US009811662B2

(12) United States Patent
Sharpe et al.

(10) Patent No.: US 9,811,662 B2
(45) Date of Patent: *Nov. 7, 2017

(54) PERFORMING ANTI-VIRUS CHECKS FOR A DISTRIBUTED FILESYSTEM

(71) Applicant: Panzura, Inc., Campbell, CA (US)

(72) Inventors: Richard Sharpe, Mountain View, CA (US); Randy Yen-pang Chou, San Jose, CA (US)

(73) Assignee: PANZURA, INC., Campbell, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 14/019,212

(22) Filed: Sep. 5, 2013

(65) Prior Publication Data
US 2014/0007239 A1    Jan. 2, 2014

Related U.S. Application Data

(63) Continuation-in-part of application No. 13/971,621, filed on Aug. 20, 2013, which is a continuation-in-part of application No. 12/772,806, filed on May 3, 2010, now Pat. No. 8,719,444, and a continuation-in-part of application No. 13/782,729, filed on Mar. 1, 2013, which is a continuation-in-part of application No. 13/769,185, filed on Feb. 15, 2013, which is a continuation-in-part of application No. 13/725,738, filed on Dec. 21, 2012, now Pat. No. 8,799,413, which is a continuation-in-part of application No. 12/772,927, filed on May 3, 2010, now Pat. No. 8,341,363, and a continuation-in-part of application No. 13/225,194, filed on Sep. 2, 2011, (Continued)

(51) Int. Cl.
G06F 15/16        (2006.01)
G06F 21/56        (2013.01)
G06F 17/30        (2006.01)

(52) U.S. Cl.
CPC ...... G06F 21/561 (2013.01); G06F 17/30097 (2013.01); G06F 17/30159 (2013.01); G06F 17/30203 (2013.01)

(58) Field of Classification Search
CPC ............ H04L 67/2842; H04L 67/1097; H04L 67/2847; H04L 29/06918; H04L 63/145; G06F 17/30902; G06F 17/30203
USPC ....................................................... 709/217
See application file for complete search history.

(56) References Cited

U.S. PATENT DOCUMENTS 6,466,978 B1    10/2002   Mukherjee et al.
6,697,846 B1    2/2004    Soltis
(Continued)

*Primary Examiner* — SM Rahman
(74) *Attorney, Agent, or Firm* — Park, Vaughan, Fleming & Dowler LLP; Mark Spiller

(57) ABSTRACT

The disclosed embodiments disclose techniques that facilitate the process of performing anti-virus checks for a distributed filesystem. Two or more cloud controllers collectively manage distributed filesystem data that is stored in one or more cloud storage systems; the cloud controllers ensure data consistency for the stored data, and each cloud controller caches portions of the distributed filesystem. During operation, a cloud controller receives a write request from a client system that seeks to store a target file in the distributed system. A scan is then performed for this target file. For instance, the scan may be an anti-virus scan that ensures that viruses are not spread to the distributed filesystem or the clients of the distributed filesystem.

20 Claims, 60 Drawing Sheets

Related U.S. Application Data now Pat. No. 8,356,016, and a continuation-in-part of application No. 13/295,844, filed on Nov. 14, 2011, now Pat. No. 8,788,628.

(56) References Cited

U.S. PATENT DOCUMENTS

| | | |
|---|---|---|
| 7,069,307 B1 | 6/2006 | Lee et al. |
| 7,610,285 B1 | 10/2009 | Zoellner et al. |
| 7,624,134 B2 | 11/2009 | Stakutis et al. |
| 7,657,550 B2 | 2/2010 | Prahlad et al. |
| 7,844,582 B1 | 11/2010 | Arbilla et al. |
| 7,865,873 B1 | 1/2011 | Zoellner et al. |
| 2004/0028068 A1* | 2/2004 | Kizhepat ............... G06F 3/0626 370/420 |
| 2004/0243644 A1 | 12/2004 | Steere et al. |
| 2006/0136720 A1* | 6/2006 | Armstrong ............. G06F 21/53 713/164 |
| 2008/0140724 A1* | 6/2008 | Flynn ..................... G06F 1/183 |
| 2010/0100698 A1 | 4/2010 | Yang et al. |
| 2010/0114832 A1 | 5/2010 | Lillbridge et al. |
| 2010/0306488 A1* | 12/2010 | Stroberger .......... G06F 11/2064 711/162 |
| 2010/0325377 A1 | 12/2010 | Lango et al. |
| 2010/0333116 A1 | 12/2010 | Prahlad et al. |
| 2011/0029730 A1* | 2/2011 | Durocher ............ G06F 12/0866 711/114 |
| 2011/0276713 A1 | 11/2011 | Brand |
| 2012/0011176 A1 | 1/2012 | Aizman |
| 2012/0089781 A1 | 4/2012 | Ranade et al. |
| 2013/0204849 A1 | 8/2013 | Chacko |

\* cited by examiner

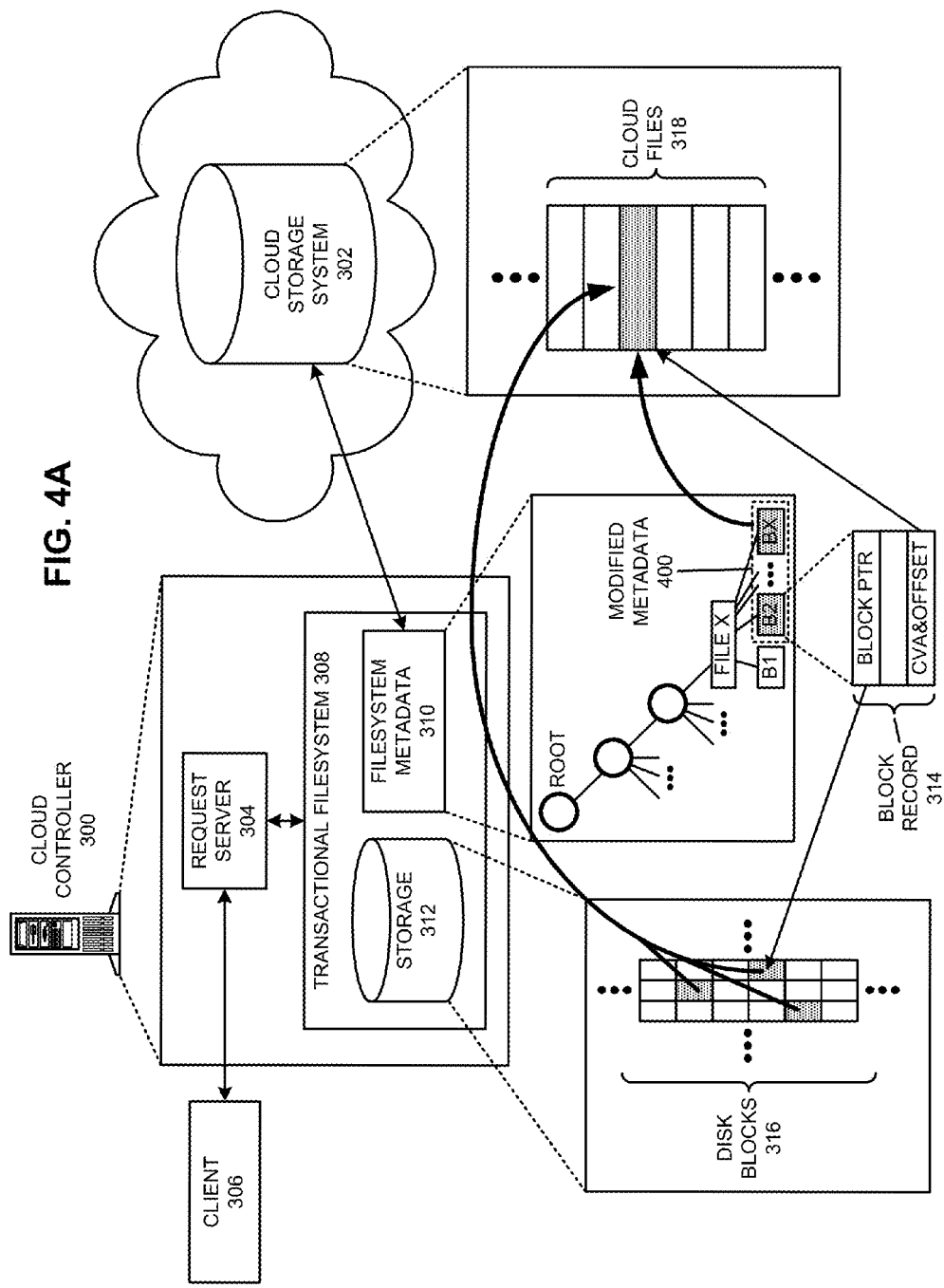

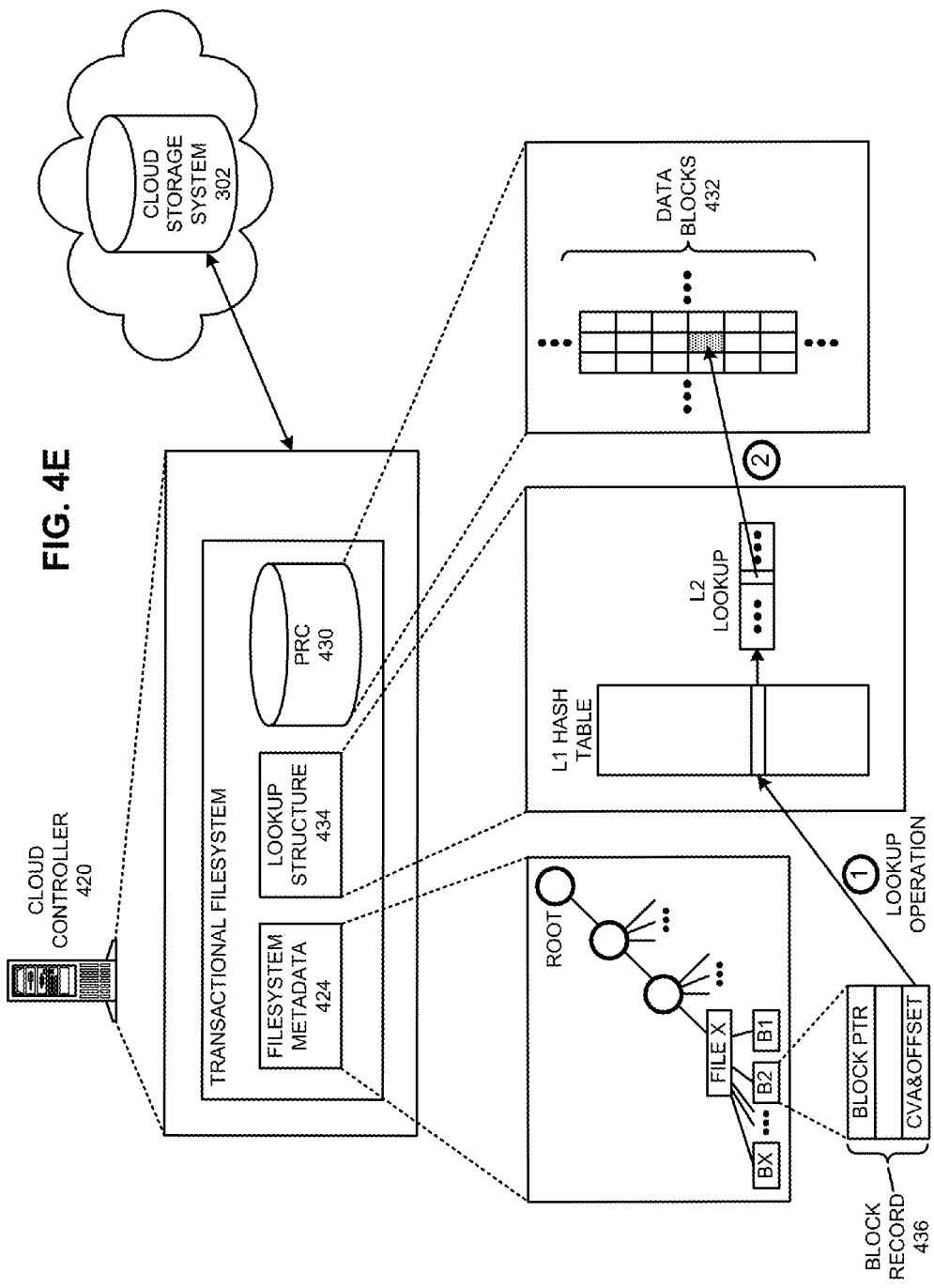

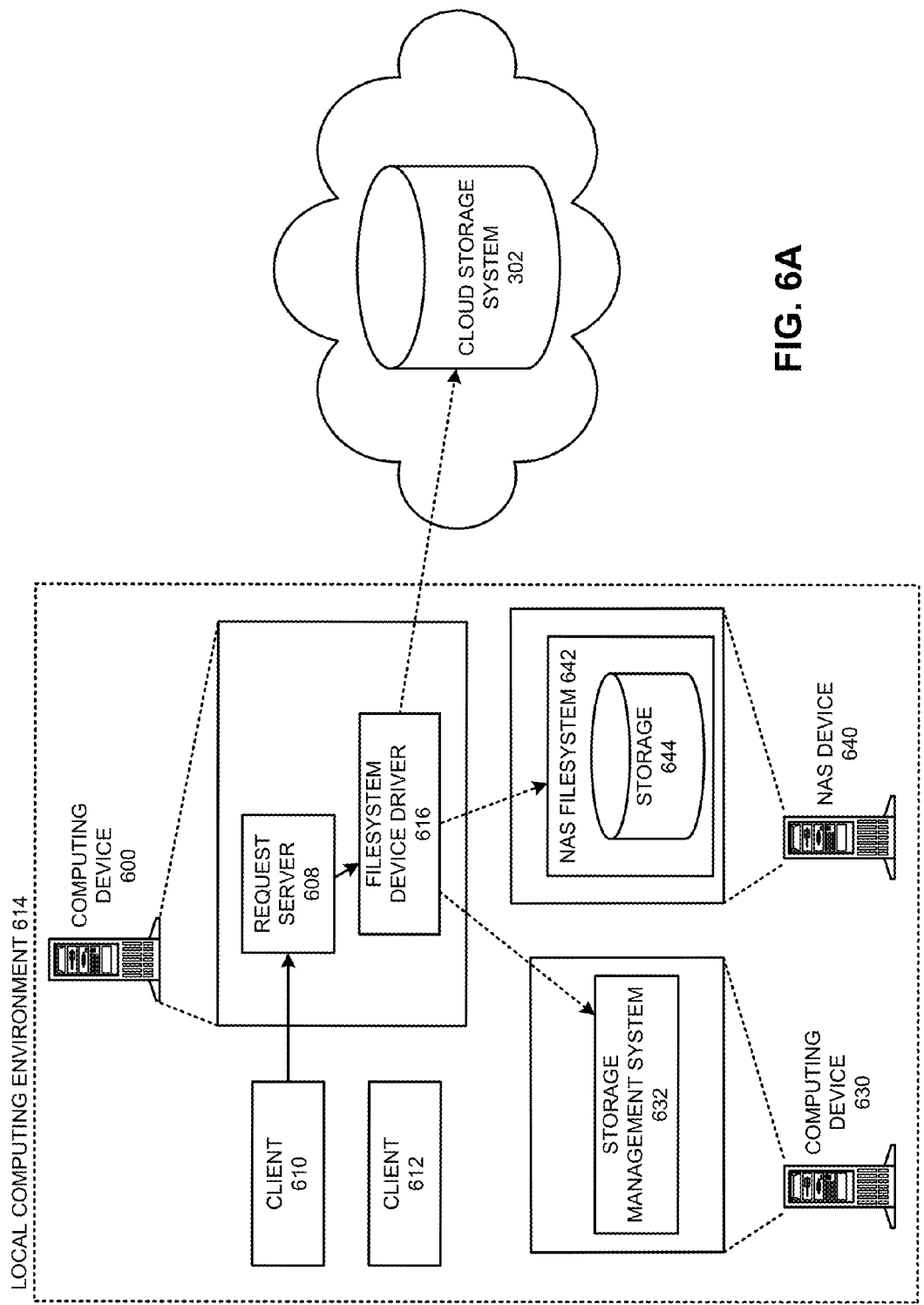

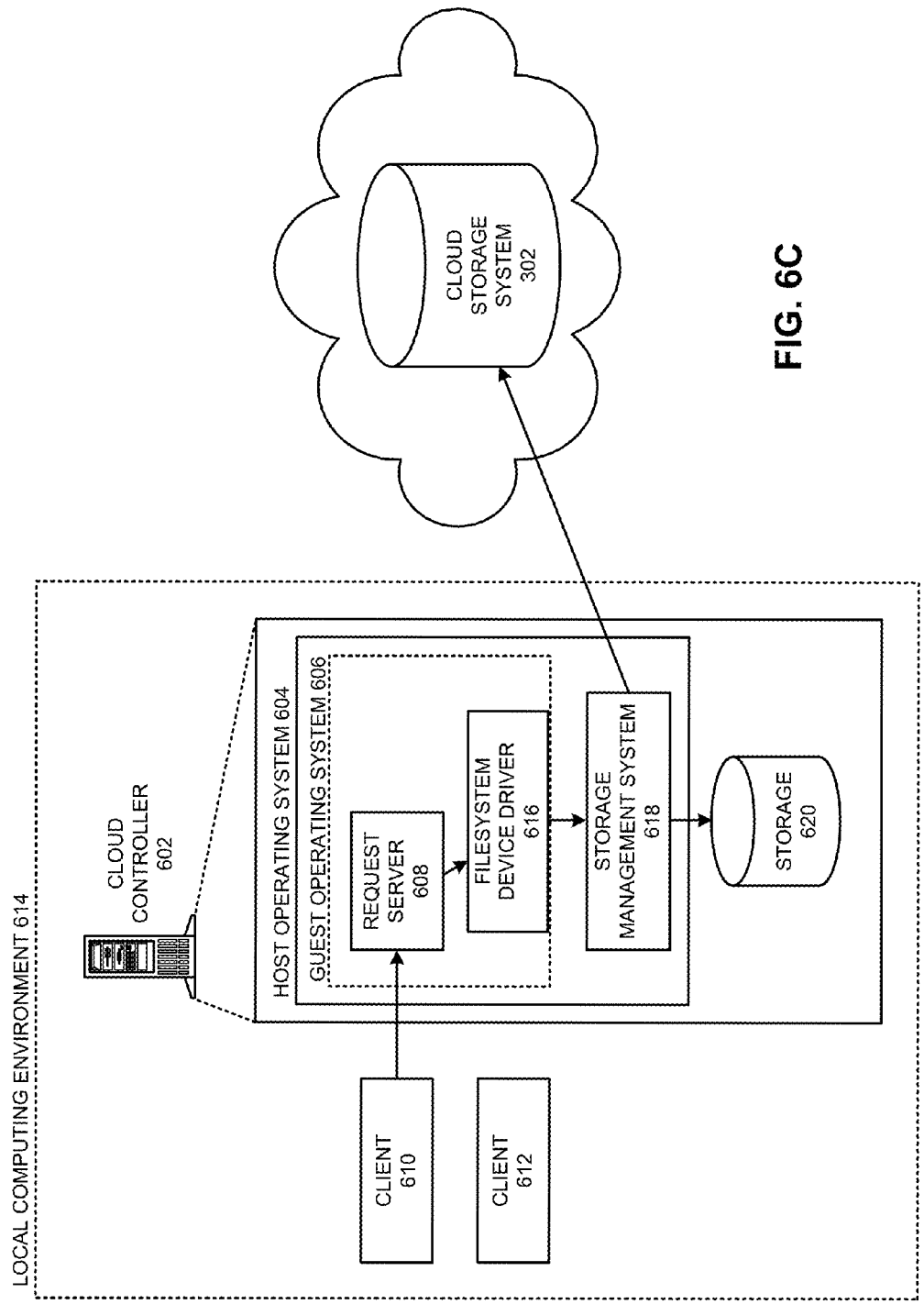

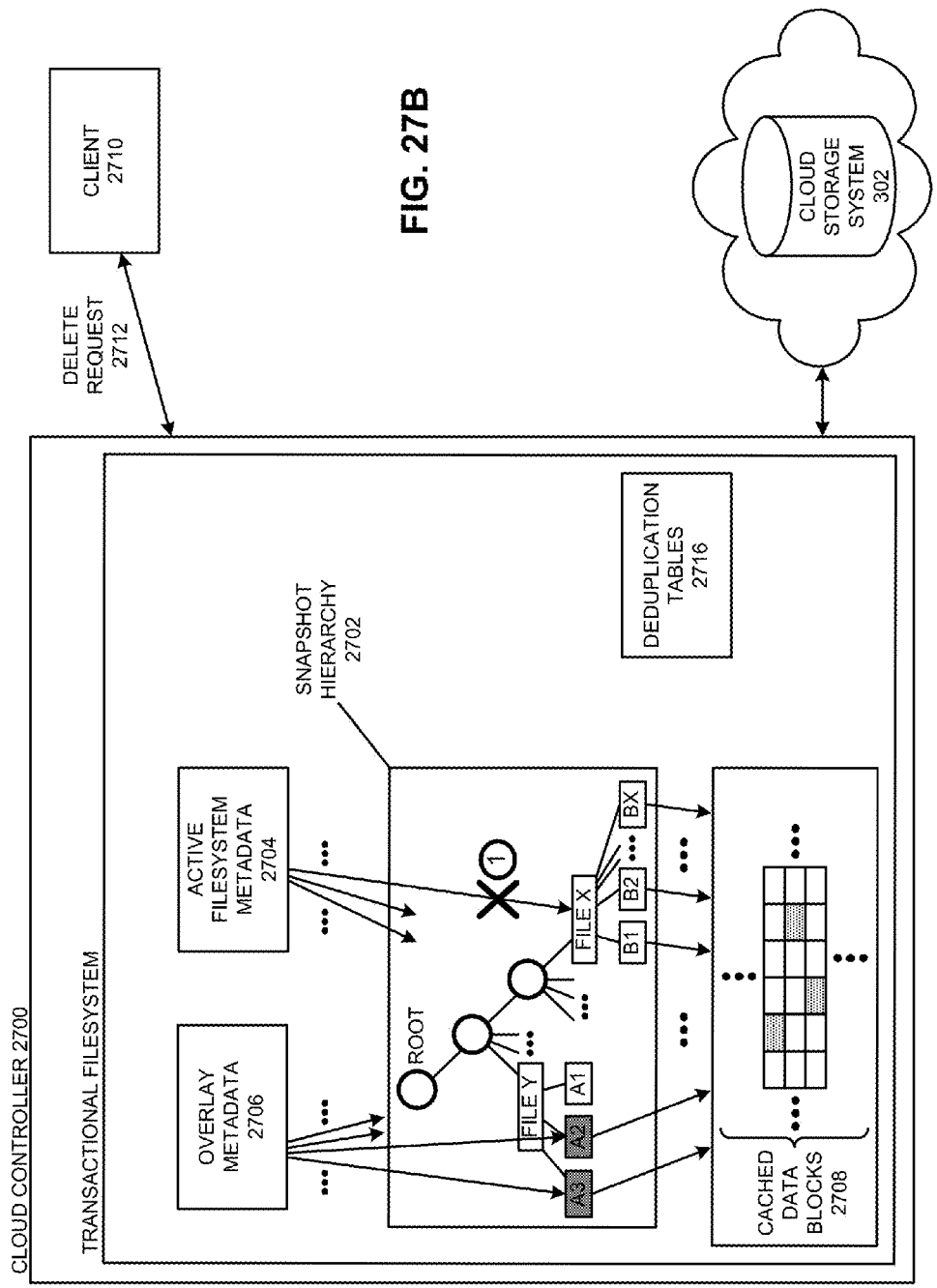

PERFORMING ANTI-VIRUS CHECKS FOR A DISTRIBUTED FILESYSTEM

RELATED APPLICATIONS

This application is a continuation-in-part application of pending U.S. patent application Ser. No. 13/971,621 filed on 20 Aug. 2013 by inventors Richard Sharpe, Randy Yen-pang Chou, and John Richard Taylor, entitled "Avoiding Client Timeouts in a Distributed Filesystem." U.S. patent application Ser. No. 13/971,621 is a continuation-in-part application of pending U.S. patent applications: (1) Ser. No. 12/772,806 filed on 3 May 2010 by inventors Randy Yen-pang Chou and Ravi Mulam, entitled "Cloud Commands"; and (2) Ser. No. 13/782,729 filed on 1 Mar. 2013 by inventors Randy Yen-pang Chou, John Richard Taylor and Andrew P. Davis, entitled "Facilitating the Recovery of a Virtual Machine Using a Distributed Filesystem". U.S. patent application Ser. No. 13/782,729 is a continuation-in-part application of pending U.S. patent application Ser. No. 13/769,185 filed on 15 Feb. 2013 by inventors John Richard Taylor, Randy Yen-pang Chou, and Andrew P. Davis, entitled "Customizing Data Management for a Distributed Filesystem". U.S. patent application Ser. No. 13/769,185 is a continuation-in-part application of pending U.S. patent application Ser. No. 13/725,738 filed on 21 Dec. 2012 by inventors John Richard Taylor, Randy Yen-pang Chou, and Andrew P. Davis, entitled "Distributing Data for a Distributed Filesystem Across Multiple Cloud Storage Systems". U.S. patent application Ser. No. 13/725,738 is a continuation-in-part application of each of the following U.S. patent applications: (1) Ser. No. 12/772,927 filed on 3 May 2010 by inventors Randy Yen-pang Chou, Ravi Mulam, and Steve Jung, entitled, "Efficient Cloud Network Attached Storage", now U.S. Pat. No. 8,341,363, issued 25 Dec. 2012; (2) Ser. No. 13/225,194 filed on 2 Sep. 2011 by inventor Randy Yen-pang Chou, entitled "Forwarding Filesystem-Level Information to a Storage Management System", now U.S. Pat. No. 8,356,016, issued 15 Jan. 2013; and (3) Ser. No. 13/295,844 filed on 14 Nov. 2011 by inventors John Richard Taylor, Randy Yen-pang Chou, and Andrew P. Davis, entitled "Pre-Fetching Data for a Distributed Filesystem". This application hereby claims priority under 35 U.S.C. §120 to the above-listed U.S. patent applications. The contents of U.S. patent application Ser. Nos. 13/971,621, 12/772,806, 13/782,729, 13/769,185, 13/725,738, 12/772,927, 13/225,194, and 13/295,844 are incorporated by reference in their entirety.

BACKGROUND

Field of the Invention

This disclosure generally relates to techniques for providing flexible and extensible network storage systems. More specifically, this disclosure relates to techniques for storing and accessing data in a distributed filesystem.

Related Art

Enterprise data centers typically include large numbers of storage devices that can be accessed using high-speed networks. However, the management overhead for a large number of storage devices can become substantial. For instance, maintaining data consistency, redundancy, and storage system performance in the presence of hard drive failures can involve substantial time, effort, and expertise.

A number of "cloud-based storage" vendors attempt to simplify storage management by providing large-scale remote network storage solutions. Such vendors can leverage economies of scale to provide extensive data storage capacity that can be leased and accessed by clients. Clients can leverage such storage solutions to offload storage management overhead and to quickly and easily increase their data storage capacity on an as-needed basis. However, cloud-based storage involves another set of inherent risks and overheads. For instance, storing data remotely ("in the cloud") often increases access latency, and multiple clients simultaneously accessing a shared data set in a cloud-based storage system may suffer from data consistency problems. Furthermore, network failures and/or outages in cloud-based storage systems can prevent clients from accessing their data for significant periods of time.

Hence, what is needed are techniques for providing network-based storage capabilities without the above-described problems of existing techniques.

SUMMARY

The disclosed embodiments disclose techniques that facilitate the process of performing anti-virus checks for a distributed filesystem. Two or more cloud controllers collectively manage distributed filesystem data that is stored in one or more cloud storage systems; the cloud controllers ensure data consistency for the stored data, and each cloud controller caches portions of the distributed filesystem. During operation, a cloud controller receives a write request from a client system that seeks to store a target file in the distributed system. A scan is then performed for this target file. For instance, the scan may be an anti-virus scan that ensures that viruses are not spread to the distributed filesystem or the clients of the distributed filesystem.

In some embodiments, the metadata for each file in the distributed filesystem includes a "clean field" that is marked when the file has been scanned and determined to be clean of any viruses. In this context, performing the anti-virus scan of the target file involves marking the clean field for the target file if no virus is found for the target file. Every cloud controller receiving a client request to access the target file confirms that the clean field for the target file is marked before allowing clients to access the target file.

In some embodiments, performing the anti-virus scan involves: (1) storage the cloud files that contain the data blocks for the target file in a cloud storage system; (2) sending an incremental snapshot containing the metadata for the target file from the cloud controller to the other cloud controllers for the distributed filesystem; (3) receiving the incremental metadata snapshot at another cloud controller that is associated with anti-virus scanning operations; and (4), if no virus is found for the target file, sending a subsequent incremental metadata snapshot from this cloud controller in which the clean field for the target file is marked.

In some embodiments, the cloud storage system, a cloud controller that is associated with anti-virus scanning operations, and an anti-virus service are all co-located in a cloud computing environment. This cloud controller downloads the target file by downloading the cloud file(s) containing the data blocks for the target file from the cloud storage system and then transfers the target file to the anti-virus service. The anti-virus service performs the scan, and then sends the results to the cloud controller.

In some embodiments, the anti-virus scan is initiated at the time that the target file is written to the distributed filesystem.

In some embodiments, the anti-virus scan is initiated at the time that the target file is accessed via a client request. For instance, the anti-virus scan may execute at the same time that a cloud controller associated with the request is downloading and processing the cloud files containing the data blocks of the target file.

In some embodiments, a first anti-virus scan of the target file is initiated at the time that the target file is written to the distributed filesystem, and the metadata for the target file includes a version field that tracks the version of the virus definitions that was used to perform this first scan. The target file is re-scanned if an updated set of virus definitions are available when the target file is accessed.

In some embodiments, a first anti-virus scan of the target file is initiated at the time that the target file is written to the distributed filesystem, and a subsequent anti-virus scan of the target file is initiated when the anti-virus service receives an updated set of virus definitions.

In some embodiments, subsequent anti-virus scans for the distributed filesystem are configured to selectively re-scan a subset of the distributed filesystem. For instance, portions of the distributed filesystem to be re-scanned may be selected based on the file type for a file, the owner of the file, and the location of the file in the distributed filesystem hierarchy.

In some embodiments, the clean field is organized in a manner that allows sub-portions of the target file that have already been scanned to be marked as clean, thereby allowing portions of the target file that have been marked as clean to be served to a requesting client while the anti-virus service is still scanning other portions of the target file.

BRIEF DESCRIPTION OF THE FIGURES

FIG. 4A illustrates the process of generating a cloud file for a snapshot in the context of the exemplary system of FIG. 3 in accordance with an embodiment.

FIG. 4E illustrates an alternative exemplary cache configuration for cloud controllers in accordance with an embodiment.

FIG. 6A illustrates a computing device that receives and forwards requests for filesystem operations in accordance with an embodiment.

FIG. 6C illustrates a cloud controller in which a filesystem device driver in a guest operating system forwards requests for filesystem operations in accordance with an embodiment.

FIG. 27B illustrates the initiation of a delete operation at a cloud controller in accordance with an embodiment.

DETAILED DESCRIPTION

Figure 1A:
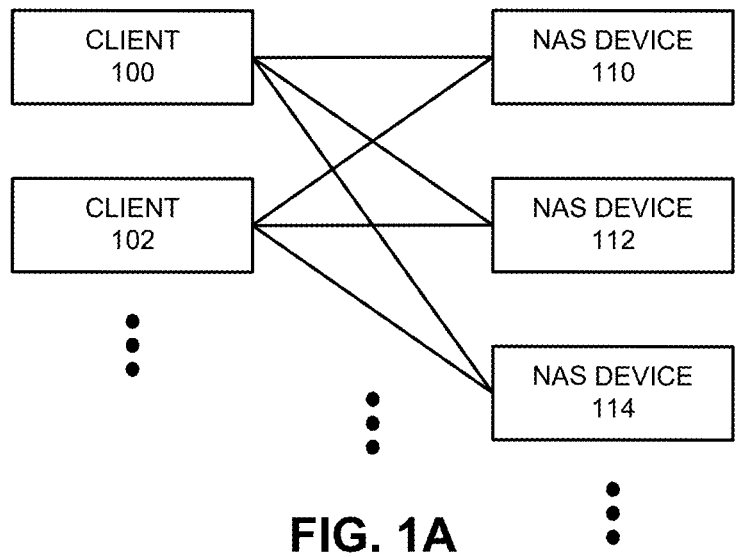
FIG. 1A illustrates a set of clients that are configured to access NAS devices.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Evolution of Network-Based Storage Systems

The proliferation of the Internet and large data sets has motivated a range of specialized data storage techniques. For instance, network-attached storage (NAS) devices often serve as centralized storage devices that provide large amounts of storage space for a set of heterogeneous clients in an enterprise. Such devices are typically tuned to provide a desired level of performance, redundancy (e.g., using a redundant array of independent disks (RAID)), and high availability. For example, while typical filesystems may take a substantial amount of time to recover from a crash (as the system has to process logs and/or journals to correctly rebuild modified data that was queued or in the process of being written at the time of the crash), NAS devices often incorporate transactional copy-on-write filesystems, which sacrifice some read performance in exchange for faster crash recovery. In a transactional copy-on-write filesystem, a file is not modified in place; instead, the system uses a delta encoding to append modifications ("deltas") to the previous file data. Such encodings increase the overhead associated with read operations, because the system incurs additional computation and access time to read and process deltas stored at the end of a file. However, this encoding also ensures that files are "data-consistent" (e.g., reliably incorruptible and consistent across crashes and reboots), thereby allowing NAS devices to recover quickly from failures. Such characteristics and capabilities have made NAS devices popular in enterprise environments.

Unfortunately, storage scalability can become problematic when data needs outscale the capabilities of a single NAS device; providing redundancy across multiple separate NAS devices (as illustrated in FIG. 1A) can involve substantial configuration expertise. For instance, consider the scenario of responding to a drive failure. Typically, a redundant storage system attempts to restore lost bits and re-establish redundancy as quickly as possible. However, in some scenarios, depending on the application and load, the storage system may need to place higher priority on continuing to serve client requests with a specified level of performance, and hence may need to delay restoration efforts. Storage systems typically need to be architected very carefully based on expected client needs, application needs, and load characteristics.

Figure 1B:
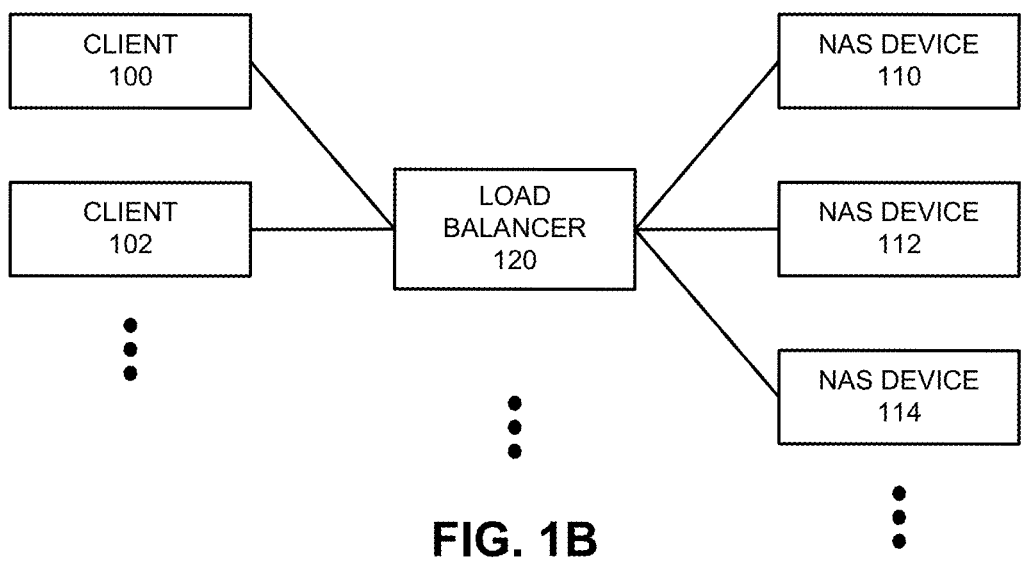
FIG. 1B illustrates a set of clients that are configured to access NAS devices via a load balancer.

FIG. 1A illustrates a set of clients (100-102) that are configured to access NAS devices (110-114). Note that management overhead typically increases in proportion with the amount of storage available. For instance, as the number of supported applications and storage space increase, a storage system may need to grow to include a load balancer 120 between the clients (100-102) and the NAS devices (110-114), as illustrated in FIG. 1B. Load balancer 120 can explicitly partition applications and clients to a given NAS device, and then route requests accordingly. While initial NAS vendors primarily focused on speed and reliability, as storage needs have continued to grow NAS vendors have also begun to compete by including sophisticated system management solutions that facilitate adapting to different storage, performance, and failure scenarios.

Figure 2:
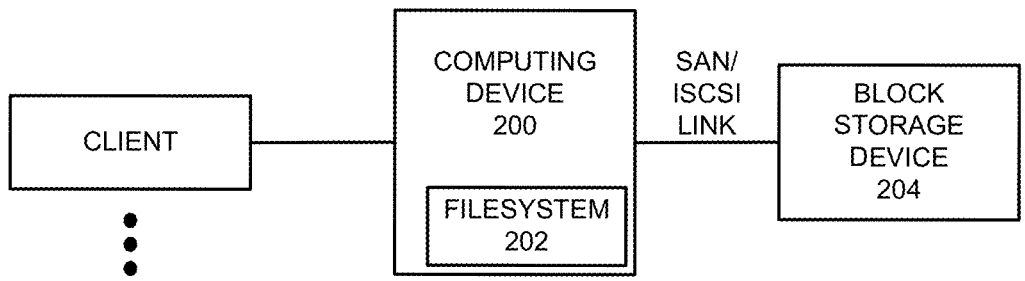
FIG. 2 illustrates a network storage system that provides remote storage with a disk-level abstraction.

FIG. 2 illustrates another network storage system that provides remote storage, but with a disk-level abstraction. In such an architecture, a computing device 200 manages metadata for a filesystem 202 locally, and then sends block-level read/write requests to a remote block storage device 204 via a storage area network (SAN) (e.g., by using the Internet Small Computer System Interface (ISCSI) or a Fibre Channel protocol). More specifically, block storage device 204 provides only a block storage interface, and is unaware of any filesystem structure associations (e.g., file names and/or structures) for the stored blocks. Such storage systems typically do not use transactional copy-on-write filesystems, and hence are not data-consistent.

Note that there is a significant distinction between filesystem-level operations and block-level (e.g., disk-level) operations. A filesystem typically serves as an intermediary between an operating system and one or more block-level devices. More specifically, a filesystem typically attempts to efficiently manage one or more block-level devices to provide more sophisticated storage services to an operating system. For instance, filesystems often manage disk blocks and metadata to provide structure (e.g., files and directories) and some notion of access rights and data consistency (e.g., via file lock operations) for an underlying block storage mechanism. Hence, filesystem-level operations provide a higher level of abstraction (e.g., a filename and an ordering associated with an underlying set of disk blocks) for the block storage mechanism.

Typically, a filesystem and an associated block storage device both operate in the context of the same computing device, and the block storage device has been specially initialized (e.g., formatted) to support the filesystem. Upon receiving a request for a filesystem operation (e.g., from an operating system and/or application), the filesystem determines and initiates a set of block-level operations needed to service the request. Hence, there is a notion of "filesystem-level information" (e.g., the level of information managed by the filesystem and received in a request for a file operation) and a separate notion of "block-level information" that is used when the filesystem operates upon the underlying block storage device. In the example of FIG. 2, the functionality of the filesystem and the underlying block storage are split across two different devices (computing device 200 and block storage device 204). As mentioned above, block storage device 204 provides only a block storage interface, and is unaware of any filesystem structure associations for the stored blocks. Block storage device 204 may store filesystem metadata on behalf of filesystem 202, but it is filesystem 202 that provides the higher level of abstraction to the operating system of computing device 200.

A number of "cloud-based storage" vendors (also sometimes referred to as "cloud storage providers") attempt to simplify storage management by providing large-scale network storage solutions. Such vendors can leverage economies of scale to provide data centers with extensive data storage capacity that can then be rented and accessed by clients, thereby allowing clients to offload storage management overhead and easily increase their data storage on an as-needed basis. However, cloud-based storage also includes another set of inherent risks and overheads. Storing data remotely ("in the cloud") often increases access latency, and network failures and/or outages in cloud-based storage systems can prevent clients from accessing their data for substantial time intervals. Furthermore, multiple clients simultaneously accessing a shared data set in a cloud-based storage system may suffer from data consistency issues.

Consider a scenario where one remote client attempts to write a set of data to a cloud storage system, and a second remote client attempts to read the data that is being written. In some systems, a reader may not be able to see the existence of newly written file data until the entire write operation has completed (e.g., after the first remote client has closed the file). In other (non-data-consistent) arrangements, the reader may see and access the file, but because writes are stateless and potentially out-of-order (e.g., as in the Network File System (NFS) protocol), does not know which file sections have already been written, and hence may access a mix of valid data and garbage.

Embodiments of the present invention combine aspects of NAS capabilities and cloud-based storage capabilities to provide a high-capacity, high-reliability storage system that ensures that data can be accessed in a data-consistent manner.

Providing Data Consistency in a Cloud Storage System

In some embodiments, a set of caching storage devices (referred to as "cloud controllers") collectively cache, manage, and ensure data consistency for a set of data that is stored in a network storage system (e.g., a cloud-based storage system, which is also referred to as a cloud storage system). More specifically, one or more cloud controllers work together (e.g., as a federation) to manage a distributed filesystem with a global address space. Each cloud controller maintains (e.g., stores and updates) metadata that describes the file and directory layout of the distributed filesystem and the location of the data blocks in the cloud storage system. Each cloud controller can also cache a subset of the data that is stored in the cloud storage system. A cloud controller that writes (or modifies) data ensures that: (1) data changes are reflected in the cloud storage system; and (2) other cloud controllers in the system are informed of file and metadata changes.

Note that while the cloud storage system stores the data for the distributed filesystem, the cloud storage capabilities may be provided by an external vendor. An enterprise storing sensitive data in the distributed filesystem may not want this vendor to be able to access such data, and hence, the cloud storage system may be configured to store the distributed filesystem's data in the form of encrypted storage volumes (referred to as "cloud files" or "drive files"). This configuration enhances data security, but also prevents the cloud storage system from actively assisting in ensuring data consistency and performing other operations that require knowledge of the data and data layout. More specifically, in some embodiments the cloud controllers fully manage the filesystem and manage data consistency, with the cloud storage system providing purely storage capabilities.

Figure 3:
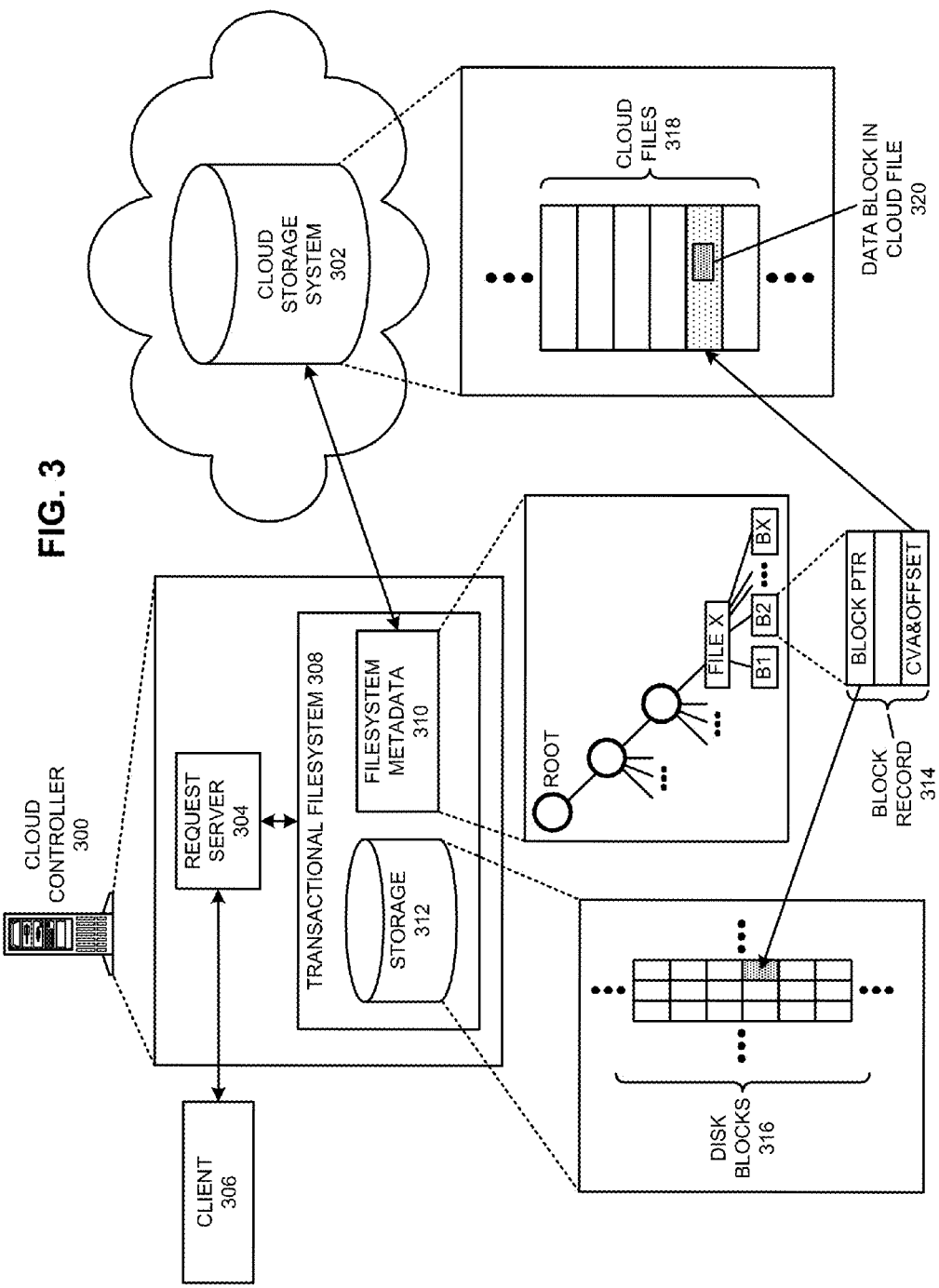
FIG. 3 illustrates an exemplary system in which a cloud controller manages and accesses data stored in a cloud storage system in accordance with an embodiment.

FIG. 3 illustrates an exemplary system in which a cloud controller 300 (e.g., a caching storage device) manages and accesses data stored in a cloud storage system 302. A request server 304 in cloud controller 300 may receive file requests from either local processes or via a network from a client 306. These requests are presented to a storage management system that includes a transactional filesystem 308 that manages a set of filesystem metadata 310 and a local storage system 312. In FIG. 3, the filesystem structure defined by metadata 310 is illustrated as a tree of pointers that define one or more levels of directories and files residing in directories. Each file is described using a set of ordered metadata structures that indicate the set of disk blocks that contain the file's data. A set of block records 314 in metadata 310 include pointer fields that indicate the location of the file data in a disk block 316 in local storage 312 (if the given block is currently being cached in the storage 312 of cloud controller 300), as well as the location of the file data in a cloud file 318. Note that disk blocks 316 and cloud files 318 may have substantially different sizes. For instance, cloud files might be much larger than disk blocks, and hence the data contained in a disk block 316 may occupy only a portion of a cloud file 320. Hence, one pointer field in block record 314 may consist of a block pointer (labeled "BLOCK PTR" in FIG. 3) that points to a specific disk block, while another field (labeled "CVA&OFFSET") may include both a pointer to a cloud file (also referred to as a "cloud virtual address," or CVA) and an offset into the cloud file.

Note that using a transactional filesystem in each cloud controller does involve some additional overhead. As described above, the transactional filesystem tracks modifications using delta encoding (instead of the more typical read/copy/modify operations used in many non-data-consistent filesystems). For instance, consider a 1 KB modification to an existing 3 KB file in a filesystem that supports 4 KB blocks. Using a traditional approach, the filesystem might read out the original 4 KB block, modify the block to reflect the updates, and then write the modified file back to the same block. In contrast, in a transactional filesystem, the original block is left unchanged, and the filesystem writes out the modifications and additional data to another empty 4 KB block. The metadata for the transactional filesystem is extended to support the notion of partial blocks and deltas (e.g., including one pointer that points to 3 KB of data in one block and another pointer that points to another block that contains 1 KB of additional data and a set of changes that should be applied to the initial 3 KB of data).

In some embodiments, using a transactional filesystem (e.g., transactional filesystem 308 in FIG. 3) in a cloud controller facilitates providing ongoing incremental snapshots of changes to a cloud storage system and other cloud controllers. More specifically, the transactional nature (e.g., the delta encoding of changes) can be extended to include a set of additional metadata structures that track recently changed data in the cloud controller. These additional metadata structures can then be used to quickly and efficiently construct compact snapshots that identify file metadata and file data that has changed due to recent write operations. Note that these snapshots do not involve copying a full set of metadata and/or every byte that was previously written for a file; instead, such snapshots compactly convey only the set of changes for the data set. Sending only a compact set of changes facilitates maintaining data consistency while minimizing the amount of data (and metadata) that needs to be transferred and processed. Sending frequent snapshots ensures that changes are quickly propagated to other cloud controllers and the cloud storage system.

In some embodiments, cloud controllers generate separate metadata snapshots and file data snapshots. Metadata is typically much smaller than file data, and is needed to access file data. Furthermore, each cloud controller is typically configured to maintain (and update) the full set of metadata, but only caches file data that is needed by local clients. Hence, uploading (or sending) a metadata snapshot separately means that the updated metadata will be more quickly available to other peer cloud controllers. Each of these peer cloud controllers can then determine (e.g., based on client data usage and needs) whether to access the related file data associated with the updated metadata. Note that a cloud controller may still upload both metadata updates and file data updates to the cloud storage system, but may split them into different sets of cloud files (or both include the metadata with the file data as well as generate another separate, duplicative update that includes only metadata) so that other cloud controllers can access the two separately. In such an organization, a cloud controller might then send a message to other cloud controllers specifying the location of the stored metadata snapshot. Alternatively, cloud controllers may also be configured to send metadata snapshots directly to a set of peer cloud controllers.

Consider an example of a cloud controller receiving a request from a client to store a 10 GB file, in an environment where the network link between the cloud controller and a cloud storage system supports a transfer speed of 1 GB/minute and the cloud controller is configured to send a metadata snapshot every minute. Upon determining the scope of the file operation, the cloud controller can already allocate a set of corresponding disk blocks and cloud files, and generate a set of corresponding metadata that indicates the respective disk addresses and CVAs for the file's data blocks. The cloud controller then uploads the file data to the cloud storage system over a time interval (e.g., roughly ten minutes), and sends out metadata snapshots that indicate the existence and location of the data blocks. The cloud controller may convey a range of information about the data being uploaded to other cloud controllers depending on the level of transparency and availability desired for modified data. For instance, in some embodiments, the file remains accessible by clients via the originating cloud controller throughout the upload process. However, other cloud controllers that have received the corresponding metadata and seek to access modified data that has not yet been received by the cloud storage system may receive an indication that the data is not yet available, and that their access attempts should be re-tried at a later time (or after a specified time interval). Alternatively, in some instances, when a set of data has not yet been uploaded to the cloud storage system, a client (and/or cloud controller) that hence cannot yet access this data via the cloud storage system may be configured to gain access to the desired data by directly interacting with the cloud controller hosting the desired data. Such alternative access techniques may depend on the capabilities and topography of the network connecting the cloud controllers and cloud storage system.

In some embodiments, the originating cloud controller may propagate additional intermediate metadata that informs other cloud controllers as portions of the modified data become available in the cloud storage system. For instance, metadata snapshots may indicate files that are in the process of being uploaded, and include a field that indicates whether a given data block has been successfully stored in the cloud storage system. The cloud controller updates (and propagates) this metadata as it receives acknowledgments of receipt from the cloud storage system, thereby indicating that some of the data being uploaded is now already available in the cloud storage system. For example, immediately after first storing the 10 GB file locally, the cloud controller may have already reserved 10 GB of space in cloud files at a given set of CVA addresses (e.g., in the cloud storage system), but have not yet transferred any file data. A snapshot sent at this point includes metadata that indicates the existence of the file, but also indicates that none of the data is available in the cloud storage system yet. After one minute, the cloud controller sends out another snapshot containing metadata that reflects the set of data that has already been transferred to (and been acknowledged as received by) the cloud storage system.

In some embodiments, each cloud controller maintains a set of structures that track snapshots and changes in metadata, and updates its local metadata to reflect updates from the rest of the distributed system. For instance, a cloud controller receiving the first snapshot from the above example may note the creation of a 10 GB file (as described in the above example), but then also determine that none of the associated data blocks is available yet. After receiving and processing the second snapshot, the receiving cloud controller determines the presence and location of the first GB of stored data that is now available. At this point, the receiving cloud controller may, if desired, use the received metadata to already download and access the available file data from the cloud storage system on behalf of a client. If, however, a client requests additional parts of the file that have not yet been stored in the cloud storage system (as indicated by the metadata in the most recent snapshot), the cloud controller can signal that the desired data is not yet available, and delay the access. More of the file data becomes available over time, as indicated by the subsequent snapshots.

Note that cloud controllers can use the detailed information received in snapshots to provide a range of data access and data consistency capabilities. More specifically, each cloud controller receives ongoing updates that identify valid data, and indicate how to find and access such data. If data is written to the cloud storage system out-of-order, this is reflected in the received snapshot(s), and the cloud controller (and/or a requesting client) can use such received snapshot information to determine how to proceed.

In some embodiments, cloud controllers may use stored snapshot data to provide access to different versions of a file. For instance, in the preceding example, a cloud controller may allow a client to already access the uploaded (and acknowledged) portions of a new file before the file has been completely uploaded to the cloud storage system. Similarly, the cloud controller may allow the client to access modified file data as it becomes available in the cloud storage system. Alternatively, in other scenarios, when an existing file is being modified, a cloud controller may be configured to present a previous version of the file to clients until the complete set of data for the modified version is available in the cloud storage system. In some embodiments, cloud controllers may maintain records of past snapshots to allow file accesses to be rolled back across multiple different versions, thereby allowing clients to view historical versions of files and/or the changes made to files over time.

In general, the disclosed techniques leverage transactional filesystem techniques and snapshots to ensure that only valid data can be accessed. While these techniques involve some additional complexity, they also provide an assurance of data consistency for a distributed filesystem that leverages cloud storage. The following sections describe additional aspects of storing and accessing data in the disclosed distributed filesystem.

Generating Snapshots and Cloud Files

A number of factors affect the performance of accessing data from a cloud storage system. In a typical computer data is stored locally on a disk, and a number of hardware and operating system mechanisms attempt to minimize the latency of reads and writes. For instance, processors and operating systems strive to load frequently used data into memory and multiple levels of hardware caches, thereby reducing the latency associated with reading data from disk. Accessing data stored on a cloud storage system involves an additional set of latencies. For instance, in addition to normal disk latency, accessing a cloud storage system may involve additional latency due to network latency, network protocol handshaking, network transfer times, and delays associated with encryption or decryption. One of the challenges of a distributed filesystem is minimizing such latencies as much as possible.

One factor that can significantly affect the latency of data access in the described distributed filesystem is cloud file size. Overly small cloud files can result in higher network negotiation and transfer overhead. Conversely, overly large cloud files can result in large transfer delays; for instance, a cloud controller that needs only a small piece of data from a large cloud file that is serially encrypted may need to wait for the entire file to be downloaded and decrypted before it can access the desired data. Determining a reasonable cloud file size that maximizes throughput to and from the cloud storage system may depend on factors such as network link size and latency (e.g., transfer speeds), local filesystem block sizes (e.g., making the cloud file size a multiple of a local block size), and CVA pointer sizes or boundaries. Another trade-off involves determining whether to use fixed-sized or variable-sized cloud files.

Variable-sized cloud files allow some level of customization to match network and application characteristics, but also involve additional complexity to manage the different sizes. Hence, in some embodiments the system reduces management overhead by using a single fixed cloud file size (e.g., 32 MB) throughout the cloud controllers and cloud storage system. Note, however, that the contents of each cloud file may vary based on the set of data currently being generated or modified. For instance, data blocks being stored for large files (e.g., larger than 32 MB in the case of 32 MB cloud files) may be split across two or more cloud files. Alternatively, if the current load involves storing data for multiple small files or making a large number of small file modifications, a corresponding cloud file may contain multiple user files and deltas. Note also that, in some embodiments, data and meta-data are always separated into different cloud files. In general, cloud controllers may use a range of techniques to stripe chunks of data across cloud files in an attempt to optimize subsequent accesses from such cloud files.

FIG. 4A illustrates the process of generating a cloud file for a snapshot in the context of the exemplary system of FIG. 3. As indicated by filesystem metadata 310, a file ("file X") includes a set of metadata 400 and a set of disk blocks (the highlighted blocks among disk blocks 316) that have been modified since a previous snapshot. During the snapshot process, cloud controller 300 freezes the pointers in the blocks, and determines the set of metadata and data that should be written out to cloud storage system 302. The modified data is then packaged into units that match the granularity of cloud files (e.g., into 32 MB segments), optionally encrypted, and then uploaded to cloud storage system 302.

Note that cloud files are also written to in an incremental, transactional fashion, to preserve data consistency. More specifically, new and modified file data is written to a separate cloud file, as in a transactional filesystem, to ensure that the consistency of previous file versions is preserved. Thus, an initial set of data for a given file is written to one cloud file, and later additions or modifications to the file detected by a subsequent snapshot are written to a new, different cloud file.

The filesystem metadata for each disk block includes information that specifically identifies the location and enables the lookup of the disk block in a cloud file. For instance, the metadata may include one or more of the following: a CVA (cloud virtual address) that uniquely addresses the cloud file; the offset of the disk block in the cloud file; a physical and logical size for the disk block; the portions of the disk block that are valid; compression information; a checksum hash value or other checksum information; and information that indicates whether the disk block has already been successfully uploaded to the cloud storage system.

To ensure data consistency, cloud controllers need to ensure that each cloud controller assigns unique CVAs that create non-overlapping cloud files. More specifically, the cloud controllers need to collectively manage the global address space for the distributed filesystem. In some embodiments, each cloud controller is assigned a unique identifier, the collective set of cloud controllers are associated with a total amount of cloud storage space, and each cloud controller is pre-allocated a portion of the global address space. In such embodiments, a cloud controller can already allocate a cloud file in this pre-allocated address range at the time that it writes a new disk block, and store the CVA of the cloud file in the block's metadata. This organization ensures that there are no collisions in allocating cloud file addresses, and also ensures that even the first metadata snapshot for a new disk block already includes an accurate (future) location of the disk block in the cloud storage system. Note that the allocations of the global address space can be adjusted as needed over time if more data is created on a subset of the cloud controllers.

While most updates and file changes can propagate through the distributed filesystem via incremental snapshots, some data consistency issues can arise if multiple clients accessing two different cloud controllers attempt to simultaneously write the same file. Downloading and importing snapshot data may involve some latency, and thus such conflicting operations may lead to race conditions and errors. Hence, in some embodiments, each file is associated with a cloud controller that "owns" (e.g., actively manages) the file. For instance, the cloud controller from which a file was first written may by default be registered (in the file block metadata) as the owner (e.g., the owning cloud controller) of the file. A cloud controller attempting to write a file owned by another cloud controller first contacts the owner with a request to lock the file. The owner can determine whether to grant or deny the lock request. In some embodiments, even if this request is granted, all write operations may be required to go through the cloud controller that owns the file (e.g., new data is written to the local filesystem of the owning cloud controller). Note that while every cloud controller actively manages a set of files, a given cloud controller may not need to continue to cache every disk block of files that it owns; once such blocks have been written to the cloud storage system, they may subsequently be cleared from the cloud controller to make space for other needed data. However, the metadata for all of the files in the distributed system is typically maintained in every cloud controller. In some embodiments, the system may also include mechanisms for transferring ownership of files between cloud controllers (e.g., migrating file ownership to cloud controllers that are the primary modifiers of the file to reduce network latency).

Optimizing the Creation of Cloud Files

Note that a cloud controller may use a range of techniques to generate cloud files. For instance, one such technique may involve: (1) allocating one or more cloud-file-size memory buffers; (2) copying the file and metadata for the cloud file into a memory buffer; (3) encrypting the contents of the memory buffer; and (4) uploading the encrypted contents of the memory buffer to a cloud storage system as a cloud file. Note, however, that this technique involves allocating and using additional memory buffers, and potentially performing a large number of data copy operations.

In some embodiments, a cloud controller generates an additional set of filesystem overlay metadata that allows existing file data and metadata to be virtually linked together into a cloud file view. For instance, the system can construct such overlay metadata when writing new blocks (and corresponding metadata). Alternatively, the cloud controller may instead generate such overlay metadata while traversing the filesystem to find changed data to include in the next incremental snapshot. Either way, unlike the above memory-buffer technique, this overlay metadata facilitates minimizing the use of additional resources by creating cloud files "in place" (e.g., without allocating additional memory buffers or additional copy operations); instead, a set of pointers point to the original blocks in the transactional filesystem that contain the modified data and metadata. Note that while such additional overlay metadata may involve some additional space and computational complexity, these additional needs are typically small compared to the space and copy overhead associated with other approaches.

When creating a snapshot, a cloud controller can access the overlay metadata to read, encrypt, and upload the cloud file to the cloud storage system. For instance, the overlay metadata may facilitate accessing the virtual cloud file via a special filesystem directory that presents a view of the disparate data blocks as a single, consolidated cloud file that can be read and transferred. In many scenarios the cloud controller primarily maintains overlay metadata for data that has not yet been written out to a cloud file; in some embodiments, once the data has been uploaded to the cloud storage system, the cloud controller clears the overlay metadata and begins generating new overlay metadata to track changes destined for a subsequent set of cloud files. In other embodiments, a cloud controller may maintain snapshot information and overlay cloud files locally for a longer time interval (e.g., until space constraints on the cloud controller prompt the removal of infrequently used data).

Figure 4B:
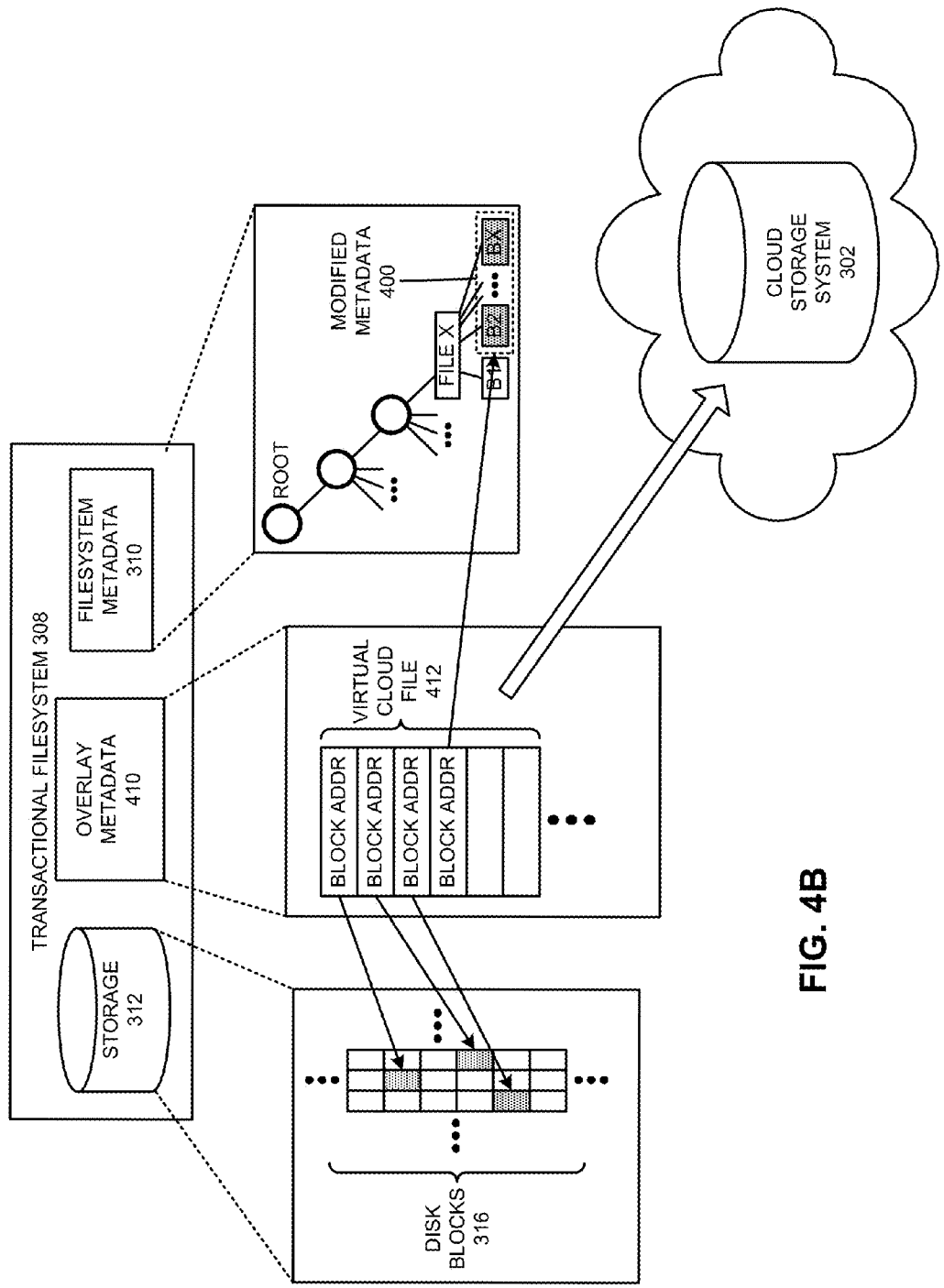
FIG. 4B illustrates a set of overlay metadata and a virtual cloud file in the exemplary system of FIG. 3 in accordance with an embodiment.

FIG. 4B illustrates a set of overlay metadata 410 and a virtual cloud file 412 in the exemplary system of FIG. 3. During operation, cloud controller 300 uses overlay metadata 410 to track the metadata 400 and data disk blocks (the highlighted blocks among disk blocks 316) that have been modified since a previous snapshot. During the snapshot process, cloud controller 300 reads and uploads the virtual cloud file 412 presented in the overlay metadata 410 into a cloud file in cloud storage system 302. Note that the transactional nature of cloud files can lead to substantial distribution of file data in a cloud storage system over time. For instance, files that are modified multiple times across multiple snapshots will be stored in different cloud files. Thus, a cloud controller that has flushed the file data (as described in more detail in the following sections) may need to download and access all of the relevant cloud files to reconstruct the file at a later time, which may involve considerable network bandwidth and time. Unfortunately, the initial cloud file for a given file is generated at the time that the first set of file data is written; at this time, little is known about the likely future access patterns for the file.

In some embodiments, a cloud controller attempts to optimize the placement of data into cloud files to reduce future access overhead. For instance, the cloud controller may strive to, when possible, store all blocks for a file in the same cloud file (e.g., assuming the size of the file and/or file modifications are smaller than the size of a cloud file). Toward this end, the cloud controller may place data into multiple cloud files in parallel, and avoid storing data for multiple files in the same cloud file unless the complete set of data for some or all of the files will fit. A cloud controller may also perform additional file grouping based on user configuration and/or automatic analysis of file access trends. For example, users may be provided with a way to configure a policy that reflects anticipated file access patterns, groupings, and/or priorities (e.g., a user policy that indicates files with a certain extension are likely to be accessed together, and thus should be grouped together).

Note that some cloud files may be partially empty. For instance, a cloud controller that is generating a snapshot based on a time interval or a cloud controller that is placing data into multiple cloud files in parallel to optimize future read operations may not have enough data to fill a complete cloud file. In such scenarios, the cloud controller may simply write out the available data, and leave the wasted space to be reclaimed using a future reclamation operation. For example, in some embodiments a cloud controller may be configured to: (1) download file data spread across two or more cloud files; (2) reassemble the desired data into a new cloud file; (3) upload the new cloud file to the cloud storage system; and (4) distribute a metadata snapshot that updates the access information for the affected files. In some scenarios, such optimizations may be performed by the cloud controller that owns the files, and involve locking the files during the cloud file defragmentation process. In scenarios where locking files for a long interval is undesirable, such operations may involve: (1) maintaining the previous cloud files the final metadata snapshot has been generated; (2) determining that the file data has not changed during the download, reassembly, and upload operations; and (3) briefly locking the original cloud files and metadata sections until the system can confirm that the updated metadata has been successfully propagated to all of the cloud controllers in the system. If the file data being compacted has changed during the interval, the changes can be discarded and compaction can be re-tried at a later time. In some embodiments, compaction operations may be limited to older (e.g., less likely to be modified) cloud files, to reduce the likelihood of collisions. Alternatively, such operations may involve determining timeframes in which particular cloud files are less likely to be used, and performing compaction operations at those times.

Figure 20:
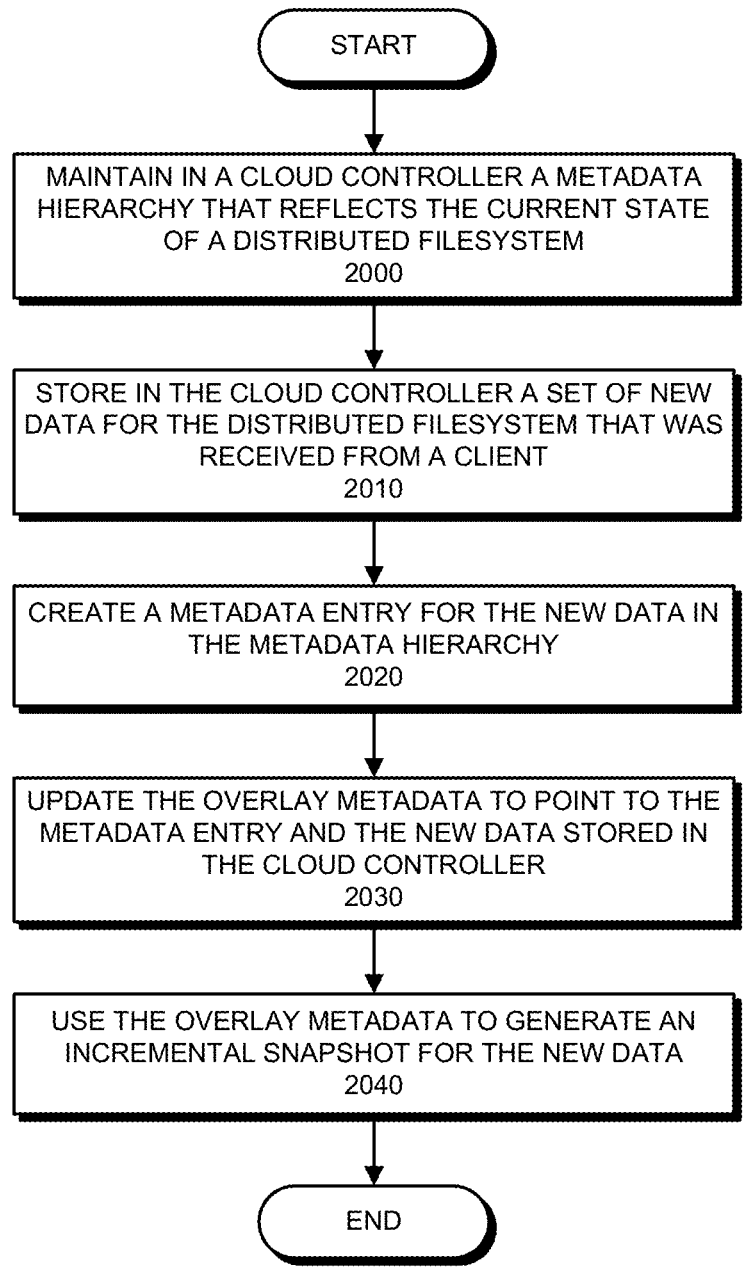
FIG. 20 presents a flow chart that illustrates the process of using a set of overlay metadata in a cloud controller to generate incremental snapshots for a distributed filesystem in accordance with an embodiment.

FIG. 20 presents a flow chart that illustrates the process of using a set of overlay metadata in a cloud controller to generate incremental snapshots for a distributed filesystem. Two or more cloud controllers collectively manage distributed filesystem data that is stored in one or more cloud storage systems. More specifically, the cloud controllers cache and ensure data consistency for the data stored in the cloud storage systems, with each cloud controller maintaining a metadata hierarchy that reflects the current state of the distributed filesystem (operation 2000). During operation, a cloud controller receiving new data from a client: (1) stores the new data in the cloud controller (operation 2010); (2) creates a metadata entry for the new data in the locally maintained metadata hierarchy (operation 2020); (3) updates the overlay metadata to point to the metadata entry and the new data stored in the cloud controller (operation 2030); and (4) then uses the overlay metadata to generate an incremental snapshot for the new data (operation 2040).

Accessing Cloud Files and Managing Local Disk Layout

The previous sections disclose techniques for generating snapshots and uploading data to cloud files. Using such techniques, cloud controllers can treat the cloud storage system as an object store. Other cloud controllers receiving metadata updates can then access data from cloud files as needed. Furthermore, a cloud controller that has uploaded data can, if needed, flush data that has been uploaded from its local filesystem (e.g., "clear its cache") to make space for other data that is more likely to be needed immediately. Note, however, that a cloud controller flushing data still keeps the accompanying metadata, so that the flushed data can be found and reloaded from the cloud storage system if needed again.

Figure 4C:
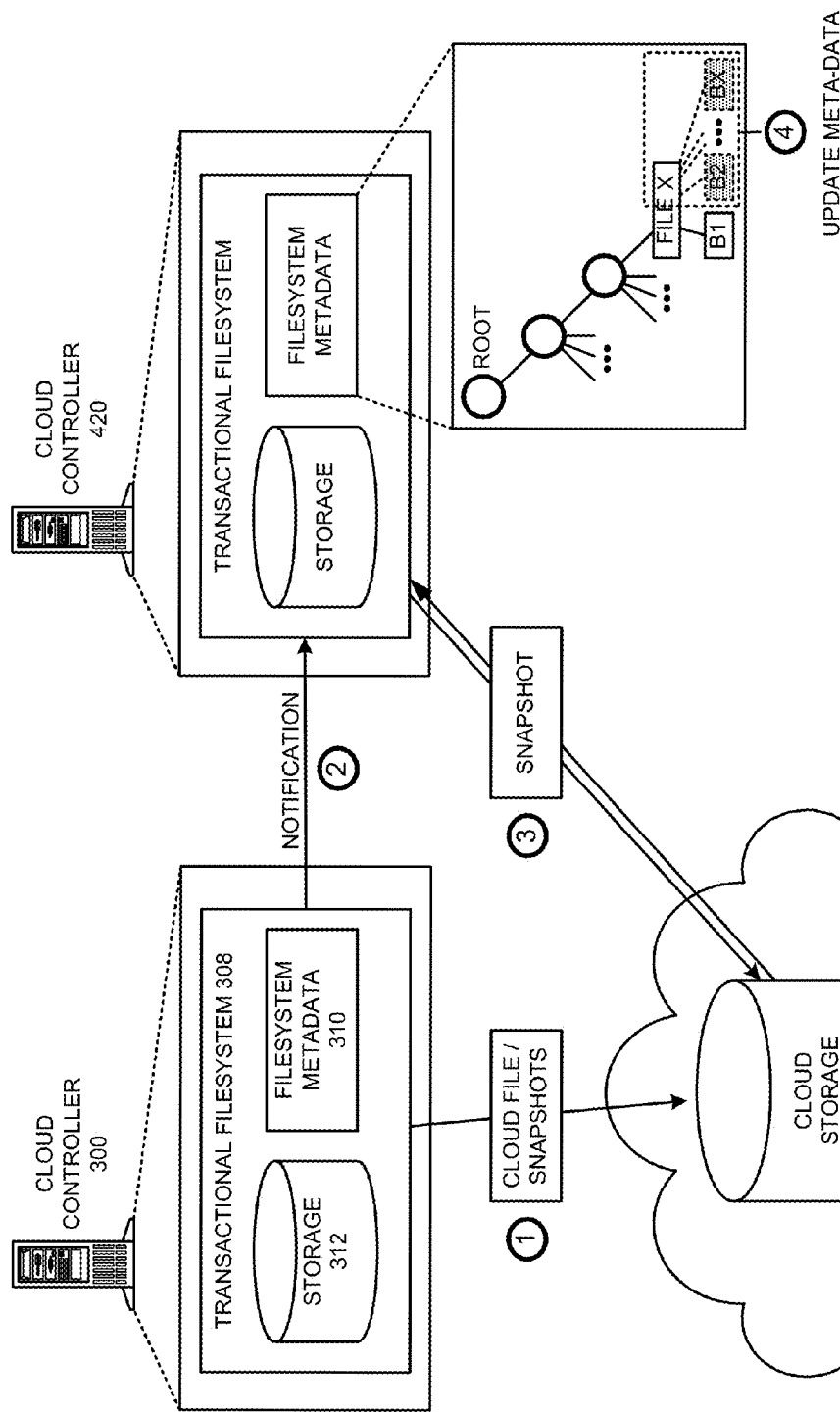
FIG. 4C illustrates a second cloud controller that responds to a snapshot sent by the first cloud controller of FIGS. 3-4B in accordance with an embodiment.
Figure 4D:
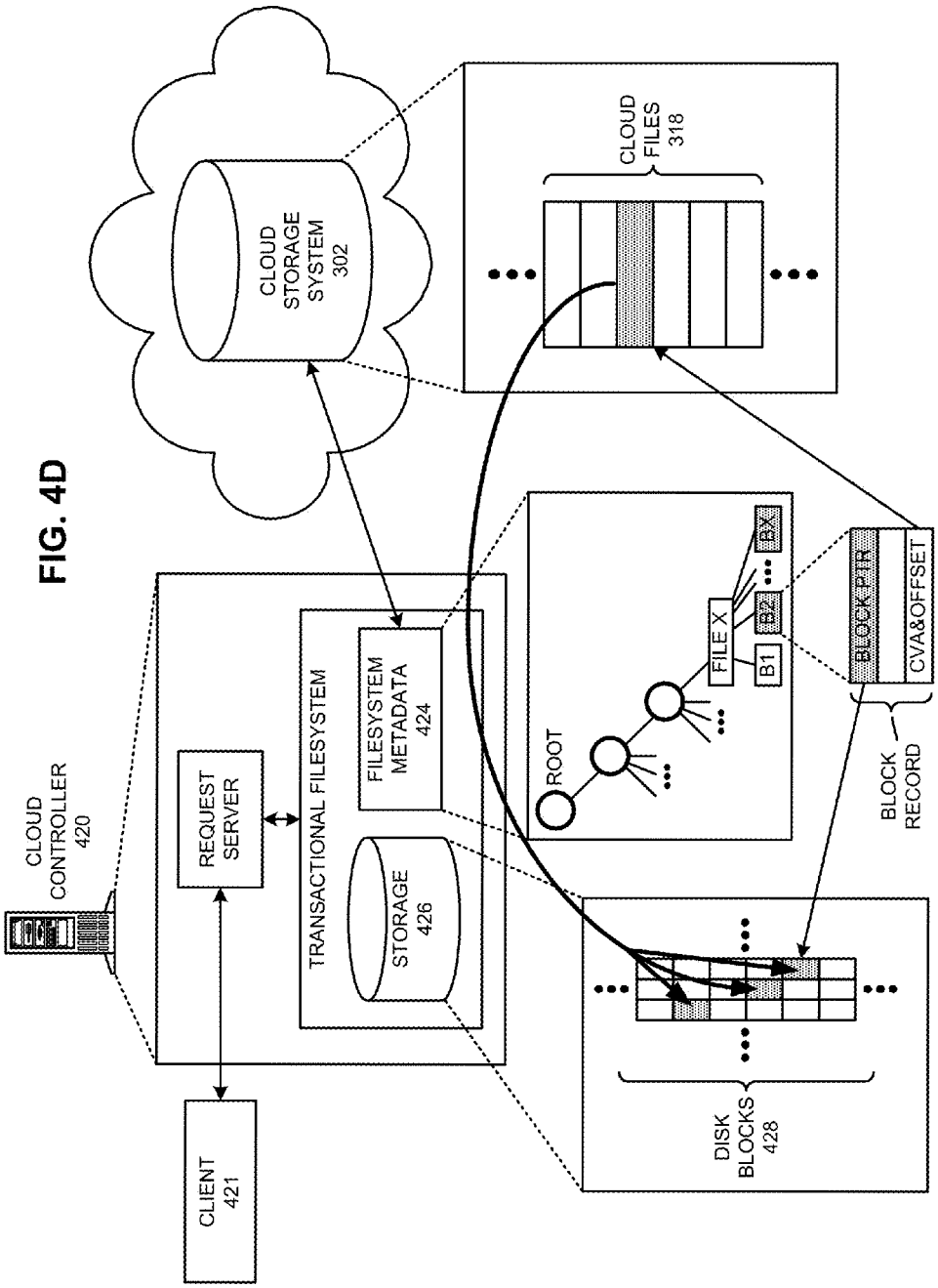
FIG. 4D illustrates the process of accessing data from a cloud file in accordance with an embodiment.

FIG. 4C illustrates a second cloud controller 420 that responds to a snapshot sent by the cloud controller 300 of FIGS. 3-4A. As described previously, cloud controller 300 generates a cloud file during a snapshot, and uploads the cloud file and the (incremental) metadata snapshot to cloud storage system 302 (as indicated by (1) in FIG. 4C). Upon receiving confirmation of the successful upload, cloud controller 300 then sends a notification to other peer cloud controllers (including cloud controller 420) that informs them of the availability of the new snapshot (as indicated by (2) in FIG. 4C). Cloud controller 420 then downloads the metadata snapshot from cloud storage system 302 (as indicated by (3) in FIG. 4C), and updates its local metadata accordingly (as indicated by (4) in FIG. 4D). After updating the metadata, cloud controller 420 can proceed to download any desired data from the corresponding cloud files. Note that in some scenarios cloud controller 300 may also be configured to directly send the metadata snapshot as part of the notification (2) to cloud controller 420.

FIG. 4D illustrates the process of accessing data from a cloud file. At some point after receiving updated metadata from a snapshot (as described for FIG. 4C), cloud controller 420 receives a request from a client 421. The storage system on cloud controller 420 inspects its updated filesystem metadata 424, and determines that the request requires data that is not currently cached in local storage 426. The system then uses the lookup information in the block records of the metadata (e.g., the CVA and offset values) to determine the appropriate cloud file(s) to download. Cloud controller 420 then downloads (and decrypts, if necessary) the indicated cloud files, and uses the offset information in the metadata to unpack the desired contents of the downloaded cloud file(s).

In some embodiments, a cloud controller downloads a cloud file into a dedicated memory buffer, and operates directly upon this memory buffer to access the desired data. The cloud file format is easy to operate upon in memory, and the downloaded data can be accessed very quickly from memory. However, storing such blocks in memory also constrains memory use, and (depending on the application) client data demands may involve reloading and caching more data than can be stored in memory. Furthermore, operating upon downloaded cloud files purely in memory may require a cloud file to be re-downloaded if the cloud controller is power cycled. Hence, in alternative embodiments, the cloud file is unpacked and re-integrated into the local transactional filesystem of a downloading cloud controller (e.g., into the highlighted subset of disk blocks 428 in FIG. 4D). Integrating downloaded cloud file data into the local filesystem allows all filesystem accesses to operate in the same manner (e.g., as opposed to special memory-buffer accesses for downloaded cloud file data), and facilitates keeping the downloaded data persistent across power cycles.

Note that a cloud controller can choose the target disk blocks that will receive the downloaded data blocks; for instance, in the context of FIG. 4D, cloud controller 420 is not constrained to use the same set of disk blocks used by cloud controller 300 to store the same data. In some instances, this selection process may involve determining disk blocks containing data that has not been accessed recently (e.g., via a least-recently-used (LRU) policy), and flushing such data. Each cloud controller tracks the usage of its cached data blocks, and strives to cache data blocks that minimize that latency experienced by clients.

FIG. 4E illustrates an alternative exemplary cache configuration for cloud controllers in which the local storage capabilities of cloud controller 420 serve as a persistent resident cache (PRC) 430 for a subset of the data blocks 432 stored in cloud storage system 302. In the exemplary configuration of FIG. 4E, a lookup structure 434 (e.g., a hash table comprising one or more levels) is used to determine whether a desired data block is currently being cached by cloud controller 420. Upon receiving a client request (not shown), cloud controller 420 traverses filesystem metadata 424 to find the block record 436 for a requested file data block. The CVA and offset from block record 436 are then used to perform a lookup operation (operation 1) in lookup structure 434 to determine whether the requested file data block is cached, and, if so, retrieve it (operation 2).

In some implementations, lookup structure 434 is implemented as a single-level hash table that is indexed using a hash value derived from the CVA and cloud file offset associated with a requested file data block. In such implementations, the hash lookup determines whether the requested file data block is cached, and if so, returns a pointer to the data block's location in PRC 430. If the block is not cached, the cloud file referenced by the CVA is downloaded from cloud storage system 302, the requested data block is loaded into PRC 430, and lookup structure 434 is updated to point to the now-cached data block.

Unfortunately, a single-level hash table implementation may sometimes become unwieldy and fragmented; for instance, hashing on a per-block basis (e.g., basing hash values on a combination of the CVA and offset) can lead to the hash table becoming sufficiently large that part of the hash table may be paged out of memory (e.g., written to disk), thus leading to a large number of disk reads which may negatively affect the performance of data accesses. Hence, in some implementations, lookup structure 434 is structured as a multi-level hash table and/or lookup structure (as illustrated in FIG. 4E). For example, a CVA may be used to perform a lookup on a level one (L1) hash table to return a second-level structure for the associated cloud file. The offset for the data block could then be used to perform a level two (L2) lookup upon this second-level structure to determine whether the requested data block is cached and, if so, determine the address of the data block in PRC 430. Note that lookup structure 434 and the contents of PRC 430 are stored in persistent storage to ensure that the cached data is not lost (e.g., does not have to be re-downloaded from cloud storage system 302) if cloud controller 420 crashes and/or reboots.

FIG. 4E can also be used to describe the process by which new data blocks become referenced by lookup structure 434 and cached in PRC 430. For instance, consider a scenario in which block record 436 is being created for a new data block that was just received from a client (not shown). Cloud controller 420 can store the new data block in an available space in PRC 430, and then set the block pointer field in block record 436 to temporarily directly point to that location in PRC 430 (e.g., for an initial timeframe in which the new data block has not yet been written to cloud storage system 302 as part of a new cloud file). After the data block has been written to a cloud file, cloud controller 420 can then update lookup structure 434 appropriately (e.g., with the needed hash table entries and structures, and a pointer to the cached block in PRC 430), update the CVA and offset field in block record 436, and then clear the block pointer in block record 436.

Note that the use of a separate lookup structure 434 adds a level of indirection that can facilitate updating the system when disk blocks are flushed from PRC 430. More specifically, when a disk block is being flushed from PRC 430, cloud controller 420 can use the disk block's CVA and offset to look up and remove the pointer to the data block from the lookup structure 434. In an alternative embodiment that did not use a lookup structure (e.g., instead having the block pointer in a block record point directly to a cached data block), cloud controller 420 might need to traverse filesystem metadata 424 to find and update a target block record or maintain a reverse mapping that facilitates looking up the block records for data blocks 432 stored in PRC 430.

While FIGS. 4A-4E illustrate filesystem metadata and cached data blocks as being logically separate, in practice both metadata and data are interleaved in cloud controllers' local storage systems. Some fragmentation issues can arise on cloud controllers over time, as cached data is flushed and new (and/or old) data is loaded from cloud files. Recall that cloud controllers typically maintain the full set of metadata, but flush actual data as needed. In general, as new data is created and written into files, target disk blocks are found to store the resulting data and metadata. To optimize reads and writes, a filesystem normally places metadata in close proximity to its referenced data. However, such organization can lead to fragmentation issues for a system in which data can be flushed (and reloaded), but metadata remains persistent. More specifically, if such data is stored interleaved and relatively continuously (e.g., to improve read access), the subsequent holes left by flushed data may be refilled with new metadata and data. Over time, these operations lead to substantial fragmentation, with small pieces of metadata strewn across the disk and a rarity of larger contiguous disk areas that can be used to store new file data. In some cases disk defragmentation techniques may be used to alleviate some of these issues, but defragmentation is typically both time- and disk-intensive, and client data access performance may be degraded during the defragmentation process.

Figure 21A:
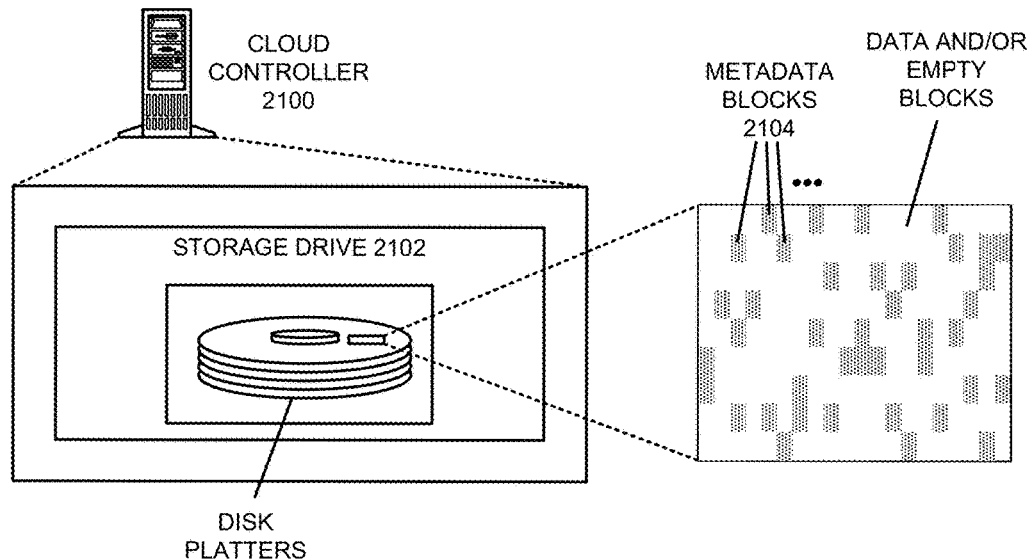
FIG. 21A illustrates metadata-based fragmentation in a storage drive of a cloud controller in accordance with an embodiment.

FIG. 21A illustrates metadata-based fragmentation in a storage drive 2102 of a cloud controller 2100. Over time, opportunistic writes result in metadata blocks 2104 being randomly spread across the disk platters of storage drive 2102. As a result, it can be difficult to find large, contiguous areas in which to write related file data. Splitting related file data across multiple small, separated disk areas involves additional seek and rotational latency, thereby increasing the total latency for both the initial write as well as subsequent reads.

In some embodiments, the block allocation policy used in a cloud controller's transactional filesystem is altered to prioritize a selected set of disk sectors toward either data or metadata. More specifically, by dynamically weighting some disk regions toward metadata, the filesystem can create dedicated, metadata areas on the disk that are distinct from their respective data blocks, and no longer interleaved on a per-file basis. While distinct, these metadata areas can still be allocated in close-enough proximity to the data blocks that they reference that both can be read without substantially degrading performance. When data is subsequently flushed, all of the disk blocks holding data are cleared, and new data and metadata can be written into the disk region; new metadata is written into the disk blocks weighted toward metadata, while the new data blocks can be stored into the nearby (flushed) disk regions. Because metadata is typically much smaller than the actual file data (e.g., in many scenarios metadata is on the order of 0.1% of the size of the file data that it manages), this arrangement facilitates avoiding fragmentation across a large number of write/flush cycles.

Note that the amount of metadata in a distributed filesystem may, depending on the client and application load, grow significantly over time. Hence, cloud controllers may need to periodically adjust the number and weighting of disk regions containing metadata (and/or a number of allocated metadata regions), so that more blocks that store metadata are allocated in proximity to a set of blocks used to store file data. Note also that in some embodiments the filesystem may attempt to optimize read accesses by trying to store (where possible) disk blocks that have been loaded from cloud files in proximity to their metadata.

Figure 21B:
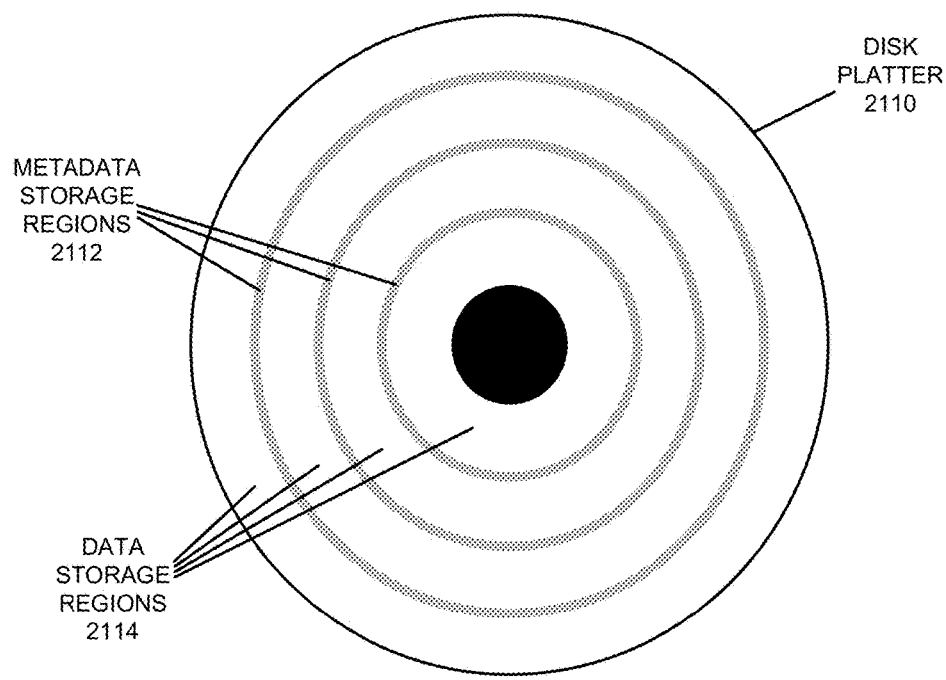
FIG. 21B illustrates an exemplary partitioning of a disk platter of a storage drive into distinct metadata and data storage regions in accordance with an embodiment.

FIG. 21B illustrates an exemplary partitioning of a disk platter 2110 of a storage drive into distinct metadata 2112 and data 2114 storage regions. Note that while metadata and data are written to distinct regions (2112 and 2114, respectively), a cloud controller may still attempt to locate metadata and data as close together as possible (e.g., by choosing target destinations that are in neighboring regions, and as close together as possible). Note also that FIG. 21B illustrates only a single example; allocation strategies may vary, resulting in layouts that are not as regular as illustrated and/or are adjusted over time. For example, metadata is typically accessed more frequently than data, so one layout policy may involve biasing toward storing metadata on "faster" sectors (e.g., on the outer edge of a disk platter, where spatial density is higher) and data on "slower" sectors. The actual layout of metadata and data storage regions may also be determined based on an expected (or tracked) load for the cloud controller and/or its clients.

Figure 22:
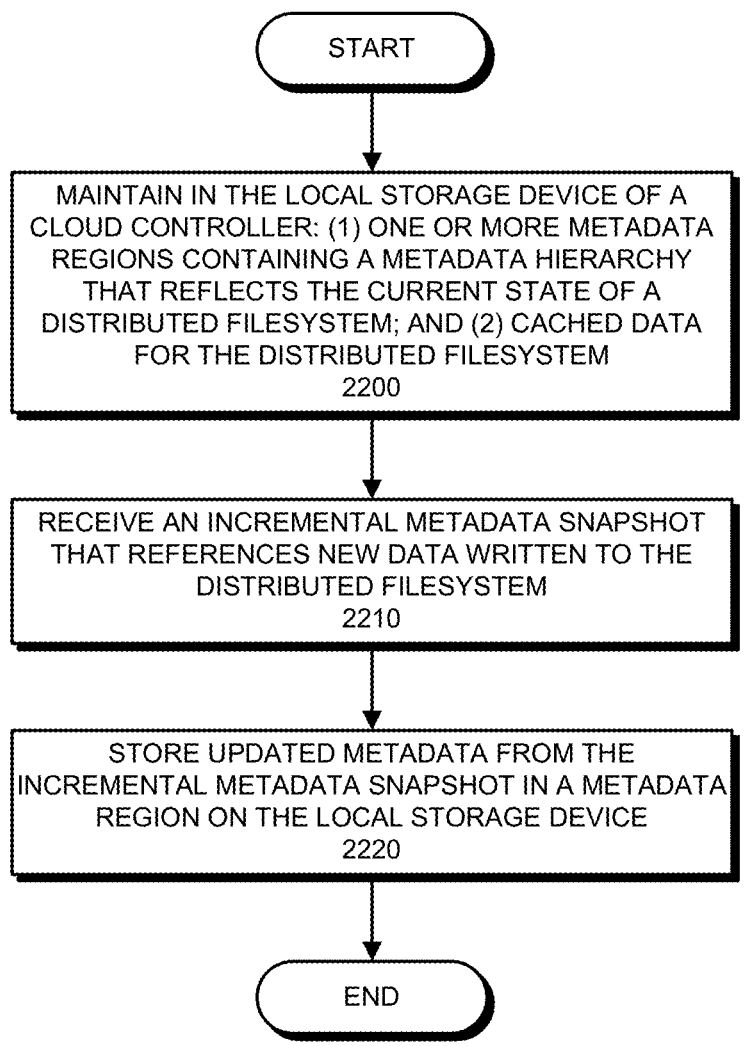
FIG. 22 presents a flow chart that illustrates the process of managing metadata and data storage for a cloud controller in a distributed filesystem in accordance with an embodiment.

FIG. 22 presents a flow chart that illustrates the process of managing metadata and data storage for a cloud controller in a distributed filesystem. Two or more cloud controllers collectively manage distributed filesystem data that is stored in one or more cloud storage systems. More specifically, the cloud controllers cache and ensure data consistency for the data stored in the cloud storage systems, with each cloud controller maintaining (e.g., storing) in a local storage device: (1) one or more metadata regions containing a metadata hierarchy that reflects the current state of the distributed filesystem; and (2) cached data for the distributed filesystem (operation 2200). During operation, the cloud controller receives an incremental metadata snapshot that references new data written to the distributed filesystem (operation 2210). The cloud controller stores updated metadata from this incremental metadata snapshot in one of the metadata regions on the local storage device (operation 2220).

In some embodiments, metadata and data may be divided across multiple storage volumes (e.g., multiple storage devices or redundant arrays of independent disks (RAIDs)). Storing metadata and its associated cached data on different storage volumes facilitates reducing seek latencies by allowing metadata and cached data to be accessed in parallel from their respective storage volumes. Note that such organizations may still involve splitting (and balancing) metadata and cached data across the different volumes; for instance, the metadata and cached data may be split such that each volume stores a subset of the metadata and a subset of the cached data, but no individual volume stores cached data referenced by its stored metadata. Such an arrangement allows metadata to be accessed in parallel from all of the volumes when high throughput is needed, while also still allowing associated sets of metadata and cached data to be accessed in parallel. Note also that each individual module may still be partitioned into metadata and data regions, to avoid the same fragmentation issues described above.

In some embodiments, a cloud controller may arrange data cached in local storage to optimize performance. For instance, the level of indirection described in FIG. 4E (e.g., by the lookup structure 434 used to track cached data blocks in PRC 430) facilitates rearranging cached data that was previously written to a storage device. For example, some applications and/or file formats continually append new data at the end of a file, thereby introducing potential fragmentation in a cloud controller that caches the data blocks for such a file. More specifically, while a cloud controller may be configured to try to place new data for such a file in proximity to the file's other cached data as new parts of the file are created, downloaded, and cached, in some situations this may not be possible (e.g., if there are currently no free data blocks in the vicinity of the other data blocks previously cached for the file). To alleviate such situations, a cloud controller may be configured to track file accesses to determine access trends and performance, and periodically perform a "defragmentation" operation for cached data to selectively relocate the cached data blocks for one or more files into a contiguous section of local storage, thereby improving read performance. Such defragmentation operations may involve copying a set of cached data blocks to a new location, updating lookup structures accordingly, and then freeing the original locations of the cached blocks.

In some embodiments, a cloud controller may be configured to perform defragmentation operations for cached data blocks based on a range of factors. For instance, a cloud controller may track usage statistics for file data blocks on an ongoing basis, and then use such tracking information to ensure that cached data blocks that are frequently accessed together are grouped together in the local cache. However, because tracking (and defragmentation in general) can involve fairly high overhead, a cloud controller may alternatively be configured to track and configure specific file types that are known to exhibit fragmentation, or to emphasize optimizing frequently accessed files whose tracking data indicates a certain common access pattern (e.g., a contiguous access pattern). In some embodiments, a locality policy may be used to specify: (1) specific file types to be considered and/or emphasized for defragmentation; (2) specific access patterns to detect and optimize for; and (3) a frequency and/or time interval for performing fragmentation checks and/or operations.

Pre-fetching Cloud Files

As mentioned previously, cloud files are also written to in an incremental, transactional fashion. For instance, files that are written and/or modified across multiple snapshots may have data stored in different cloud files. Unfortunately, accessing data split across multiple cloud files can increase access latency substantially. Consider a client that sends a request to a cloud controller to access a data block in a file. The cloud controller inspects its current set of metadata, determines that the data block is not currently cached, downloads the corresponding cloud file containing the data block, and presents the data block to the client. The client may then request additional data blocks from the same file. In some scenarios, all of these blocks will have been stored in the same cloud file, and are now available in the cloud controller. If, however, some of these file blocks are in another cloud file, the client will have to endure additional network, download, and processing latencies as one or more additional cloud files are accessed. While an initial delay may be acceptable, recurring access delays may cause a noticeable delay and substantial user frustration. In some embodiments, pre-fetching techniques facilitate reducing the access latency experienced by a user accessing files from a distributed filesystem.

In some embodiments, a cloud controller predictively pre-fetches additional cloud files in an attempt to reduce access latency. For instance, upon receiving a request to access a given data block for a file, a cloud controller may analyze the metadata for the file and then predictively pre-fetch other cloud files that contain other nearby data blocks (or even all other data blocks for the file, depending on the file size). Alternatively (and/or additionally), the cloud controller may also pre-fetch data for other associated files that are likely to be accessed in conjunction with the original file. For instance, when a user browses a given file directory, the cloud controller may pre-fetch the first data block for every file in that directory and the contents of each subdirectory to anticipate the user's next actions. Alternatively, the cloud controller may pre-fetch files that are known to be associated with a requested file (e.g., an icon file that contains an icon representation for a selected file, along with any other support files for the requested file). In such situations, the cloud controller can traverse its stored set of metadata to look up the physical locations (e.g., the CVAs and offsets) for cloud files that should be pre-fetched from the cloud storage system.

Figure 5:
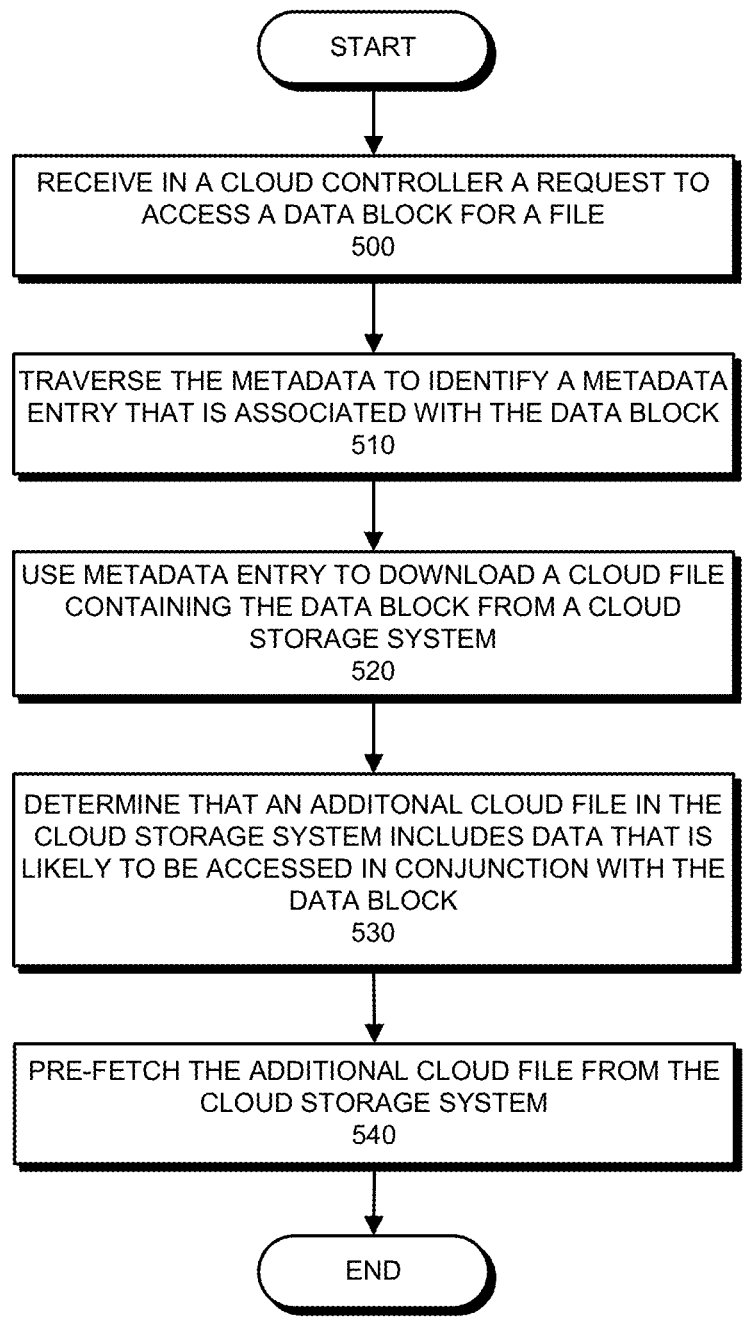
FIG. 5 presents a flow chart that illustrates the process of pre-fetching data for a distributed filesystem in accordance with an embodiment.

FIG. 5 presents a flow chart that illustrates the process of pre-fetching data for a distributed filesystem. During operation, a cloud controller that maintains a set of metadata for the distributed filesystem receives a request to access a data block for a file (operation 500). The cloud controller traverses the metadata to identify a metadata entry that is associated with the data block (operation 510), and then uses this metadata entry to download a cloud file containing the data block from a cloud storage system (operation 520). While performing these operations, the cloud controller additionally determines that an additional cloud file in the cloud storage system includes data that is likely to be accessed in conjunction with the data block (operation 530), and proceeds to pre-fetch this additional cloud file from the cloud storage system (operation 540).

Note that NAS workloads are very user-based, and hence can be quite random as a large number of users access a fairly random set of files; the amount and range of pre-fetching performed may vary based on factors such as the available network bandwidth, cloud controller load, and types of accessing clients or applications. For instance, a basic optimization may involve pre-fetching data for other files in the same directory as the current file being accessed. More sophisticated pre-fetching techniques may involve receiving application (or user) feedback that specifies file associations and/or files that are likely to be needed soon. Cloud controllers may also be configured to track access patterns over time to determine files and file sections that have temporal locality. For example, consider a large (e.g., terabyte-sized) set of seismic data that is typically accessed sequentially. Cloud controller tracking may: (1) detect the sequential nature of the data; (2) make note of this behavior in the file's metadata; and then (3) perform selective pre-fetching upon successive accesses to ensure that each subsequent cloud file is pre-fetched, thereby providing latency-free file access for a client. Note that some of these techniques may also facilitate initially grouping commonly accessed files and/or data blocks into the same cloud file so that they can be accessed more efficiently at a later time. Pre-fetching configurations may be specified and customized for a range of different granularities (e.g., globally, per-site, or for individual cloud controllers) using locality policies (as described in a following section).

While the previous paragraphs describe techniques for identifying and pre-fetching additional cloud files, pre-fetching and caching decisions may also occur at the granularity of an individual cloud file. As described previously, a cloud file may contain data blocks associated with a large number of files. However, not all of these data blocks may be related to and/or useful for a given user request; furthermore, caching all of the data blocks for every cloud file accessed by a cloud controller can quickly fill the cloud controller's cache with potentially un-useful data. Hence, in some embodiments, cloud controllers may be configured to analyze local filesystem metadata and metadata from a cloud file being downloaded to determine the portions of the cloud file that should be downloaded and/or cached.

In some embodiments, a cloud controller performs "opportunistic caching" by using block metadata stored in a cloud file to determine other data blocks in the cloud file that should be downloaded and cached. For instance, the beginning of each cloud file may include a set of metadata for each data block that is stored in the cloud file. This metadata block specifies, but is not limited to, one or more of the following: a unique filename and/or number that identifies the file in the distributed filesystem that its corresponding data block in the cloud file is associated with; a compression algorithm used to compress the data block; the logical size of the data block; the physical size of the data block; a checksum for the data block; the checksum algorithm used to calculate the checksum; and the type of checksum. The cloud controller can analyze distributed filesystem metadata and metadata for the cloud file to determine which data blocks may be associated with the current block request, and hence should be cached.

Upon receiving the metadata from the cloud file, the cloud controller can determine the unique filenames and/or file identifiers that are stored in the metadata. However, the cloud controller may not be able to perform a reverse mapping to determine the location (e.g., path) of this file data in the distributed filesystem; for instance, distributed filesystem metadata may be stored in a manner that optimizes using file data structures to determine the CVA for a given file but does not include a reverse lookup mechanism that maps file identifiers back to a location in the distributed filesystem. If no such reverse mapping is available, scanning the metadata of the distributed filesystem to determine the location of a given file's data block may involve substantial computation and delay. However, the cloud controller does know the location of the requested file data block in the distributed filesystem, and thus can determine the file identifiers for files and directories in proximity to the requested file without substantial additional effort. The cloud controller can compare the set of file identifiers for the data blocks in the cloud file with the file identifiers for these proximate files and directories to determine which data blocks from the cloud file should be opportunistically cached; unrelated data blocks are not cached. As previously noted, related files have temporal and special locality, and thus are likely to be stored in the same cloud file and accessed again in a substantially similar timeframe; hence, such opportunistic caching techniques are likely to cache blocks that will be used in the near future, thereby improving access performance.

In some embodiments, a cloud controller downloading a cloud file may determine from the metadata in the cloud file that a large number of data blocks at the end of the cloud file are not likely to be needed, and request "transport termination" for the remaining unneeded portion of the cloud file, thereby saving network bandwidth. In some implementations where the cloud file is not encrypted, the cloud controller may be able to analyze the metadata from the cloud file to determine sections of the cloud file that are not needed, and instruct the cloud storage system to only transfer needed portions of the cloud file. In alternative implementations where cloud files are encrypted and compressed from beginning to end, additional portions of the cloud file may need to be transferred. More specifically, the metadata for the blocks of the cloud file can be stored at the beginning of the file data, and are analyzed upon receipt and decryption. Because of the serial encryption and compression, all data up to and including a given target data block will need to be downloaded, decrypted, and decompressed to allow the target data block to be accessed. If, however, data after the location of the target data block (or the location of some other beneficial data block later in the cloud file) is not determined to be of likely benefit, the cloud controller can instruct the cloud storage system to stop sending any data after that specified location. In some embodiments, the cloud controller can make this determination after receiving and analyzing the cloud file metadata, thereby ensuring that no extraneous data is sent from the cloud storage system. Such techniques can be particularly beneficial in situations where cloud files contain data blocks for a large number of unrelated files (especially if the target data is near the beginning of the cloud file) and in situations where metadata and/or application hints can indicate that only a limited set of data blocks from the cloud file will be accessed.

Figure 23:
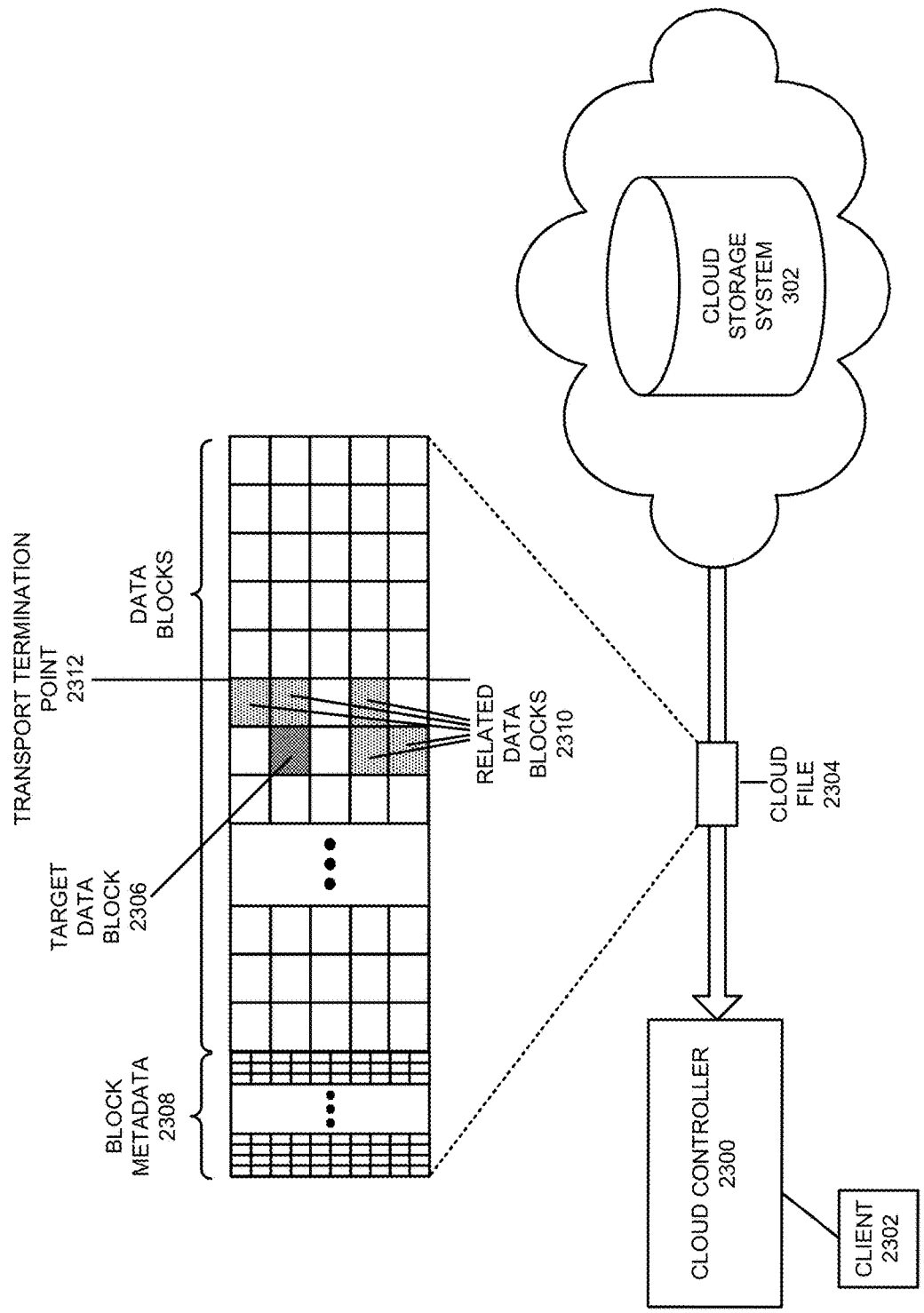
FIG. 23 illustrates a cloud controller that performs exemplary opportunistic caching and transport termination operations in accordance with an embodiment.

FIG. 23 illustrates a cloud controller 2300 that performs exemplary opportunistic caching and transport termination operations. During operation, cloud controller 2300 receives a request from a client 2302 for a specific file data block. Cloud controller 2300 determines the cloud file 2304 containing the target data block 2306, and requests cloud file 2304 from cloud storage system 302. Cloud storage system 302 begins sending cloud file 2304 to cloud controller 2300; the first set of data received by cloud controller 2300 is the block metadata 2308 for cloud file 2304. Cloud controller 2300 already has the CVA for cloud file 2304 and the offset of the target data block 2306 in cloud file 2304, but can use the additional information included in the (locally maintained) distributed filesystem metadata and the block metadata 2308 to determine a set of related data blocks 2310 that should be opportunistically cached in cloud controller 2300's local cache. Cloud controller 2300 can also determine from block metadata 2308 the set of data blocks in cloud file 2304 that are not likely to be needed, and inform cloud storage system 302 of a transport termination point 2312 in cloud file 2304; cloud storage system 302 in response does not send any of the data blocks in cloud file 2304 that follow transport termination point 2312.

Figure 24:
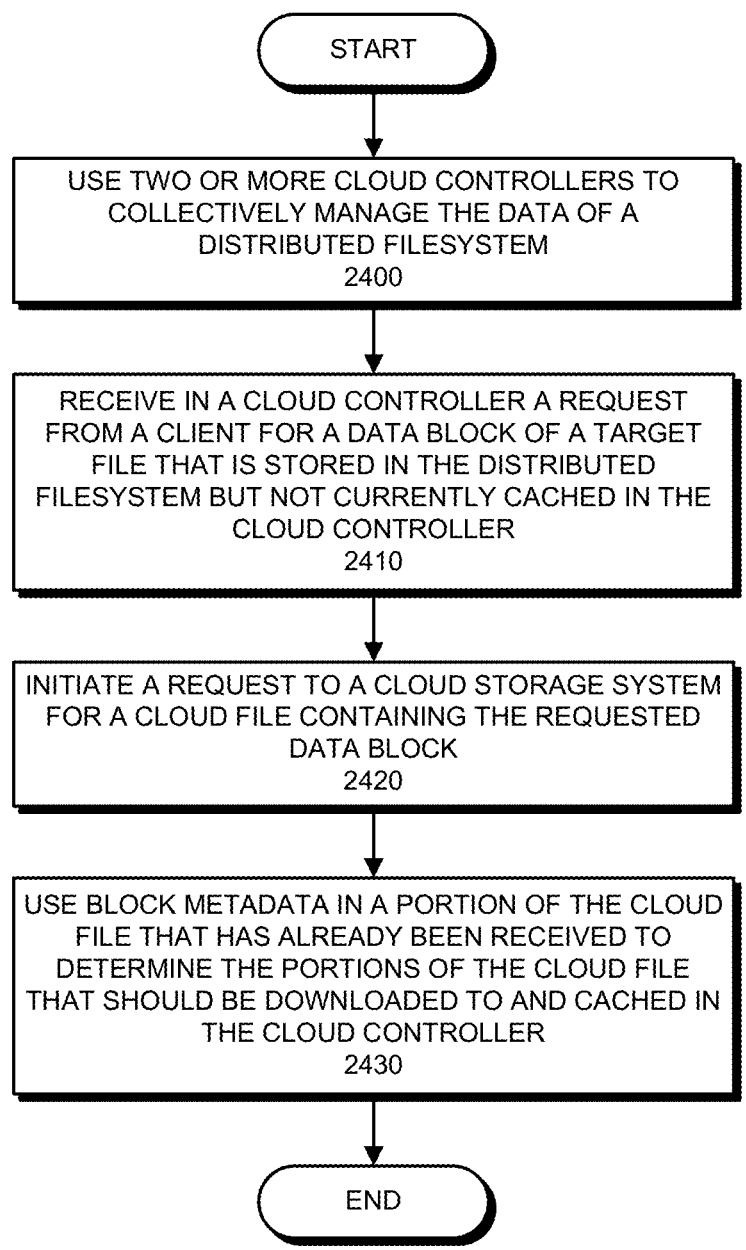
FIG. 24 presents a flow chart that illustrates the process of transferring and caching a cloud file in a distributed filesystem in accordance with an embodiment.

FIG. 24 presents a flow chart that illustrates the process of transferring and caching a cloud file in a distributed filesystem. Two or more cloud controllers collectively manage distributed filesystem data that is stored in one or more cloud storage systems (operation 2400); the cloud controllers cache and ensure data consistency for the stored data. During operation, a cloud controller receives a request from a client for a data block of a target file that is stored in the distributed filesystem but not currently cached in the cloud controller (operation 2410). The cloud controller initiates a request to a cloud storage system for a cloud file containing the requested data block (operation 2420). As the cloud controller begins receiving the cloud file from the cloud storage system, it uses a set of block metadata in the portion of the cloud file that has already been received to determine the portions of the cloud file that should be downloaded to and cached in the cloud controller (operation 2430).

Receiving and Servicing Client Requests

Client systems typically use network protocols (such as the Network File System (NFS) and the Common Internet File System (CIFS) protocols) to access network-based storage systems. CIFS (also sometimes referred to as Server Message Block (SMB)) is a complex application-layer network protocol that includes many application-specific capabilities that blur the typical separation between filesystems and applications. When a user accesses a file on a client system using software (e.g., Microsoft Office) that supports CIFS functionality, the client system may send CIFS requests to the network storage system to inform that the file has been opened and to store specific data. The CIFS server receiving the request for the file operation recognizes the file type, and can provide application-specific support. For instance, the CIFS server may maintain a network connection, and after determining that only that client is accessing the file, instruct the client to continue to cache file data indefinitely. Later, upon detecting that another client is attempting to open the file, the CIFS server can instruct the first client to flush the cached file data, and provide collaboration capabilities to both clients. Such functionality can enhance the user experience, but can complicate the interface between clients and storage systems; crafting a high-performance implementation of the CIFS protocol can involve substantial effort and expense.

In addition to complexity, CIFS also suffers from a range of other drawbacks and/or limitations. CIFS does not allow requests to be proxied; all requests need to be addressed directly to the hosting server, which locks the underlying data. CIFS is also a "chatty" protocol (e.g., CIFS generates substantial bi-directional status and update traffic). In a distributed environment, these characteristics can result in substantial load and latency issues.

Embodiments of the present invention combine cloud controllers with NAS capabilities and cloud-based storage to provide a high-capacity, high-reliability storage system that can be accessed from multiple front-ends via an application-layer network protocol (e.g., CIFS).

In some embodiments, a customized filesystem device driver in an operating system decouples filesystem functionality from an underlying block storage mechanism, thereby allowing filesystem-level information to be forwarded to another filesystem and/or data management mechanism. For instance, in some embodiments a customized filesystem device driver in an operating system may forward such filesystem-level request information to a range of network storage devices and/or distributed architectures that can provide enhanced data storage capabilities to client computing devices.

Operating systems often support several standard filesystems (e.g., the DOS filesystem, the New Technology File System (NTFS), and CDROM filesystems), but sometimes also include an open interface that facilitates accessing special devices and providing third-party interoperability (e.g., to support USB flash drives and filesystems associated with other operating systems, and to allow the development and support of future filesystems). In some embodiments, such interfaces can be used to create a filesystem device driver that emulates a local filesystem and storage device to the local operating system, but actually instead forwards filesystem-level request information to (and receives responses from) a non-block-level storage management system and/or filesystem.

In some embodiments, the disclosed forwarding techniques facilitate leveraging an existing implementation of a request server to reduce implementation overhead and complexity. For instance, as described above, implementing CIFS involves substantial effort and expense. Hence, some embodiments may provide CIFS capabilities by executing an operating system (e.g., Microsoft Windows Server 2008 Core, which includes embedded, high-performance CIFS server functionality with low memory usage) that can manage CIFS requests, but then use a customized filesystem device driver to extract and forward filesystem-level information that was received in CIFS requests. Note that this is distinct from techniques that direct file operation requests to a filesystem (such as NTFS) that then directly performs corresponding block-level operations upon a block storage device; forwarding filesystem-level information facilitates adding additional layers of capabilities and services prior to (or in place of) performing lower-level storage operations.

FIG. 6A illustrates a computing device 600 that receives and forwards requests for filesystem operations. Computing device 600 executes a request server 608 that receives requests for file operations from clients (610-612) in its computing environment 614. Request server 608 sends instructions to a filesystem device driver 616 to perform the requested file operations. However, instead of managing a disk drive and disk operations, filesystem device driver 616 can be configured to forward filesystem-level information associated with the request to a range of other devices and/or mechanisms. For instance, filesystem device driver 616 may be configured to forward filesystem-level request information to one or more of the following: a cloud storage system 302 that is outside local computing environment 614; a storage management system 632 on another computing device 630; and/or an NAS device 640. Note that NAS device 640 may comprise a range of capabilities and architectures. For instance, NAS device 640 may comprise a compute server that uses an NAS filesystem 642 (e.g., a transactional copy-on-write filesystem) and a range of local storage capacities 644 to handle network file requests.

In some embodiments, an NAS device serves as a cloud controller for the cloud storage system. In this role, the NAS device presents a standard request interface (e.g., CIFS) to clients, and uses local storage capabilities to cache the working data set that is being accessed in its local computing environment. The high-capacity cloud storage system stores the full data set for an enterprise, and serves as a backing store for the NAS device. This architecture combines the performance and interface of a local NAS device with the capacity of a cloud storage system, while reducing management complexity.

Figure 6B:
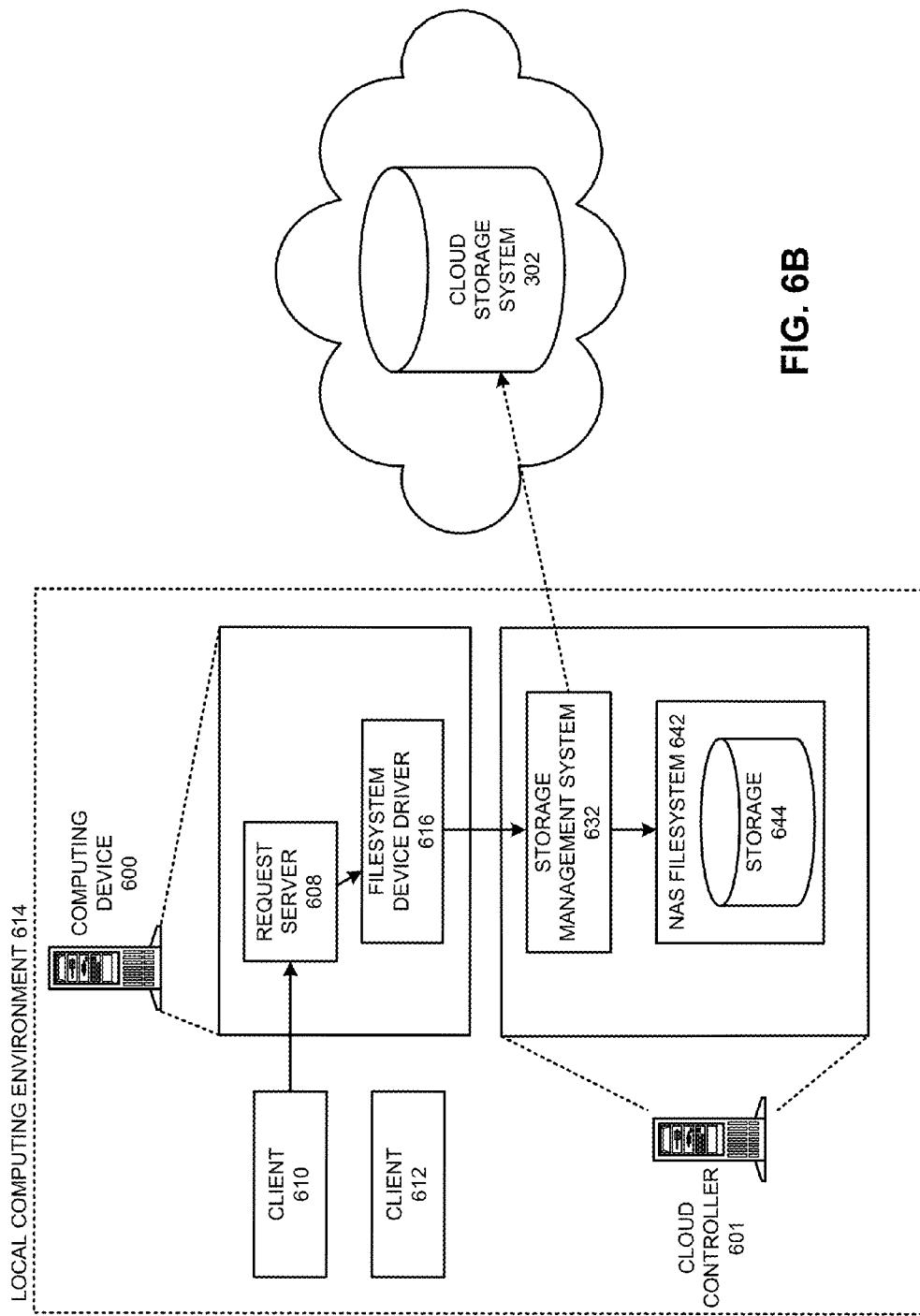
FIG. 6B illustrates a computing device that forwards requests for filesystem operations to a cloud controller in accordance with an embodiment.

FIG. 6B illustrates a scenario in which storage management system 632, NAS filesystem 642, and storage 644 are co-located on an NAS device, cloud controller 601. For instance, filesystem device driver 616 may forward filesystem-level information from requests to storage management system 632, which can then use this information to determine whether file data should be stored (or accessed) in NAS filesystem 642 and storage 644 and/or cloud storage system 302. For instance, storage management system 632 may determine how to distribute and/or duplicate file information associated with the request between storage 644 and cloud storage system 302. The local working data set for an organization is usually relatively small (compared to the full enterprise data set), and hence can typically fit into a reasonably provisioned local storage 644 mechanism. From the client perspective, data access remains substantially similar to the simplest NAS device scenarios described above; computing device 600 serves as a single point of contact, no load balancer is needed to map applications of clients to specific NAS devices, and clients 610-612 are unaware of the interaction between storage management system 632 and cloud storage system 302. Note also that while request server 608 is not limited to receiving requests from local computing environment 614, request server 608 may also be configured to service requests for other clients outside of local computing environment 614. Similarly, in some scenarios one or more front-end computing devices 600 may be co-located with cloud storage system 302.

In some embodiments, filesystem-level information can be forwarded by executing an operating system with a desired server capability (e.g., Microsoft Windows Server 2008 Core) in a virtual machine. Note that, as above, this "guest" operating system does not execute in a stand-alone configuration (e.g., with an underlying NTFS filesystem and disk drive), but instead can be configured to forward filesystem-level information (e.g., CIFS requests) to (and receive responses from) an underlying storage management system that provides data-consistent capabilities. For instance, a customized filesystem device driver in the guest operating system can forward request information to (and receive responses from) a storage management system in the host operating system. Note that such forwarding behavior in the guest operating system is distinct from typical storage operations for a guest operating system. Typically, upon receiving a request for a file operation, a guest operating system accesses an associated (virtual) filesystem and outputs a block-level storage request that is received and handled by the host operating system; hence, no filesystem-level information is sent to the host operating system. In contrast, in the described embodiments, the guest operating system forwards filesystem-level information, not block-level information, to the host operating system.

FIG. 6C illustrates a cloud controller 602 that includes all of the above-described capabilities. More specifically, cloud controller 602 receives requests directly from clients, and also serves as a front-end to remote cloud storage system 302. Cloud controller 602 includes a host operating system 604 that executes a guest operating system 606 in a virtual machine. Guest operating system 606 includes a filesystem device driver 616 that forwards requests for filesystem operations. A request server 608 (e.g., a CIFS server) in guest operating system 606 receives requests for file operations from clients (610-612) in its local computing environment 614. Request server 608 sends instructions to filesystem device driver 616 to perform the requested file operations. However, instead of managing a disk drive and disk operations (and/or using a virtual filesystem to send block-level requests to host operating system 604), filesystem device driver 616 is configured to forward filesystem-level information associated with the request to a storage management system 618 in host operating system 604 (e.g., via a virtual device interface in host operating system 604). As in FIG. 6B, storage management system 618 then determines how to distribute and/or duplicate file information associated with the request between local storage 620 and cloud storage system 302.

Figure 7A:
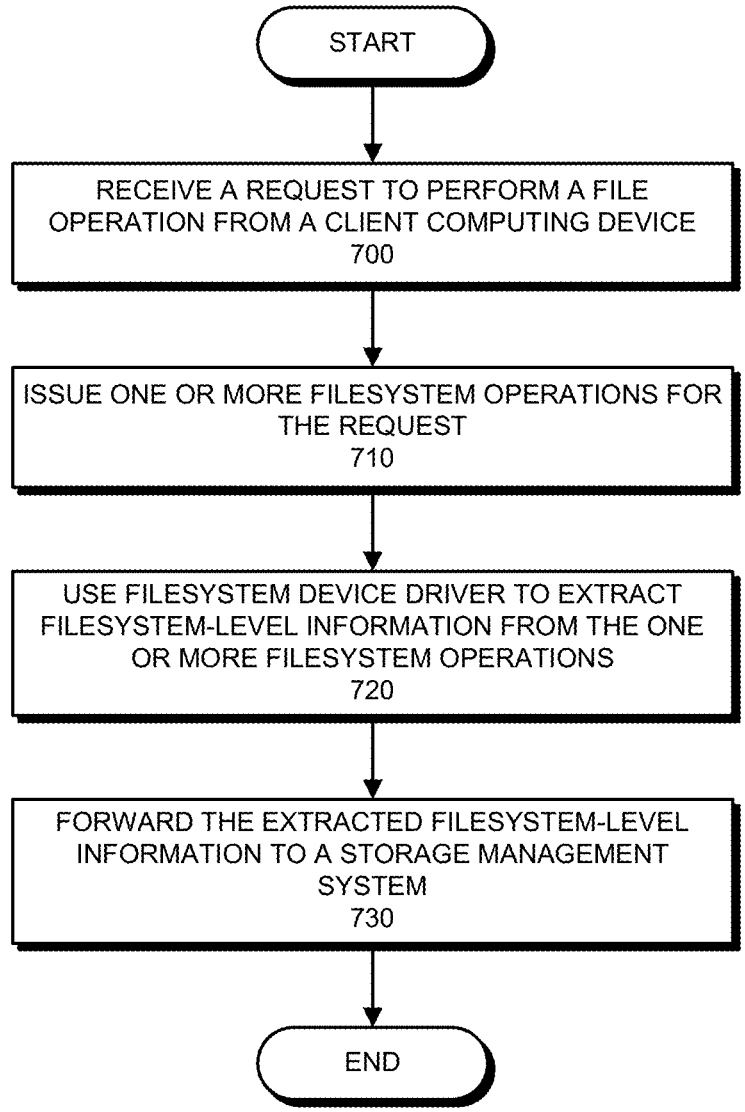
FIG. 7A presents a flow chart that illustrates the process of forwarding filesystem-level information in accordance with an embodiment.

FIG. 7A presents a flow chart that illustrates the process of forwarding filesystem-level information. During operation, a computing device receives a request for a file operation from a client computing device (operation 700). In response, the operating system of the computing device issues one or more filesystem operations for the request (operation 710). A filesystem device driver receives and extracts filesystem-level information from these filesystem operations (operation 720), and then forwards the extracted filesystem-level information to a storage management system (operation 730).

Figure 7B:
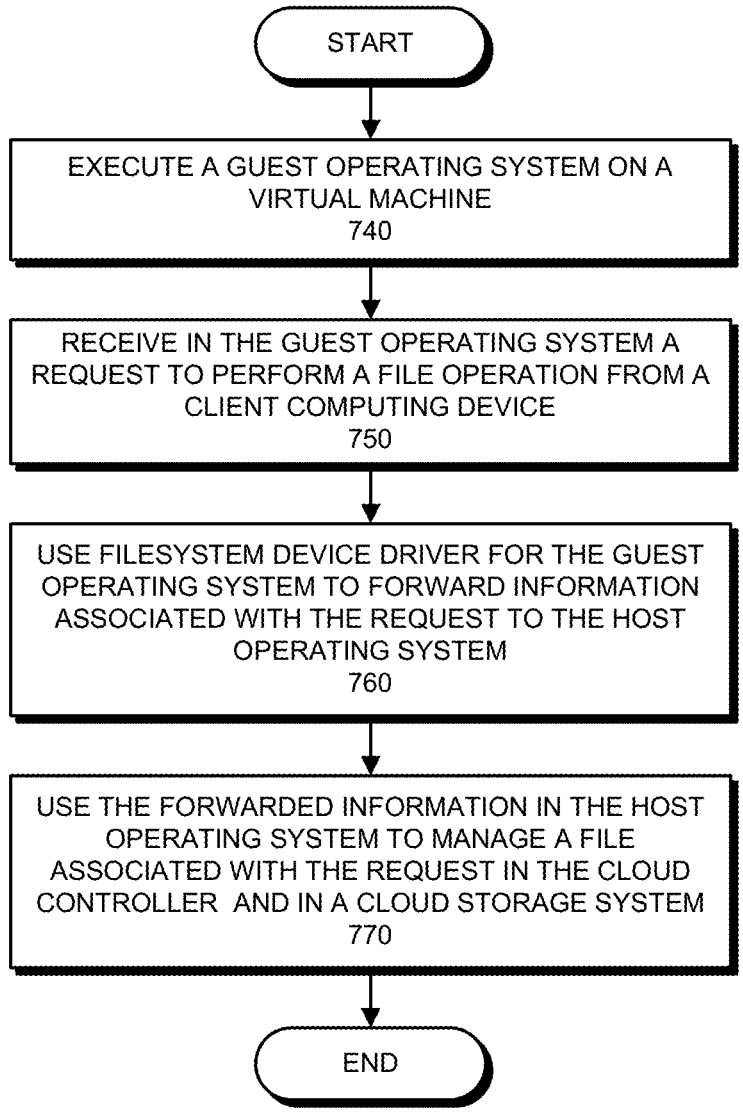
FIG. 7B presents a flow chart that illustrates the process of using a guest operating system to forward filesystem-level information in accordance with an embodiment.

FIG. 7B presents a flow chart that illustrates the process of using a guest operating system to forward filesystem-level information. During operation, a cloud controller that serves as a front-end for a cloud storage system executes a guest operating system on a virtual machine (operation 740). When this guest operating system receives a request for a file operation from a client computing device (operation 750), a filesystem device driver for the guest operating system forwards filesystem-level information associated with the request to the host operating system of the cloud controller (operation 760). The host operating system then uses this forwarded information to manage a file associated with the request in the cloud controller and in a cloud storage system (operation 770).

In some embodiments, the customized filesystem device driver extracts, tracks, and forwards client file interactions on a per-file and a per-directory basis. More specifically, semantic filesystem-level information included in the application-layer network protocol (e.g., CIFS) is forwarded by the filesystem device driver to a storage management system. This semantic information can include, but is not limited to: a file name; a file type; a requested file operation (e.g., a read, write, or update operation); a set of application information associated with the file; one or more users accessing the file; and security information for the file. Cloud controllers can use this information to determine whether a file and its associated information should be cached locally and/or forwarded to the cloud storage system (or other devices accessing the cloud storage system, as described below). For instance, the storage management system may know that certain files will be duplicated and/or shared shortly after being modified, and hence may ensure that such files are both cached locally and forwarded to the cloud storage system to facilitate the expected duplication operation.

In some embodiments, decoupling a filesystem from underlying block storage devices facilitates transparently changing (e.g., either increasing or decreasing) the amount of storage space accessible by clients. Operating systems typically assume that filesystem device drivers always manage fixed-size volumes; storage devices normally have a fixed size, so this usually is not an issue. However, one of the benefits of using cloud-based storage is the ability to easily increase data capacity on demand. For instance, for the above-described scenario where a cloud controller caches data for a cloud storage system, the amount of space available to clients can be increased by leasing additional space in the cloud (network) storage system and communicating the change to clients as needed (e.g., upon request) through the filesystem device driver. Hence, in such embodiments the customized filesystem device driver and the disclosed caching architecture substantially simplify adjusting data storage capabilities. In contrast, expanding traditional storage systems typically may involve shutting down a storage device, physically adding additional storage devices, and then reconfiguring the entire storage system to accommodate the added storage space.

In some embodiments, volume size can be changed transparently regardless of any pending client operations. In alternative embodiments, the presence of some active filesystem connections and/or operations may require some or all connected clients to be disconnected during volume size changes (e.g., preventing some clients from actively accessing files), which may be infeasible or inconvenient. Hence, in some embodiments, the filesystem device driver may be configured to claim an initial fixed size that substantially overstates the expected amount of storage, to prevent future resizing logistics. The allocated portion of the cloud storage system may initially provide only a small subset of this claimed storage size, but then subsequently be dynamically expanded as needed. In some embodiments, such size configurations may be accompanied by user quotas to prevent storage space wastage.

Note that a filesystem device driver provides a higher level of abstraction than techniques that attempt to analyze disk-block-level traffic (e.g., in the disk-level remote storage system illustrated in FIG. 2). More specifically, such techniques attempt to recreate filesystem information by reverse-engineering block-level storage transactions. However, because these storage transactions typically do not include higher-level (e.g., file- and directory-level) information, such attempts typically involve substantial effort, and do not provide the same level of tracking capabilities. In contrast, a customized filesystem-level device driver facilitates forwarding reliable high-level semantic information without additional processing overhead and without modifying the guest operating system.

In some embodiments, the described techniques provide filesystem-level proxy functionality. In many situations, proxies are implemented at the abstraction level of networking protocols, but this becomes more difficult as network protocols become more complicated (e.g., by adding application-specific information, as in CIFS). Hence, instead of re-implementing a complicated network protocol, some of the disclosed embodiments create a proxy at another, simpler layer by using a customized filesystem device driver that extracts and "tunnels" (e.g., forwards) filesystem-level information to another storage management system. Note that a filesystem-level proxy can also provide additional benefits. For instance, by emulating a local filesystem and storage device, the disclosed techniques can also overcome restrictions imposed by certain resource-intensive applications (e.g., certain databases, email server products, and/or data protection managers) to only use local storage devices.

Using Multiple Cloud Controllers to Access Cloud-Based Storage Via CIFS

The previous section described some possible architectures for cloud controllers. As described previously, two or more cloud controllers may work together to collectively manage and access a shared set of files that are stored in a cloud storage system.

Figure 8:
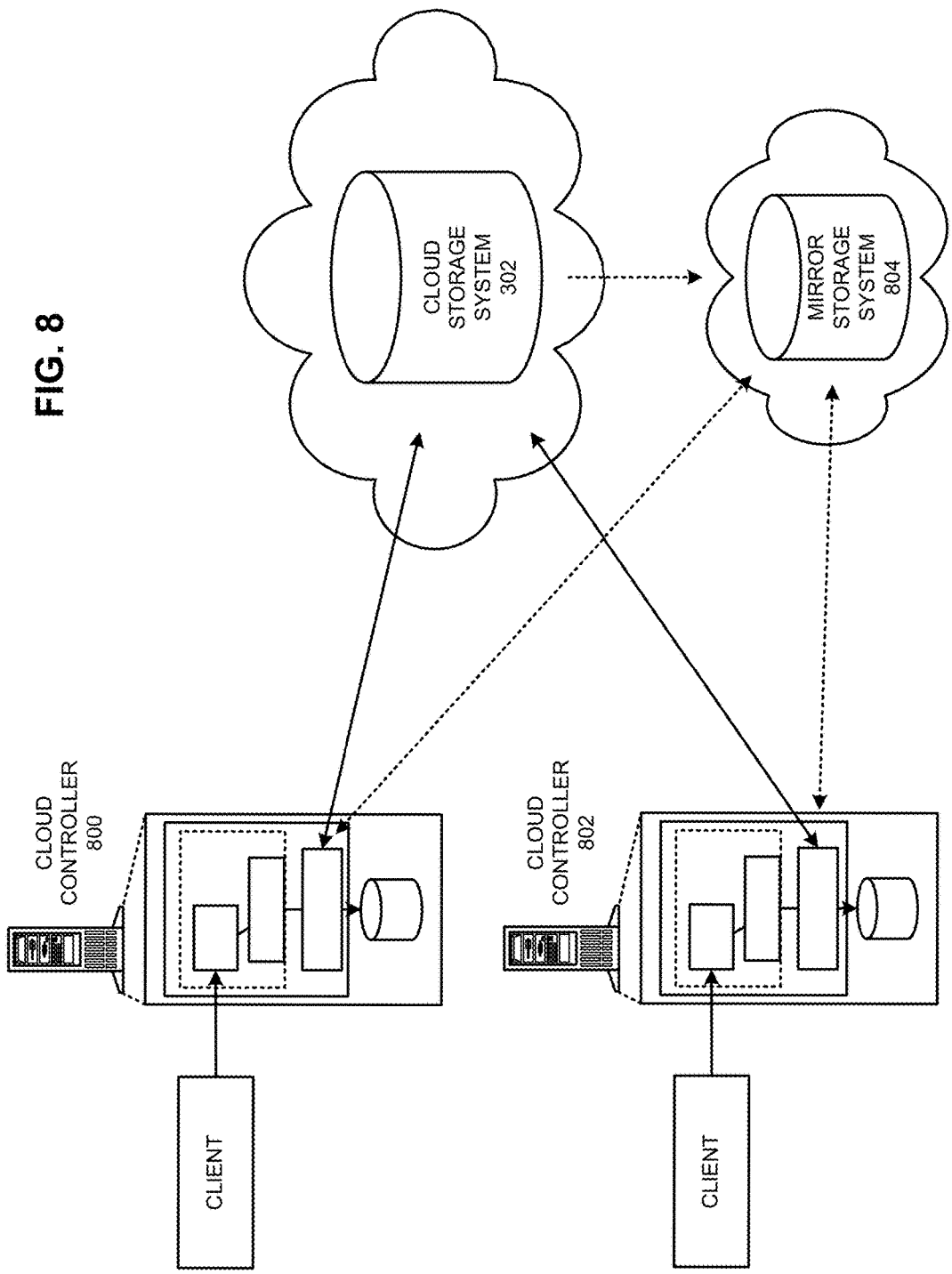
FIG. 8 illustrates a distributed system in which updates are mirrored to an additional mirror storage system in accordance with an embodiment.

FIG. 8 illustrates multiple cloud controllers 800-802 (as individually illustrated in FIGS. 3-6C and described above) that collectively manage data in cloud storage system 302. Both cloud controllers 800-802 support application-layer network requests (e.g., CIFS requests) from their respective clients, and then collectively ensure data coherency and access performance for the shared data. As described previously, storage management systems in cloud controllers 800-802 incorporate aspects of a transactional copy-on-write filesystem, thereby ensuring that file operations are data-consistent and that the system can quickly recover from crashes.

Note that the described architecture can overcome limitations in an application-layer network protocol. As described above, CIFS does not allow requests to be proxied, and requires that a single hosting server manage the underlying filesystem. However, the disclosed filesystem forwarding mechanisms provide a level of abstraction where each guest operating system assumes it is the sole manager of the shared data. The underlying storage management systems in the host operating systems can pass application-level request information to one another to ensure that consistency is maintained. Thus, the disclosed techniques leverage existing CIFS implementations (via the guest operating system), but also extend CIFS capabilities to allow multiple CIFS servers to share access to underlying data. Note that the storage management systems may not need to understand all of the application-level information being received via CIFS requests; in some instances, the cloud controllers may simply forward such information to each other. However, for some data access scenarios (e.g., multiple clients accessing a shared file via different gateways), the storage management systems in each cloud controller may need to track and actively manage file operations to ensure that data consistency is maintained for the underlying data. Note also that receiving and filtering CIFS requests at the cloud controllers can reduce the amount of protocol chatter that travels over wide-area network links. For instance, a storage management system in a local cloud controller may be able to resolve some subset of CIFS requests, thereby eliminating the need to forward associated request information to the other components of the distributed storage system and reducing request latency.

In some embodiments, an additional network storage system may be used to provide another level of redundancy (and ensure high availability). For instance, in FIG. 8, either the storage management systems in cloud controllers 800-802 and/or cloud storage system 302 may be configured to mirror updates (e.g., also send metadata and data snapshots) to a mirror storage system 804 which is primarily used in failure situations. For instance, if cloud storage system 302 were to crash or become unavailable due to a network partition, cloud controllers 800-802 could be configured to temporarily use mirror storage system 804 as their backing store. As an emergency backup, mirror storage system 804 may include fewer resources (e.g., a smaller network link and/or less storage capacity) than cloud storage system 302, but still ensure that availability and performance guarantees can be met. Note also that cloud controllers may be deployed as mirrored pairs, to ensure high availability across cloud controller failures. The following sections discuss redundancy and recovery options in more detail.

Disaster Recovery and Business Continuity

Some embodiments of the disclosed system architecture support the rapid recovery and/or replacement of cloud controllers. For instance, a new (or recovering) cloud controller immediately begins reading and processing the available metadata snapshots (e.g., in the case of a recovering cloud controller, the set of incremental metadata snapshots written to the cloud storage system since the cloud controller went offline). Because metadata is relatively small in comparison to the actual file data, this process can be performed more quickly than transferring a full data set. A cloud controller with relatively up-to-date metadata can immediately begin processing client requests; while the cloud controller may not yet have the requested data (or any data at all) cached, once it has retrieved a sufficient set of metadata it can already identify and access the cloud files containing requested file data.

In some embodiments, one or more additional cloud controllers serve as backups for an existing set of cloud controllers. These additional backup cloud controllers can take over the load of damaged and/or failing cloud controllers to provide disaster recovery and business continuity.

Figure 11A:
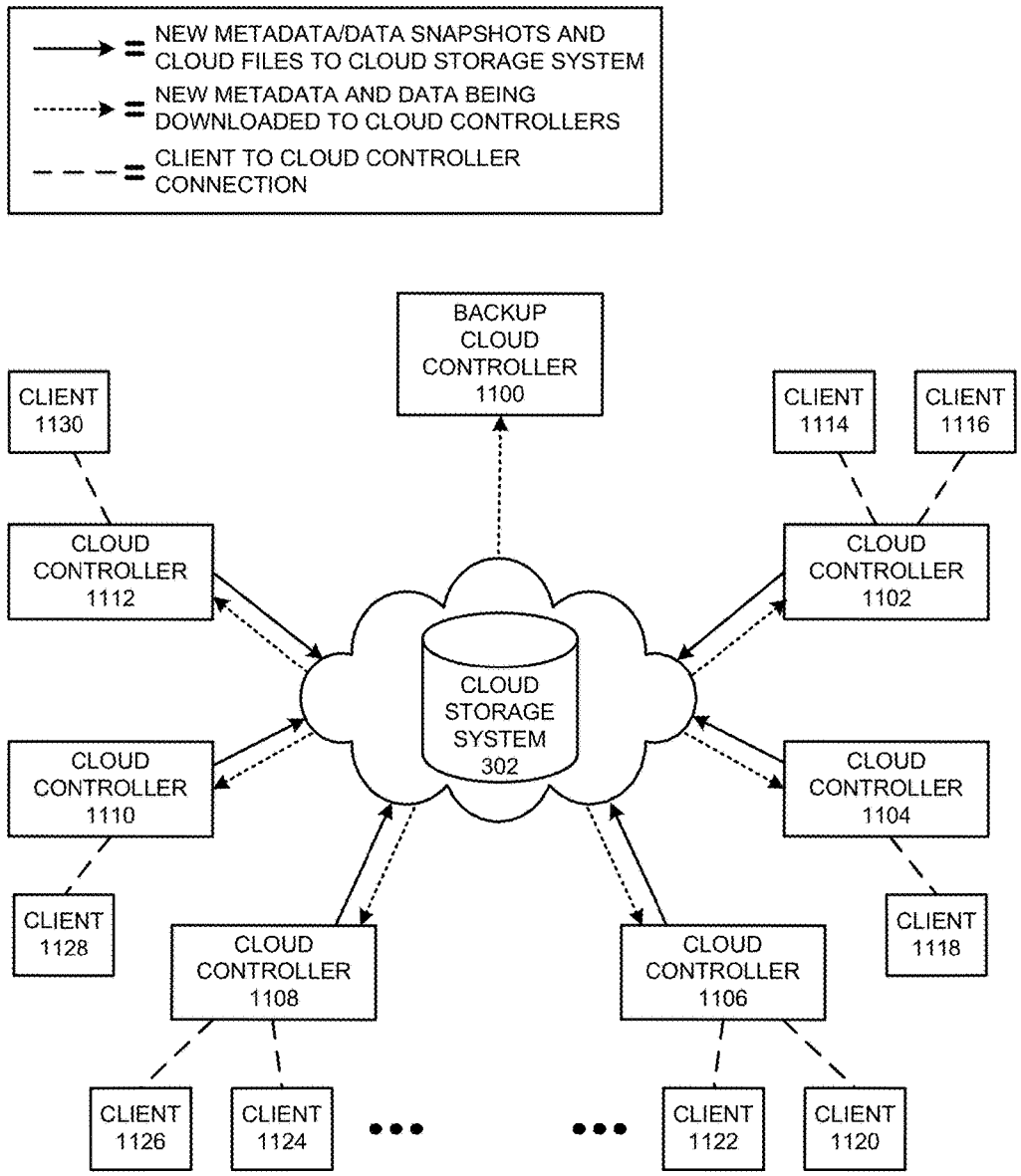
FIG. 11A illustrates a distributed filesystem in which a backup cloud controller serves as a backup for set of cloud controllers that manage and access data stored in a cloud storage system in accordance with an embodiment.

FIG. 11A illustrates a set of cloud controllers 1100-1112 that manage and access data stored in a cloud storage system 302. Backup cloud controller 1100 serves as a "hot backup"

for cloud controllers 1102-1112. During operation, cloud controllers 1102-1112 write incremental snapshots containing new metadata and data to cloud storage system 302. Cloud controllers 1102-1112 continuously receive incremental metadata snapshot updates (e.g., either from cloud storage system 302, as shown, or directly from the other cloud controllers), and update their local metadata with these updates to maintain a current view of the data stored in the distributed filesystem. Cloud controllers 1102-1112 also download data (e.g., stored in cloud files) from cloud storage system 302 in response to data requests from a set of clients 1114-1130.

Note that in FIG. 11A backup cloud controller 1100 is not associated with any clients, but is instead configured to take over the load of another failing cloud controller. In some embodiments, backup cloud controller 1100 does not (in its backup role) serve data to any clients; instead, backup cloud controller 1100 primarily receives and synchronizes the metadata updates sent by cloud controllers 1102-1112 to maintain a current view of the data stored in the distributed filesystem. In some alternative embodiments, backup cloud controller 1100 may also be configured to assist with serving client data requests during times of exceptional system load.

In some embodiments, a backup cloud controller may also be configured to predictively download some of the data created and/or cached by the other cloud controllers of the system, in an attempt to download data that is in the working set of other cloud controllers. While a backup cloud controller that is provisioned similarly to the other cloud controllers can only store a partial subset of the full caches of the combined set of other cloud controllers, caching the full set of metadata and at least some of the current data actively being operated on in the system can be of benefit if the backup cloud controller needs to take over the role of a failed cloud controller.

For instance, a backup cloud controller that is configured to serve as a "hot backup" may continuously load the (most-recently-created) data that was most recently uploaded to the cloud storage system. Due to temporal locality, recently created data is very likely to be accessed again, so in some scenarios caching such data in a backup cloud controller may be an optimal caching choice. For example, consider a scenario in which a set of globally distributed cloud controllers collectively manage data stored in a cloud storage system. Due to geographic constraints, only a subset of the cloud controllers may be active (e.g., actively servicing client requests) at a time, thereby allowing a backup cloud controller using the above-described technique to cache a larger portion of each active cloud controller's active data set. In the most extreme scenario, if only one cloud controller is active, the backup cloud controller may mirror a substantial percentage of the working set of that one active cloud controller. If an active cloud controller fails, the backup cloud controller's cache is already loaded with much of the recent data. Alternatively, if an inactive cloud controller were to fail, the backup cloud controller has more time and leeway (due to the failing cloud controller's current inactivity) to transparently load a data set that more closely matches the working set of the failed cloud controller.

Alternatively, if constantly downloading the most-recently-uploaded data to the backup cloud controller incurs too high a bandwidth cost, the backup cloud controller may instead be configured to periodically update the local cache (e.g., hourly). Other options include tracking the most-commonly-accessed set of files in each cloud controller (and sharing this tracking information with the backup cloud controller, which then caches that specific data) and/or allowing system users and/or administrators to select the set of data that is cached on the backup cloud controller (e.g., using locality policies, as discussed in a following section).

Figure 11B:
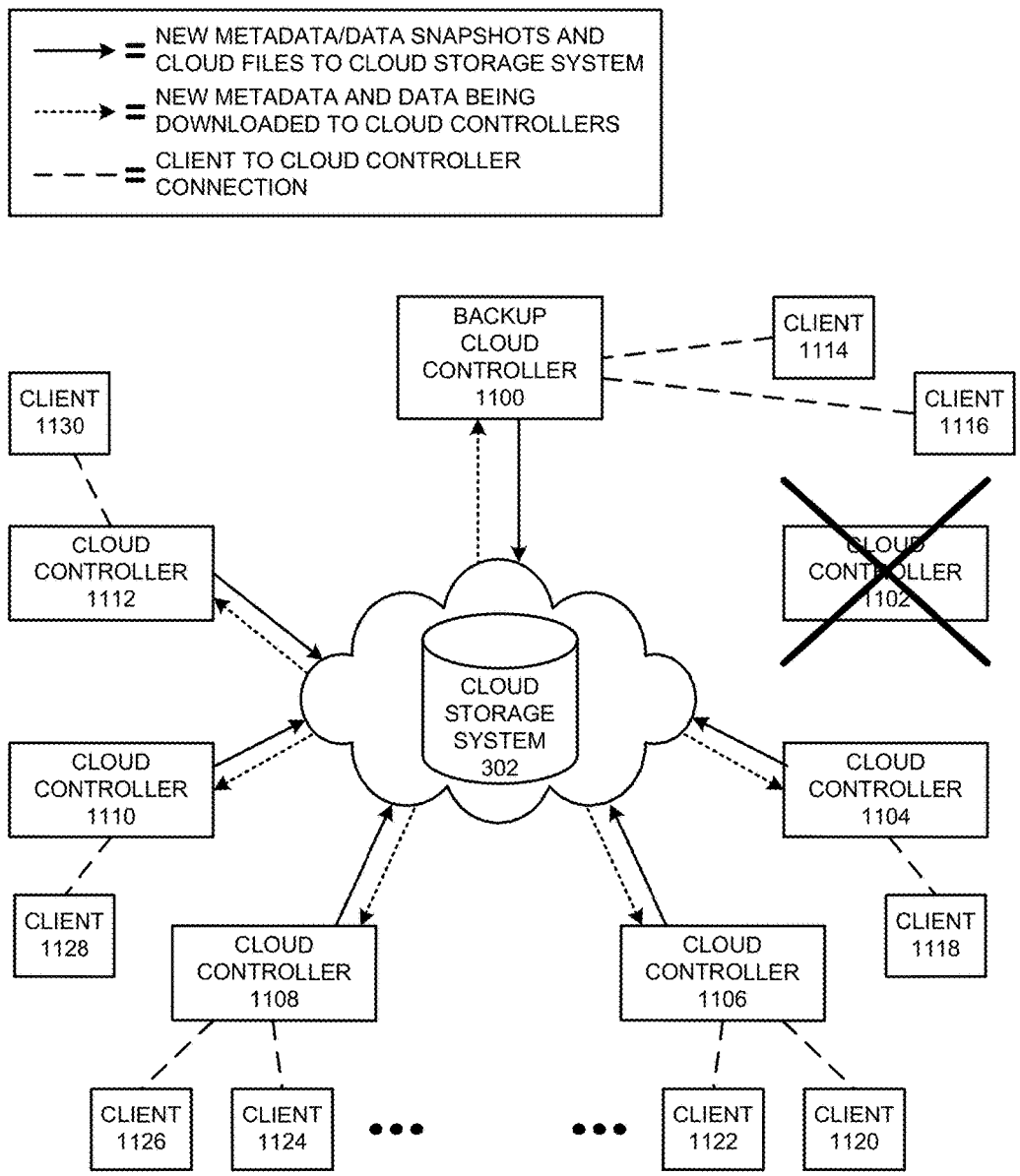
FIG. 11B illustrates the distributed filesystem of FIG. 11A after the backup cloud controller has taken over the load of a failed cloud controller in accordance with an embodiment.

FIG. 11B illustrates the system of FIG. 11A after the failure of a cloud controller, 1102. Backup cloud controller 1100, which was previously primarily synchronizing metadata (and perhaps predictively downloading some of the data cached by cloud controllers 1102-1112, as described above), takes over the load of failed cloud controller 1102, and begins servicing requests from clients 1114-1116. More specifically, because of its ongoing metadata synchronization efforts, backup cloud controller 1100 can already provide clients 1114-1116 instant access to any needed metadata, and can either serve locally cached data or access the cloud storage system as needed in response to client data requests. Note that a backup cloud controller will generally be configured to stop performing general caching efforts after taking over the role of a failed cloud controller; at this point, the backup cloud controller typically manages its cache in a manner that optimizes the performance of the data requests received from its clients.

In some embodiments, a backup cloud controller may be located at a location that is distinct from any other cloud controller, to ensure that a local disaster or issue does not also affect the backup cloud controller. However, in alternative embodiments, and in embodiments that include multiple backup cloud controllers (which might also serve in a load-balancing capacity when needed), some or all of the one or more backup cloud controllers may be co-located with active (non-backup) cloud controllers. Note that in scenarios that include multiple backup cloud controllers, individual backup cloud controllers may be associated with (and cache data for) a distinct subset of the active (non-backup) cloud controllers.

In some embodiments, backup cloud controllers (and/or other cloud controllers or other system entities) may be configured to automatically detect the failure of a cloud controller and perform a set of network and/or client reconfiguration options that automatically reroute requests from orphaned clients to a backup cloud controller. In scenarios where multiple backup cloud controllers are available, backup cloud controllers may also be configured to periodically track the network latency and bandwidth between each backup cloud controller and non-backup cloud controller; such information can assist in determining which backup cloud controller can provide better service to the orphaned clients. In alternative embodiments, rerouting requests from orphaned clients to a backup cloud controller may involve manual intervention by a system administrator (e.g., explicitly changing a distributed filesystem mapping in a local network to route client requests to the backup cloud controller).

Note that transitioning from a failed cloud controller to a backup cloud controller may not be completely transparent from the perspective of orphaned clients of the failed cloud controller. For example, a client may have been transmitting data to be written to the failing cloud controllers, or the failing cloud controller may have been preparing (or even already been transmitting) data and/or metadata updates to the cloud storage system. Data in transit to or from a failed cloud controller should typically be considered lost; a primary consideration for the distributed storage system is that no data corruption occurs at the remaining cloud controllers or the cloud storage system.

In some embodiments, depending on the desired failure characteristics, the distributed storage system may have different modes of operation. For instance, in some modes of operation cloud controllers may perform strict ordering of updates; e.g., always upload an incremental data snapshot before its associated incremental metadata snapshot, to ensure that the global system metadata isn't updated until the uploading cloud controller has confirmed that both the data and metadata have been successfully received by the cloud storage system. For example, the cloud controller may calculate checksums (e.g., MD5 checksums) prior to uploading each snapshot, and confirm that these checksums match checksums generated by the cloud storage system upon receiving and successfully storing the snapshots. In the worst case, such strict ordering may result in the loss of some storage space in the cloud storage system (e.g., if the cloud controller fails after uploading snapshots but prior to sending notification of the metadata and/or data updates to other cloud controllers); this storage space can be recovered during cloud-controller recovery or via administrator actions.

In alternative embodiments, incremental metadata snapshots are uploaded first (to propagate the awareness of new data throughout the system as quickly as possible), with data snapshots following. In such embodiments, a cloud-controller failure that occurs between the upload of the metadata and data snapshots may result in metadata references to unavailable cloud files. In such situations, data corruption issues may need to be resolved by administrator actions or by inspecting log data to revert the metadata uploaded by the failing cloud controller.

Figure 12:
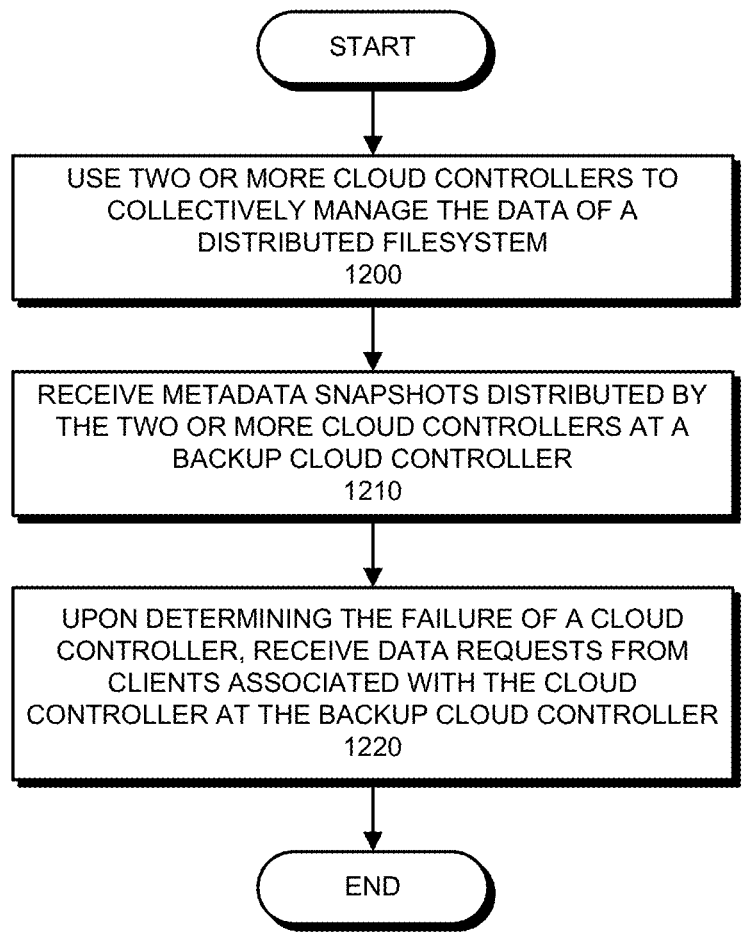
FIG. 12 presents a flow chart that illustrates the process of providing disaster recovery for a distributed filesystem in accordance with an embodiment.

FIG. 12 presents a flow chart that illustrates the process of providing disaster recovery for a distributed filesystem. During operation, two or more cloud controllers collectively manage the data of a distributed filesystem (operation 1200). More specifically, whenever each cloud controller receives new data from a client, it sends incremental metadata snapshots for the new data to the other cloud controllers, and sends an incremental data snapshot containing the new data to a cloud storage system. A backup cloud controller associated with the distributed filesystem is also configured to receive each (incremental) metadata snapshot (operation 1210), such that, upon determining the failure of a cloud controller, the backup cloud controller can immediately begin receiving data requests from clients associated with the failed cloud controller (operation 1220).

Multiple Cloud Storage Providers

Cloud storage providers may be differentiated (and selected) based on a range of characteristics including, but not limited to:
capacity;
cost per unit of storage, network transfer, access, and/or processing activity;
request response/performance (e.g., internal latency when servicing a request);
frequency and/or severity of outages (with less reliable cloud storage providers typically offering cheaper pricing to make up for the potential unreliability);
location (which may involve political concerns) and network latency; and
level of replication/redundancy and number of points of presence (POPs) (e.g., some higher-cost cloud storage providers may immediately internally replicate newly stored data to multiple POPs at different geographic locations, thereby ensuring very high availability and low-latency access from anywhere in the world).

Choosing an appropriate cloud storage provider for a distributed filesystem may also depend on determining an anticipated data set and access patterns.

In some embodiments, multiple cloud storage providers may also be used to provide high availability and disaster recovery. For example, data may be mirrored across multiple cloud storage providers to ensure that data is still available to clients even if there is an outage in one of the cloud storage providers. Alternatively, multiple different cloud storage providers that provide different tiers of performance (and have different cost structures) may also be combined to balance performance and overall system cost.

Figure 13A:
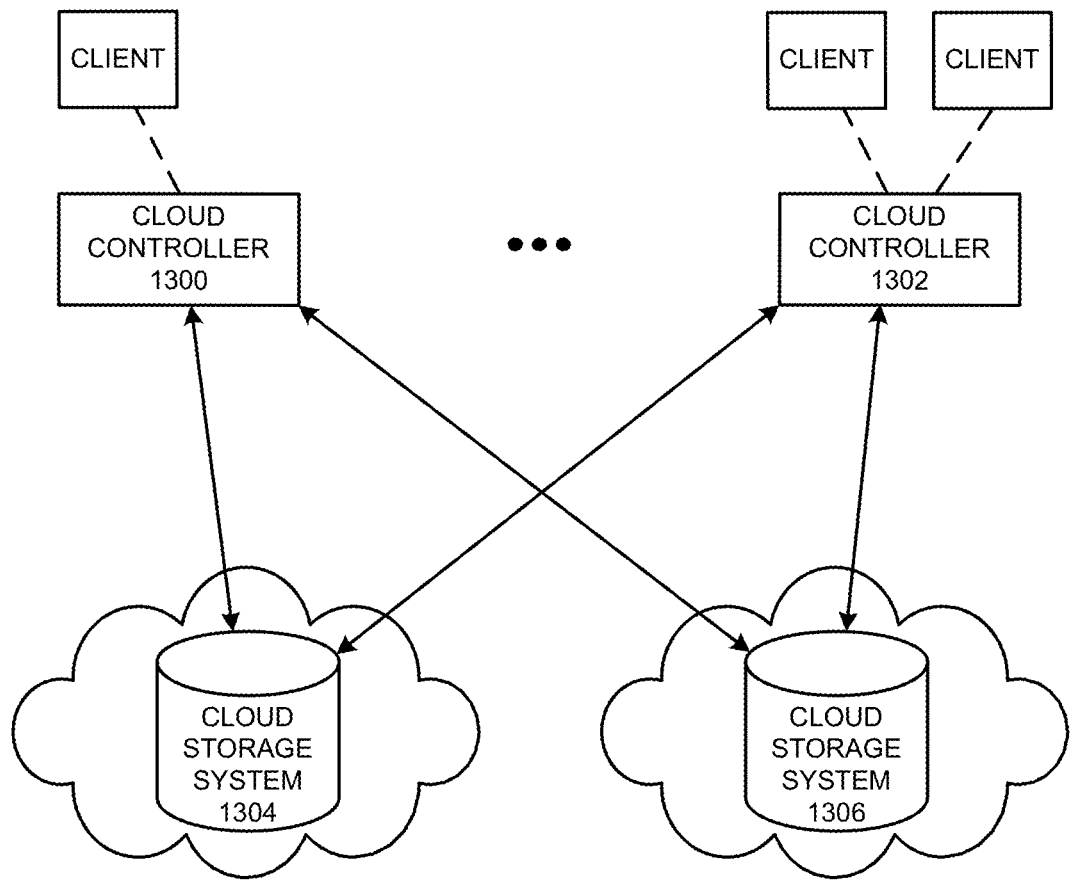
FIG. 13A illustrates a distributed filesystem in which a set of cloud controllers manage and access data mirrored across multiple cloud storage systems in accordance with an embodiment.

FIG. 13A illustrates a set of cloud controllers 1300-1302 that manage and access data mirrored across multiple cloud storage systems (e.g., multiple cloud storage systems hosted by multiple distinct cloud storage providers). During operation, cloud controllers 1300-1302 write incremental data and metadata snapshots to both cloud storage systems 1304 and 1306. Load (e.g., cloud controller read requests) may be balanced between the two cloud storage systems depending on a number of desired criteria. For instance, if cloud storage systems 1304 and 1306 typically provide comparable performance, but cloud storage system 1304 has a lower per-access cost because it has occasional outages, the cloud controllers may be biased to primarily read from cloud storage system 1304, and only access cloud storage system 1306 when 1304 is suffering from an outage. In another example, cloud storage system 1304 may be more reliable and cheaper than 1306, but have worse performance due to fewer POPs (and, as a result, higher network latencies); in such a scenario, the cloud controllers might be biased to optimize performance by primarily reading data from cloud storage system 1306. Note that such choices are mostly transparent to the clients of cloud controllers 1300-1302; clients continue to access cloud controllers as previously, but may notice different levels of file access performance depending on the underlying cloud storage system choices (e.g., the cloud controllers' caches may hide some, but not always all, of the performance and latency aspects of an underlying cloud storage system).

In some embodiments of a distributed filesystem with data mirrored across multiple cloud storage systems, a cloud controller may be configured to immediately write a cloud file to a first cloud storage provider (thereby allowing the data to be propagated to other cloud controllers), but then delay the transfer of the cloud file to the mirror to a time when network bandwidth is cheaper. In such embodiments, the cloud controller may be specially configured to ensure that the cached local copy of the data in the cloud file is not flushed until after it has been mirrored to the second cloud storage provider.

Figure 13B:
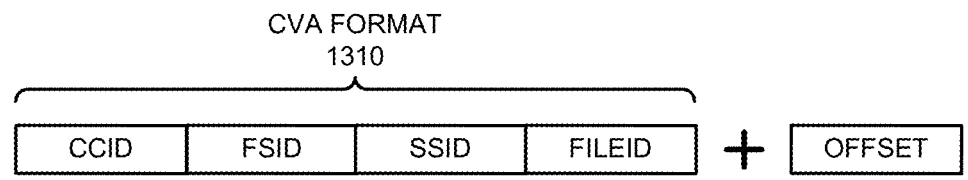
FIG. 13B illustrates a cloud virtual address (CVA) format that facilitates identifying and locating cloud files across different cloud storage configurations in accordance with an embodiment.

FIG. 13B illustrates an exemplary CVA format 1310 that facilitates identifying and locating cloud files across different cloud storage configurations. As described previously, accessing a block from a cloud file involves using a CVA to download the needed cloud file and then using the offset into the cloud file to access a specific target block. Fields in exemplary CVA format 1310 include, but are not limited to: a cloud controller ID (CCID) that uniquely identifies the originating cloud controller for the respective cloud file (e.g., the cloud controller that uploaded the cloud file); a filesystem ID (FSID) that identifies one or more cloud storage providers and/or other storage options; a snapshot ID (SSID) that uniquely identifies the updates of each cloud controller (e.g., each CCID+SSID combination in the system is unique); and a file ID (FILEID) that identifies the cloud files within each snapshot (e.g., each FILEID for a given SSID is unique). Note that ensuring the uniqueness of CVAs can be quite important for avoiding data corruption, because cloud storage providers typically serve as "black boxes" to the cloud controllers. For instance, a cloud controller may not know anything about the organization or layout of data in a cloud storage system, but may simply use a CVA to generate a unique file name and/or identifier for a cloud file to be stored to the cloud storage system. For example, in the context of the exemplary CVA format 1310 of FIG. 13B, a CVA may be converted to an object (file) name such as:

"data-<CCID>-<FSID>-<SSID>-<FILEID>.snp"

By using such naming conventions, a CVA can easily be used to determine the identifier for the cloud file; during a subsequent access, the same (or another) cloud controller can use the same CVA to generate and present the same file name to the cloud storage system and receive in return the cloud file that was stored in association with that CVA. Hence, the fields of CVA format 1310 need to be sufficiently provisioned to ensure that two cloud files are never written to the same cloud storage system for the same identifier; for example, CVA format 1310 may include a 64-bit SSID field to ensure that there will never be duplicate snapshot numbers for a cloud controller.

In some embodiments, an FSID field can be used to support multiple cloud storage providers. For instance, part of the FSID field may form a bit vector that indicates one or more cloud storage providers that are currently storing an associated cloud file. In another example, a cloud controller may use a value stored in a CVA's FSID field to perform a lookup in a table of cloud service provider credentials. This table may include a list of cloud storage providers that are currently storing the cloud file, as well as "cloud account" information (e.g., information identifying a specific user account at a cloud storage provider and credentials that are needed to access that user account). Note that in addition to accessing different cloud storage providers, a cloud controller may also be configured to access different cloud accounts at the same cloud storage provider (e.g., different user accounts with different configurations and/or levels of service at the same cloud storage provider). FSIDs may also be used to support other filesystem-level features, such as storage quotas.

In some embodiments, data in the distributed filesystem may be split across multiple different cloud storage providers based on factors such as access frequency, age, and cost. For instance, new data may initially be written to a higher-cost cloud storage provider that instantly replicates the stored data across multiple POPs; this wide initial distribution allows other cloud controllers requesting the new data (and metadata) to download it quickly. At some subsequent time, data that is no longer frequently accessed may be migrated into a cheaper lower-tier cloud storage provider (e.g., a cloud storage provider with higher latency and lower cost) and deleted from the first cloud storage provider. Such moves may be performed asynchronously and as background operations to ensure that users accessing cloud controllers and data are not adversely affected. For example, data may be migrated to the lower-tier cloud storage provider at a time of day when the load of the distributed filesystem and the cost of network bandwidth are both lower.

Figure 14:
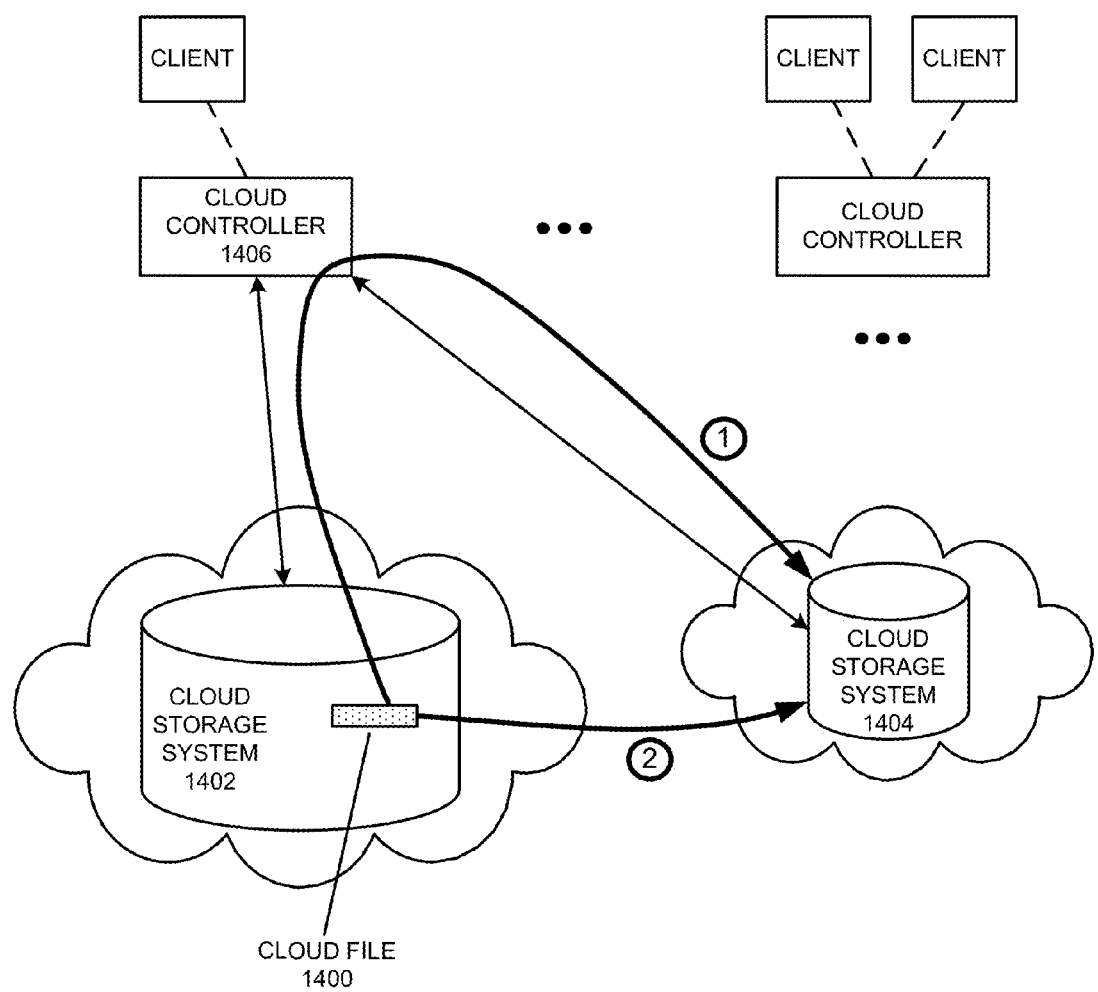
FIG. 14 illustrates the process of migrating a cloud file from a first cloud storage system to a second cloud storage system in accordance with an embodiment.

FIG. 14 illustrates the process of migrating a cloud file 1400 from a first cloud storage system 1402 to a second cloud storage system 1404. Upon determining that all of the contents of cloud file 1400 are no longer being frequently accessed, cloud controller 1406 downloads cloud file 1400 from cloud storage system 1402 and then writes cloud file 1400 to cloud storage system 1404 (operation 1 in FIG. 14). Alternatively, if the cloud storage providers support direct transfers, cloud controller 1406 may instead be able to instruct cloud storage system 1402 to copy cloud file 1400 directly to cloud storage system 1404 (operation 2 in FIG. 14), thereby saving the overhead (and additional network bandwidth) involved in having cloud controller 1406 be an intermediary for the transfer.

In some embodiments, multiple factors are considered prior to migrating data between cloud storage providers. For instance, in some scenarios deciding whether to migrate a given cloud file may involve considering: the cost of storage at both the source and target cloud storage providers; a variable network bandwidth cost and/or the network bandwidth cost for the transfer; the access frequency and/or history for the contents of the cloud file; the potential performance impact of moving the cloud file to a lower tier; and the load of one or more cloud controllers. In some scenarios, cloud controllers actively monitor the cloud files and/or data files that they "own" (e.g., created) to determine how frequently they are accessed, and then use this information to determine candidates for migration. For example, a cloud controller may track the most recent access (e.g., the last read time) for individual blocks in its local persistent read cache (and/or in a persistent read cache that is distributed across multiple cloud controllers). After the last block for a cloud file is evicted from the read cache (e.g., due to not being used recently), the cloud controller may initiate a counter; if no blocks from the cloud file are used before the counter reaches zero, the cloud file becomes a candidate to be moved to a lower tier. Alternatively, the cloud storage system may be configured to track how often each given cloud file is accessed; the cloud controller that created a drive file may also check this access log to determine data that is no longer frequently used. Note that the above scenarios keep a cloud file in the higher tier cloud storage system if any of its blocks are still being actively used. In other scenarios, such decisions may be more complex (e.g., migration choices may also be affected by user-defined locality policies and/or cost-performance trade-offs).

In some embodiments, migrating a cloud file to a different cloud storage provider and deleting the copy from the previous cloud storage provider involves some additional logistical operations and/or policies to ensure that cloud controllers can still access the cloud file as needed. For instance, in one system metadata may not be updated to reflect migrations, and cloud controllers are configured to incrementally check cloud storage providers in priority order (using the same CVA as an identifier) until the target cloud file is found. In other scenarios, the metadata for files may be updated to indicate that the cloud file has moved. Such indications may range from changing a bit field that is associated with a CVA (but not included in the actual CVA itself) to actually creating a new CVA that correctly references the cloud file on the new cloud storage provider. In the latter scenario, updating the metadata may be a multi-step operation. For example, a cloud controller may: (1) determine that a given cloud file should be migrated; (2) determine a new CVA for the cloud file at the new cloud storage provider; (3) upload the cloud file to the new cloud storage provider using the new CVA as the identifier; (4) upon receiving confirmation of receipt from the new cloud storage provider, update the metadata for all of the file blocks in the migrated cloud file to point to the new CVA (ideally without otherwise modifying the access history or other characteristics for the file blocks); (5) distribute an incremental metadata snapshot to the other cloud controllers; and (6) after enough time has passed to ensure that the other cloud controllers have updated their metadata, delete the cloud file from the old cloud storage provider.

Figure 15:
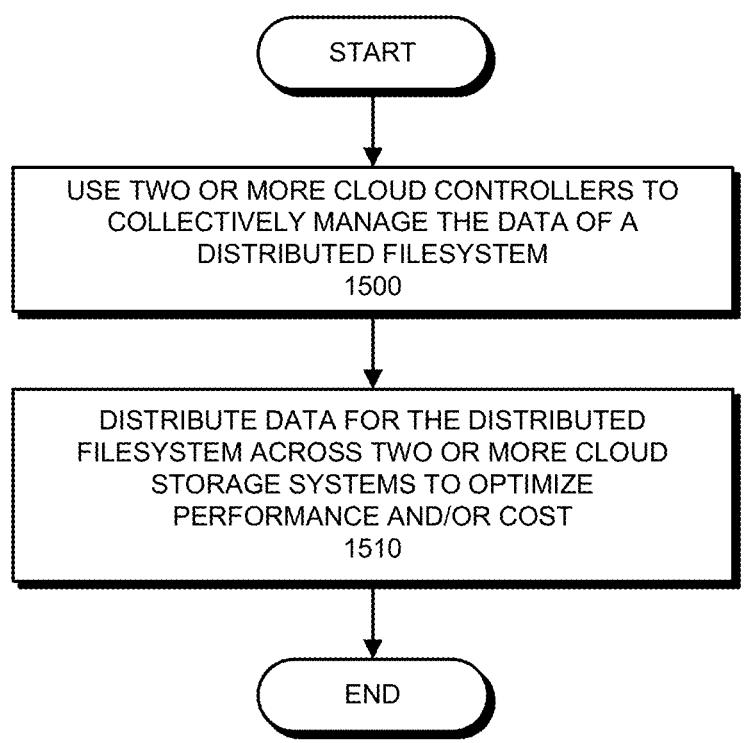
FIG. 15 presents a flow chart that illustrates the process of distributing data for a distributed filesystem across multiple cloud storage systems in accordance with an embodiment.

FIG. 15 presents a flow chart that illustrates the process of distributing data for a distributed filesystem across multiple cloud storage systems. During operation, two or more cloud controllers collectively manage the distributed filesystem data that is stored in one or more cloud storage systems (operation 1500); the cloud controllers cache and ensure data consistency for the stored data. Whenever each cloud controller receives new data from a client, it sends an incremental metadata snapshot for the new data to the other cloud controllers and an incremental data snapshot containing the new data to a cloud storage system. Data stored in the distributed filesystem can be distributed across two or more cloud storage systems to optimize performance and/or cost for the distributed filesystem (operation 1510).

Archival Cloud Storage Providers

In some embodiments, a distributed filesystem can also leverage an "archival" cloud storage system. Archival cloud storage systems typically provide storage for a very low cost, but are equipped with a limited set of storage capabilities that are geared toward storing data that is infrequently accessed. For instance, archival cloud storage systems may be architected such that new data can be received and written immediately, but read requests for stored data sometimes involve potentially substantial delays (e.g., sometimes on the order of multiple hours, or longer). Such relaxed service constraints allow the cloud storage provider to optimize its data center to substantially reduce costs (e.g., by receiving data in a rotating set of active servers and powering down all other servers and storage devices completely, thereby dramatically reducing power and cooling costs); storage costs for archival cloud storage systems may be one or more orders of magnitude cheaper than non-archival storage systems. While such access constraints may not be appropriate for data that is being actively accessed by users, such storage capabilities can provide low-cost storage options for certain sets of archival data in a distributed filesystem.

In some embodiments, data writes can be mirrored to an archival storage system for disaster recovery. In such embodiments, writes can be mirrored as described previously (for multiple tiers), but the archival storage system would typically only be read if a primary (non-archival) cloud storage system were to be irretrievably lost (e.g., if the primary cloud storage provider were to go out of business or suffer from a substantial national disaster). In such arrangements, data might be sequentially read out of the archival storage system (e.g., in order of priority) and then immediately written into another non-archival cloud storage system.

In some embodiments, the distributed filesystem collects and writes a set of archival data that is being retired from active use to an archival cloud storage system. This archived data will typically no longer be directly accessible by cloud controllers, but instead would need to be recovered by an administrator of the distributed filesystem.

As described earlier, cloud controllers notify each other whenever new data is created in the distributed filesystem. More specifically, cloud controllers periodically generate snapshots that reference every block, including both data and metadata, that is valid and stored in the cloud storage system at the time that the snapshot is taken. These snapshots are stored using data structures that allow each cloud controller to determine the set of new data and metadata that have been created in a recent time interval. Each cloud controller compares its two most recent snapshots (e.g., snapshot A and a later snapshot B) to determine the incremental difference between the two snapshots. For instance, data blocks that were created after snapshot A but before snapshot B (and are still referenced by snapshot B) are considered part of this incremental difference. Furthermore, any data blocks that were freed (e.g., deleted) between the snapshots are also considered part of this incremental difference. This incremental difference can be logically separated into incremental differences in metadata (e.g., new metadata created to reference newly created file data blocks) and incremental differences in data (e.g., the actual newly created file data blocks). In this disclosure, incremental differences in metadata are referred to as incremental metadata snapshots, and incremental differences in data are referred to as incremental data snapshots.

Each cloud controller stores both sets of incremental differences (e.g., the incremental metadata snapshot and the incremental data snapshot) in a cloud storage system. After uploading an incremental metadata snapshot to the cloud storage system, each cloud controller notifies the other cloud controllers. Each cloud controller then downloads these incremental metadata snapshots from the cloud storage system, updates its local metadata based on the downloaded metadata, and then deletes the downloaded incremental metadata snapshot. Other cloud controllers can then use the new metadata to access the new data stored in the incremental data snapshot (in the cloud storage system). In some scenarios, a cloud controller may also receive metadata (and data) directly from other cloud controllers. As mentioned previously, owning cloud controllers maintain data consistency by arbitrating multiple attempts to simultaneously write a given file. Cloud controllers can request updates directly from other cloud controllers if the data in the cloud storage system (or in a requesting cloud controller) is not up-to-date. In this scenario, the cloud controller storing the most recent copy of a file will determine the incremental difference between what the requesting controller has and the up-to-date version, and send the incremental difference directly to the requesting cloud controller.

Stored snapshots can be used for a range of features, including, but not limited to: "rolling-back" the filesystem to an earlier date; recovering accidentally deleted files; and archiving data from the distributed filesystem. The data structures used to store snapshots facilitate storing periodic snapshots compactly. For instance, a cloud controller may store hourly snapshots that capture the full state of the system at each hour interval; instead of storing each snapshot as a separate entity, however, these data structures may store incremental differences in a manner that is more compact but still allows each hourly snapshot to be accessed as needed. For example, in this scenario the incremental difference would reference the full set of changed data and metadata for all cloud controllers over the specified time interval (as opposed to the incremental metadata and incremental data snapshots, which only specify the set of changed data and metadata for one cloud controller). When using such an organization, accessing a desired snapshot for a previous time may involve creating a copy of an even earlier snapshot, and then applying one or more incremental differences for snapshots subsequent to the earlier snapshot to generate the desired snapshot.

A cloud controller may also periodically create "full" snapshots (e.g., complete, distinct copies of the metadata for the system at a given time that can be accessed without having to apply incremental differences). In summary, in this disclosure:

1. the term "snapshot" refers to a complete set of references for the distributed filesystem at a given time;

2. a subsequent snapshot may be accessed by starting with an earlier snapshot and applying a set of incremental differences;
3. the term "incremental metadata snapshot" refers to a set of incremental differences that identify a set of metadata that has changed on a specific cloud controller since its previous snapshot;
4. the term "incremental data snapshot" refers to a set of incremental differences that include a set of data that has changed on a specific cloud controller since its previous snapshot; and
5. the term "full snapshot" refers to a specific type of snapshot that can be accessed without having to apply any incremental differences between snapshots.

Figure 16A:
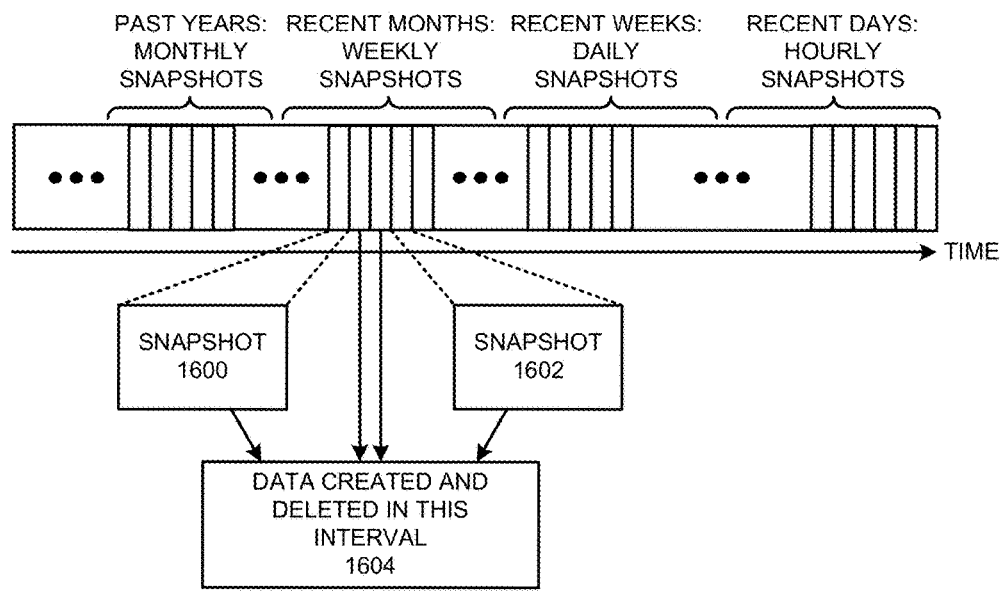
FIG. 16A illustrates a set of snapshots that are taken for the distributed filesystem over time in accordance with an embodiment.
Figure 16B:
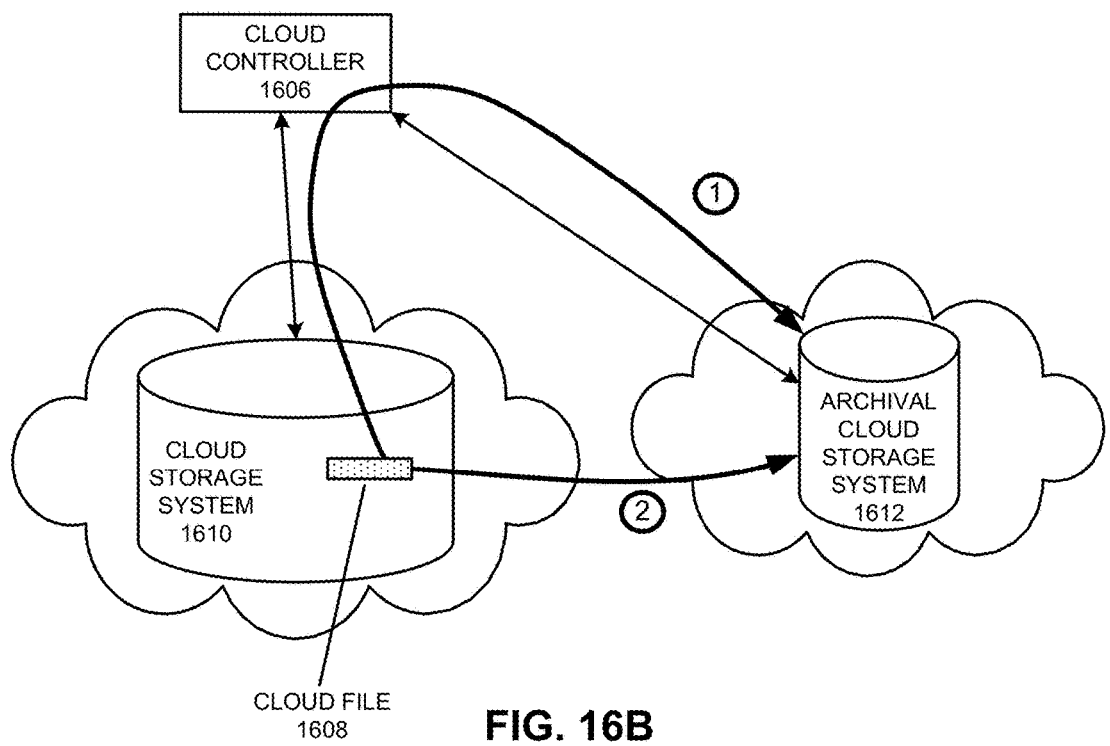
FIG. 16B illustrates the process of migrating a cloud file from a first cloud storage system to an archival cloud storage system in accordance with an embodiment.

FIGS. 16A-16B illustrate an exemplary process for archiving data in a distributed filesystem. FIG. 16A illustrates a set of snapshots that are taken for the distributed filesystem over time. For instance, a designated cloud controller may be configured to write a snapshot on an hourly basis. Note that storing a large number of snapshots may consume substantial storage space (even when using delta encoding to store incremental differences); hence the system may be configured to retire some of the snapshots for older time intervals. For example, the system may (as illustrated in FIG. 16A) store hourly snapshots for a recent set of days, but then only maintain a select set of daily snapshots for recent weeks, a select set of weekly snapshots for recent months, and a select set of monthly snapshots for past years.

During an archival operation, a cloud controller analyzes file metadata changes for a time interval between two snapshots (e.g., snapshots 1600 and 1602) to determine files that existed and were deleted in the time interval 1604 but are still actively stored in cloud files in a cloud storage system. For example, cloud controller 1606 may be able to determine from snapshots 1600 and 1602 (and/or the intervening and surrounding snapshots) that a given file that existed (and/or was created) in snapshot 1600 and deleted in snapshot 1602 is still stored in a cloud file in a non-archival cloud storage system. If this deletion occurred sufficiently far in the past (e.g., more than 30 days ago), the cloud controller determines that the active lifespan of this file is over, and that any data for the file that is stored in cloud files no longer need to be kept in active storage.

FIG. 16B illustrates how cloud controller 1606, after determining from past snapshots that all of the blocks in cloud file 1608 were previously deleted, moves cloud file 1608 from cloud storage system 1610 to archival cloud storage system 1612. As in FIG. 14, this transfer may involve either cloud controller 1606 as an intermediary (operation 1 in FIG. 16B) or a direct transfer from cloud storage system 1610 to archival cloud storage system 1612 (operation 2 in FIG. 16B).

The archival operation illustrated in FIGS. 16A-16B describes using data gleaned from previous snapshots to determine data that can be archived. In some embodiments, cloud controllers can also actively track deletes to determine archival candidates. For instance, each cloud controller can keep track of data blocks in the cloud files it previously uploaded to the cloud storage system (e.g., by maintaining a bitmap for each cloud file), and then mark deleted blocks whenever a file is deleted. When all of the blocks in a cloud file are marked as being deleted, the owning cloud controller can move the cloud file to the archival cloud storage system. Alternatively, the cloud controller may instead add the cloud file to a special delete list for a specified interval (e.g., 30 days) to ensure that the data still remains temporarily available and quickly recoverable for that interval in case of an accidental delete or other similar issue; if no client or cloud controller accesses the cloud file during this interval, the cloud file is then moved to the archival cloud storage system. One benefit of techniques that track deletes is that they can detect and archive files that were created and deleted between snapshots (e.g., depending on the time granularity between snapshots). In some embodiments, snapshot-comparison and delete-tracking approaches can be combined into a hybrid technique that more accurately archives unneeded data.

Note that in some embodiments a cloud file typically is only archived if all of the blocks of the cloud file have been deleted; if any of the blocks have not been deleted, the cloud file remains in non-archival cloud storage. In alternative embodiments, individual blocks in a cloud file may be archived, and cloud files can be shrunk to conserve cloud storage space. For instance, if a subset of the blocks in a cloud file are moved to an archival cloud storage system, the portion of the cloud file remaining in the primary cloud storage system may need to be reconstructed to preserve the remaining blocks. For example, filling the archived blocks of a cloud file with zeros and then compressing the cloud file effectively reduces the amount of storage space needed for the empty blocks without changing block indexing and accesses for the cloud file. In a specific (small) example, for an exemplary cloud file containing blocks "ABC", a cloud controller archiving block B could generate a modified cloud file "A0C" for the primary cloud storage system and "0B0" for the archival cloud storage system (where '0' represents a block filled with zeros). If block 'C' were later archived, the blocks could be updated to become "A00" and "0BC", respectively.

In some embodiments, a storage administrator manages and/or initiates archival operations. Alternatively, such operations may be scheduled at regular time intervals. Note that some archival techniques (e.g., the snapshot-comparison technique) can be initiated on a single cloud controller that has access to the collected snapshot data. Furthermore, archival operations may be initiated as low-priority background jobs (in comparison with client accesses) and/or on a cloud controller during a timeframe that the cloud controller typically has low load. Alternatively, such operations may be initiated on a backup cloud controller if available, especially if backup cloud controllers are configured to not receive client requests. Archival transfers can also be timed to occur when network bandwidth is cheaper.

In some embodiments, a distributed filesystem may include additional tables (or other structures) that facilitate accessing archived data; note that reading data from an archival cloud storage system may involve special access techniques and/or administrator assistance. After ensuring that a cloud file has successfully been copied to an archival storage system, a cloud controller can delete that cloud file from the originating (non-archival) cloud storage system. At this point, the cloud controller may generate an incremental metadata snapshot to indicate that the metadata stored in previous snapshots can no longer be used to access the deleted data that was previously stored in the (now deleted) cloud files. However, a different set of tracking structures will need to be updated to reflect that the newly archived data in the archival cloud storage system can still be accessed if needed. For instance, archived data may be tracked in a separate set of metadata, and indexed by date such that an administrator can selectively recover and access archived data within a desired timeframe (e.g., data that is approximately one year old, data that existed during a certain timeframe, or data that was deleted between two specified dates) as needed.

Note that recovering archived data may also involve recovering archived snapshots. Because only a subset of snapshots are kept over time, a cloud controller performing an archival operation may also write an old snapshot of the distributed filesystem to the archival cloud storage provider; these old snapshots can be re-populated into the cloud controllers at a later point if needed to access cloud file data that is restored from archives. If the archived snapshot is written together with the deleted data that it references, a recovery operation may recover both simultaneously. For example, the index of archived data may indicate the deletion timeframe, original lifespan, data size, format, and identifier for each archival record, thereby facilitating archival recovery.

Note also that, in some embodiments, archival operations can also be opportunities to defragment and/or reorganize data. As described previously, cloud file size is often chosen to balance download throughput and latency; for data being archived, these are no longer issues, and hence cloud file constraints may be eliminated. For instance, file data distributed across multiple cloud files may be re-written into contiguous files (that can be recovered more easily in a single access) regardless of size during archiving. In such implementations, an index of archived files may simply store filenames, relevant metadata (e.g., creation and deletion dates, originating cloud controller, size, etc.), and a reference identifier to access the data from the archival cloud storage system.

In some embodiments, cloud controllers can also serve as intermediaries to an archival cloud storage provider for backup purposes. For instance, cloud controllers may implement a virtual tape library (VTL) interface that allows clients to perform backups as if the cloud controller were a tape backup device, with the data instead being written to the archival cloud storage provider. These techniques allow existing client backup infrastructure to be used transparently while adding additional capabilities (e.g., offsite storage in the archival cloud storage provider, redundant simultaneous writes to multiple archival cloud storage providers, etc.). Note that the high read latency of archival cloud storage providers is comparable to that of typical tape backup systems, and hence not a drawback in such usage scenarios.

Figure 17:
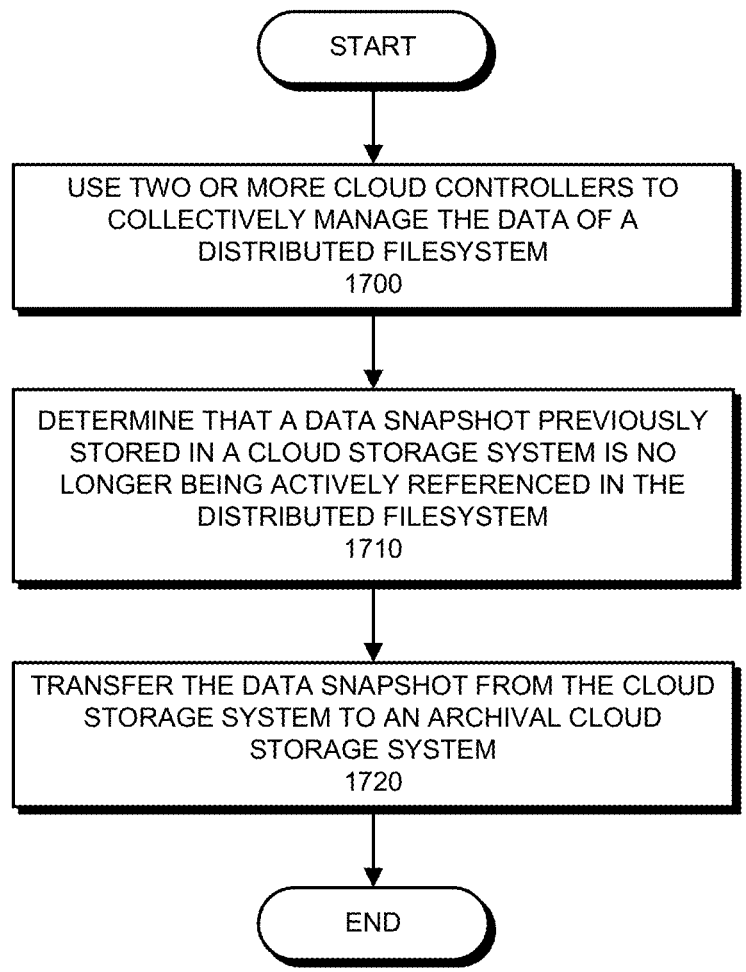
FIG. 17 presents a flow chart that illustrates the process of archiving data for a distributed filesystem in accordance with an embodiment.

FIG. 17 presents a flow chart that illustrates the process of archiving data for a distributed filesystem. Two or more cloud controllers collectively manage distributed filesystem data that is stored in one or more cloud storage systems (operation 1700); the cloud controllers cache and ensure data consistency for the stored data. Whenever each cloud controller receives new data from a client, it creates an incremental metadata snapshot for the new data that is propagated to the other cloud controllers and an incremental data snapshot containing the new data that is sent to a cloud storage system. During operation, a cloud controller determines that a cloud file in a previously stored data snapshot is no longer being actively referenced in the distributed filesystem (operation 1710). For instance, a cloud file from a previous data snapshot may no longer be referenced if all of the blocks it contains have been deleted some time ago. The cloud controller transfers this cloud file from the (first) cloud storage system to an archival cloud storage system (operation 1720), thereby reducing storage costs while preserving the data in the cloud file in case it is ever needed again.

Accessing Cloud Controllers as Peer Caches

Accessing cloud files involves some overhead—a cloud controller seeking to download a target file that is not locally cached needs to: (1) contact a cloud storage system hosting one or more cloud files that contain the target file's data blocks; (2) download some or all of the target cloud files; and (3) if the cloud files are encrypted, decrypt the portions of the target cloud files that precede and include the target data blocks. Delaying factors may include the distance and network latency between the requesting cloud controller and the cloud storage system, the load and delay in the cloud storage system, the size of cloud files, and the location of the target block in the cloud file. Furthermore, accessing the cloud storage system may be associated with an access cost and/or network bandwidth cost. Hence, while a requesting cloud controller will typically eventually get the file from the cloud storage system, accessing the data blocks for the target file may involve considerable delay. If another (peer) cloud controller in the distributed filesystem is already caching desired data blocks, requesting and transferring cached data blocks from a peer cloud controller potentially facilitates accessing the desired file data more quickly (and cheaply).

In some embodiments, cloud controllers can query one or more of the other cloud controllers of the distributed filesystem to locate and access a needed data block that is already being cached by a peer cloud controller. Each individual cloud controller strives to determine the working set of its clients and locally cache a set of data that reduces the average client access latency. However, cloud controllers have limited storage capacity, and hence can only cache a limited amount of data. Inter-cloud-controller cache-sharing techniques can effectively increase the size of a cached working set, thereby potentially reducing average file access latencies as well as the number of requests that are sent to the cloud storage system. Furthermore, such techniques transfer only the needed data blocks; in contrast, accessing cloud files from the cloud storage system to access the same set of data blocks potentially transfers a larger amount of data (due to the size and organization of cloud files).

However, attempts to leverage the caches of other cloud controllers can also introduce additional overhead and trade-offs. As described previously, a cloud controller writes new data received from a client to a cloud storage system. The cloud controller will typically continue to cache this data locally while it is actively used by its clients; data that is no longer actively used is eventually pushed out of the local cache by other frequently and/or recently accessed data, but can be re-loaded if needed from the cloud storage provider. Thus, while it is possible that other cloud controllers may cache data that a requesting cloud controller needs, determining which cloud controllers are likely to be currently caching a needed file block is difficult. One option is to query all of the cloud controllers in the distributed filesystem. Unfortunately, while broadcasting requests to all cloud controllers increases the probability of finding a cached block, processing and/or responding to such requests may substantially increase each cloud controller's load. As a result, broadcast techniques become increasingly inefficient as the number of cloud controllers in the distributed filesystem grows. Furthermore, cloud controllers that are distributed across a large internal network or wide-area network are typically not be in the same broadcast domain; hence, broadcasts will require a large number of point-to-point messages. Such messages can increase network load, potentially to the point of slowing down accesses to the cloud storage system. Directory-based techniques that track the location and status of cached data blocks provide an alternative to broadcast-based techniques, but also require storage space and substantial message update traffic to keep the cache directories up-to-date.

In some embodiments, cloud controllers are configured to query a limited subset of peer cloud controllers in the distributed system for cached data blocks. For instance, a cloud controller may be configured to only send such "peer cache requests" to: one or more co-located cloud controllers; the cloud controller that owns (e.g., created) the cloud file containing a needed data block; a backup cloud controller; one or more cloud controllers that are determined to be in close network proximity to the requesting cloud controller; and/or one or more cloud controllers that are specified using a locality policy.

In some embodiments, a cloud controller is configured to query the caches of one or more peer cloud controllers for a data block in parallel with sending a request to the cloud storage system for the cloud file containing the data block. If a target peer cloud controller is indeed caching the data block, it can send the cached data block to the requesting cloud controller, which can then cancel and/or interrupt the transfer of the cloud file from the cloud storage system (e.g., depending on whether the cloud storage system is already transferring the cloud file or is still processing the request). If the peer cloud controller indicates that it is not caching the data block (or does not respond at all), the requesting cloud controller still receives the cloud file from the cloud storage system, and caches the requested (and now received) data block. Performing these two operations simultaneously: (1) ensures that peer cache requests do not increase the worst-case latency for a data block access; (2) adds only a small number of additional network messages and cloud controller look-ups (that are proportional to the number of peer cloud controllers that are queried); and (3) in the best case facilitates transferring needed data blocks to a requesting cloud controller more quickly than would be possible from the cloud storage system, thereby allowing the requesting cloud controller to quickly present the requested data blocks to a requesting client and cancel the parallel request to the cloud storage system before part (or sometimes even any) of the cloud file has been transferred.

Figure 18:
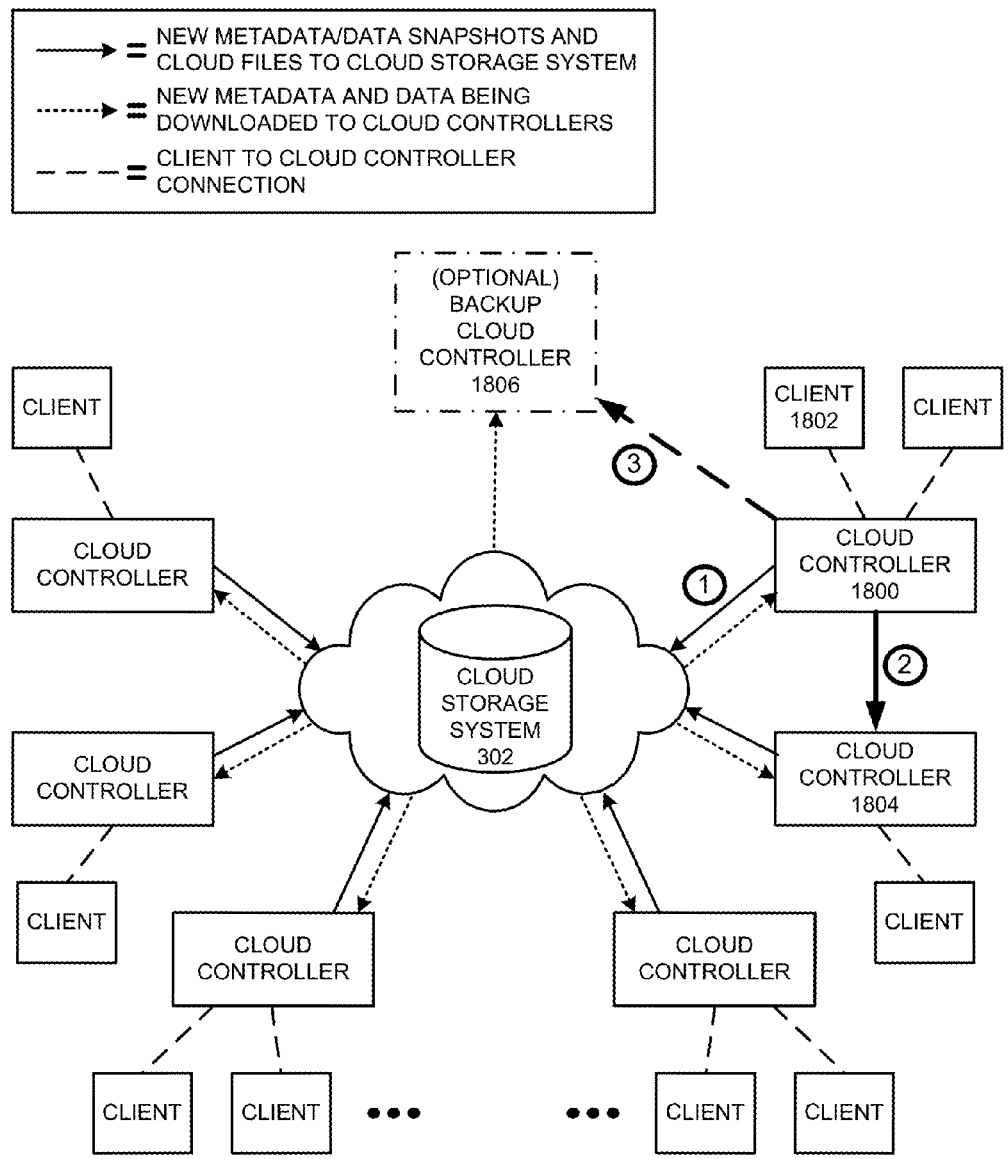
FIG. 18 illustrates a distributed filesystem in which a cloud controller issues peer cache requests to one or more peer cloud controllers in accordance with an embodiment.

FIG. 18 illustrates a cloud controller 1800 that issues peer cache requests to one or more peer cloud controllers. In one scenario, upon receiving a request for a data block of a file from client 1802, cloud controller 1800 uses the stored metadata for the distributed filesystem to determine that cloud controller 1804 is the owner of the cloud file containing the data block, and then sends a peer cache request to cloud controller 1804. More specifically, cloud controller 1800: (1) uses the stored metadata to determine the CVA for the data block; (2) determines that the data block is not currently locally cached in cloud controller 1800; (3) identifies cloud controller 1804 as the originating cloud controller for the data block based on the unique CCID in the CVA; and (4) sends a peer cache request for the data block to cloud controller 1804 (operation 2 in FIG. 18). Cloud controller 1804 is targeted for the peer cache request based on temporal and spatial locality; as the originator and a previous cacher of the data block, cloud controller 1804 is more likely to be currently caching the data block, and thus is a good candidate for the request. As described above, cloud controller 1800 can send the peer cache request to cloud controller 1804 (operation 2) in parallel with sending a request for the cloud file referred to by the CVA to cloud storage system 302 (operation 1 in FIG. 18).

In a second scenario for FIG. 18, the distributed filesystem also includes a backup cloud controller 1806, and cloud controller 1800 instead sends a peer cache request for the data block to backup cloud controller 1806 (operation 3 in FIG. 18). As described above, backup cloud controllers may be configured to store the most frequently accessed and/or recently created data in the distributed filesystem; in this role, backup cloud controllers are likely to be caching the most useful and most-frequently-requested data blocks in the system, and are therefore logical targets for peer cache requests. Furthermore, a backup cloud controller that is not currently associated with any active clients is likely to be lightly loaded, and hence able to handle and quickly respond to peer cache requests. As in the first scenario, the peer cache request to backup cloud controller 1806 (operation 3) may be issued in parallel with the request to the cloud storage system 302 (operation 1). Alternatively, operations 1 and 2 may both be performed in parallel to operation 3.

In a third scenario for FIG. 18, cloud controllers 1800 and 1804 may be co-located at a single geographic location and collaborate to split the working set of clients at that location. For instance, two or more cloud controllers may be in very close network proximity and configured to query each other using peer cache requests before sending requests for cloud files to a cloud storage system. In such a collaborative environment, a set of tightly bound cloud controllers may operate (and segment a cache space) more efficiently if they are configured to track what their peer cloud controllers are caching (e.g., constantly update one another with the specific set of data blocks that each is caching).

In some embodiments, cloud controllers may determine a target cloud controller for a peer cache request based on a range of criteria. The preceding exemplary scenarios determined targets for peer cache requests based on ownership, proximity, and/or a specific role (e.g., the role of the backup cloud controller), but the disclosed techniques are in no way limited by these examples, and peer cache requests may be routed or partitioned based on other factors. For instance, cloud controllers may periodically calculate and share both the network latency and bandwidth between cloud controllers as well as cloud controller load (e.g., how many clients are connected to a given cloud controller, and/or how many current requests are currently queued for disk I/O), and use such information when determining the appropriateness and targets for peer cache requests. For example, a requesting cloud controller may decide not to send a peer cache request if a target cloud controller's load is above a specified threshold, or only send high-priority requests in such instances.

In some embodiments, cloud controllers may be configured to operate in different modes during different times of the day. For instance, a cloud controller may be configured to cache data that is being actively accessed by a set of local clients during a particular time period (e.g., daytime working hours). However, when these clients are idle (e.g., during the night), this cloud controller may be configured to replace some or all of this cached data with data that is being accessed in a different time zone. More specifically, instead of being idle, this cloud controller can be configured to load a different set of data and serve this data to other active cloud controllers via peer cache requests. Such configurations may provide substantial improvements to the efficiency and average response time of the other cloud controllers. For example, depending on the situation, retrieving a small set of data blocks from a distant cloud controller may still be faster than downloading an entire cloud file from a closer cloud storage system. Such configurations may be specified and customized for individual cloud controllers using locality policies (as described in following sections).

Note that accessing other cloud controllers as peer caches does not involve having to maintain or check coherency for data blocks. The characteristics of the transactional filesystem ensure that each data block is unique and read-only (e.g., new data is written to new blocks and new cloud files). Thus, requesting cloud controllers only need to be concerned with retrieving needed data blocks as quickly as possible, and do not need to perform checks to determine whether another cloud controller and/or client have modified the contents of the requested data block. Note also that peer cache requests are typically constant-time requests that are sent directly to target cloud controllers, and not multi-hop queries.

Figure 19:
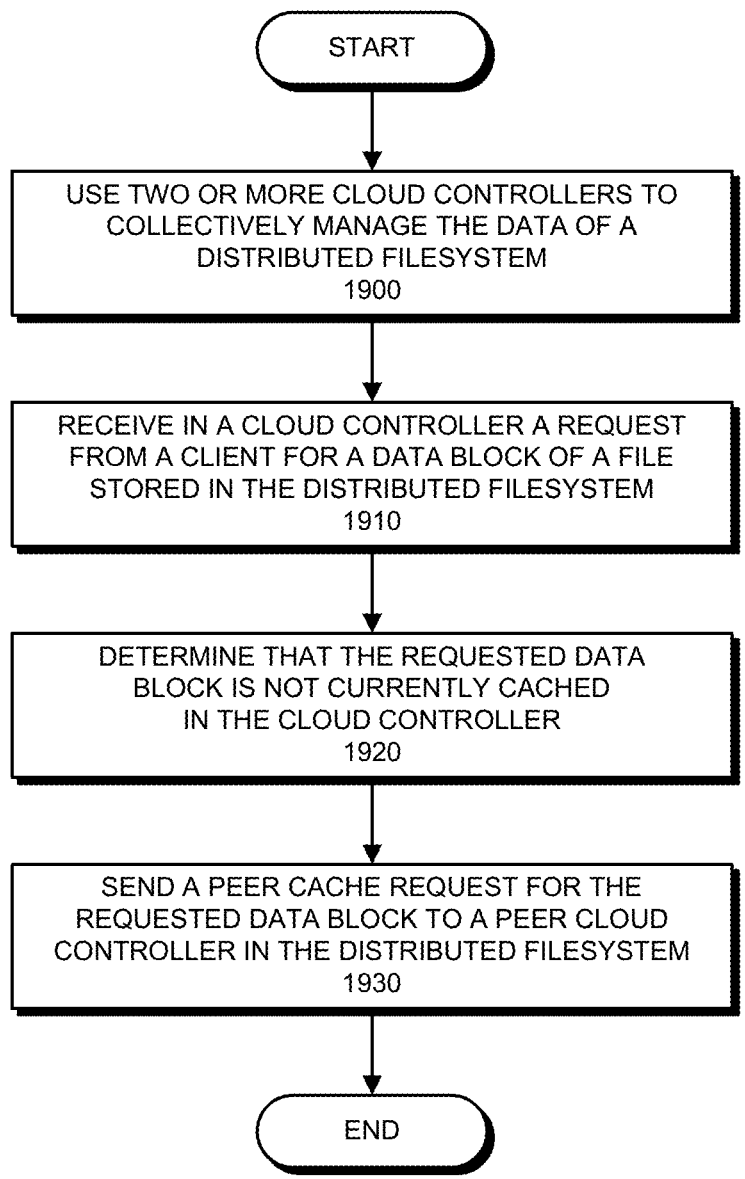
FIG. 19 presents a flow chart that illustrates the process of archiving data for a distributed filesystem in accordance with an embodiment.

FIG. 19 presents a flow chart that illustrates the process of accessing cached data from a peer cloud controller in a distributed filesystem. Two or more cloud controllers collectively manage the distributed filesystem data that is stored in one or more cloud storage systems (operation 1900); the cloud controllers cache and ensure data consistency for the stored data. Whenever each cloud controller receives new data from a client, it sends an incremental metadata snapshot for the new data to the other cloud controllers and an incremental data snapshot containing the new data to a cloud storage system. During operation, a cloud controller receives a request from a client for a data block of a file stored in the distributed filesystem (operation 1910). Upon determining that the requested data block is not currently cached in the cloud controller (operation 1920), the cloud controller sends a peer cache request for the requested data block to a peer cloud controller in the distributed filesystem (operation 1930).

Deduplication

A given data block may be stored multiple times in a filesystem; for instance, users may back up or otherwise keep multiple copies of the same file, or may send copies of a file to other users in their organization. Over time, file duplication can lead to an increasing number of duplicate data blocks and a substantial amount of wasted storage space. Data deduplication techniques involve calculating and tracking hash values for previously written data blocks, and comparing the hash values for newly written data blocks against these previous hash values to determine whether new data blocks have already been previously stored in a filesystem (and, if so, referencing the existing data block instead of writing a new, additional data block).

Figure 29A:
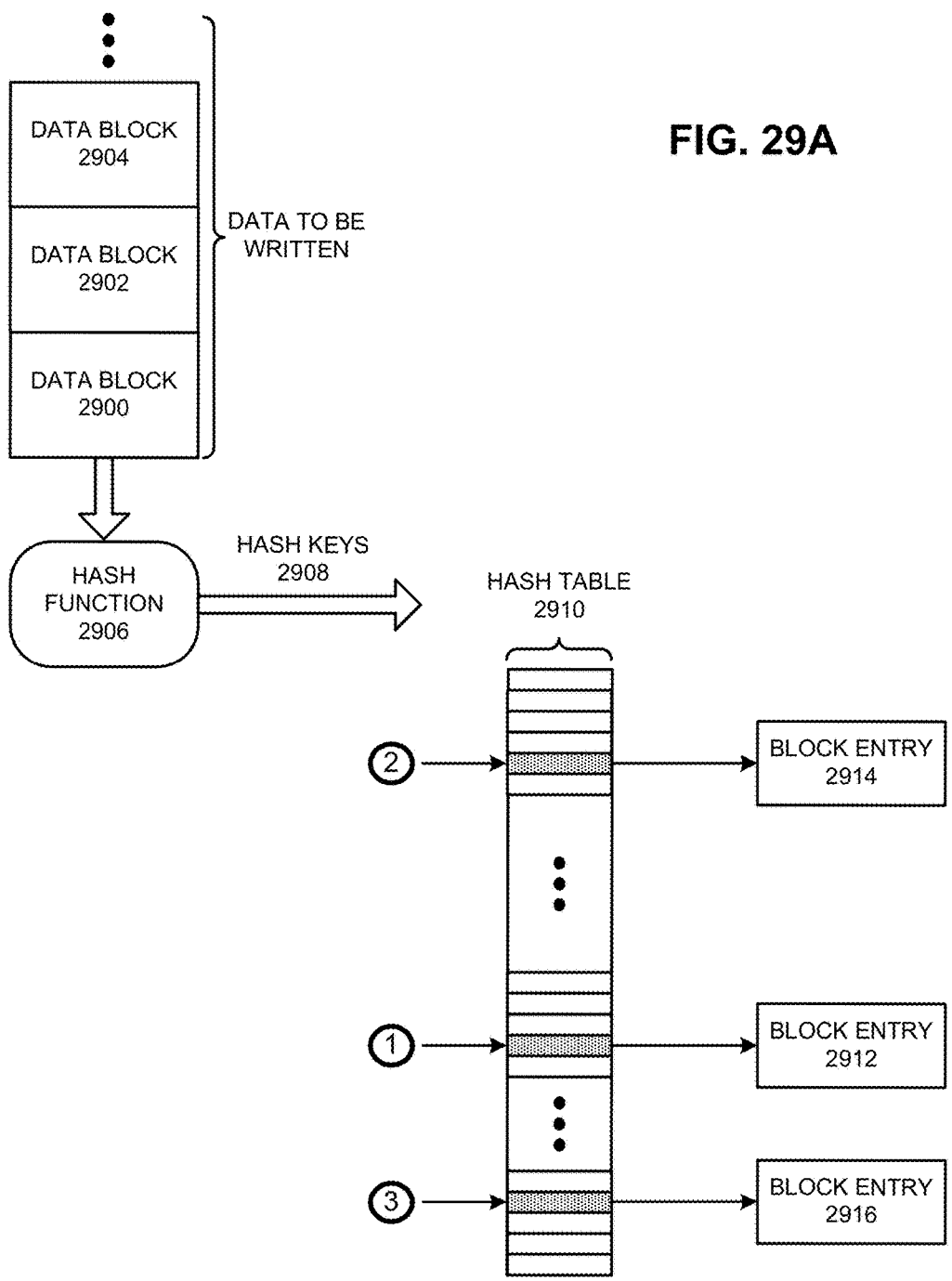
FIG. 29A illustrates the process of writing new data blocks in an exemplary deduplication architecture in accordance with an embodiment.

FIG. 29A illustrates the process of writing new data blocks in an exemplary deduplication architecture. During operation, a filesystem receives a set of data blocks to be written 2900-2904. A hash function 2906 is used to determine hash keys 2908 based on the contents of each data block that is being written; this hash function can use one or mechanisms to compute unique, random hash values for each data block. Note that the deduplication architecture is designed to ensure that the probability of duplicate hash keys for two data blocks that contain different data is very small (e.g., smaller than the probability of a disk error).

The hash keys 2908 generated by hash function 2906 are used as indices into a hash table of block entries 2910 (which is sometimes also referred to as a deduplication, or "dedup," table). Each block entry can include metadata identifying the storage location for the data block and a reference count for the data block (e.g., the number of times that the block is currently referenced in the filesystem metadata). During operation, a request to store a new block of data prompts the filesystem to calculate a hash key 2908 for the data block and then use this hash key 2908 as an index into hash table 2910 to determine whether the data block has already been written previously (e.g., determine whether a block entry already exists in hash table 2910 for that specific hash key). If no block entry exists for the hash key, the filesystem: (1) writes the data block to storage; (2) updates the filesystem metadata for the data block to point to the storage location; (3) creates a new block entry for the data block (that points to the storage location and stores an initial reference count of one for the newly written data block); and (4) updates hash table 2910 so that the index for the hash key points to the new block entry. Alternatively, if a block entry already exists for the hash key, the filesystem: (1) accesses the block entry to retrieve the storage location for the previously written data block; (2) updates the filesystem metadata for the current data block to point to the storage location (e.g., updating the metadata with additional references to an existing storage location instead of writing a duplicate data block to another storage location); and (3) increments the reference count in the block entry to reflect the additional reference to the previously written data block. For the example illustrated in FIG. 29A, copies of data blocks 2900-2904 have previously been written, and lookups of the hash keys 2908 for these data blocks in hash table 2910 (operations 1, 2, and 3, respectively, in FIG. 29A) are associated with block entries 2912-2916. Note that a file delete operation in a filesystem that supports deduplication techniques typically involves updating the reference counts for the file's data blocks in hash table 2910 (and only actually deleting each given data block and its associated block entry when its reference count reaches zero). Note also that deduplication techniques may be used across data blocks of different fixed and/or variable sizes; in some instances, for instance, a hash function may be configured such that two different-sized blocks that contain the same actual data (e.g., with one larger block being partially empty) resolve to the same hash value.

In general, deduplication techniques increase the effective write performance of a storage device by reducing the total number of writes that need to be made to the storage device. More specifically, the ability to detect and prevent duplicate data from being written effectively increases write throughput while also reducing the amount of storage space that is actually needed. However, deduplication techniques do typically involve some additional overhead. For instance, if the number of data blocks is large, memory constraints may lead to deduplication structures being stored lower in the memory hierarchy (e.g., on a hard drive). In such situations, the architecture illustrated in FIG. 29A may involve additional disk reads to access the hash table 2910 and block entries 2912-2916. For example, because hash values are based on the contents of data blocks, and not storage locations, a set of data blocks 2900-2904 from a single file that are being written contiguously to a storage device may have very different hash values, and hence be widely spaced across different locations in hash table 2910. As a result, a subsequent duplicate write of these same data blocks may involve three distinct hash table lookups (e.g., reading three different disk blocks from potentially different regions of the storage device, with all of the associated seek, rotational, and read latencies), with each of these lookups requiring a further distinct lookup of a corresponding block entry (e.g., reading three additional disk blocks, again from potentially different regions of the storage device). Thus, deduplication operations can sometimes involve substantial lookup delays and overhead.

In some embodiments, deduplication techniques can be extended to encode time information in deduplication structures. For instance, the data structures used to store block entries can be re-architected so that the information for data blocks is temporally grouped in a manner that reduces the number of disk reads needed during subsequent deduplication operations.

Figure 29B:
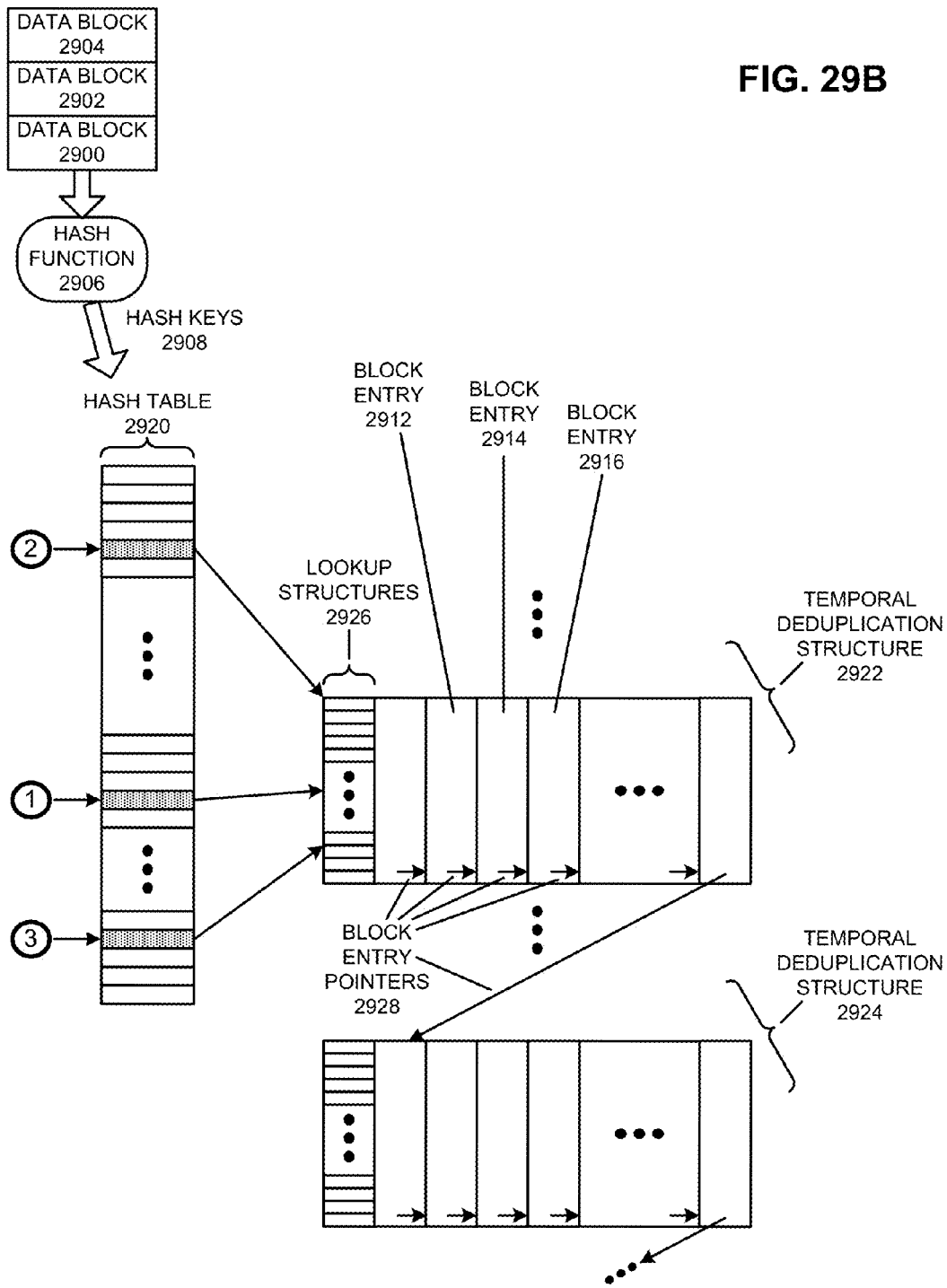
FIG. 29B illustrates an exemplary temporal deduplication architecture in accordance with an embodiment.

FIG. 29B illustrates an exemplary temporal deduplication architecture that receives write requests for the same three data blocks 2900-2904 illustrated in FIG. 29A. As described previously, hash function 2906 is used to generate hash keys 2908. However, unlike in FIG. 29A, occupied indices of hash table 2920 now point to a temporal deduplication structure 2922 that stores temporally related block entries in proximity with each other. For instance, consider an initial write operation for data blocks 2900-2904. Upon determining that no entry exists in hash table 2920 for the hash key for data block 2900, the filesystem: (1) writes data block 2900 to storage; (2) updates the filesystem metadata for data block 2900 to point to the new storage location; (3) determines a current temporal deduplication structure (TDS) 2922 that is currently being populated; (4) creates a new block entry 2912 for data block 2900 in TDS 2922; (5) updates a set of lookup structures 2926 in TDS 2922 to reflect the addition of block entry 2912; and then (6) updates hash table 2920 so that the index for the hash key points to TDS 2922. The subsequent write requests for data blocks 2902 and 2904 proceed substantially similarly, with the filesystem: (1) writing data blocks 2902-2904 to storage; (2) updating the filesystem metadata accordingly; (3) adding block entries 2914 and 2916 for data blocks 2902 and 2904 in the locations subsequent to block entry 2912 in TDS 2922; (4) updating lookup structures 2926 in TDS 2922 to reflect the addition of block entries 2914-2916; and (5) updating hash table 2920 so that the indices for the hash keys for data blocks 2902 and 2904 also point to TDS 2922.

While creating and populating TDS 2922 involves some additional overhead, subsequent duplicate writes benefit from lower overhead. For example, consider a subsequent set of duplicate writes for the same three data blocks 2900-2904. Upon determining that an entry exists in hash table 2920 for the hash key for data block 2900, the filesystem receives a reference to TDS 2922. The filesystem can then: (1) use lookup structures 2926 to find and access block entry 2912 to retrieve the storage location for the previously written data block; (2) update the filesystem metadata for the current data block to point to the storage location; and (3) increment the reference count in block entry 2912. However, for the second and third blocks, the hash key lookups in hash table 2920 both return references to the same TDS, TDS 2922, which was already read from disk and loaded into memory during the preceding lookup for the first data block. Thus, while the duplicate write of the first data block (2900) still involves two disk reads (to access hash table 2920 and TDS 2922), the (duplicate) writes for the second and third data blocks (2902-2904) only involve at most one further disk read each (to access hash table 2920), thereby reducing the total number of disk reads needed and substantially improving deduplication performance. Consider the duplicate write of a file with 100 data blocks in a scenario in which each TDS is the size of a disk block and holds 100 block entries. In this scenario, a deduplication operation in the deduplication architecture of FIG. 29A would involve 200 disk reads. In contrast, the deduplication architecture of FIG. 29B would only involve at most 101 disk reads (e.g., 100 accesses of hash table 2920 for the 100 hash keys, and one read of the TDS storing the block entries for the 100 data blocks), effectively almost halving the maximum number of disk reads required and potentially dramatically improving deduplication performance.

In some embodiments, temporal deduplication structures can be optimized to reduce the number of disk reads even further. For instance, the block entries of TDS 2922 can be enhanced so that each block entry includes the hash value for its associated data block and a "next pointer" that points to the block entry following it in TDS 2922 (e.g., block entry pointers 2928 in FIG. 29B). Similarly, the last block entry in TDS 2922 can be configured to point to the first block entry in a subsequent TDS (e.g., TDS 2924). These block entry pointers 2928 allow block entries to be traversed temporally during deduplication operations. For example, during a duplicate write of data blocks 2900-2904, the attempt to write data block 2900 would still result in the hash table 2920 lookup and the access of TDS 2922. However, the subsequent writes for data blocks 2902-2904 might no longer involve lookups in hash table 2920, but could instead involve: (1) traversing block entry pointers from block entry 2912 to the next two block entries; (2) determining whether the hash values stored in these block entries match the hash keys for data blocks 2902 and 2904; and (3) if so, using these block entries, thereby avoiding the additional disk reads required by additional lookups into hash table 2920 in situations where the block entries for contiguously written data blocks have also been written contiguously into a TDS. Using block entry pointers to link each TDS to a subsequent TDS further facilitates efficiently traversing large numbers of related block entries; for instance, a filesystem may track the use of these pointers and then preemptively pre-fetch the next TDS when approaching the end of a current TDS. In such embodiments, the previous exemplary scenario of a duplicate write of a file with 100 data blocks might involve only two or three disk reads, e.g., one access of hash table 2920 for the first hash key, and one read for each TDS storing the needed block entries (which are then accessed sequentially via the TDS using the block entry pointers).

In some embodiments, multiple sets of block entry pointers may be used to form a doubly-linked list of block entries within and between TDSs. Maintaining doubly-linked lists sometimes involves higher overhead, but can also provide performance benefits, for instance in the face of unusual write patterns (e.g., when a client for some reason performs a duplicate write for a set of blocks in the reverse order that the blocks were initially written and ordered in a TDS). Alternative embodiments may also involve loading the contents of TDSs into a memory cache of block entries, thereby speeding up accesses and efficiently supporting atypical access patterns.

Note that the concept of temporal deduplication applies not only to individual files, but also to groups of files. Many automated computing tasks are defined processes (e.g., automated scripts) that execute in a very regular, predictable manner. For instance, applications are typically written to execute in the same way across multiple iterations, e.g., compilation jobs typically create files and data in the same order, and directory copy or backup commands will typically traverse a directory hierarchy that is being operated upon in the same order for every invocation. The above-described temporal deduplication techniques leverage the notion that things written with temporal locality are likely to be re-written again in the same temporal order; the disclosed temporal deduplication structures can be used to efficiently detect and handle long, contiguous sets of duplicate data blocks that are being written by an automated process.

In some embodiments, temporal deduplication structures can also be optimized to accommodate the subsequent addition of data blocks to a previously created file. For instance, a filesystem may be configured to reserve some block entries in each TDS that can then be used at a later time (e.g., to add a few additional data blocks to a file, and have the block entries associated with those new data blocks show up in the same TDS as the rest of the block entries for the file), in contrast with a purely temporal approach that would add the block entries for subsequent data blocks being appended to a previously written file to another, separate TDS that is currently being populated (and, hence, potentially splitting the block entries for the appended file across multiple non-contiguous TDSs, and requiring more TDSs to be read in subsequent deduplication operations that involve the entire appended file). Note, however, that such additional capabilities may interfere with some of the advantages of the above-described temporal deduplication structures; for instance, all of the block entries for a given file may still be in the same TDS (e.g., after an additional block entry has been added to the TDS), but an efficient stream of contiguous temporal block entry lookups may have been disrupted as a result. Hence, the decision of whether to reserve some block entries in a TDS for subsequent additions may be limited to certain situations (e.g., files and/or filesystem regions that are more likely to be accessed in isolation) and/or be selectively specified using a locality policy.

Global Deduplication for a Distributed Filesystem

Deduplication techniques can be applied across a range of scopes. For instance, the above-described deduplication techniques can be performed on (individual) single- or multi-user workstations and/or servers to conserve storage space and increase user-perceived write performance. However, deduplication techniques can be even more effective and beneficial when leveraged across a distributed filesystem that encompasses a large number of users and data files. More specifically, the types of regular operations that typically cause file duplication (e.g., duplicate compilation jobs, recurring backup jobs, the sharing of files between users, etc.) quite often increase as the size of the filesystem and user base grow, leading to substantial storage space and bandwidth savings for a distributed filesystem.

In some embodiments, cloud controllers use data deduplication techniques to reduce the amount of duplicate data that is stored in a distributed filesystem. For instance, supporting deduplication techniques across the distributed filesystem may involve leveraging incremental metadata snapshots to update deduplication information in the cloud controllers that manage the data in the distributed filesystem. Each cloud controller then monitors the writes made by its clients and performs deduplication operations to avoid storing duplicate copies of data blocks in the cloud storage system. Note that the disclosed deduplication techniques are distributed across the cloud controllers; attempts to perform centralized deduplication operations for a large distributed filesystem on a single server typically limit the scalability and performance of deduplication operations.

Figure 29C:
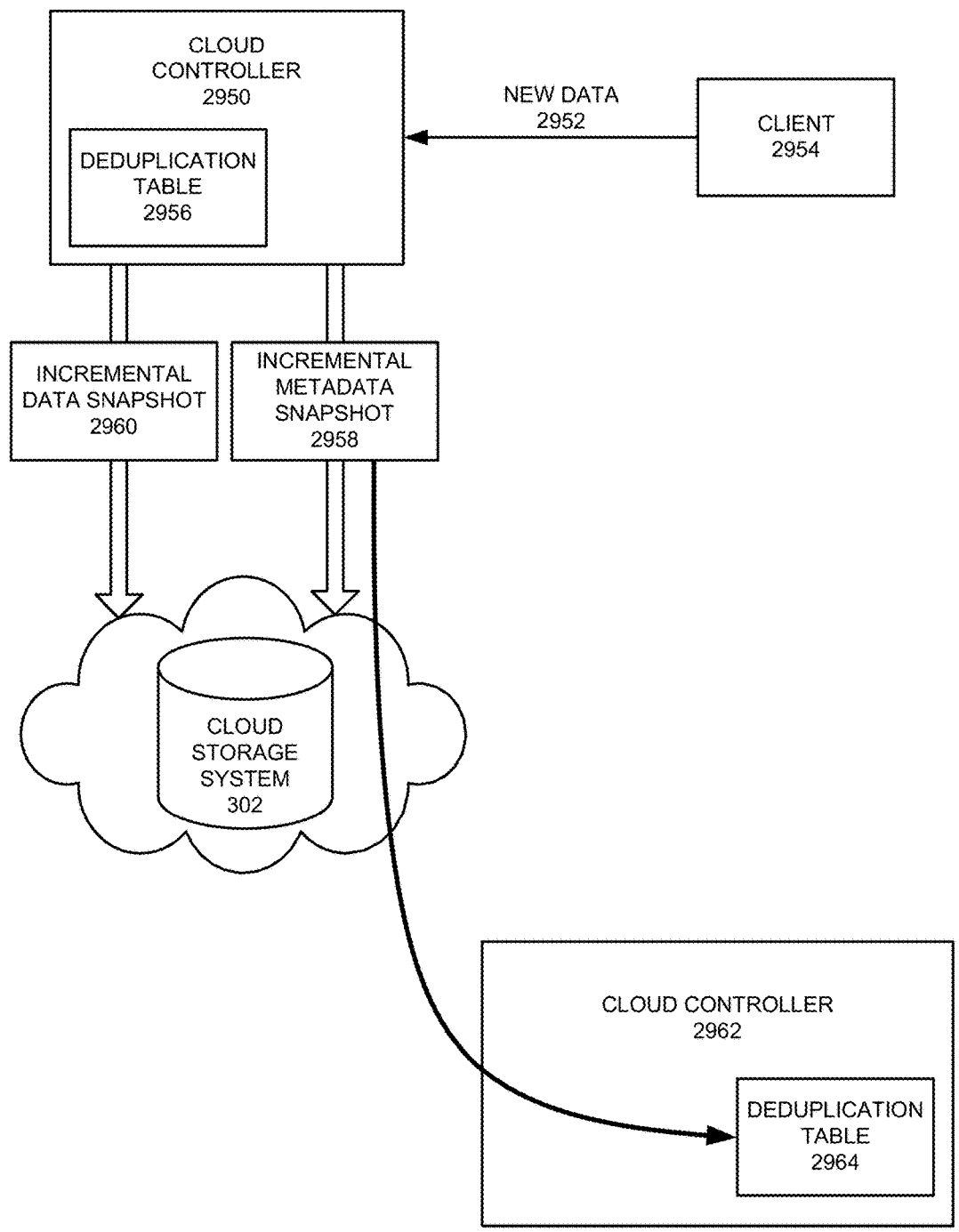
FIG. 29C illustrates the process of using incremental metadata snapshots to update deduplication information in accordance with an embodiment.

FIG. 29C illustrates the process of using incremental metadata snapshots to update deduplication information. During operation, a cloud controller 2950 receives new data 2952 (e.g., a new file containing one or more data blocks) from a client 2954. Cloud controller 2950 uses a local deduplication table 2956 to determine whether these received data block(s) have already been written previously. If so, cloud controller 2950: (1) creates new metadata for new data blocks 2952 that references the previously created data block(s); (2) updates the reference counts in deduplication table 2956 appropriately; and (3) distributes an incremental metadata snapshot 2958 that reflects the additional references and the existence of the new file. If not, cloud controller 2950: (1) allocates new CVA addresses for the new data block(s); (2) writes an incremental data snapshot 2960 containing the new data block(s) to cloud storage system 302; (3) creates one or more new block entries for the new data block(s) in a TDS in deduplication table 2956 and updates the deduplication hash table accordingly; (4) creates new metadata for the distributed filesystem that references (the CVA addresses and offsets for) the new data block(s); and (5) distributes an incremental metadata snapshot 2958 that reflects these metadata updates to the other cloud controllers of the distributed filesystem. Note that both types of operations may occur simultaneously; for instance, some of the new data 2952 received from a client may have been previously written already, while other parts may be completely new. For example, a client may take an existing file and append new material; in this case, a first set of data blocks for the file may be identified as duplicate data (and result in incremented reference counts), while a second set of data blocks for the file may be identified as new data, and handled accordingly. As a result, incremental metadata snapshot 2958 may include metadata changes that encompass both additional references to existing data as well as new data being written in incremental data snapshot 2960.

Other cloud controllers can make use of the metadata updates propagated via incremental metadata snapshots to update their own local deduplication tables. For instance, metadata updates may specify a set of data blocks that are being referenced, created, and/or deleted, and include the hash values and locations (e.g., CVA address and offset) for each new or newly referenced data block. Hence, in the context of FIG. 29C, a second cloud controller 2962 receiving incremental metadata snapshot 2958 will: (1) update its local metadata hierarchy to reflect the updates to the distributed filesystem that were made by cloud controller 2950; and (2) update its own local deduplication table 2964 to reflect any new data blocks and/or reference changes described in incremental metadata snapshot 2958. At this point, duplicate writes of new data 2952 that are received by cloud controller 2962 can be detected using deduplication table 2964. Note that incremental metadata snapshots can also propagate information related to deletion requests, which can lead to the decrement of reference counts in deduplication tables and the eventual deletion of data blocks; file deletion operations are described in more detail in a subsequent section.

Figure 30:
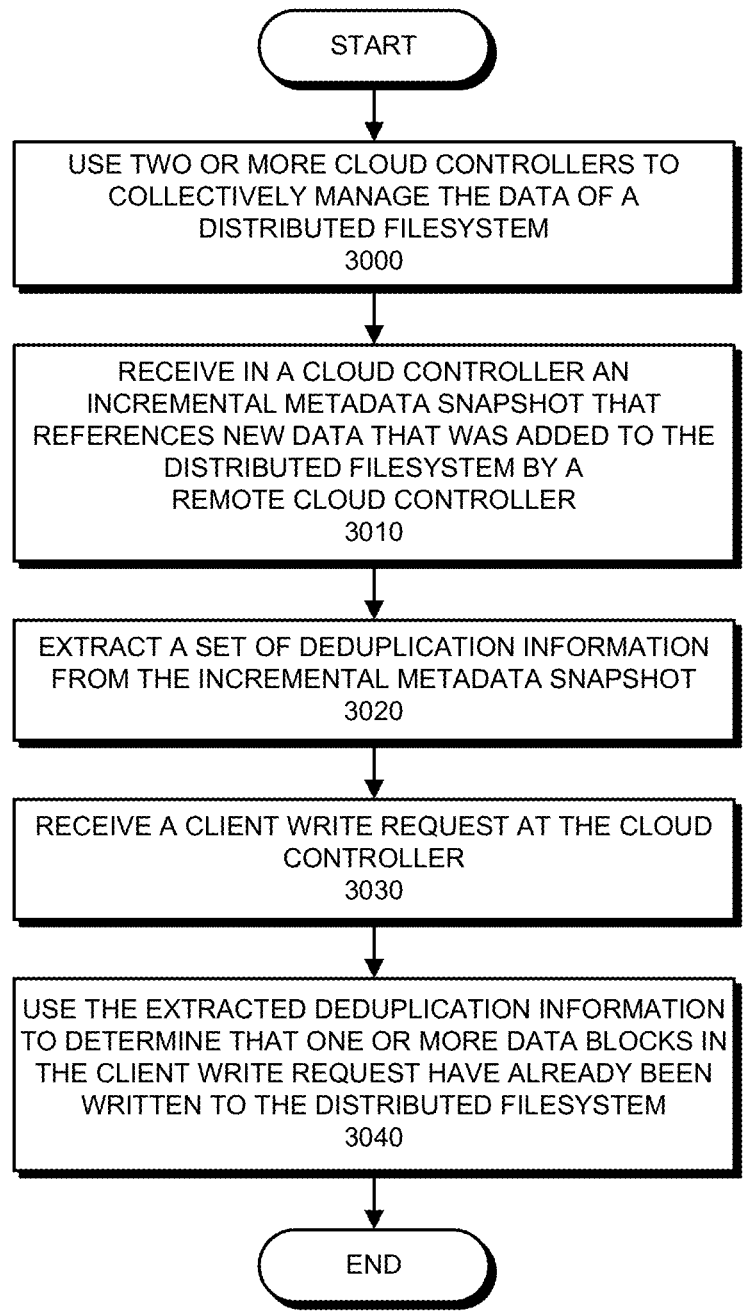
FIG. 30 presents a flow chart that illustrates the process of performing deduplication in a distributed filesystem in accordance with an embodiment.

FIG. 30 presents a flow chart that illustrates the process of performing deduplication in a distributed filesystem. Two or more cloud controllers collectively manage distributed filesystem data that is stored in one or more cloud storage systems (operation 3000); the cloud controllers cache and ensure data consistency for the stored data. During operation, a cloud controller receives an incremental metadata snapshot that references new data that was added to the distributed filesystem by a remote cloud controller (operation 3010). The cloud controller extracts a set of deduplication information from this incremental metadata snapshot (operation 3020). Upon receiving a client write request (operation 3030), the cloud controller uses the extracted deduplication information to determine that one or more data blocks in the client write request have already been written to the distributed filesystem (operation 3040).

The regular exchange of incremental metadata snapshots between the cloud controllers of the distributed filesystem ensures that deduplication information is shared and that each cloud controller's local deduplication table remains up to date, thereby allowing duplicate writes to be detected and avoided. Note that temporal deduplication information can also be shared between the cloud controllers. Consider, for example, a cloud controller that receives from a client a write request for a file with ten data blocks that have not previously been written to the distributed filesystem. The cloud controller: (1) takes hash values for these ten data blocks, and determines that the blocks are new; (2) allocates new CVAs and offsets for the new data blocks; (3) updates a TDS in its local deduplication table, creating temporally related block entries for the new data blocks; (4) updates the local metadata hierarchy appropriately; and (5) sends out incremental data and metadata snapshots. Other cloud controllers receiving the incremental metadata snapshot detect the creation of the ten new blocks, and write the information for these ten blocks into their own deduplication tables in a temporal manner (e.g., updating TDSs in their local deduplication tables in a manner that creates temporally related block entries for the new data blocks). Hence, if a client of one of these other cloud controllers attempts to write the same file, the deduplication operation in that cloud controller benefits from the same temporal lookup aspects described previously (e.g., a reduced number of disk reads in the deduplication operation due to the temporal similarities).

Note, however, that some challenges can arise for temporal deduplication techniques in a distributed filesystem environment. For instance, consider a cloud controller that is receiving incremental metadata snapshots (from another cloud controller) while simultaneously locally writing a set of new data blocks in response to a client request. Unfortunately, such scenarios can lead to situations in which sets of block entries from the remote deduplication information and from local writes (e.g., two sets of unrelated write operations) are written into the same TDS in an interleaved manner. As described above, temporal deduplication techniques benefit from grouping block entries for temporally related data blocks together in TDSs; however, while these two sets of writes occur in the same approximate temporal timeframe, they originate on different cloud controllers, and are most likely not related. In general, interleaving two unrelated sets of block entries in a TDS typically reduces the temporal nature and efficiency of the deduplication table.

Another problem may arise when block references are not sent between cloud controllers in the order in which they were written. For instance, incremental metadata snapshots may send block references between cloud controllers in a "filesystem:file:block" format, instead of the order in which the blocks were actually written (and the order in which their respective block entries were written to a TDS in the originating cloud controller). Such reordering of write information can affect the ordering of a temporal deduplication table; for example, a second cloud controller may end up with a significantly different block entry order in its local deduplication table. Consider a client subsequently writing the same file to this second cloud controller—the deduplication operation will still determine that all of the data blocks for the file have been previously written in the distributed filesystem, but the deduplication operation may be highly inefficient. Because of the difference in the write order of the block entries, the cloud controller may not be able to take benefit from temporal locality in the deduplication table, and instead may have to perform individual hash lookups for each data block in the file. For example, in the worst case, the original write order for the initial file may have been "data block 1, 2, 3, 4, . . . , N-2, N-1, N," but the temporal deduplication table may have been populated in reverse order (e.g., "data block N, N-1, N-2, . . . , 2, 1") or some other non-temporal order, in which case a subsequent write of the same file received by the second cloud controller might result in a backwards walk through and/or random accesses into the temporal deduplication table, which are typically less efficient. Note, however, that the worst-case behavior for temporal deduplication is still no worse than non-temporal deduplication techniques (e.g., the deduplication techniques described in FIG. 29A); thus, as long as temporal deduplication is beneficial in at least some scenarios, it is generally likely to improve performance.

In some embodiments, cloud controllers reorder write information to improve the temporal locality of block entries for writes performed both locally and on remote cloud controllers. For instance, write information can be sorted based on one or more secondary qualifiers (e.g., the data's source cloud controller, the data's source filesystem, a snapshot identifier, a file ID, and/or a block offset) to separate write information received directly from local clients and from remote clients (via other cloud controllers' incremental metadata updates) back into individual segments that are "temporally accurate" and facilitate efficient temporal deduplication. For example, one specific scenario may involve sorting write operations by CVA and offset; cloud controllers may use the CCID in CVAs to differentiate which cloud controller is the source for each given write, and may then use other portions of the CVA (e.g., the FSID, SSID, FileID and/or offset) to determine the exact order in which data blocks were written on each cloud controller and/or block entries should be written into a TDS. Each cloud controller can then use such determinations to ensure that any desired aspects of the original write order (e.g., in the originating cloud controller) are maintained for corresponding block entries in each local deduplication table, thereby avoiding interference between remote and local writes and ensuring improved temporal deduplication performance for local writes.

As mentioned above, a range of sorting (or any other form of reordering) techniques may be used to ensure high temporal locality on both local and remote filesystems and to facilitate efficient global deduplication efforts across all of the cloud controllers of the distributed filesystem. In some embodiments, one or more parameters for a secondary sort operation may be specified using a locality policy. For instance, a locality policy may be used to tune temporal deduplication behavior on a given cloud controller to match the specific needs of the cloud controller's expected clients and client load. For example, a cloud controller expected to receive a large amount of new client data may be configured to use a specific sort order. Consider as a specific example a cloud controller that is configured to gather data from multiple other cloud controllers and then perform backups of the full data set. In such a scenario, if the host cloud controller is configured to traverse and write this backup data on a per-cloud-controller basis, a sensible approach might be to ensure that the block entries in the temporal deduplication table are also grouped together similarly; a locality policy can be used to ensure that this is indeed the case.

In some embodiments, a locality policy may also be used to specify that the block entries for one or more files should be written in a different order than the data blocks for the files. Files are quite frequently accessed (e.g., copied, or re-written) in the same manner that they were initially written, but in some instances it may be known that a certain set (or type) of files will have a specific unusual future re-write pattern; in such scenarios, ordering the block entries for these files to anticipate these future write patterns may improve the performance of subsequent deduplication operations for those files.

In some embodiments, a cloud controller may be configured to maintain multiple simultaneous sets of TDSs that are all referenced by the same top-level hash table. For instance, a cloud controller may maintain one set of TDSs that store block entries for locally written data, while a second set of TDSs store block entries for remote data written by other cloud controllers. The appropriate TDS is determined based on the initial hash value for a given deduplication operation. Separating the stream of local and remote writes completely ensures that block entries for local and remote writes are never interleaved. Note that the block entries for remote writes are automatically grouped at the snapshot level already (e.g., if incremental metadata snapshots from different cloud controllers are processed serially), and thus are less likely to become interleaved.

The above sections describe how temporal deduplication techniques can be managed and synchronized across cloud controllers in a manner that facilitates maintaining temporal accuracy and locality, thereby providing a range of benefits for a distributed filesystem. These benefits can be broken down into benefits of deduplication "at rest" (e.g., specific storage space savings gained from reducing duplicate stores) as well as benefits of deduplication "in transit" (e.g., specific network bandwidth savings gained from avoiding network transfers of duplicate data). However, as also mentioned above, deduplication techniques also involve a certain level of overhead (e.g., extra reads and writes for the deduplication tables as well as additional complexity and compute overhead). The actual value of deduplication efforts in a distributed filesystem depends on the amount of duplicate data being written (e.g., the "dedup ratio," or ratio between the average number of references per stored data block). For instance, a 10:1 at-rest dedup ratio indicates that there are on average ten references for each actual stored data block, e.g., deduplication efforts have on average saved nine additional copies of each data block from being written. A 10:1 in-transit dedup ratio indicates that on average ten metadata references are sent for every copy of a data block that is actually transferred between a cloud controller and a cloud storage system; because metadata is much smaller than actual data, deduplication efforts can save substantial network bandwidth.

Performing temporal deduplication for a distributed filesystem can provide substantial at-rest and in-transit benefits. While certain minimum dedup ratios are needed to break even (e.g., justify the additional deduplication overheads), a system that profits from both at-rest and in-transit benefits begins to reap those benefits at lower dedup ratios than systems that only provide one or the other of the two benefits. Deduplication benefits also tend to scale with the number of users and amount of data in the system; distributed filesystems tend to be large and encompass a larger number of users, and hence tend to have higher natural levels of duplication that in turn result in higher dedup ratios. Hence, tuning deduplication efforts to optimize a distributed filesystem can result in definite performance improvements and reduced system costs. For example, effectively reducing network load can have direct economic benefits, because upgrading network links often involves considerable delay and cost, and may not even be feasible in some situations.

Locality Policies

In some embodiments, a set of locality policies specify how data in the distributed filesystem should be managed. Such locality policies may define and/or control how data is managed at different levels of scope. For instance, locality policies may be defined at a global level (e.g., for the entire distributed filesystem) as well as at a range of finer granularities (e.g., on a per-cloud-controller, per-filesystem, per-user, per-file-type, or per-directory basis). The ability to define arbitrary locality policies that span a range of granularities allows the behavior of the distributed filesystem to be customized to meet the needs of an organization, specific users, and/or specific applications or data sets.

In some embodiments, a locality policy can specify that one or more files should be "pinned" in the cache(s) of one or more cloud controllers. For instance, a locality policy may specify that a specific set of files that are being actively collaborated on by users throughout an organization should be pinned into the cache of every cloud controller. For example, this configuration may be achieved by specifying a locality policy that identifies one or more directories whose contents (and sub-contents) should be pinned in all cloud controllers; users can explicitly ensure that a file will be immediately distributed to and actively cached in all of the cloud controllers by storing it in such directories. In another similar example, the home directory of an important user (e.g., a chief executive officer) who frequently travels throughout an organization may be pinned so that that person can access their data with the fastest possible access times no matter where they are currently located. Alternatively, a project directory for a single site in an organization may be pinned in only the cloud controller for that site, to ensure that the data is quickly available locally (e.g., even if there is a network failure/partition between the cloud controller and the cloud storage system storing the cloud file containing that data). In another example of per-cloud-controller pinning, a locality policy may specify that certain blocks that are frequently read by specific applications (e.g., internet browsers or local file browsers) be pinned for users accessing the cloud controller to ensure that common, frequently used user applications execute as quickly as possible. Note that in such situations part of the cache is fixed (e.g., may not follow normal cache replacement policies), while the remaining portions of the cache may be managed using traditional cache policies (e.g., "best effort" cache replacement policies).

In some embodiments, a locality policy can specify storage behavior for different classes and/or types of files. For instance, a locality policy may specify that certain files should be written together (e.g., putting a project file and all of its supporting files in the same cloud file), or that certain file types should not be written into the same cloud file. For example, image and video files typically consume a substantial amount of space, and are often only viewed for a brief initial time window. Hence, a locality policy may specify that image and video files (e.g., files with ".jpg" and ".avi" extensions) should be considered low-priority (e.g., in comparison with other project file types), and should immediately be stored in a second-level (e.g., cheaper) cloud storage system instead of in a costlier high-speed, highly replicated cloud storage system that is used for high-priority files. Conversely, other file types may be identified as being high-priority, and as a result be pinned in cloud controllers and/or stored (and kept) in the first-level cloud storage system even if they are infrequently accessed. Note that while an initial user accessing low-priority files may experience a slightly higher latency as the files are loaded from the second-level cloud storage system, subsequent users accessing these files fairly soon thereafter from the same location (e.g., before they are flushed out of the cloud controller's cache) will be able to access the files quickly from the cache of the cloud controller. Note also that filling drive files with files of the same type can facilitate performing uniform operations on certain classes of files at a later time (e.g., archiving all of the image files in a portion of the filesystem hierarchy) without having to split cloud files or duplicate portions of cloud files.

In some embodiments, a locality policy may include time-based specifications and/or time-outs. For instance, a certain project directory may be specified to only be pinned for the lifetime of a project, or a training video may be pinned for an initial period (e.g., 15 days), and then subject to normal cache replacement policies. For example, an alternative locality policy for image files may specify that image files should be kept in a first-level cloud storage system for 30 days (or 30 days after the last access), and then moved to a second-level cloud storage system.

In some embodiments, locality policies can specify the synchronization and management of metadata and data. For example:

- a locality policy for a specific cloud controller may be configured such that the cloud controller, upon receiving an incremental metadata snapshot, "warms its cache" (e.g., preemptively downloads some of the data referenced in the incremental metadata snapshot from a cloud storage system); for instance, the cloud controller may be configured to preemptively download and cache any files created by a certain user or related to a certain project.
- a locality policy may be configured to manage how data is packaged into cloud files; for instance, a locality policy may ensure that files of a similar type (e.g., image files) or other criteria are packed into the same cloud file, so that the set of associated files can later be managed uniformly (e.g., all image files can be easily sent to a cloud storage system that is specified for image files, or a group of backup files are grouped into a common set of cloud files using a locality policy so that they can be archived or deleted as a unit with minimal effort at a later time).
- a locality policy can specify a mapping of data to cloud storage providers and/or cloud storage systems; for instance, a locality policy may specify a preferred cloud storage provider (e.g., based on performance or cost), when data should be migrated between cloud storage systems, that backup data should immediately be sent to an archival cloud storage system, and/or that certain cloud storage providers should not store portions of the distributed filesystem (e.g., for geopolitical reasons).
- a locality policy may specify whether a cloud controller should send peer cache requests, and if so, may specify one or more peer cloud controllers that should be targeted by peer cache requests; for instance, the locality policy may specify a priority list for target peer cloud controllers, and/or may identify specific target peer cloud controllers based on a type of file, owner, project, etc.
- a locality policy may specify when global deduplication techniques should be used; for instance, the locality policy may specify that deduplication should be disabled when a cloud controller is writing encrypted files (which frequently do not benefit from deduplication efforts but would still consume entries in the deduplication tables, thereby negatively impacting overall deduplication performance).
- a locality policy may specify the aggressiveness of pre-fetching decisions (e.g., aggressively attempt to reduce user latency at a cost of additional network pre-fetch transfers vs. reducing the aggressiveness of pre-fetching to save network bandwidth at the expense of higher user latency).
- a locality policy may indicate files and/or portions of the distributed filesystem hierarchy that should not be uploaded to a cloud storage system (e.g., files that are known to be temporary and short-lived, or files that users have explicitly specified to not be shared).
- a locality policy may allow a cloud file's block size to be set on a per-file basis. For instance, database dumps typically use 8 KB block sizes, and hence a locality policy may specify that all files of that file type should be 8 KB in size to improve the deduplication hit rate; because database dumps often have a high level of redundancy, such a policy may substantially improve the deduplication hit rate for that set of blocks.
- a locality policy may specify the target location for data and/or metadata on a set of storage drives; for instance, the locality policy may specify that a set of data that is expected to be accessed very frequently should be cached near the outer edge of a disk platter (e.g., to improve performance).
- a locality policy may specify a set of parameters that affect delete operations and delays for the distributed filesystem.
- a locality policy may specify that some or all accesses (e.g., create, rename, read, write, and/or stat) for one or more files should be tracked and/or timed; such access data can be used to audit file usage, to determine the proportion of cache hits in the cloud controller (in contrast with accesses that require cloud files to be downloaded to the cloud controller), and to help tune the performance of the cloud controller and/or distributed filesystem.
- a locality policy may be used to specify defragmentation parameters (e.g., time intervals, file types and access patterns to monitor and track, etc.) for file data blocks cached in the local storage of a cloud controller.

Figure 25:
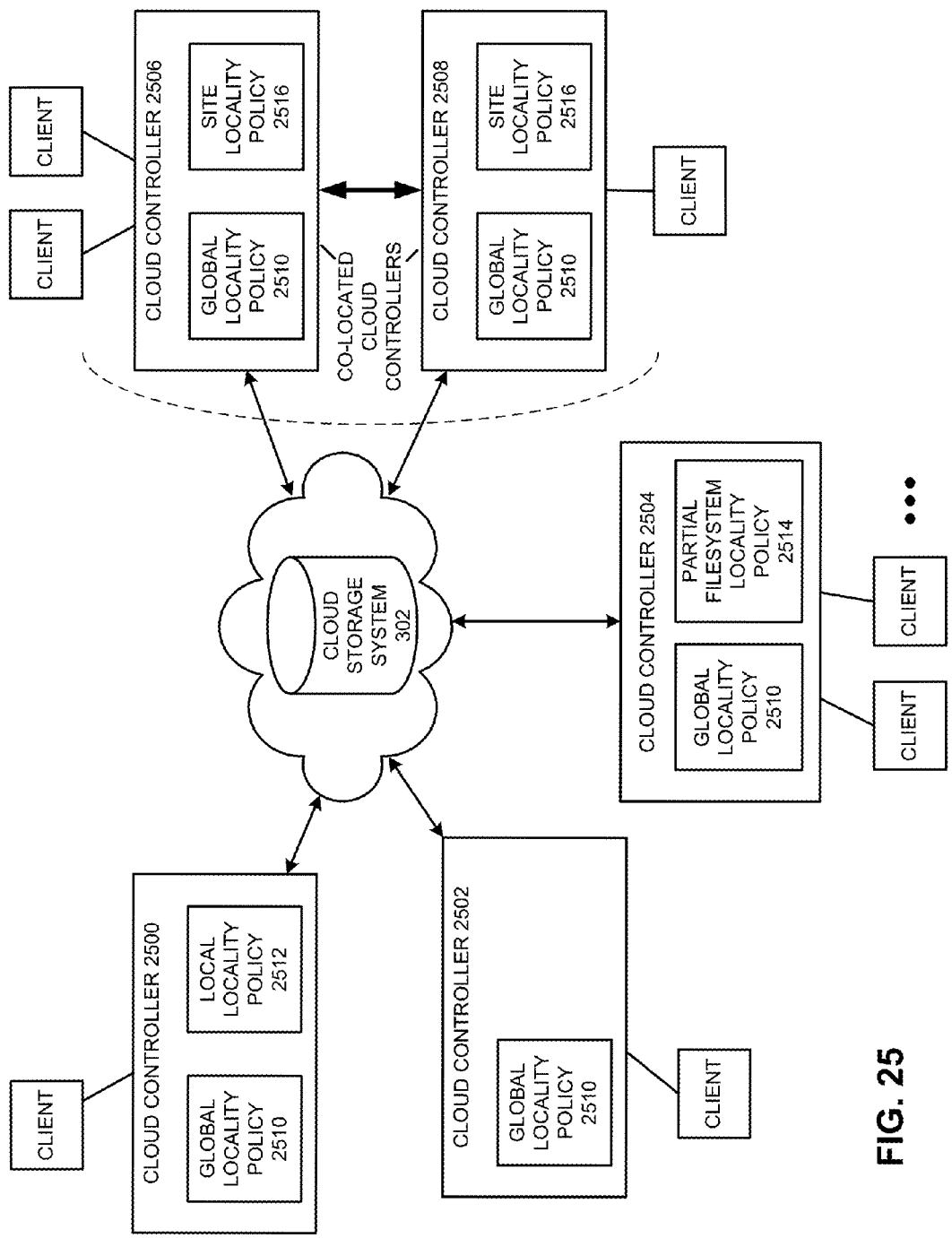
FIG. 25 illustrates an exemplary distributed filesystem environment in which the characteristics of the distributed filesystem are guided and/or adjusted by a set of locality policies in accordance with an embodiment.

FIG. 25 illustrates an exemplary distributed filesystem environment in which the characteristics of a distributed filesystem are guided and/or adjusted by a set of locality policies 2510-2516 that influence the operation of cloud controllers 2500-2508. For instance, a global locality policy 2510 may specify that a set of data that is frequently accessed through an organization should be pinned into the cache of all of cloud controllers 2500-2508. Cloud controller 2500 may be located at the organization's headquarters, and hence be configured with a local locality policy 2512 that specifies aggressive pre-fetching to minimize the access latency experienced by the organization's executives. Cloud controller 2504 may include a partial filesystem locality policy 2514 that identifies that a portion of the distributed filesystem hierarchy contains highly sensitive data, and should not be stored on a certain set of less-trusted cloud storage providers. Multiple cloud controllers 2506 and 2508 may be co-located at a site that has a particularly large number of clients and client data requests to ensure adequate data throughput; a site locality policy 2516 specifies that cloud controllers 2506 and 2508 should send peer cache requests to each other to effectively double the amount of data that is cached at that site.

Note that some locality policies can be modified at any time without incurring substantial overhead. For instance, decisions to no longer pin certain portions of the distributed filesystem and/or to pin a different set of data may simply result in the formerly pinned data now being subject to normal cache replacement policies and the new data being downloaded into the cloud controller. Some policies, however, are primarily applied at the time new data is written (e.g., data policies that group certain types of files into common cloud files); changing the organization of cloud files that were written based on a previous locality policy to reflect a new locality policy may involve walking the metadata of the distributed filesystem and rewriting previously stored data into new cloud files that reflect the new policy.

Figure 26:
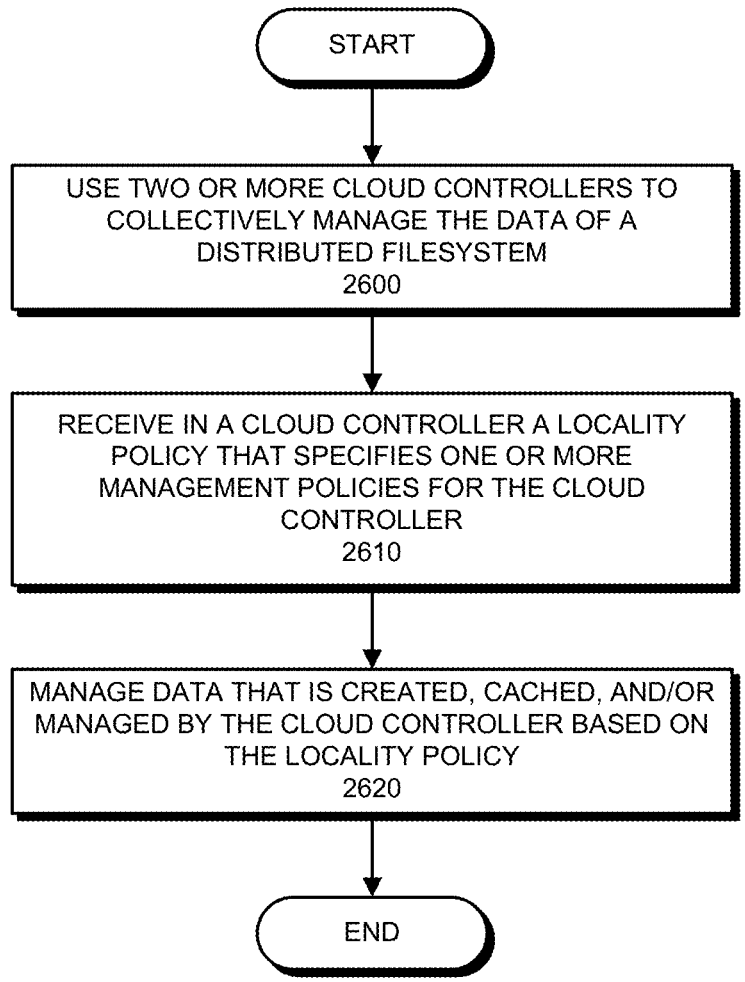
FIG. 26 presents a flow chart that illustrates the process of adjusting the characteristics of a distributed filesystem using a locality policy in accordance with an embodiment.

FIG. 26 presents a flow chart that illustrates the process of adjusting the characteristics of a distributed filesystem using a locality policy. Two or more cloud controllers collectively manage distributed filesystem data that is stored in one or more cloud storage systems (operation 2600); the cloud controllers cache and ensure data consistency for the stored data. During operation, a cloud controller receives a locality policy that specifies one or more management policies for the cloud controller (operation 2610), after which the portion of the distributed filesystem's data that is managed, created, and/or cached at the cloud controller is then managed based on this locality policy (operation 2620). Locality policies facilitate customizing and optimizing data management for the distributed filesystem to fit the needs of an organization (e.g., specific sets of users, applications, and/or datasets).

Deleting Files from a Distributed Filesystem

A distributed filesystem based upon cloud storage systems can efficiently store and access extremely large data sets. At some point, however, some of this stored data will no longer be needed, and hence will need to be deleted from the distributed filesystem. Deletion techniques may involve substantial complexity, computation, and potential delay, and hence need to be carefully managed to ensure that deletions do not negatively impact perceived user file access performance.

Consider as an example an organization that regularly backs up the data on all of its client machines to the distributed filesystem. For instance, all of the clients of the distributed system may be configured to periodically (e.g., on a daily, weekly and/or monthly basis) write backups of their local data to the distributed filesystem. All of this backup data may be collected into a single "tarball" (e.g., a single tape archive file that encompasses the full collection of backed up files while preserving important file system information, such as user permissions, dates, and directory structures). These tarballs may have only a limited lifespan—for instance, a tarball for a given backup date may only be preserved for a given timeframe (e.g., a month, or 60 days), and then be deleted to conserve storage space and/or make way for future backups. Depending, however, on the number of clients and the amount of data on each client, the collected data size may be substantial; for instance, performing backups may involve creating and deleting files that consume on the order of terabytes (or larger) of data in the distributed system, and hence may involve considerable time and effort.

In some embodiments, deletion from the distributed filesystem involves a series of steps that first hide a deleted file from users (to provide a user perspective of instant response) and then perform a number of background operations that traverse the file's metadata and then actually delete the data from the distributed filesystem over time in a manner that does not affect the performance of other simultaneous data accesses in the distributed filesystem.

Figure 27A:
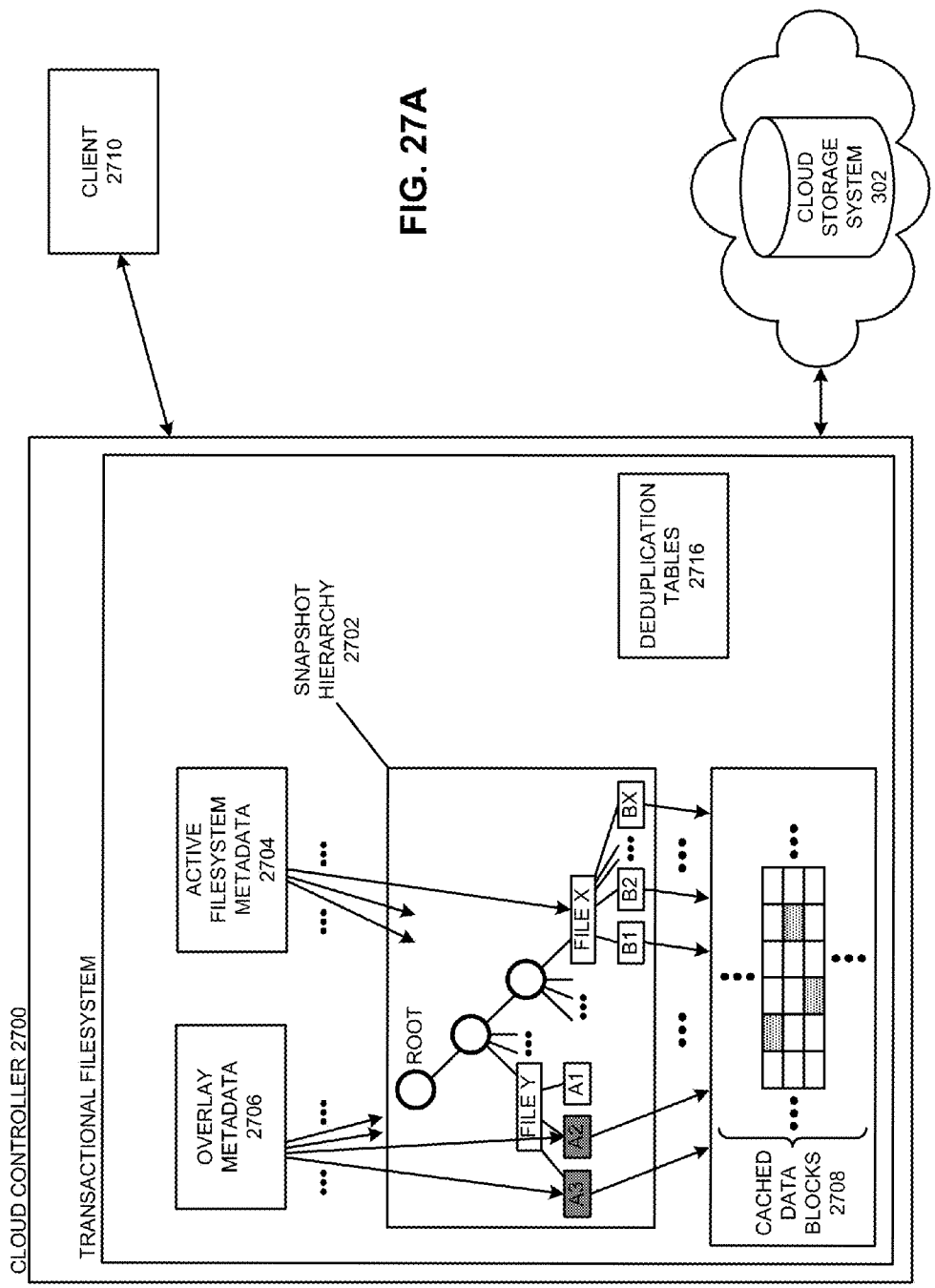
FIG. 27A illustrates the state of a cloud controller prior to a delete request in accordance with an embodiment.
Figure 27C:
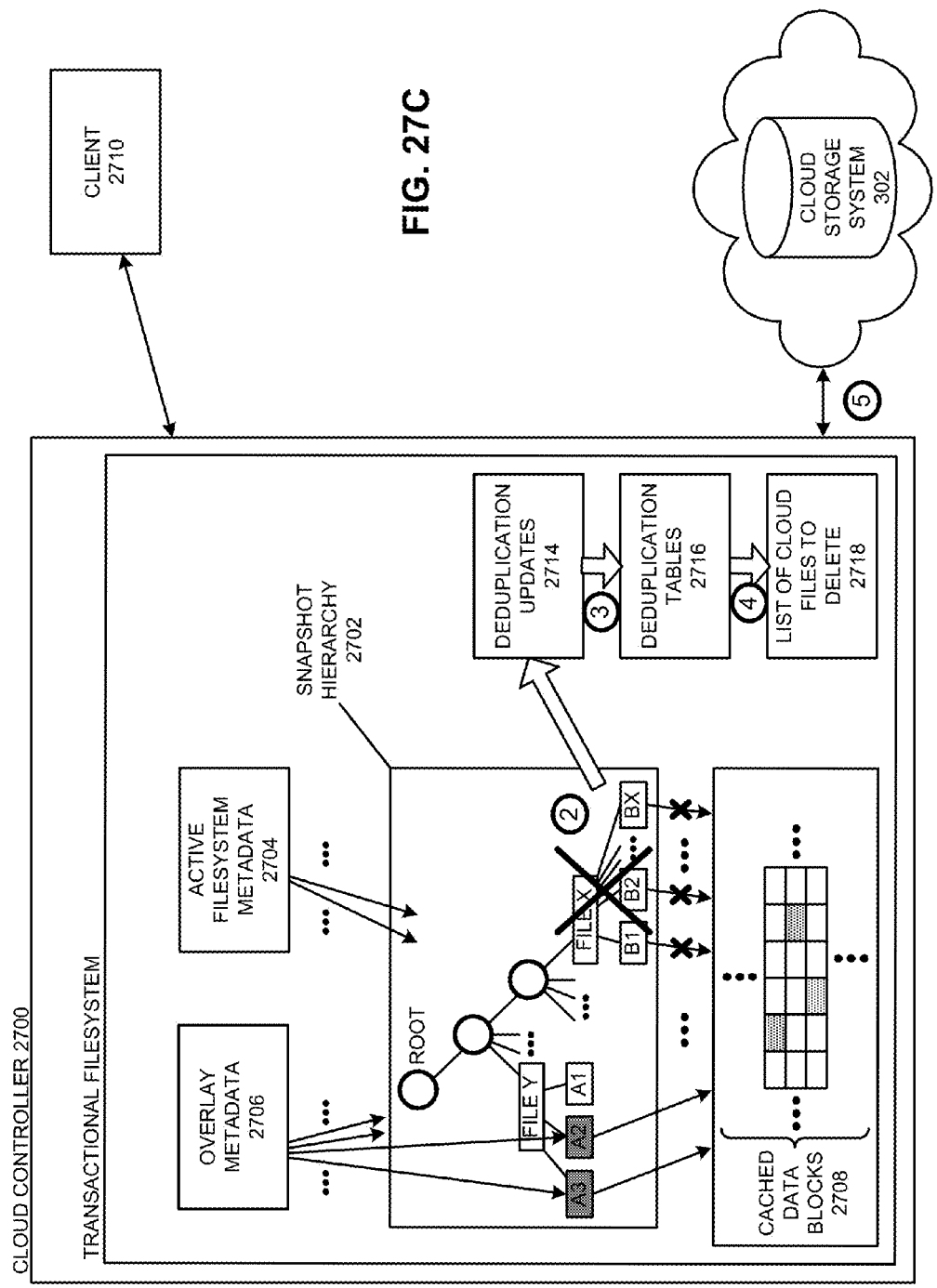
FIG. 27C illustrates the execution of the delete process initiated in FIG. 27C in accordance with an embodiment.

FIGS. 27A-27C illustrate the deletion of a file from a distributed filesystem. FIG. 27A illustrates the state of a cloud controller 2700 prior to a delete request. As described previously, each cloud controller in the distributed filesystem actively manages and updates its view of the distributed transaction filesystem; more specifically, cloud controller 2700 downloads incremental metadata snapshots that are distributed by other cloud controllers, and creates and uploads new cloud files containing incremental metadata and data snapshots whenever new data is written by local clients. The collected metadata for the distributed filesystem is maintained in a snapshot hierarchy 2702. Snapshot hierarchy 2702 includes a set of metadata that tracks all of the data that is currently stored in the distributed filesystem; snapshot hierarchy 2702 also includes samples over time of the metadata tree that indicate how the metadata has changed historically (e.g., across multiple snapshots). The metadata in snapshot hierarchy 2702 is used to determine and access the set of data blocks 2708 that are currently being cached by cloud controller 2700. Additional layers of metadata can be layered on top of snapshot hierarchy 2702 to present different views into the distributed filesystem. For instance, a set of active filesystem metadata 2704 tracks the portion of the distributed filesystem that is currently visible to the clients (e.g., users) of the distributed filesystem. Another set of overlay metadata 2706 pinpoints the set of modified data in a cloud controller that needs to be uploaded in a subsequent snapshot and facilitates creating cloud files in place (as described earlier).

FIG. 27B illustrates the initiation of a delete operation. Client 2710 sends a request 2712 to cloud controller 2700 to delete a specific file, 'File X.' In response, cloud controller 2700 modifies active filesystem metadata 2704 to no longer refer to File X (operation 1 in FIG. 27B) and writes a snapshot update to the other cloud controllers reflecting this change. At this point, the file is effectively deleted from the user viewpoint (e.g., the file is no longer visible to users browsing through the active filesystem), but no data has actually been deleted from the distributed filesystem; a data block is not actually deleted until it is no longer referenced in snapshot hierarchy 2702.

FIG. 27C illustrates the execution of the delete process in response to the delete request of FIG. 27B. As described above, the metadata for "deleted" (from the user perspective) File X is still available in snapshot hierarchy 2702, and can now be traversed (e.g., in the background, when system load is low). More specifically, the cloud controller walks the metadata for each data block of the file and adds the deduplication hash value for the data block (which is stored in the metadata for the data block) to a list of deduplication updates 2714 (operation 2). After all of the metadata for the file has been traversed, the metadata for File X can be removed from snapshot hierarchy 2702 (and a corresponding metadata snapshot reflecting this change can be propagated to the other cloud controllers).

The set of hash values in the list of deduplication updates 2714 indicate data blocks in the deduplication tables 2716 that need to be decremented (e.g., to reflect the fact that File X no longer refers to these data blocks). These updates are applied to deduplication tables 2716 (operation 3); during this process, cloud controller 2700 determines whether any of these data blocks are no longer referenced in the distributed filesystem (e.g., the reference count for a given data block is decremented to zero). If this is the case, cloud controller 2700 further determines from cloud file status-tracking structures whether these changes result in any cloud files whose data blocks have all been deleted; if so, these cloud files are added to a list of cloud files that are queued for deletion 2718 (operation 4). The cloud controller can then subsequently send requests to cloud storage system 302 to actually delete (or archive) these cloud files (operation 5); only at this point, after the cloud storage system has executed and confirmed the deletion request, has the data actually been deleted from the distributed filesystem. Note that each cloud controller maintains and updates its own internal deduplication table. For example, the process by which the other cloud controllers of the distributed filesystem update their deduplication tables in response to the above-described file deletion on cloud controller 2700 may comprise performing the following on each of the other cloud controllers: (1) receiving an incremental metadata snapshot uploaded by cloud controller 2700 that indicates that the metadata for File X should be removed; (2) using the metadata for File X (e.g., the deduplication hash values for the blocks of File X) to properly update (e.g., decrement references in) the cloud controller's local deduplication table; and (3) updating the locally stored metadata to reflect the removal of File X.

In some embodiments, operations 2-5 as described for FIG. 27C may execute in parallel as simultaneous background jobs. For instance, some deduplication updates may already be processed at the same time that other portions of the metadata for the file are still being walked and other cloud files that contained unused data blocks are already being deleted. Alternatively, during peak load times some or all of these operations may be delayed to reduce system load. Performing delete operations as low-priority background jobs ensures that intensive delete operations do not adversely affect user experience with the distributed filesystem.

In some embodiments, a cloud controller may also intentionally delay some of the steps of the deletion process for a time interval to ensure that the deletion was intended. For instance, upon receiving user file delete request 2712, cloud controller 2700 may initially delete the view of the file from active filesystem metadata 2704 (operation 1), but then delay performing the subsequent deletion operations for a specified time interval to ensure that the deletion request was not accidental. This delay (and other deletion parameters) may be configured using a locality policy. For example, a locality policy influencing deletions might specify: whether deletions should be delayed, and if so, for how long of a time interval; whether other cloud controllers, administrators, and/or clients should be notified of pending deletes; and/or whether deletion requests for certain (or all) files should to be moderated (e.g., approved) by an administrator and/or file owner before being executed. A locality policy may also be used to group backup files into a distinct set of cloud files (e.g., not mixed with other data) to simplify the deletion of the backup files at a later time.

Note that the point at which cached data blocks for a file that is being deleted should be flushed from cloud controller caches may vary. If deduplication is enabled, a data block referenced by the file being deleted may also still be referenced (and actively used) by other files, and hence should not be flushed from the cloud controller's cache. If, however, the cloud controller determines that a data block is no longer referenced, it can check whether the block is still cached and, if so, delete it from the cache. Alternatively, instead of being explicitly flushed, the cache controller may instead leave the data block in the cache and let it be flushed out eventually (due to disuse) via normal cache replacement policies. Note also that deduplication techniques can help to reduce the overhead of deletion operations by reducing the amount of redundant data that is stored and will later need to be deleted; deletion operations that delete unique data involve somewhat more computation and overhead (e.g., additional operations 4 and 5 in FIG. 27C) than deletion operations that primarily decrement references to still-used data blocks.

Figure 28:
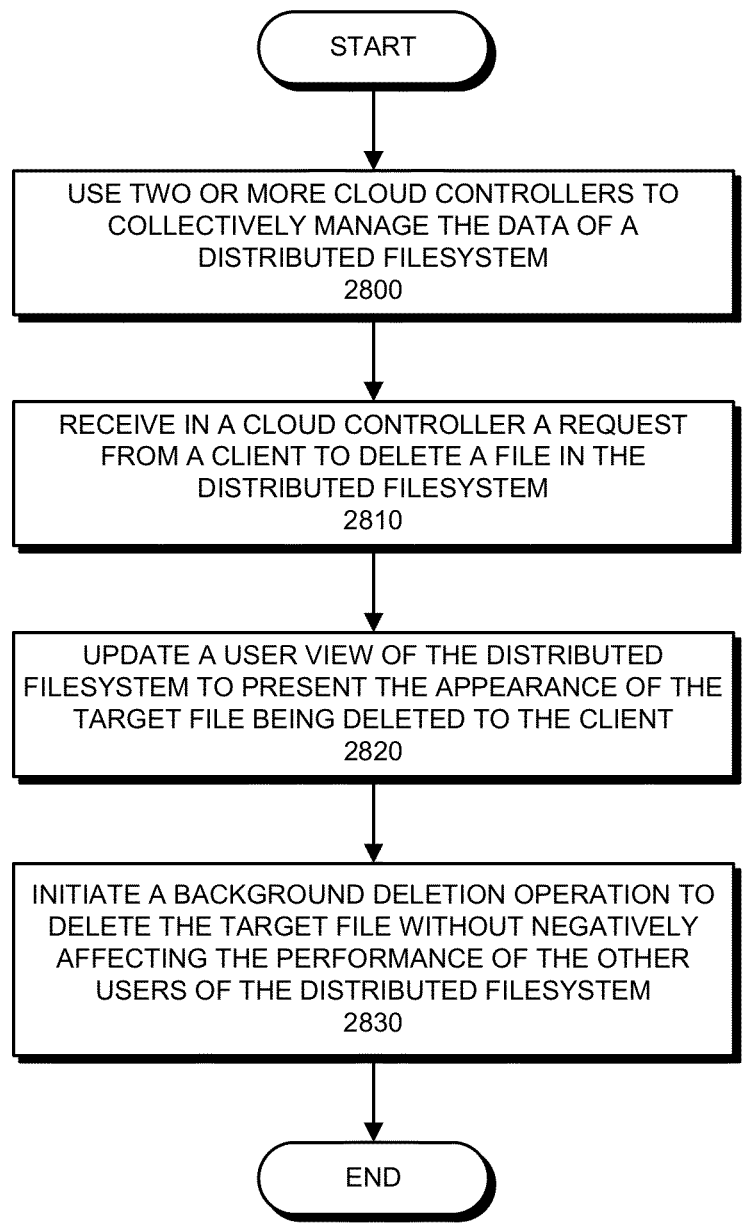
FIG. 28 presents a flow chart that illustrates the process of deleting a file from a distributed filesystem in accordance with an embodiment.

FIG. 28 presents a flow chart that illustrates the process of deleting a file from a distributed filesystem. Two or more cloud controllers collectively manage distributed filesystem data that is stored in one or more cloud storage systems (operation 2800); the cloud controllers cache and ensure data consistency for the stored data. During operation, a cloud controller receives a request from a client to delete a file in the distributed filesystem (operation 2810). The cloud controller updates a user view of the distributed filesystem to present the appearance of the target file being deleted to the client (operation 2820), and then initiates a background deletion operation to delete the target file without negatively affecting the performance of the other users of the distributed filesystem (operation 2830).

In some embodiments, a distributed filesystem can be tuned to balance a range of performance and cost goals. For a scenario in which performance is the only factor and cost is no issue, the data for the distributed filesystem might be stored in the cloud storage system that provides the highest availability, redundancy, and performance, and each client site may include multiple peer cloud controllers as well as backup cloud controllers. In a more typical scenario, however, performance may need to be balanced by cost factors. For instance, the distributed filesystem may leverage multiple cloud service providers (including archival cloud service providers) to minimize the storage costs for infrequently accessed data while maintaining high performance for frequently accessed data. For example, cloud controllers may be configured to track and consider a range of parameters (e.g., the most commonly used data, the most frequently transferred data, access frequencies, typical access sizes, the costs of storing data in different cloud storage providers, the network cost of leveraging distributed cloud controllers as peer caches, etc.) and attempt to automatically rebalance and optimize system behavior to maximize performance for a given fixed cost.

Supporting and Recovering Virtual Machines in a Distributed Filesystem

Some organizations may allocate one or more distinct cloud controllers (e.g., separate, dedicated compute servers) at every site in the organization, to provide access to the shared, distributed filesystem. Some scenarios, however, may motivate combining multiple services into a single hardware device. For instance, a small, remote site may not have sufficient rack space for another computing device or may not be large enough to justify the cost of multiple independent servers. However, such sites might still benefit from the capability to leverage the storage, archive, and backup capabilities of an organization-wide distributed filesystem and cloud storage.

In some embodiments, one or more distributed filesystem services may be executed in a virtual machine on another computing device. For instance, an application with cloud controller functionality may be executed in a virtual machine to provide access to the distributed filesystem at a site that otherwise might not be able to host (or otherwise justify) a dedicated cloud controller device. This cloud controller application (sometimes also referred to as a cloud controller instance) can provide all of the previously described cloud controller functionality to other processes executing on the same host server as well as to external clients.

Figure 31:
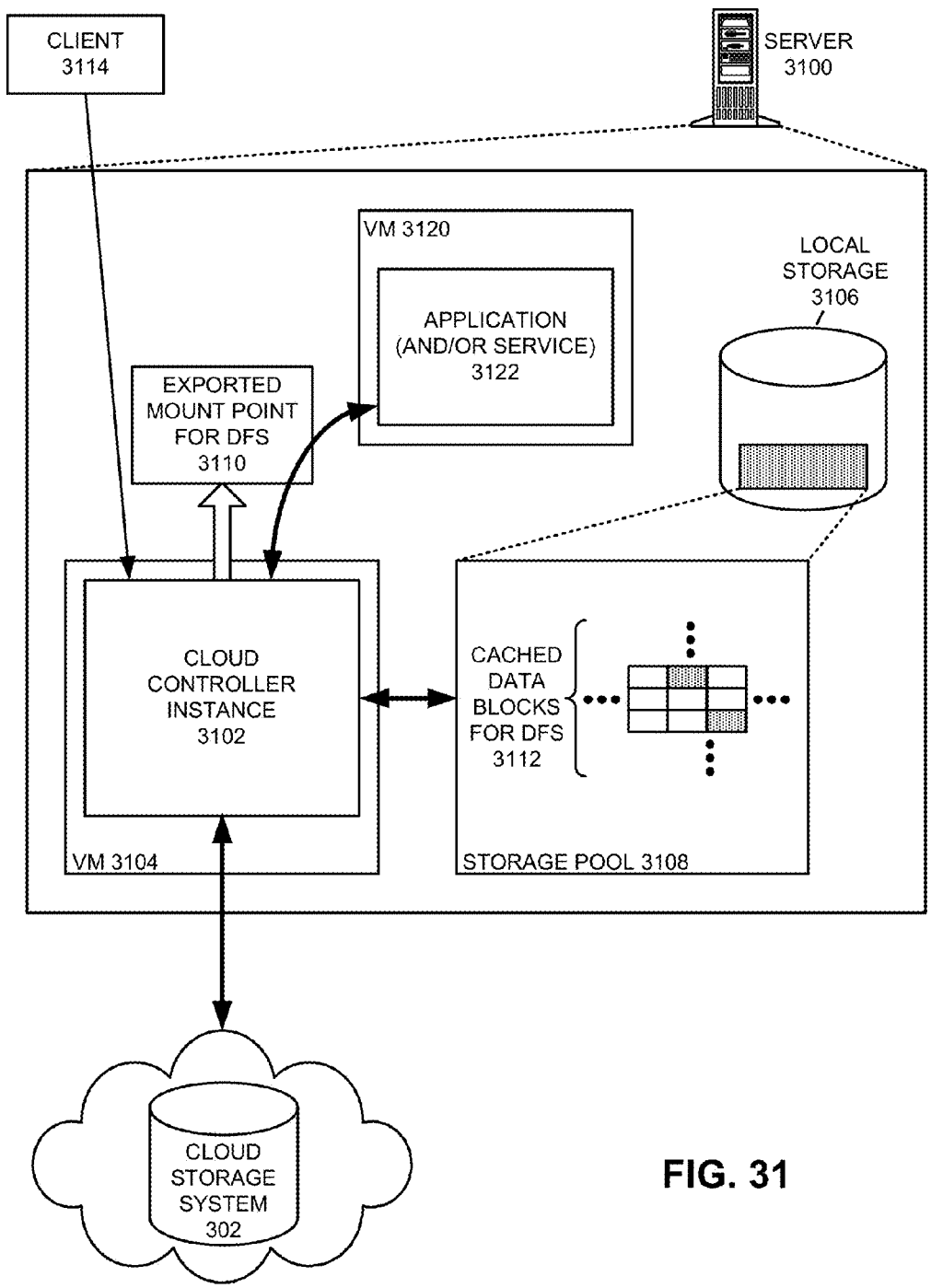
FIG. 31 illustrates an environment in which a computing device executes an application with cloud controller functionality in a virtual machine in accordance with an embodiment.

FIG. 31 illustrates an environment in which a computing device (server 3100) executes a cloud controller instance 3102 in a virtual machine (VM) 3104. Server 3100 allocates a portion of its local storage capacity 3106 to a storage pool 3108 that is managed by cloud controller instance 3102, which uses storage pool 3108 to cache data blocks 3112 for and/or from the distributed filesystem. Cloud controller instance 3102 provides access to the distributed filesystem by exporting a filesystem mount point 3110 that exposes the structure of and the data stored in the distributed filesystem to server 3100 and external clients. For instance, cloud controller instance 3102 may include support for NFS (Network File System) protocols, and export an NFS mount point that presents the contents of the distributed filesystem to server 3100 and other external devices as if it was an NFS filesystem. More specifically, cloud controller instance 3102 supports an additional interface that enables full, transparent access to the data stored in the distributed filesystem; cloud controller instance 3102 ensures that file blocks requested via this interface are loaded from cloud storage system 302 (as described in the preceding sections for cloud controllers in general) and cached 3112 in storage pool 3108. Note that server 3100 no longer accesses the storage pool allocated to cloud controller instance 3102 directly; other services executing on server 3100 can, however, access the distributed filesystem (and data blocks for the distributed filesystem that are cached 3112 in storage pool 3108) via the exported mount point 3110. Note also that server 3100 can be configured to allow external clients (e.g., client 3114) to interact with cloud controller instance 3102 in the same way that clients would interact with and access data (for the distributed filesystem) from a stand-alone cloud controller.

In some embodiments, one or more services are executed in virtual machines in a manner that leverages the distributed filesystem. More specifically, services and applications can be executed in virtual machines in a manner that ensures that their executables, runtime structures, and/or application data are all stored in the distributed filesystem. This arrangement allows such services and applications to be automatically backed up to (and, if needed, restored from) the distributed filesystem. Note that such capabilities are not limited to situations in which cloud controller functionality is executed in a virtual machine; any stand-alone cloud controller can also export a mount point for the distributed filesystem that can then be used to facilitate the execution of virtual machines in the context of the distributed filesystem.

Figure 32:
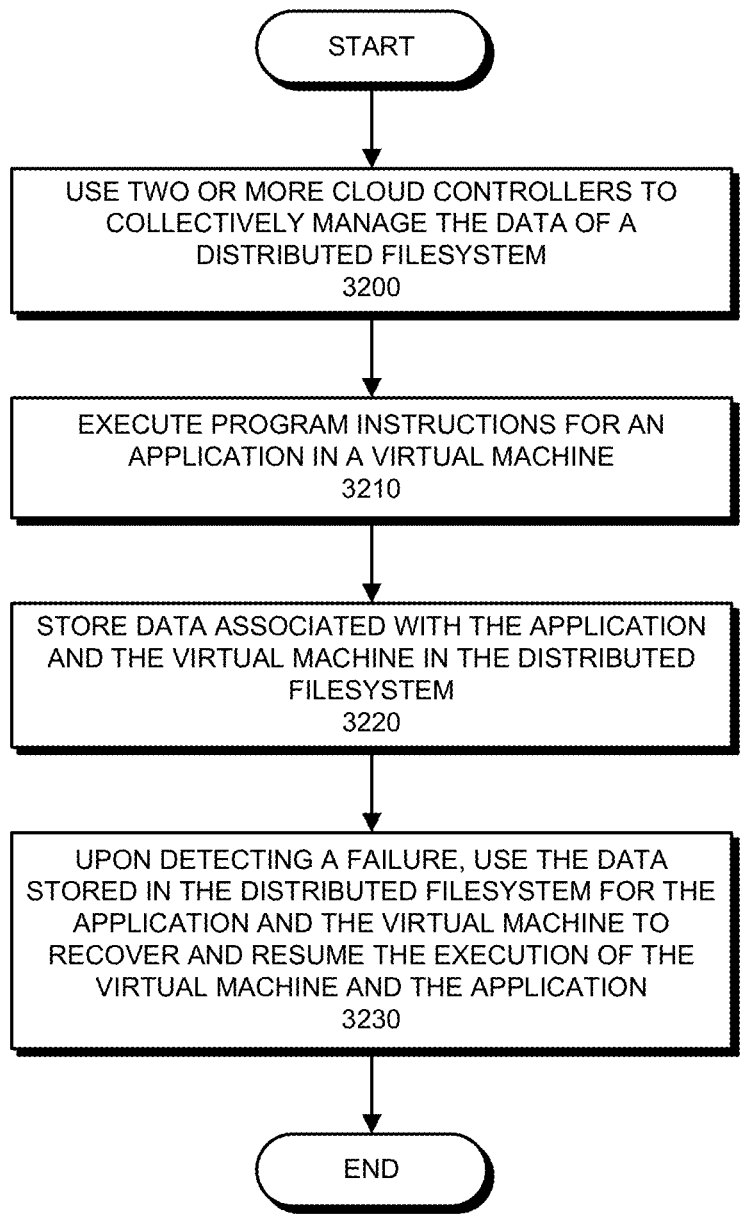
FIG. 32 presents a flow chart that illustrates the process of supporting and recovering virtual machines using a distributed filesystem in accordance with an embodiment.

FIG. 31 further illustrates an exemplary application (and/or service) 3122 that is executed by a second VM 3120 in the context of the distributed filesystem. Sever 3100 can load an executable for application 3122 from the distributed filesystem via the exported mount point 3110 provided by cloud controller instance 3102, and then execute this executable in VM 3120. For example, application 3122 may be a service that manages email, calendaring, and contact information for a remote site that includes server 3100. VM 3120 can be configured such that all of the data accesses made by application 3122 access the distributed filesystem. For instance, VM 3120 can be configured so that all of the data written by application 3122 is written (via the exported mount point 3110) to one or more directories in the distributed filesystem; cloud controller instance 3102: (1) receives any new data blocks written by application 3122 and VM 3120; (2) caches these new blocks in storage pool 3108; and (3) and ensures that the information for these new data blocks is written through to cloud storage system 302 using incremental metadata and data snapshots (as described previously). In some scenarios, temporary files and swap space associated with VM 3120 and application 3122 may also be written to the distributed filesystem; storing all of the data associated with executing application 3122 and VM 3120 in the distributed filesystem facilitates disaster recovery for application 3122 across a wide range of failures. For example, if server 3100 were to crash, another computing device capable of accessing data from the distributed filesystem could use the data stored for VM 3120 and application 3122 to effectively re-start application 3122 from its previous executing state at a different location and/or in a new virtual machine. Note that cloud controller instance 3102 (via exported mount point 3110) provides transparent access to the distributed filesystem; applications are unaware that data is being written to the distributed filesystem instead of local storage. However, the distributed filesystem can only be accessed (e.g., is only visible and available to server 3100, any VMs executing in server 3100, and any external clients) when cloud controller instance 3102 is running FIG. 32 presents a flow chart that illustrates the process of supporting and recovering virtual machines using a distributed filesystem. Two or more cloud controllers collectively manage distributed filesystem data that is stored in one or more cloud storage systems (operation 3200); the cloud controllers ensure data consistency for the stored data, and each cloud controller caches portions of the distributed filesystem in a local storage pool. During operation, a host server executes program instructions for an application in a virtual machine (VM) (operation 3210); data associated with this application and/or this virtual machine is stored in the distributed filesystem (operation 3220). Upon detecting a subsequent failure, the system can recover and resume the execution of the virtual machine and application using the application and virtual machine data that was stored in the distributed filesystem (operation 3230).

Executing multiple applications in virtual machines in the context of the distributed filesystem may involve substantial additional network overhead for some remote sites with limited network bandwidth. For instance, executing such applications may involve: (1) accessing a large application executable file from the distributed filesystem (e.g., loading the application executable from the cloud storage system); (2) accessing application data needed by the application (e.g., from the cloud storage system); and (3) storing a large amount of temporary, swap, and application data that is created while executing the application to the cloud storage system. In some scenarios, an application executable may be cached by a host server (or pinned in a cloud controller) to reduce an initial startup delay for an application. Furthermore, while a cloud controller and/or virtual machine may be configured to store runtime environment data to the distributed filesystem (and cloud storage system), such runtime environment data may be delayed, metered, and/or marked as low-priority to ensure that storing such data in the distributed filesystem does not interfere with other higher-priority data accesses and/or network transfers. Storing all of the data associated with the virtual machine facilitates restoring the exact execution state on the same or another host server in case of failure. In alternative scenarios where only application data is written to the distributed filesystem, an application may still be recoverable after a failure, but perhaps only to the point of the application's last written data output and/or internal snapshot, as opposed to an exact application state that could be conveyed using the full set of stored data. Such configuration and storage decisions may be influenced by the expected data usage, data access patterns, duration of execution, and runtime requirements of an application.

Note that some applications may access both structured and unstructured data. For instance, a given application may access both structured data (e.g., an SQL database) as well as unstructured raw files. In some instances, executing a given application may also involve executing other additional support applications (e.g., a database application) in the same or in another separate virtual machine; the disclosed techniques can scale to any number of applications and virtual machines, depending on the capabilities of one or more host servers. These multiple applications can all share the same distributed filesystem view provided by a cloud controller (and/or cloud controller instance), and hence can interact normally, as if they were operating upon locally-stored data, while the actual structured and unstructured data being operated upon are stored in the distributed filesystem.

In some embodiments, executing applications in a manner that leverages a distributed filesystem facilitates recovering from a range of failures. For instance, failures may include, but are not limited to: (1) the failure of a host server; (2) the crash of a cloud controller and/or cloud controller instance; and/or (3) the crash of an individual virtual machine or application. Some organizations may select a highly redundant hardware platform to serve as a host server to avoid failure, but even such devices fail sometimes. However, if all of the virtual machine and application data that is written and modified is also stored in a cloud storage system (via the distributed filesystem), the entire state of an executing VM and application can be recovered from the distributed filesystem and executed via another host server and/or cloud controller. In a scenario in which a cloud controller or cloud controller instance crashes, as long as the persistent storage managed by the cloud controller remains intact (e.g., a cloud controller's local storage, or a storage pool allocated to a cloud controller instance), the cloud controller (or cloud controller instance) can be quickly restarted and use the locally cached data to immediately continue providing data services. In a worst case scenario in which the cached data is lost, the cloud controller (or cloud controller instance) can reload requested metadata and data from the cloud storage system. In a scenario in which an individual application and/or its host virtual machine crash, its data is likely to still be cached (and/or pinned, perhaps, via a locality policy) in its associated cloud controller (or cloud controller instance), or can be re-loaded from the cloud storage system, thereby allowing the application to be quickly restarted to its previous state. Hence, leveraging the distributed filesystem ensures that disaster recovery solutions are available for all of the services being run on a host server (e.g., in a remote office).

In some scenarios, data management for applications and virtual machines may be structured and/or adjusted to reduce overhead and facilitate different recovery options. For instance, because a large number of applications may be executed in virtual machines via a number of different cloud controllers, data from these applications and virtual machines may benefit from being logically separated (and/or indexed) in the distributed filesystem on a per-VM and/or per-cloud-controller basis (e.g., with each cloud controller, and each VM per cloud controller, being associated with different, distinct directories in the distributed filesystem). Distinguishing each instance of an application and/or VM facilitates recovering and re-executing a given application on the same or another host server after a failure. Note that data may also be logically separated for each individual application and/or VM. For example, data associated with a given application and virtual machine may also be logically separated into different sub-directories (and/or directory hierarchies) in the distributed filesystem that store the application's executable, the temporary and swap data (e.g., runtime environment data) for each executing application instance, and application data stored by each executing application instance.

In some embodiments, the size of the storage pool allocated to a cloud controller instance may vary depending on factors that include, but are not limited to: the amount of local storage in the host server; the anticipated data needs for the site and/or host server; the set of files (and application executables) from the distributed filesystem that will be pinned in the storage pool; and/or the set of virtual machines that will be executed on the host server. For instance, in some scenarios where the host server is primarily dedicated to executing applications that will execute in virtual machines whose data will be backed up via the distributed filesystem, most of the host server's local storage may be allocated to the cloud controller instance to ensure that as much space as possible is available to cache application and VM data.

Applications executed in virtual machines may be used to provide a range of important compute services and/or information resources to a site, and hence supporting cloud controllers may sometimes be configured to perform additional operations to improve data access performance. In some embodiments, a cloud controller (or cloud controller instance) may be configured to optimize (e.g., reduce the latency of) the data accesses associated with virtual machines as much as possible. For instance, a cloud controller may be configured to request and cache data that is expected to be accessed by a virtual machine in a local storage pool before the virtual machine is even executed (e.g., via locality policies that pre-populate the local storage pool based on expected data use, an expected time of use, and/or other factors).

Another optimization involves adjusting the write behavior for scenarios in which multiple entities attempt to perform modifications to the same portion of the distributed filesystem. As described previously, a cloud controller attempting to write a file "owned" (e.g., created) by another cloud controller typically first contacts the owning cloud controller with a request to modify the file. More specifically, the cloud controller that owns a file may be considered to hold a "write lock" which identifies the cloud controller as the arbitrator for further writes for the file. However, contacting another cloud controller to perform a write operation may involve additional latency. Hence, optimizing write behavior to improve the performance of virtual machines may also involve identifying and transferring the write locks for contentious portions of the distributed filesystem hierarchy to a local cloud controller (or cloud controller instance) to reduce write latencies. A further optimization may involve ensuring that such write locks cannot be requested by and moved to another cloud controller (and/or cloud controller instance) for a given time interval and/or while a given virtual machine is executing. Such optimizations may be specified by techniques including, but not limited to, locality policies and other predictive mechanisms.

Note that, in some scenarios, a host server may execute two or more cloud controller instances that provide access to multiple, distinct distributed filesystems. In such scenarios, the host server may allocate separate storage pools for the different cloud controller instances, and each cloud controller instance would present a different export mount point for its respective distributed filesystem. The host server may also simultaneously write data related to applications executing in virtual machines to multiple distributed filesystems.

Avoiding Client Timeouts in a Distributed Filesystem

Figure 33A:
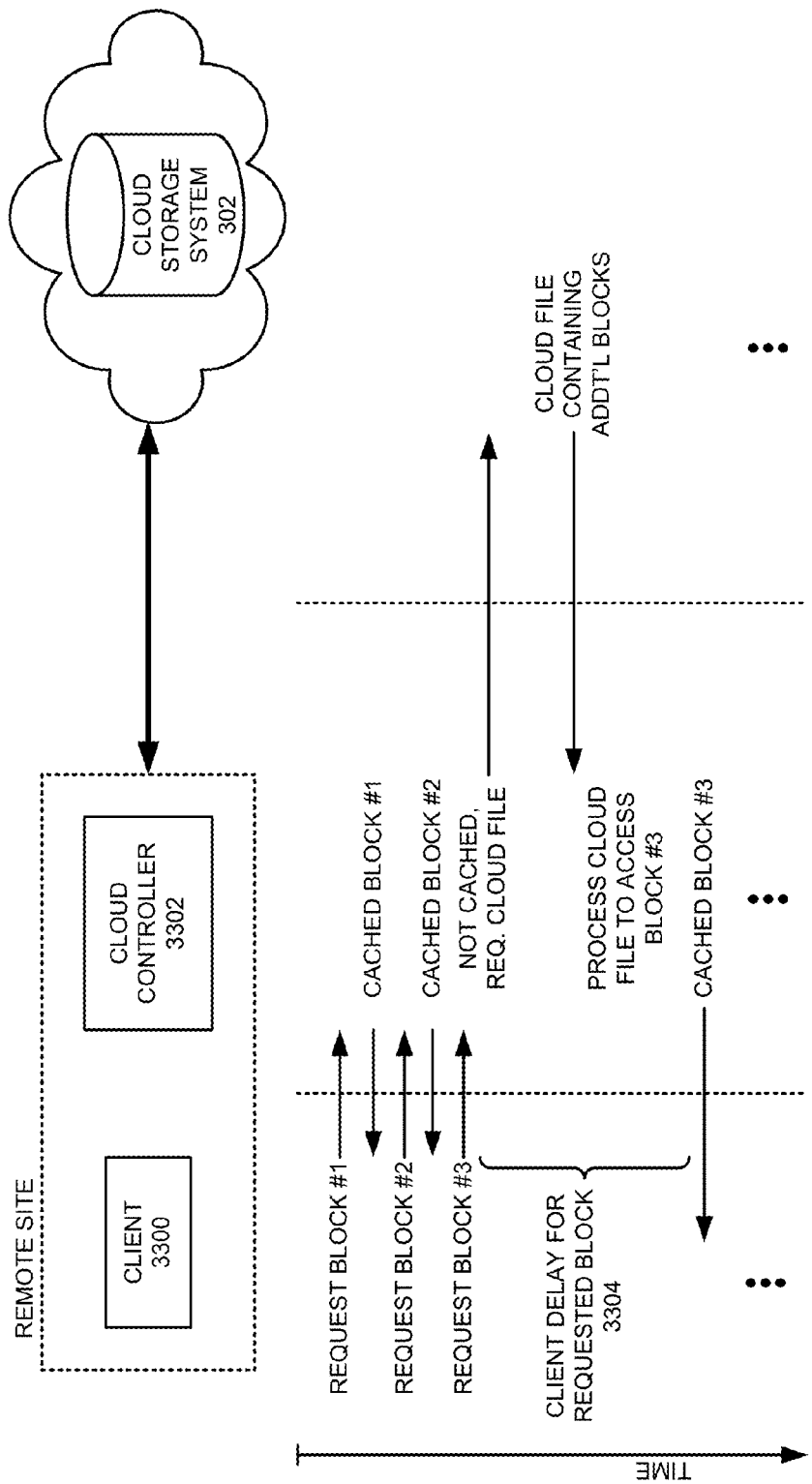
FIG. 33A illustrates an exemplary scenario in which a client requesting data blocks from a cloud controller experiences a data request timeout in accordance with an embodiment.

Some client systems may be configured to "time out" a data request (e.g., disconnect and abort the request) if a target server does not return the requested data block within a specified time interval. Such timeouts can lead to performance issues in a distributed system. For instance, FIG. 33A illustrates an exemplary scenario in which a client 3300 requests data blocks for a file from a cloud controller 3302 (e.g., using the CIFS protocol). In the illustrated example, the first two blocks of data for a file being accessed by client 3300 are in the cache of cloud controller 3302, which immediately transmits the cached blocks to client 3300 in response to the client's requests. However, a subsequent block (requested block #3) is not cached by cloud controller 3302; as described previously, upon receiving a request for this block, cloud controller 3302 determines the cloud file containing the needed block and sends a request to cloud storage system 302 to retrieve this cloud file. Upon receiving the cloud file, cloud controller 3302 traverses and processes the cloud file to access the requested block, and transmits the (now locally cached) block to client 3300. However, in some scenarios, this process of determining, receiving, and accessing the cloud file may result in a client-perceived delay for the requested block 3304 that exceeds a pre-defined client timeout. For example, if a large amount of data is being downloaded from cloud storage system 302 and the network link between cloud controller 3303 and cloud storage system 302 is slow, client 3300 may determine that the request has exceeded the timeout interval, and hence disconnect and abort the data access before it has actually received the requested data from cloud controller 3302.

Note that while client timeout intervals can typically be configured or adjusted to provide more time, adjusting the timeout interval for all of the clients in an enterprise may involve considerable overhead and/or otherwise be infeasible. For instance, some clients (e.g., clients using the CIFS protocol) may be initially configured to disconnect from a server and report an error if they have not received their requested data within 60 seconds. If a given site has a slow network link (or intermittently has a high network load that would delay data transfer from a cloud storage system), all of the clients at the site might be reconfigured with a longer timeout interval. However, depending on the number (and mobility) of clients, such reconfiguration operations may involve substantial effort, and may also cause delays in realizing and identifying actual failures (e.g., due to the lengthened timeout intervals). Another option involves adjusting the behavior of the cloud controller to consider client-perceived delay and client timeouts.

In some embodiments, a cloud controller may adjust the rate at which requested data blocks are delivered to one or more clients to ensure that clients to not experience timeouts. For instance, a cloud controller may determine how many of the data blocks for a requested file are currently being cached and, depending on factors such as the available network bandwidth between the cloud controller and a cloud storage system containing the uncached data blocks, control the rate at which cached data blocks are served to a client to minimize the probability of timeouts for the client. For example, a cloud controller may pre-request uncached file data blocks from the cloud storage system while simultaneously restricting the rate at which cached file data blocks are sent to the client; these combined actions ensure that there is sufficient time for cloud files containing subsequent needed data blocks to be transferred from the cloud storage system and processed. Delaying the delivery of some cached blocks can facilitate the operation of the distributed filesystem by avoiding and/or reducing the number of timeout-related errors in clients.

In some embodiments, a cloud controller tracks typical file access patterns, and determines a set of data blocks that will be cached for each file. For instance, some frequently-accessed files may be cached in their entirety during a peak-access time interval. However, due to space constraints, a cloud controller may cache only limited portions of less-frequently accessed files. For example, a cloud controller may determine that, for a certain type or class of file, clients frequently access only the first and last data blocks of a file (or initially access these blocks prior to sequentially accessing all the other blocks of the file). In such scenarios, the cloud controller may adopt a policy of caching only the first and last block of such files (e.g., the first and last 64 KB of all files, as allowed by storage space constraints in the cloud controller); the cloud controller can then slightly delay the transmission of these cached blocks to a requesting client to create a time buffer during which subsequent file data blocks can be predictively pre-fetched from the cloud storage system.

Figure 33B:
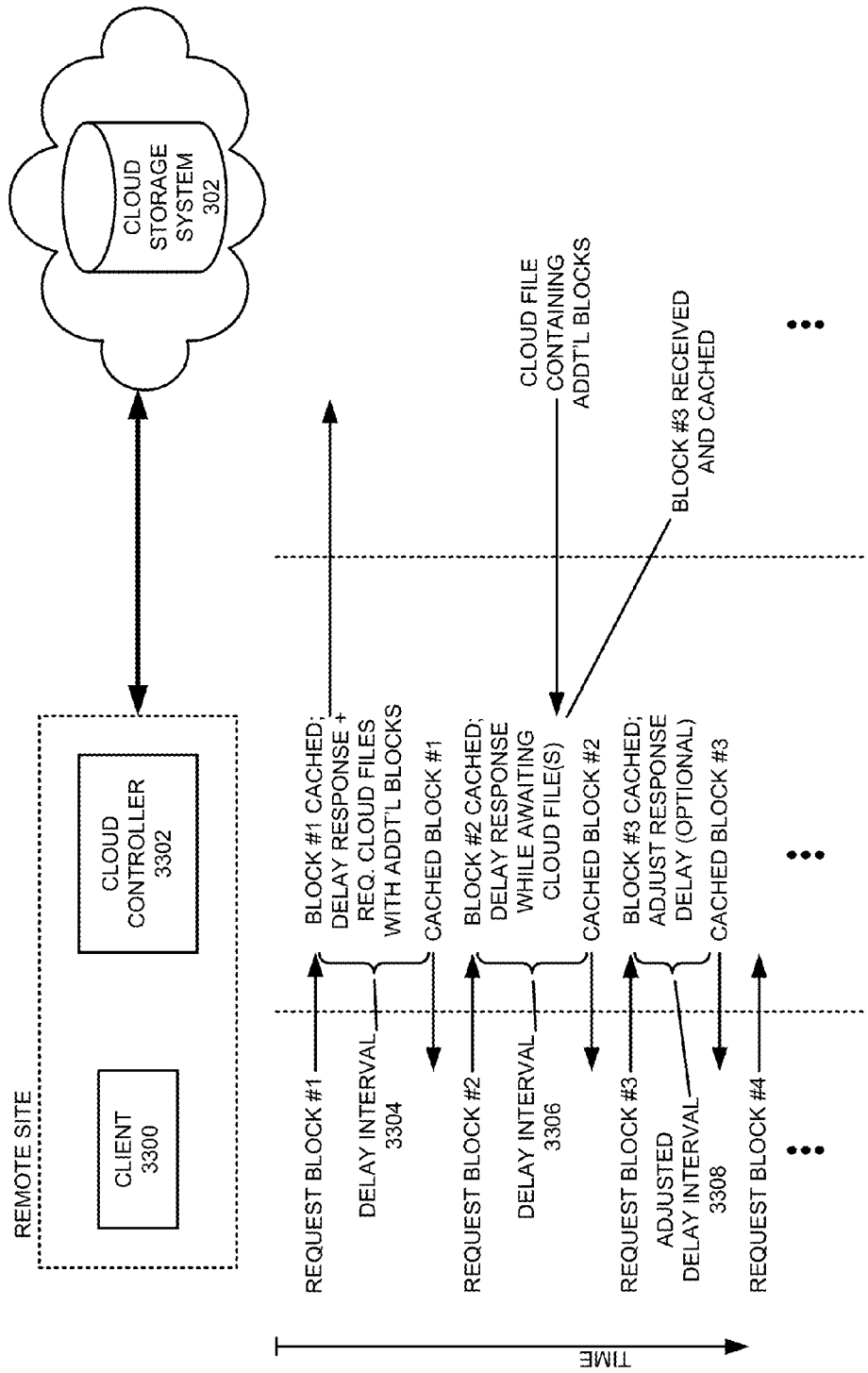
FIG. 33B illustrates an exemplary scenario in which a cloud controller delays responses to a client system to avoid client timeouts in accordance with an embodiment.

FIG. 33B illustrates an exemplary scenario in which cloud controller 3302 delays responses to client 3300. As illustrated in FIG. 33A, client 3300 requests the first block of data for a file. Cloud controller 3302 walks the metadata for the file to determine how many of the blocks of the file are already locally cached, how many blocks would need to be downloaded from cloud storage system 302, and how much bandwidth is available between cloud storage system 302 and cloud controller 3302. Upon determining that only two blocks of the file are currently being cached, cloud controller 3302 estimates the amount of time needed to load the following set of uncached data blocks and uses this estimate to determine delay intervals (3304-3306) for the cached data. More specifically, cloud controller 3302 does not immediately transmit the requested (cached) block to client 3300, but instead: (1) sends a request to cloud storage system 302 for cloud files containing additional uncached blocks of the file; and (2) only sends the requested (cached) block to client 3300 after delay interval 3304. After receiving this first block, client 3300 requests a second block. Cloud controller 3302 again delays sending the second cached block (for delay interval 3306) while waiting for (or receiving) the requested cloud file(s). By injecting these additional delays (3304-3306), cloud controller 3302 ensures that subsequent blocks of the file are received, and that subsequent requests from client 3300 can be serviced, without incurring client timeouts. Note that in some scenarios, a client receiving delayed responses may also come to the conclusion that it is communicating using a slow network link, and automatically adjust its timeout interval to be less stringent, thereby further reducing the likelihood of causing timeout-related errors.

In some embodiments, techniques for choosing a delay interval may involve either using fixed delay intervals or adaptively adjusting delay intervals based on characteristics of the distributed system. For instance, in some embodiments, a cloud controller may consider and/or calculate one or more of the following when determining a delay interval for a requested data block:

the number and order of the data blocks for a file that are already being cached on the cloud controller;

the network bandwidth available to the cloud controller (e.g., the current link bandwidth between the cloud controller and a cloud storage system hosting cloud files that include a set of file data blocks). Determining the available network bandwidth may involve: tracking historical transfer rates to estimate the maximum bandwidth of the network link; tracking the amount of time needed to receive the most recently requested cloud file and/or data blocks; receiving one or more parameters that specify the maximum bandwidth that should be used by the cloud controller and/or the minimum amount of bandwidth that is dedicated to the cloud controller; and/or tracking the current network load/congestion for the site hosting the cloud controller (e.g., by comparing current transfer rates with the estimated maximum bandwidth of the network link or communicating with other servers and/or networking equipment to receive notifications of or otherwise determine network usage).

the total set of data that needs to be downloaded for the file, the number of cloud files containing the needed data blocks, and the locations of the needed data blocks in these cloud files. For instance, because cloud files may store serially encrypted data blocks for multiple files, some additional cloud file data may need to be downloaded to access needed data blocks. Hence, calculations of effective client delay may need to consider the total number of cloud file data blocks that need to be downloaded, which may be larger than the actual number of outstanding uncached data blocks that are actually needed for a requested target file.

the rate at which a client is actually requesting data for a file (e.g., the rate at which requests for the file data blocks arrive from the client). For instance, depending on the type of operation being performed on a file, a client receiving a given block may perform some processing before requesting the next data block in the file.

how long the cloud controller has been operating, and how much tracking data has been collected.

an additional "safety margin" that increases the delay interval to ensure that fluctuations in network usage and/or file requests do not lead to a substantial increase in client timeouts. For instance, while a cloud controller may be configured to minimize the delay interval for requests (where possible) to improve perceived client performance, changes in network load and other fluctuations may sometimes reduce a calculated and/or expected transfer rate. For example, the cloud controller may suddenly receive additional requests for other files from one or more additional users. Hence, a cloud controller may calculate very conservative delay intervals for the initial set of cached blocks, track fluctuations in network performance and/or load as subsequent blocks are downloaded and cached, and use this tracking information to calculate an additional safety margin for per-block delay intervals.

a locality policy that specifies one or more delay-related parameters.

Note that the set of criteria considered by a cloud controller, and hence the calculated delay interval, may change over time based on the operational situation. For example, upon initial start-up a cloud controller may initially use a conservative fixed delay interval (e.g., 20 seconds) for every block request for a file until the cloud controller has received all of the blocks for the file from a cloud storage system; when the cloud controller has cached all of the data blocks for the file, it can proceed to send the cached blocks to the client without delay. Over time, as more tracking data is collected the cloud controller may then switch to more sophisticated techniques that instead dynamically adjust delay intervals based on factors such as the rate at which the cloud controller is receiving file data from the cloud and the rate at which a client is requesting file data. For instance, in the context of FIG. 33B, cloud controller 3302 may also delay responses to subsequent data requests for newly-cached data (e.g., adjusted delay interval 3308) based on the rate at which subsequent file data is being received from cloud storage system 302. In one example, a cloud controller may throttle responses to a client based on an estimated percentage of available network bandwidth, the percentage of data blocks for the target file that have been received from the cloud storage system, the total amount of remaining data that remains to be downloaded, and other additional factors.

In some embodiments, a cloud controller adaptively decreases and/or increases the delay interval for data blocks sent to a client as needed. For instance, as described above, a cloud controller receiving a request from a client determines how much of the file's data is cached locally. Upon detecting that not all of the file's data blocks are cached locally, the cloud controller starts out with an initial delay interval (e.g., 20 seconds per data block) and measures how long it takes to retrieve the remaining uncached data blocks of the file. More specifically, while delaying the initial responses for cached blocks, the cloud controller starts a separate thread that reads data blocks (e.g., 128 kB blocks) from a cloud storage system hosting the data blocks. This thread tracks the received blocks to determine how long each read is taking, and uses this information to compute the amount of bandwidth between the cloud controller currently and the cloud storage system. After making an initial estimate of how long it will take to retrieve the rest of the uncached data blocks (based on the initial set of received data blocks), the cloud controller can begin to adjust the delay interval to match the expected arrival rate of the data blocks. For example, upon determining how long it will take to retrieve the rest of the data blocks for the file at the current bandwidth, and assuming that the arrival rate is lower than the client timeout interval, the cloud controller can progressively reduce the delay interval; when all of the file data is cached on the cloud controller, the delay interval can be reduced to zero. Note that in some implementations, the delay interval may be decreased in fixed steps (e.g., the cloud controller may smoothly reduce the delay interval by halving the delay interval after every set of five successful data block reads). However, in some scenarios, if the time taken to retrieve blocks increases, the cloud controller may need to increase the delay interval in a similar manner to ensure that the client does not trigger request timeouts. Note also that in some implementations the set of I/O credits issued to a client may need to be reduced so that the client doesn't issue parallel requests (thereby partially bypassing the flow control being provided by the cloud controller as well as increasing the traffic congestion between the cloud controller and cloud storage system). The described techniques facilitate a wide range of data block access rates—if the arrival rate for the file's data blocks is slow, the cloud controller can keep the delay interval high to avoid client timeouts; alternatively, if the arrival rate is fast, the cloud controller can quickly reduce the delay interval to provide data to the client more quickly (while continuing to track the arrival rate to ensure that a reduced delay interval continues to be the appropriate).

In some embodiments, a cloud controller may be configured to adjust caching behavior in an attempt to balance both client performance and avoid client timeouts. For instance, in scenarios where a cloud controller is provisioned with sufficient local storage, the cloud controller may be configured to cache a larger set of initial data blocks for each file (or a specified subset of files). If such scenarios, the cloud controller can determine from an initial set of accesses whether a file is likely to be accessed in its entirety, and respond appropriately. For instance, if enough data blocks for the file are cached, a cloud controller can immediately send an initial set of requested data blocks for a file to the client, thereby allowing the client to being operating upon them without delay. In some situations, the client may only need these first few blocks, and hence the operation completes without any additional delay. If the client is indeed accessing the entire file, the cloud controller, upon receiving requests for additional data blocks of the file, can delay the transmission of the remaining cached blocks while retrieving the subsequent set of uncached blocks from a cloud storage system. This configuration reduces the delay for requests that only touch a small subset of a file's data (e.g., when a user is probing a directory) while also reducing the likelihood of timeouts for files that are accessed in their entirety. Alternatively, if the cloud controller and the cloud storage system are provisioned with substantial network bandwidth, the cloud controller may assume that every file request will lead to a complete sequential file access, and begin downloading any additional uncached data blocks for a file from the time the first cached data block for the file is accessed.

Figure 34:
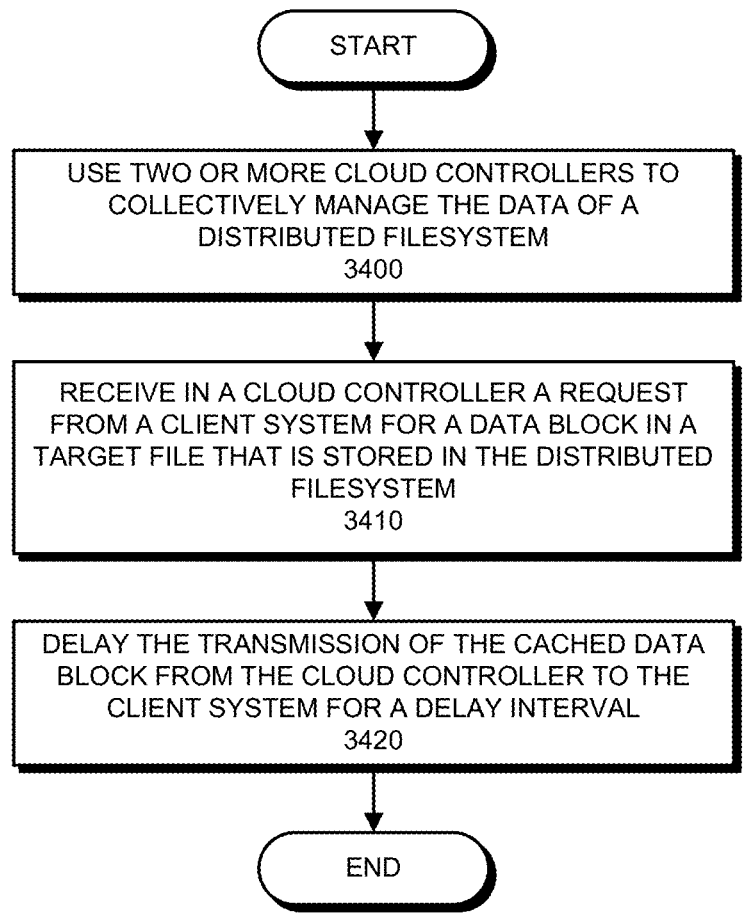
FIG. 34 presents a flow chart that illustrates the process of avoiding client timeouts in a distributed filesystem in accordance with an embodiment.

FIG. 34 presents a flow chart that illustrates the process of avoiding client timeouts in a distributed filesystem. Two or more cloud controllers collectively manage distributed filesystem data that is stored in one or more cloud storage systems (operation 3400); the cloud controllers ensure data consistency for the stored data, and each cloud controller caches portions of the distributed filesystem in a local storage pool. During operation, a cloud controller receives from a client system a request for a data block in a target file that is stored in the distributed filesystem (operation 3410). Although the cloud controller is already caching the requested data block, the cloud controller delays transmission of the cached data block for a delay interval (operation 3420); injecting this additional delay gives the cloud controller more time to access one or more uncached data blocks for the target file from a cloud storage system, thereby ensuring that subsequent requests of such data blocks do not exceed a timeout interval on the client system.

In some embodiments, an additional technique for avoiding client timeouts (that can be used in conjunction with the above-described techniques) involves adjusting the size of the cloud files that are uploaded to (and downloaded from) cloud storage systems. For cloud controllers that are located in environments with relatively low network bandwidth, using smaller cloud files allows faster download and decryption of cloud files, hence involving less delay and reducing the likelihood of a client timeout. In some implementations, cloud controllers may initially evaluate their environments and then communicate to make a concerted determination of a cloud file size based on their respective network connections and bandwidth (e.g., based on the network bandwidth of the cloud controller hosted by the slowest site). Some implementations may even support adjusting cloud file size at a later point (e.g., to accommodate one or more cloud controllers in low-bandwidth environments that are added to the distributed filesystem at a later point), although such operations may involve considerable reconfiguration overhead. Note that because each cloud file include a number of metadata fields, reducing the size of the cloud file does increase the amount of storage overhead, thereby increasing the number of total bytes that need to be uploaded and downloaded for each actual block of file data (thereby effectively reducing the maximum upload and download data rates for data files). However, in some environments, these higher storage overheads may be justified by the faster download and decryption times for smaller cloud files (while can result in lower-latency lookups for individual file blocks).

Cloud Commands for a Distributed Filesystem

As described previously, some embodiments of a distributed filesystem facilitate leveraging cloud storage capabilities while providing clients with an abstraction that all of the data in the distributed filesystem is locally available and accessible via local cloud controllers. More specifically, caching data for the distributed filesystem on each cloud controller provides transparent access to large data sets on an on-demand basis. However, in some scenarios, providing such abstractions to clients of a distributed filesystem can negatively impact performance.

Figure 35A:
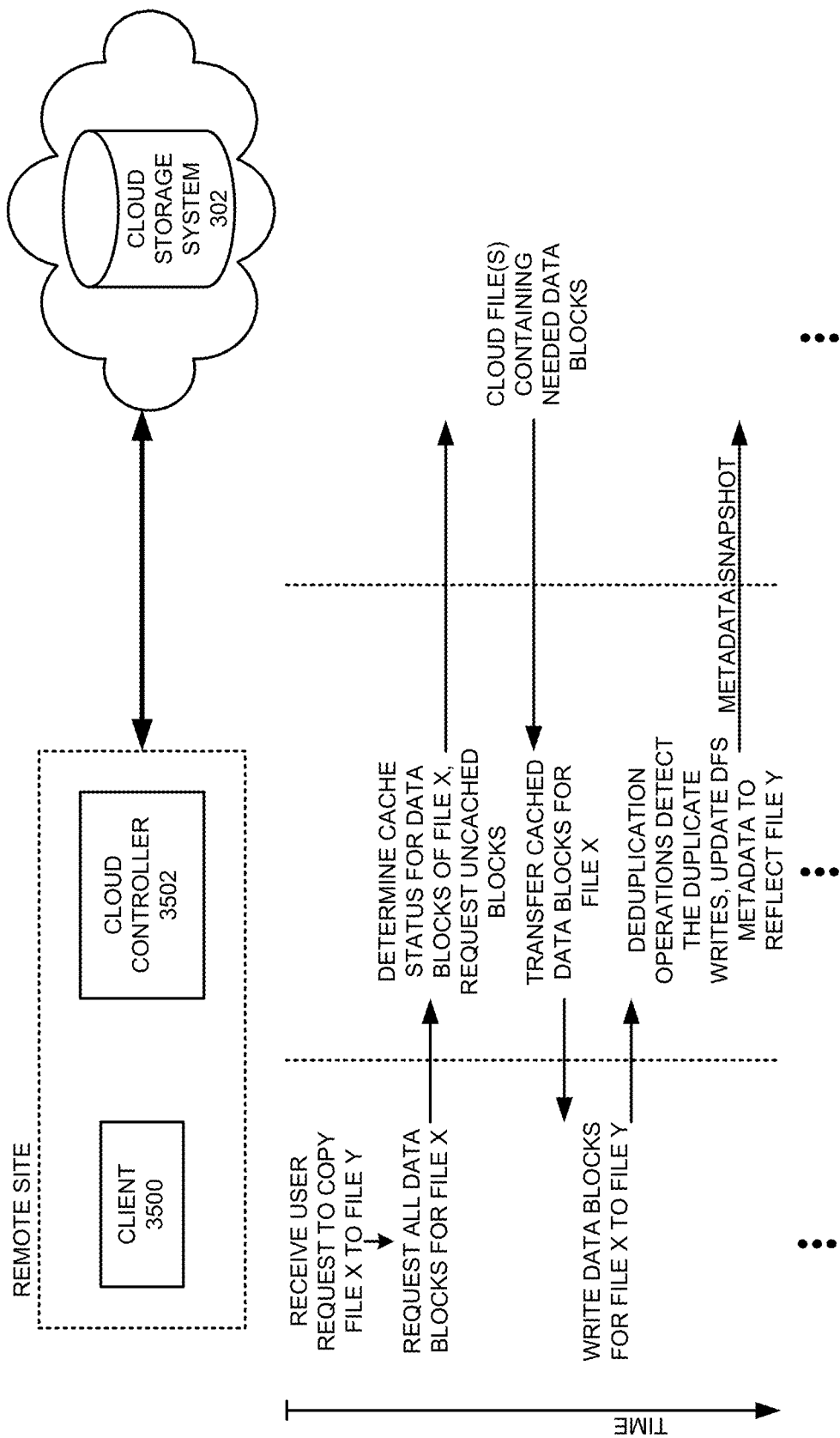
FIG. 35A illustrates a typical file copy operation in a distributed filesystem in accordance with an embodiment.

For instance, consider a typical file copy operation that is initiated by a client that transparently accesses a file stored in a distributed filesystem, as illustrated in FIG. 35A. Upon receiving a user request to copy the file ("file X") to a new, second file ("file Y"), client 3500 requests all of the data blocks for file X from cloud controller 3502, and, upon receiving these data blocks, writes them to the new file Y. Unfortunately, if cloud controller 3502 is not caching all of these data blocks, this operation may involve substantial latency and overhead (e.g., depending on the size of file X and the network connection to cloud storage system 302). More specifically, cloud controller 3502 needs to: (1) determine the cache status for all of the data blocks of file X; (2) request any uncached data blocks for file X from cloud storage system 302; (3) wait for the associated cloud files containing these data blocks to be delivered and processed; and then (4) send the data blocks to client 3500, which then writes them back to the distributed filesystem as file Y. Cloud controller 3502, upon receiving the data being written for the new file Y from client 3500: (1) performs deduplication operations for the received data blocks; (2) determines that these data blocks are duplicates of existing data blocks; (3) creates a new set of metadata for file Y that points to the existing data blocks and updates the deduplication tables to indicate the additional references to these data blocks; and (4) distributes a metadata snapshot indicating the addition of file Y to the distributed filesystem. Note that, in terms of client latency, the copy operation is not considered complete (and the new file Y is not visible to client 3500 and/or other clients) until all of the data blocks have been received by client 3500 and written back to cloud controller 3502, and all of the deduplication operations have been completed by cloud controller 3502. Thus, in some scenarios, the abstraction of transparency presented by a distributed filesystem can result in network latency and transfer delays that may lead to substantial user-perceived delay in the completion of the copy command (e.g., when large, uncached files are copied).

In some embodiments, aspects of the implementation and/or distributed nature of a distributed filesystem are exposed to one or more end users to improve the responsiveness, reliability, and/or performance of operations for the distributed filesystem. More specifically, a set of cloud-storage-aware directives (also referred to as "cloud commands") can be used to selectively perform system-aware operations that can provide substantial performance benefits and/or additional functionality over a transparent distributed filesystem.

Figure 35B:
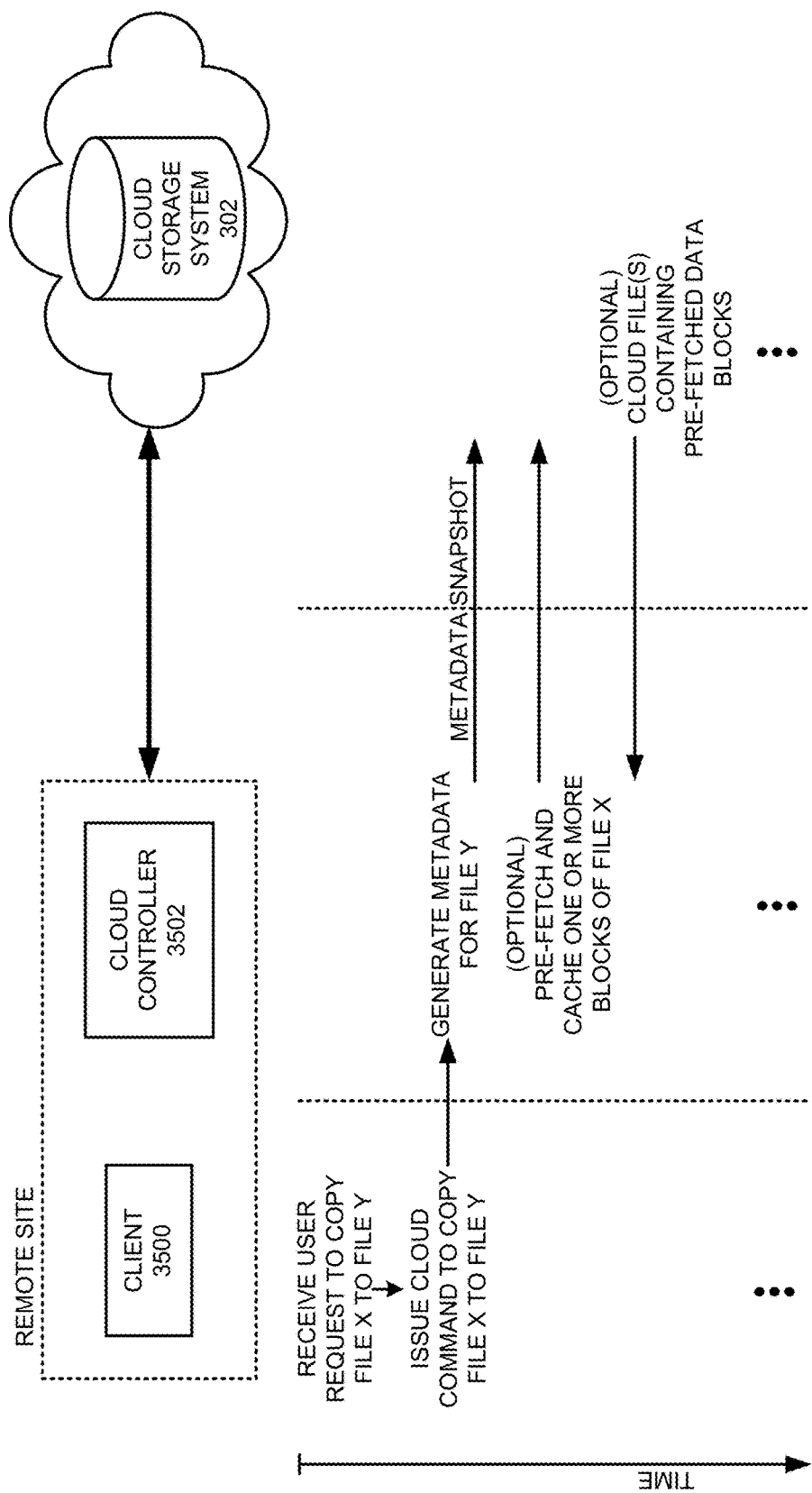
FIG. 35B illustrates an alternative "cloud-aware" file copy operation in a distributed filesystem in accordance with an embodiment.

FIG. 35B illustrates the operation of an alternative "cloud-aware" copy operation that enables users to copy files in the distributed filesystem without downloading file data from the cloud storage system. More specifically, this alternative copy operation enables users to copy files without loading the source file's data blocks from the cloud storage system. As illustrated in FIG. 35B, upon receiving a user request to copy file X to file Y, client 3500 issues a cloud command to cloud controller 3502 to perform the copy. Cloud controller 3502 receives this cloud command and uses the metadata for file X to generate metadata for the new file Y that references the same set of data blocks (while also updating the corresponding reference counts in the deduplication tables). Cloud controller 3502 then subsequently distributes a metadata snapshot that includes file Y to cloud storage system 302 and/or the other cloud controllers of the distributed filesystem. Note that this cloud-aware copy operation can complete substantially faster than the copy operation illustrated in FIG. 35A; not needing to read all of the file's data blocks from the cloud storage system to the cloud controller and then on to the client system substantially reduces network bandwidth and delay, thereby allowing the copy command to complete more quickly than in the example of FIG. 35A (and substantially reducing user-perceived command execution time).

In some scenarios, a user request to copy a file may indicate that one or both files will be accessed and/or modified soon. Hence, in some instances, a cloud controller may optionally be configured to begin pre-fetching part or all of a file that has been copied via a cloud-aware copy operation. For instance, in the context of FIG. 35B, the cloud controller 3502 receiving the copy command may pre-fetch one or more initial data blocks in file X to ensure that at least some of these blocks are already available upon user access. In the copy operation described for FIG. 35A, the copy operation does result in loading all of the file's data to the client and cloud controller (hence potentially making that data available in local caches for subsequent operations), but may take a considerable amount of time to complete. In contrast, the cloud-aware copy operation described for FIG. 35B completes quickly (thereby providing quick response from the user perspective), after which needed data blocks can be either pre-fetched or loaded as specified (e.g., using a locality policy) and/or on an as-needed basis, Hence, the cloud-aware copy command both improves command response (from the user perspective) while providing a range of flexibility in choosing whether to transfer and load data blocks for the copied file.

In some embodiments, cloud commands can be initiated using a range of invocation mechanisms. For instance, in some embodiments, client applications can be configured to communicate directly with a cloud controller to invoke a cloud command (e.g., using CIFS private filesystem controls (FSCTLS)—private filesystem controls provide a mechanism for extending existing filesystem protocols). In alternative embodiments, cloud commands may be initiated using an enhanced filesystem interface and abstraction. More specifically, cloud controllers may use a filesystem abstraction to present clients with additional files and directories that do not actually represent stored data, but instead represent cloud commands that can be executed to perform cloud-aware operations.

Figure 36:
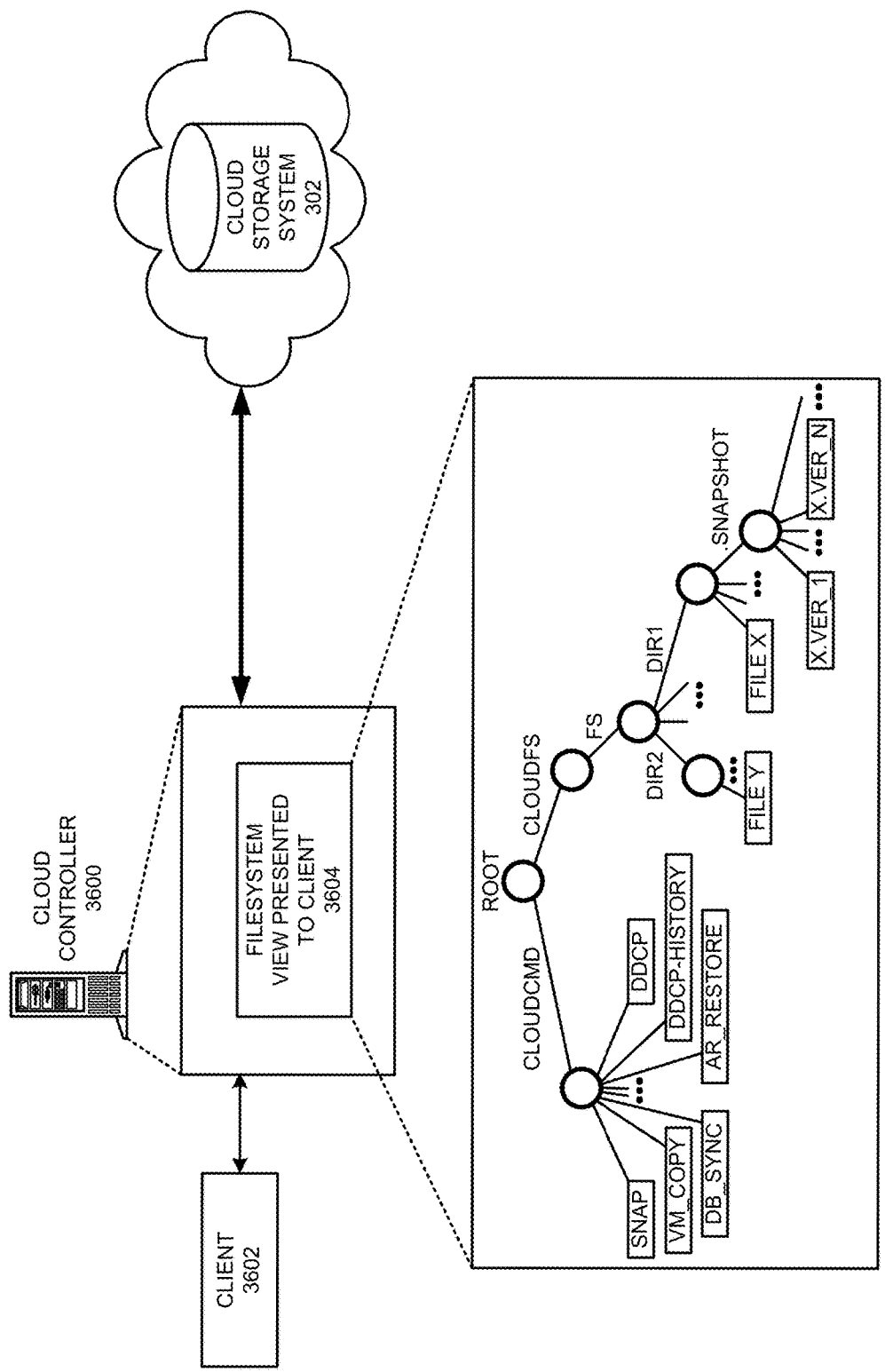
FIG. 36 illustrates a cloud controller that uses a filesystem abstraction to present a set of cloud commands to a client system in accordance with an embodiment.

FIG. 36 illustrates a cloud controller 3600 that uses a filesystem abstraction to present a set of cloud commands to client 3602. The filesystem view 3604 presented to client 3602 includes a sub-hierarchy comprising a filesystem of data files (the "CLOUDFS" branch) as well as a separate sub-hierarchy (the "CLOUDCMD" branch) that does not comprise actual data files composed of data blocks that are stored in cloud storage system 302, but instead comprises cloud commands that can be used to initiate cloud commands. For instance, such "cloud command files" may be executed by end-users either directly (e.g., via a command line), via scripts, via client-based applications, or via other mechanisms. For example, for the exemplary cloud-aware copy operation described for FIG. 35B, a user may execute a command-line cloud command such as:

echo/cloudfs/fs/dir1/f1/cloudfs/fs/dir2/f2>/cloudcmd/ ddcp, which specifies a source file and a destination file as arguments for a specific cloud command (e.g., a cloud-aware "deduplication copy", or "ddcp") that operates upon the two files. The cloud-command sub-hierarchy may also comprise one or more additional "status files" that can be accessed to determine the status and/or output of executed cloud commands.

In some embodiments, a cloud controller may be configured to manage the items in the cloud-command sub-hierarchy using filesystem mechanisms and abstractions. For instance, in the context of FIG. 36, cloud controller 3600 may be configured to adjust the set of cloud commands and status files that are presented to a given client depending on the identity (e.g., a user or group identifier) and permissions associated with an accessing user. For example, upon detecting an access to a cloud-command directory, a cloud controller may determine the identity of the accessing user, and only present client 3602 with (1) a set of cloud commands that an administrator has given the user access to execute and (2) the output of executing (or previously executed) cloud commands that were executed by (or authorized to be viewed by) that specific user. Alternatively, a user may be allowed to view the full set of cloud commands, but only execute (or see the status information for) a selected subset. In this manner, the cloud controller can customize the set of cloud-command data that is made visible to each user. For example, every user accessing the CLOUDCMD directory may see a status file named "DDCP-HISTORY" that lists the status of currently executing and/or a history of previously-executed cloud-aware copy operations; the cloud controller may dynamically generate this file on a per-user-access basis to generate user-specific (and user-appropriate) output. Hence, multiple users accessing the cloud-command sub-hierarchy of the distributed filesystem (from the same or different clients and/or cloud controllers) may simultaneously access the same file but receive different per-user output and command feedback.

In some embodiments, a set of cloud commands may be made available to privileged users of a distributed filesystem to enable (or improve the performance of) a set of operations that would otherwise be infeasible. For instance, a system administrator or IT (information technology) staff member that is conversant with the organization of the distributed filesystem may write a script that can be executed by authorized users to invoke one or more cloud commands to complete a specific task. For example, one exemplary operation of this type might involve a large copy (e.g., or terabytes of data) that might saturate a corporate network for several days if not executed using a cloud-aware copy command. More specifically, consider a common distribution operation in a software development build environment. Application developers may initiate a "release" operation that copies a large number of executable binary files and supporting libraries to an export directory in a workflow hand-off to one or more other (local and/or remote) teams that then perform additional operations for the files (e.g., application testing, language localization, etc.). Using a script that leverages cloud commands (e.g., cloud-aware copy commands) allows the files to be copied in a fast and seamless manner regardless of whether they are already cached by the cloud controller. The use of cloud commands enables the copy to complete quickly, thereby allowing the metadata for the copied files to propagate to the other cloud controllers quickly. Locality policies can be used to selectively pre-load (or not pre-load) the data blocks for the copied files at other sites (e.g., at each given site's cloud controller) based on the anticipated immediacy of use, with each receiving team then accessing the files normally via the distributed filesystem. As described previously; any cloud controller already caching data blocks for the "released" files (potentially due to previously-accessed data blocks from other file data blocks containing the same content) can already serve these same data blocks to clients accessing the new export directory, or can load uncached data blocks from the cloud storage system as needed.

Figure 37:
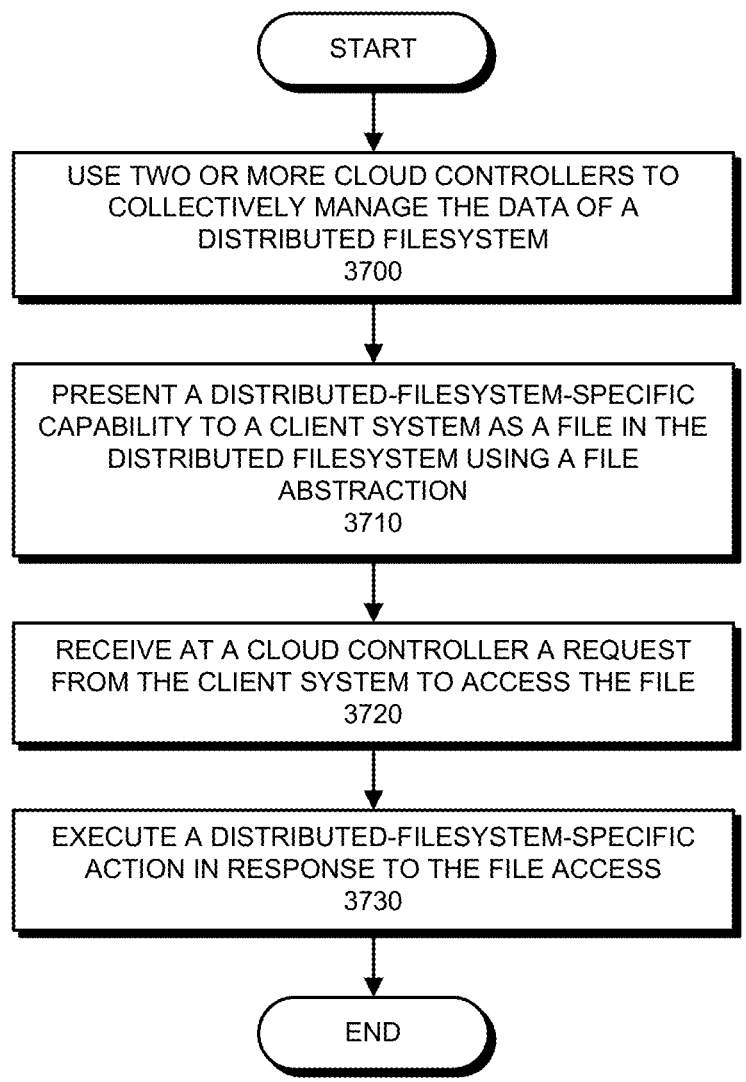
FIG. 37 presents a flow chart that illustrates the process of executing a cloud command in a distributed filesystem in accordance with an embodiment.

FIG. 37 presents a flow chart that illustrates the process of executing a cloud command (also referred to as a distributed-filesystem-specific action). Two or more cloud controllers collectively manage distributed filesystem data that is stored in one or more cloud storage systems (operation 3700); the cloud controllers ensure data consistency for the stored data, and each cloud controller caches portions of the distributed filesystem. During operation, a cloud controller presents a distributed-filesystem-specific capability to a client system as a file in the distributed filesystem (e.g., using a file abstraction) (operation 3710). Upon receiving a request from the client system to access and/or operate upon this file (operation 3720), the client controller executes an associated cloud command (operation 3730). More specifically, the cloud controller, upon receiving the request, detects that the file access involves a file that represents (e.g., is associated with) a cloud command (and hence is not a read or write access for a typical data file), and initiates a set of cloud command event handlers and/or program instructions that perform the enhanced distributed-filesystem actions that are associated with the invoked cloud command.

In some embodiments, cloud commands can be used to perform and/or enhance a set of distributed filesystem operations that include, but are not limited to:
 performing user-initiated snapshot operations;
 specifying locality policies;
 snapshotting and cloning virtual machines;
 synchronizing and backing-up database application data;
 moving data to archival storage; and
 recovering data from archival storage.

In some embodiments, cloud commands enable users to initiate a snapshot for some or all of a distributed filesystem at a given moment in time. For instance, a user completing some unit of work upon a set of files may want to ensure that a snapshot of those modified files be created immediately instead of at a system-chosen time (e.g., so that the state of those files and/or the entire distributed filesystem at that specific point can be revisited if needed in the future). Note that the computing and storage overhead for a snapshot operation may vary depending on the extent of the distributed filesystem being snapshotted. As described previously, global snapshots for a distributed filesystem can be achieved by initiating a snapshot operation in each cloud controller and then triggering a set of update events that share the resulting snapshot state between the cloud controllers (via incremental metadata snapshots), thereby effectively capturing the entire state of the distributed filesystem at that moment. However, such global snapshot operations may involve considerable overhead, and frequent user-initiated global snapshots may result in the exchange or capture of substantial amounts of data (e.g., temporary data) that might otherwise might not be snapshotted or transferred throughout the system. The time interval for periodic system snapshots may be tuned to ensure that global data and metadata for temporary data is typically deleted before being snapshotted.

In some embodiments, to ensure that user-initiated snapshots do not contribute to declines in distributed filesystem performance, an administrator for a distributed filesystem may limit the scope of snapshots that can be initiated by a given user (via cloud commands). For example, an administrator may configure a set of permissions for each user to specify whether a user may initiate snapshots, and specify whether snapshots initiated by a given user are: limited to that user's portion of the filesystem; limited to a specified set of files; or unlimited (e.g., can snapshot the entire distributed filesystem). In some scenarios, a user may also be allowed to specify the scope of the snapshot when initiating a snapshot cloud command. In another exemplary scenario, an administrator may limit the frequency with which a user may initiate snapshots or specify a minimum time interval between user-initiated snapshots.

Note that techniques for using cloud commands to initiate snapshots and/or grant permissions to initiate snapshots may be implemented using a range of techniques. For instance, a system administrator may use command-line cloud commands such as:
 echo "permit write <username> <path>">/cloudcmd/snap
to grant a specific user (specified as "<username>") permission to initiate cloud commands that perform snapshots on all or part (specified using "<path>") of the distributed filesystem. A user receiving such permissions can then initiate desired snapshot operations via any client, application, or other interface. For example, a user may initiate a snapshot for the entire distributed filesystem or a specified sub-hierarchy by performing the following exemplary command-line cloud commands:

```
echo "execute" > /cloudcmd/snap , or
echo "execute /cloudfs/fs/dir1" > /cloudcmd/snap .
```

Note also that exposing the notion of snapshots to users may involve providing some additional information and/or capabilities associated with snapshots to users and clients of the distributed filesystem. For instance, in some embodiments cloud controllers may expose information and/or different versions of snapshotted files to clients and users using a set of user-visible snapshot directories. In some implementations, such snapshot directories may be organized as separate file hierarchies (for each given snapshot) that can be traversed by clients (or users) that have permission to access that snapshot; more specifically, these file hierarchies can be traversed to access file state at the time of the given snapshot (and may involve using additional cloud commands to restore a previous snapshotted version of a file). Alternatively, in other implementations, every filesystem directory may include a hidden snapshot directory (e.g., a directory named ".snapshot") that facilitates accessing the different versions available for files in each given filesystem directory. For example, in the context of FIG. 36, the directory /cloudfs/fs/dir1 includes the most recent version of file X and a hidden snapshot directory .snapshot that includes multiple snapshotted versions of files in the dir1 directory (e.g., snapshots of previous versions file X, X.VER_1 through X.VER_N, as illustrated, as well as snapshotted versions of other files in the dir1 directory); these files may be identified by date and time (e.g., X.2013_06_20-13:21) to facilitate identification and access. This implementation integrates the snapshot hierarchy into the distributed filesystem structure, thereby allowing client applications and/or users to browse through available snapshotted versions of files without needing to traverse multiple different snapshot hierarchies. In some implementations, cloud controllers may further be configured to only show (and/or only allow access to) snapshot directories and/or hierarchies to users, clients, and/or applications that have been granted sufficient permissions to access and/or create snapshots for the distributed filesystem.

In some embodiments, a filesystem interface for the distributed filesystem can also be used to specify locality policies. More specifically, cloud commands can be used to implement, complement, and/or expand upon the capabilities of locality policies. For instance, command-line cloud commands may be used to identify files and/or directories to be: pinned on one or more cloud controllers; mirrored to one or more additional cloud controllers; immediately loaded to any cloud controller that is accessed by a given user and/or client; and/or subject to a range of other behaviors.

In some embodiments, cloud commands can be used to enhance the operation of virtual machines executing in the distributed filesystem environment. During normal operation, executing a virtual machine involves copying the virtual machine's executable code, executing the executable code, and performing a number of initialization operations. In contrast, cloud commands can facilitate quickly copying and/or cloning existing virtual machines. For example, a system administrator for the distributed filesystem may perform the initial execution and initialization for a virtual machine, and then perform a snapshot for the state and the data of the virtual machine (e.g., using a cloud command) after the initialization operations have completed. Users can then subsequently use another cloud command (e.g., /cloudcmd/vm_copy) to clone this existing virtual machine, thereby bypassing the overhead of instantiating a new virtual machine. Note that these techniques may incorporate aspects of the above-described cloud-aware copy command.

As described previously, virtual machines that are being executed from the distributed filesystem may be configured to write runtime and/or operating data into the distributed filesystem. In this context, cloning a virtual machine may involve performing such cloud-aware copies to copy all of the data for the snapshotted virtual machine to a new directory, and then having the new clone of the virtual machine begin execution in this new directory. If the host cloud controller is already caching the data blocks for the snapshotted virtual machine, the new clone of the virtual machine will already have access to all of its needed data, and can begin executing immediately (e.g., the copy-on-write properties for the distributed filesystem mean that each cloned virtual machine will initially have the same characteristics and data blocks as its "parent" virtual machine, and that only modified portions of the cloned virtual machine will need to be subsequently written to the cloud storage system). Hence, cloud commands can be used to substantially improve the start-up times of virtual machines. For instance, users may use cloud commands in a scripting manner to programmatically create (e.g., clone) a large number of virtual machines without requiring any additional data storage.

In some implementations, a parent virtual machine (or multiple different parent virtual machines) may be created in a separate, dedicated filesystem or sub-hierarchy of a filesystem, thereby logically separating the virtual machine data from other unrelated data and facilitating subsequent cloning operations for one or more virtual machines. Note that, as described previously for backing-up virtual machines, some sub-portions of the virtual machine data (e.g., temporary files) may not be needed for the cloned virtual machines; the vm_copy command and/or scripts may be configured to exclude such unneeded data, or a system administrator may configure the parent virtual machines to store this unneeded data in a different portion of the distributed filesystem (e.g., in a location distinct from the dedicated storage areas that will be cloned).

In some embodiments, cloud commands can be used to enhance the operation of database applications executing in the distributed filesystem environment. A database "dump" operation (e.g., backup) typically involves writing out all of the data contents of the tables in the database to one or more files that are structured for backup purposes; note that these files are structured differently from how an active database typically stores data on a disk storage device. Creating such backups involves bringing the database into a quiescent state (e.g., pausing all incoming queries or other requests and flushing all modified data in memory to persistent storage) to ensure that the database data is in a consistent state, and then writing out the full set of (consistent) database data to perform the actual dump operation. In contrast, for a database application executing in the context of a distributed filesystem, all of the database data blocks that are written to the distributed filesystem can be preserved in the cloud storage system persistently, thereby allowing subsequent database applications to be restored to a previous state as needed (e.g., after the database application has crashed) without needing to perform a dump operation. However, the database application does still need to synchronize all in-memory data to the distributed filesystem so that all of the database data is consistently stored in a set of data blocks at a given time. A cloud command (e.g., /cloudcmd/db_sync) may be used to trigger the database application to perform such a synchronization operation. For example, a system administrator may use this synchronization cloud command followed by a snapshot cloud command to put the database into a consistent state and then ensure that an explicit snapshot is made of that consistent state; all updated data blocks written by the database application are then propagated to the cloud storage system using the previously described mechanisms, thereby effectively ensuring that the data used by the active database application is mirrored (and backed up) without incurring the additional overhead and database down time associated with performing an explicit dump operation.

In some embodiments, cloud commands can be used to both archive data that is not currently needed in the (active, non-archived) distributed filesystem to an archival cloud storage system as well as to retrieve and access archived data that has been previously moved to an archival cloud storage system. As described previously, data blocks may be moved to such an archival cloud storage system after not being accessed for some specified time interval. Alternatively, a user may also use a cloud command to identify specific files that can already be archived, for instance by performing the following exemplary command-line cloud commands:

```
echo"/cloudfs/fs/dir1" > /cloudcmd/archive , or
/cloudcmd/archive /cloudfs/fs/dir1 .
```

While previous sections describe having an administrator of the distributed filesystem recover archived files and/or data blocks, in some embodiments cloud commands may also offer an alternative for recovering archived data. For example, cloud controllers may be configured to preserve the metadata for archived file data, continue to present archived files to (authorized) users, and enable (authorized) users to initiate the recovery of archived files via cloud commands. The following section describes techniques for restoring archived data in more detail.

In some implementations, permissions and authentication for a distributed filesystem are provided using standard authentication techniques (e.g., an Active Directory service, an NT LAN Manager (NTML), the Kerberos protocol, etc.). Cloud commands for the distributed filesystem can be implemented to leverage such existing authentication techniques as well as existing filesystem abstractions. More specifically, users attempting to access cloud command functionality can do so via existing filesystem mechanisms (e.g., initiating cloud commands by invoking special files or scripts that appear in the CLOUDCMD branch of the distributed filesystem, as described above) and can be authenticated using their existing user names and credentials. These capabilities allow system administrators to delegate cloud command permissions using existing filesystem commands and permissions, thereby allowing trusted users to perform some management activities and potentially reducing the load upon IT staff. Note that in some scenarios users may also be granted the permission to delegate privileges to other users. For instance, a system administrator may grant a trusted user both the permission to invoke snapshots as well as the permission to grant the permission to invoke snapshots to other users. This trusted user can then grant the permission to invoke snapshots to a third user without requiring further interaction or permission from the system administrator.

In some embodiments, presenting cloud commands using a filesystem abstraction facilitates providing additional capabilities for the distributed filesystem without requiring additional infrastructure or support in a client of the distributed filesystem. For instance, using the filesystem abstraction to initiate cloud commands does not require a client to access any additional ports or connections in a cloud controller, nor perform additional authentication operations. Because all commands flow through the filesystem, no additional firewall rules are needed between clients and cloud controllers (e.g., in scenarios where the two entities are separated by one or more firewalls). Furthermore, using the filesystem abstraction to invoke cloud commands is distinct from alternative techniques that use client plug-ins to perform management operations for the distributed filesystem. Vendors associated with the distributed filesystem no longer need to implement additional security features or create application plug-ins to provide additional functionality; invoking cloud commands via the filesystem abstraction allows the set of cloud commands to be changed and/or expanded without having to modify clients, client plug-ins, or the client/cloud-controller interface.

Restoring Archived Data for a Distributed Filesystem

As mentioned in the previous section, cloud commands can be used to retrieve and access archived data that has been moved from the (active) distributed filesystem to an archival cloud storage system. In some embodiments, the distributed filesystem may be configured to expose the availability of archived files (as well as other filesystem status information) to clients and users using either separate file hierarchies with archived data or hidden per-directory archive directories (e.g., by including in every existing directory a sub-directory named ".archive" or ".policy" that provides additional archival and/or status information for the parent directory), thereby exposing the notion of archived data in a manner substantially similar to the way snapshots were exposed in the preceding section. More specifically, a cloud controller presenting a view of the distributed filesystem to a client could present archived data files via such mechanisms, and allow (authorized) users accessing such archive directories to initiate requests to restore such archived files. For example, users may be able to enable or disable the view of archived files via a cloud command menu. Upon receiving a request from a user to access an archived file (e.g., via a command-line interface, a file browser, or some other mechanism), the cloud controller receiving the request may present the user with a set of options for restoring the file. Note that such accesses enter the domain of cloud commands in that at this point the file request is no longer returning actual file data (at least initially), but instead involves additional filesystem operations that expose the underlying nature of a distributed filesystem (e.g., archival cloud storage systems) and/or give the user a set of choices before providing the requested file data.

In some embodiments, cloud command interfaces also facilitate exposing additional information about the operation of and the current status of files in the distributed filesystem; this information can then be used to make informed decisions for restoring archived files or other operations. Filesystem protocols typically provide a standardized set of information for files (e.g., the name of a file, the file's size, and the last time the file was accessed), but the set of file metadata that is shared between clients and servers is often limited. Furthermore, the process of adding new information into a standard filesystem protocol is typically quite complex, thereby making extending such protocols to convey additional information related to the status of a distributed filesystem challenging. As an alternative, the distributed filesystem can leverage cloud command interfaces and status directories (e.g., .archive or .policy directories) to share information about files that cannot otherwise be conveyed using a normal filesystem protocol. For instance, information in a .policy directory may specify (but is not limited to):

the last time a file was snapshotted;
whether the file has been replicated (e.g., how many times each data block in the file is referenced in the distributed filesystem);
whether the file's data has been written to a cloud storage system already, or, if not, how much of the file's data still needs to be written to the cloud storage system;
how much (and potentially which specific subset) of the file's data is currently locally cached in the current cloud controller, and estimate how long it would take to receive the rest of the file's uncached data blocks given current cloud controller and network load;

whether the file has been archived, and if so, estimates of how long it would take and/or how much it would cost to restore the file's data; and any other relevant status information for the file.

The ability to access such information allows users and system administrators to set realistic expectations for file operations and plan accordingly. For instance, a user may be able to determine: (1) that only 1% of a needed file is available locally, and that the rest of the file data will take 2 hours to download from a cloud storage system; or (2) that a given file has been written but not yet completely uploaded to the cloud storage system, and will require another 4 hours to be completely uploaded given the currently available network bandwidth. Conveying status information to interested users can potentially reduce user frustration, for example by providing accurate estimates of data availability and indicating the causes of file access delays. The availability of such status information can also lead to the adoption and formation of associated locality policies.

Note that such status information may be updated using a range of update techniques. For example, keeping such status information up-to-date on every cloud controller for every data file in the distributed filesystem may involve substantial overhead (especially if the underlying files and file information change frequently). Instead, the system may be configured to populate such status information on demand, thereby only determining, retrieving, and/or populating the status information for a specific target file only when a user accesses the placeholder for that file in an associated .policy directory.

In some embodiments, the set of archival operations that are presented to users may vary based on policies and economics associated with the distributed filesystem and/or one or more cloud storage providers. For instance, system administrators may provide a specific set of archive and restore options based on a cloud storage provider's billing model. Such an arrangement gives users some control of the set of data that is kept in the distributed filesystem (thereby reducing the number of user archive and restore requests submitted to the system administrators), while also allowing system administrators to control the costs of restore operations.

In some implementations, accessing archived files data via cloud commands may involve choosing between a set of economic and performance choices. For instance, an archival cloud storage system may provide a range of price options and recovery times for a given set of archived data blocks. For example, accessing the requested data immediately may cost a certain amount, receiving the requested data within a week may cost a second (presumably lower) amount, and receiving the requested data for free may also be possible but incur an even longer time delay. Upon receiving a request from a user for an archived file, a cloud controller may determine the set of access options, and communicate these options back to the requesting client for resolution. In some implementations, this decision process may involve: (1) a user initiating a cloud command requesting access to an archived file (e.g., via a command-line /cloudcmd/ar_restore command or a file browser that selects an archived file); (2) the cloud controller determining a set of access options and costs; (3) the cloud controller returning the set of access options and cost choices to the user by initially writing the set of access choices as the contents of the archived file (or to a status file in the cloud-command sub-hierarchy); (4) the accessing user receiving and viewing these file contents, and choosing the desired access choice (e.g., by deleting the unwanted options from the file and then performing a file write); (5) the cloud controller receiving the write for the archived file, determining that this write is for an archived file being restored, and initiating the recovery operation from the archival cloud storage system according to the selected access choice; and (6) after the unarchiving operation has completed and the (non-archival) cloud storage system and/or the cloud controller have received the previously archived data blocks, having the distributed filesystem optionally notify the user of the availability of the now-unarchived file (e.g., by updating the status file or performing some other notification action). Note that this exemplary implementation is substantially similar to the cloud-aware copy command in that the user immediately receives an immediate response (with a set of access choices) for an archived file containing data that is not immediately retrievable, in contrast with an alternative approach that instead immediately initiates an unarchiving process (which may take multiple days to complete), thereby potentially providing a negative user experience. However, the described decision process is exemplary, and the process of unarchiving an archived file using cloud commands (and presenting a set of access options and receiving a user selection) may be implemented using a range of other techniques and interactions.

The preceding example describes allowing users to choose among a range of restore options. In many scenarios, however, system administrators may allocate (or be allocated) a fixed "restore budget," and a large set of users may not be trusted to manage this budget fairly. For instance, consider an archival cloud storage provider that bills based on the maximum restore rate used at any one moment in a given month. In such a scenario, system administrators may be granted a fixed restore budget (e.g., $1000/month) that limits that maximum restore rate for all user accesses over that time period. Given this limitation, the system may be configured to offer only a single restore option to users attempting to restore archived files and track the set of outstanding restore requests to provide users appropriate time estimates for such retrieval requests. In situations where a file is needed more quickly, the distributed filesystem may configured to (either with or without system administrator intervention) either increase the restore budget (to make outstanding restore requests clear more quickly) or adjust the schedule and/or priority of outstanding restore operations to effectively boost the restore of a higher-priority file.

Figure 38A:
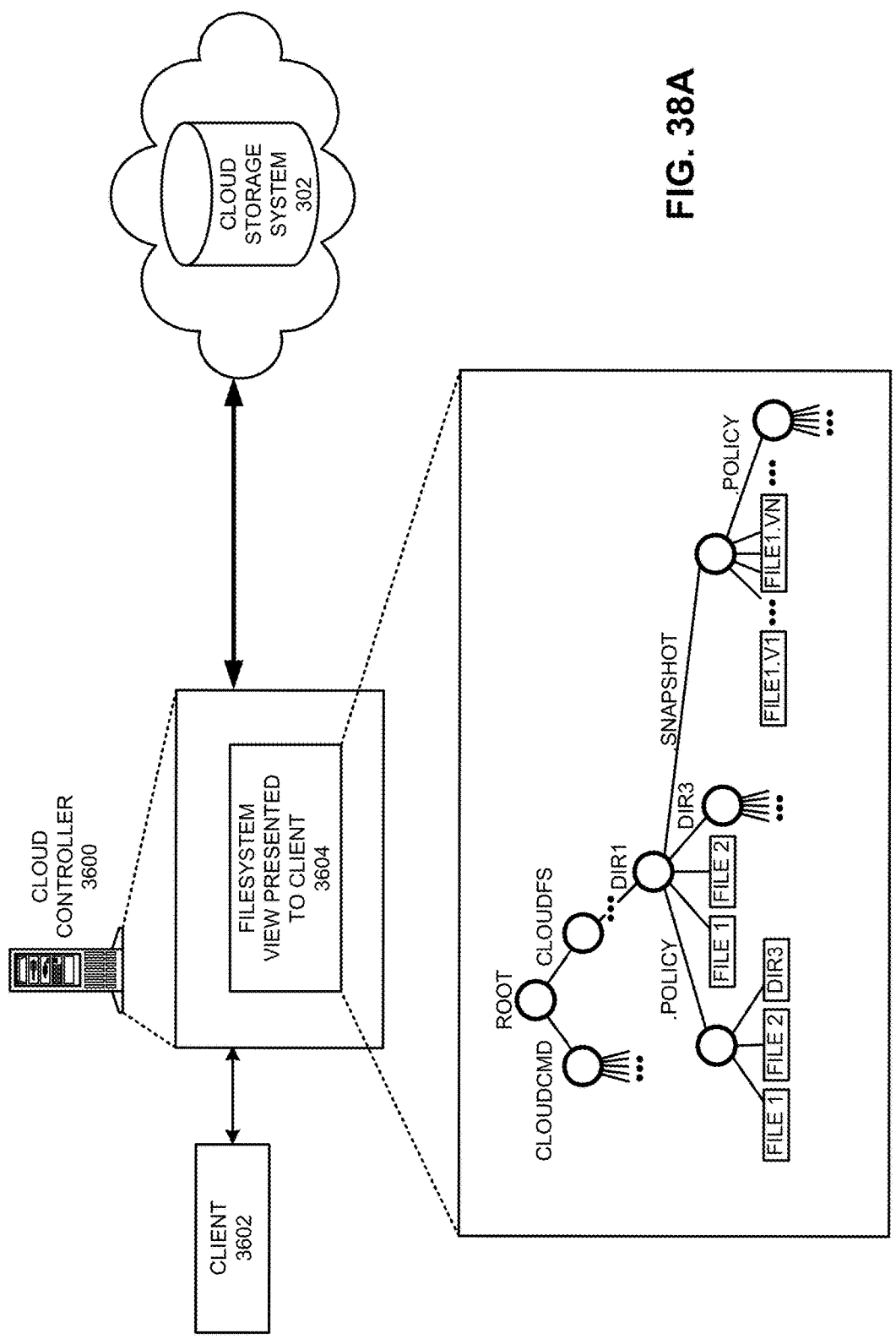
FIG. 38A illustrates an exemplary environment for an archival restore operation for a distributed filesystem in accordance with an embodiments.
Figure 38B:
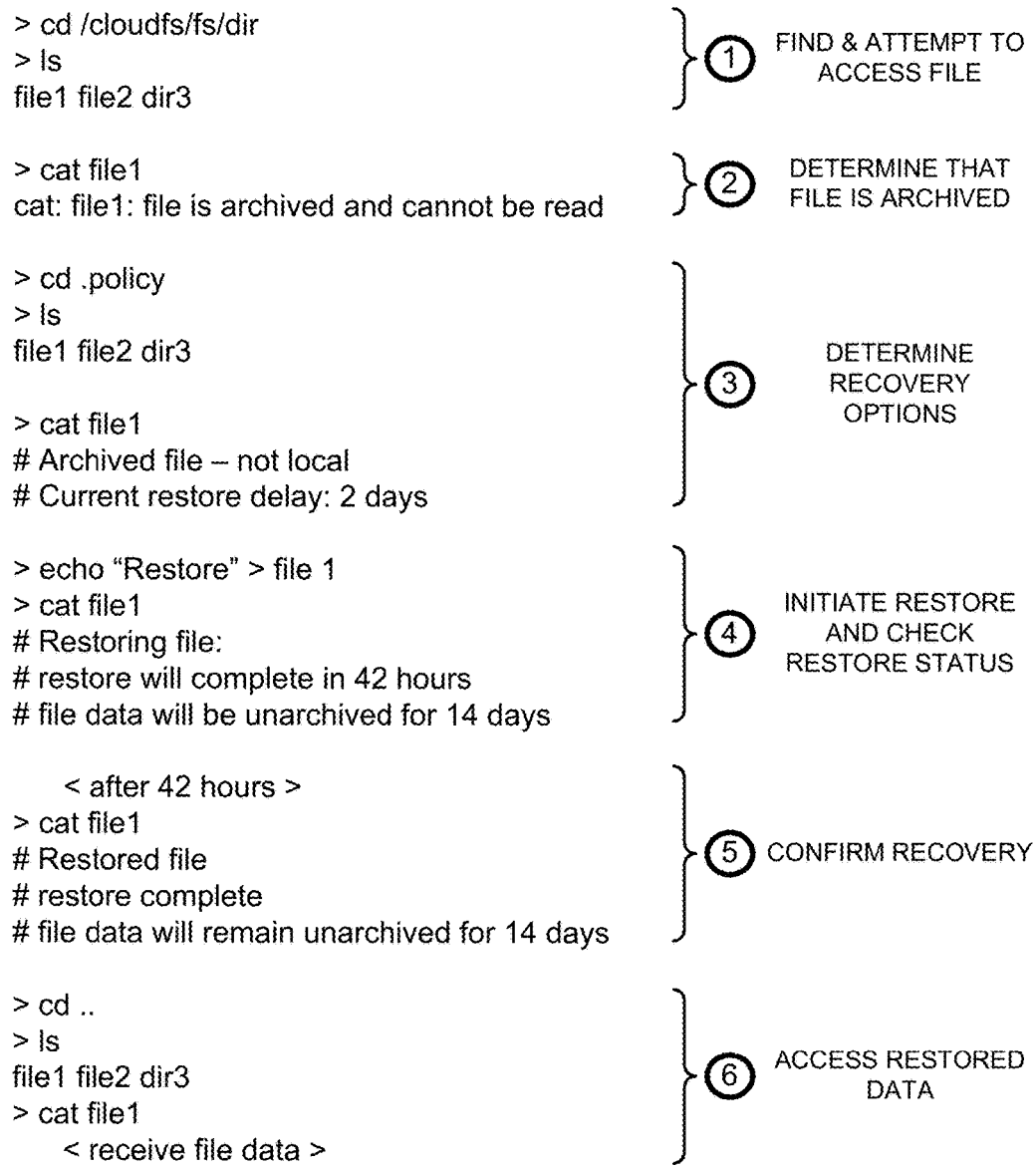
FIG. 38B illustrates an exemplary archival restore operation for a distributed filesystem in accordance with an embodiment.

FIGS. 38A-B illustrate exemplary scenarios for an archival restore operation in a given directory (/cloudfs/dir1) of a distributed filesystem. As illustrated in FIG. 38A, the dir1 directory includes two files (file1 and file2) and three sub-directories (.policy, dir3, and .snapshot). A user accessing this directory may further access status files of the same name in the .policy directory (e.g., files file1 and file2 in the .policy directory) to determine additional status information for the associated data files in the parent directory. For instance, the user may be able to determine from these status files information that includes (but is not limited to): whether the associated data files have been written to the cloud; how much of each associated data file is currently stored in the local cloud controller; the status of any operations for the associated data file; and/or status for the associated data file that is specific to a cloud storage system or an archival cloud storage system. If the data files file1 and file2 are currently archived, a user browsing dir1 may receive some visual indication of this archival status, and (if authorized to perform archival restore operations) can then navigate to the .policy directory to determine restore options (e.g., an expected restore time interval and cost) and initiate the restore operation, if desired. Note that a cloud controller can dynamically populate the information presented via status files in the .policy directory based on a range of factors that include the implementation of the distributed system, locality policies, and/or the set of permissions associated with an accessing user. For example, in some scenarios a cloud controller may inform a user (via a status file) of restore information that details how many restore operations are currently pending, including the specific set of users initiating the requests, the specific files being restored, and the expected restore times; this detailed view may, for instance, be appropriate for a system administrator who is considering how to adjust the priorities of a given set of files being restored. In other scenarios, the status file may instead be constructed to simply inform the user of an expected time of arrival for the archived file under consideration that is based on the distributed filesystem's current set of operating parameters.

FIG. 38B illustrates an exemplary command-line process for restoring an archived data file (file1 from FIG. 38A) in more detail. A user browsing through the filesystem finds and attempts to access the data file (operation 1), and receives a message indicating that the data file is archived (operation 2). The user accesses the .policy directory to determine the set of recovery options for the data file, and is informed that the current restore delay is two days (operation 3). The user decides to initiate a restore operation for the data file, and checks the associated status file in the .policy directory to confirm that the restore operation has been initiated successfully (operation 4). After the specified time interval has elapsed, the user can confirm that the data file has been restored (operation 5), and can proceed to access the restored data (operation 6). Note that the system may limit the amount of time that restored data is kept (e.g., restored data may be kept until a future archive operation, or may only be maintained for a set time interval, as illustrated in the exemplary status message of operation 5 in FIG. 38B). Note also that As described above, authorized users can perform restore operations for individual files. In some embodiments, users may also be provided abstractions that allow them to restore larger portions of a filesystem sub-hierarchy in a single operation. For instance, as illustrated in FIG. 38A, a .policy directory may also include a status file that describes a sub-hierarchy associated with a given sub-directory. Users can access this status file in a similar manner to see the status summary for all of the files and sub-directories of that directory. For example, a user accessing the .policy/dir3 status file illustrated in FIG. 38A may determine that the directory hierarchy underneath this directory is archived, contains 500 Mbytes in total, and would take one week to restore. The user can then execute a restore command upon this status file (as a shortcut) to initiate a restore operation for all of the archived contents of the sub-directory structure. An abstraction that allows users to perform such "batch" operations that determine status information for (and perform operations upon) entire directories can substantially reduce user overhead (e.g., compared to having to navigate to the .policy directory of each archived file and restore each file individually). Note that in situations where only part of a sub-hierarchy is archived, such a status file may include status information for both archived and unarchived data (e.g., both indicate the set of files and/or percentage of data that is archived, along with an estimated restore time interval, as well as the cache availability information for the portion of the sub-hierarchy that is not archived).

In some embodiments, users can be granted the ability to also recover archived snapshot data. As described previously, the distributed filesystem may be configured to take, distribute (to other cloud controllers), and preserve both user- and system-initiated snapshots of modified data. The size of the snapshot data preserved in the distributed filesystem may become substantial over time, and hence the cloud controllers managing the distributed filesystem may be configured to selectively archive some snapshot data in an archival cloud storage system. Users, however, may still be enabled to selectively unarchive such data snapshots to retrieve historical versions of a file. For instance, as illustrated in FIG. 38A, .snapshot directories may also include a .policy directory that can be accessed by users to restore any desired previous version of a file. Such capabilities further reduce the system administrator overhead by enabling users to perform a wide range of restore and recovery operations themselves.

Figure 39:
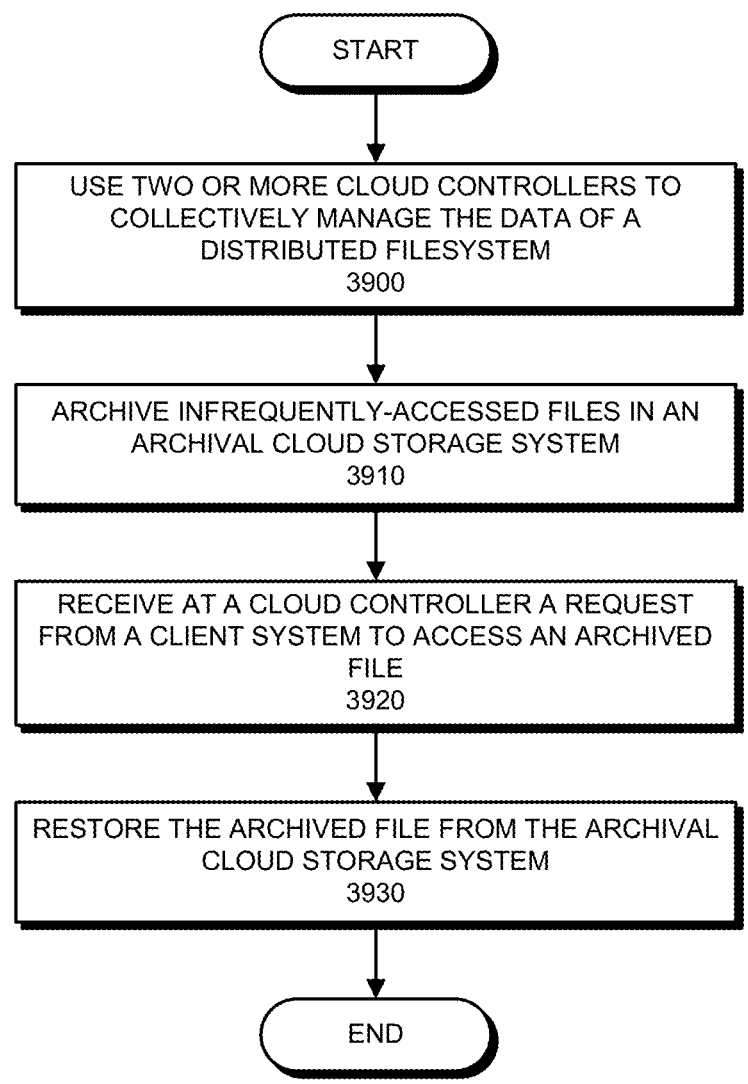
FIG. 39 presents a flow chart that illustrates the process of restoring an archived file in a distributed filesystem in accordance with an embodiment.

FIG. 39 presents a flow chart that illustrates the process of restoring an archived file in a distributed filesystem. Two or more cloud controllers collectively manage distributed filesystem data that is stored in one or more cloud storage systems (operation 3900); the cloud controllers ensure data consistency for the stored data, and each cloud controller caches portions of the distributed filesystem. Furthermore, cloud controllers may archive infrequently-accessed files in an archival cloud storage system (operation 3910). During operation, a cloud controller receives a request from a client system to access an archived file (operation 3920), and restores this archived file from the archival cloud storage system (operation 3930).

Note that the filesystem view presented to users may be configurable to reduce user confusion. More specifically, preserving and displaying information for deleted and archived files and directories may sometimes overwhelm users who only want to see the current set of available files. In some implementations, users may be able to select a set of filesystem views that hide archived and deleted files and directories. In such implementations, for instance, a user may be able to choose whether files that are archived (or deleted) are still displayed in their given directories, or are only displayed in their associated .policy directories. For example, a client may be configured to present a view that displays archived files and allows a typical set of normal file operations (e.g., list the most recent access times and other information) but raises an error and/or status notification whenever a user attempts to access the contents of an archived file.

In many organizations, archived data is typically written once to an archival storage system. Such data may frequently never be read again, but may still need to be preserved (e.g., due to a legal obligation). In such situations, rapid access to the archived data may not be critical, and the restore cost model for an archival cloud storage system may not be an issue. In other organizations, however, archived data may need to sometimes be accessed more quickly and/or may need to be accessed as quickly as possible within a specified set of cost bounds. In such environments, the billing model for an archival cloud storage system may become an issue. Every cloud storage provider may provide different archival storage plans, and the billing models for these plans may change dynamically. Some vendors may provide an API (application programming interface) that allows services such as a distributed filesystem to programmatically check and detect changes to the billing model and parameters (e.g., per-service costs) that are associated with a storage service.

In some embodiments, a distributed filesystem may dynamically track and consider billing models for one or more archival cloud storage systems and adapt archiving and restore behavior accordingly. For instance, the distributed filesystem may be configured to detect updates to the billing models of archival storage providers, and to consider the storage costs incurred by such billing models when making storage decisions. For example, exemplary optimizations made by a distributed filesystem based on billing model parameters may include:
- calculating whether it is beneficial to archive a given set of data files or not based on the current cost of non-archival storage space, the current cost of archival storage space, an expected restore rate, and the cost of restoring data;
- using user hints (e.g., receiving a user specification of whether one or more files should be cached or prioritized in some way, or are not likely to be used again) in combination with a billing model to determine whether to archive a given file;
- delaying the deletion of archive data to control the cost of restore operations;
- transparently adjusting the operation of the distributed filesystem to maximize user data access performance while maintaining a specified budget; and
- coordinating a maximum allowed restore bandwidth and restore operations across multiple cloud controllers.

In general, if the distributed filesystem has access to the formulas and/or parameters for a set of cloud storage offerings, the distributed filesystem can determine, select, and/or choose a combination of offerings to achieve a desired level of performance and/or cost. The following paragraphs describe several exemplary optimization scenarios in more detail.

Consider a scenario in which the billing model for an archival cloud storage system calculates the "free" restore rate as a function (e.g., a percentage) of the total amount of archived data being stored. For instance, in one exemplary archival cloud storage system, every gigabyte of data stored may cost a certain amount (e.g., $0.01/gigabyte), and may be billed for a minimum number of months (e.g., a minimum of three months); in this billing model, the customer still pays some ongoing storage costs for data that is written and then immediately deleted. In addition, the amount of data that can be restored by a customer (and the restore rate) may be a function of the total amount of data that is being stored by the customer; for example, if the billing model specifies that 0.1% of the data archived can be restored per month for free, every terabyte of data stored would allow a customer to restore one gigabyte of data free per month at a given transfer rate. As an additional option, if the customer pays $1000/month, the billing model might multiply this restore rate by ten (e.g., the customer can restore 10 gigabytes per month at ten times the original transfer rate). In this scenario, the billing model discourages the deletion of data—deleting half of the archived data effectively halves the amount of data that can be restored and the restore rate, while not necessarily decreasing storage costs (due to the minimum three-months-of-billing requirement). Thus, the distributed filesystem may determine that executing a deletion request might reduce the restore rate without reducing storage costs. Based on such calculations, the distributed filesystem may choose to delay the deletion of data to a later time (e.g., determining that because the cost of storing data for that interval will already be incurred, preserving the deleted data for the full three-month interval allows for a higher restore rate without incurring additional cost).

In another exemplary billing model (called "peak billing"), monthly restore costs for an archival cloud storage system are billed at the maximum restore rate used at any time in the month. More specifically, the cloud storage provider calculates the maximum restore rate (e.g., the maximum data transfer rate) at any time in the month, and charges that rate for the entire month. In this billing model, if even a very small amount of data is downloaded at a high rate at one point in the month, a customer may be billed at a very high rate for the entire month. In such a scenario, the cloud controllers managing the distributed filesystem may need to carefully track all restore operations to ensure that an allocated restore budget is not exceeded. Consider, for instance, a distributed filesystem that includes five terabytes of archived data and is managed by ten cloud controllers. The combined data managed by these cloud controllers enables a larger effective overall restore capacity for the distributed filesystem, but requires the cloud controllers to track and coordinate restore efforts over an ongoing time interval (e.g., perhaps exchanging restore information in conjunction with regular snapshot updates) to ensure that their combined peak restore rate does not exceed a desired (or specified) average rate. Note that such economies of scale can improve perceived user restore performance in comparison with multiple smaller, disjoint filesystems; for example, if only a single user of the distributed filesystem is currently restoring archived data (e.g., other cloud controllers in different timezones are currently idle), that user benefits from a higher effective restore bandwidth than might otherwise be available. Furthermore, the distributed filesystem may also be configured to consider user and/or system hints (e.g., a user indicating that a file being queued to be restored will not actually be needed until the following morning) to schedule restore operations more effectively across the set of cloud controllers.

In general, the cloud controllers managing the distributed filesystem can be configured to consider dynamic billing model parameters and other collected information to maximize restore operation throughput while also minimizing cost. In many scenarios, the distributed filesystem can optimize restore operations in a manner that benefits, but is transparent to, the end users. In particular, it is quite desirable to ensure that the managers of the distributed filesystem are not surprised by unexpected high costs due to restore operations.

Managing a Global Namespace for a Distributed Filesystem

Managing a distributed filesystem becomes increasingly challenging as the number of users, the amount of stored data, and/or the number of cloud controllers scales. Ideally, management and access loads would be split across cloud controllers evenly to ensure that no individual cloud controller becomes overloaded. However, in practice, balancing filesystem load can be complex, especially in an environment where the set of data being operated on changes over time and mobile users may change locations but still expect comparable file access performance. System administrators may seek to provision some particularly heavily loaded sites with multiple cloud controllers to spread the load and allow the distributed filesystem to support a larger number of users, but may (due to the scale and complexity of the system) be unable to manually track access patterns and move data between controllers to balance cloud controller load. In some embodiments, the cloud controllers of a distributed filesystem are configured to automatically perform load-balancing and improve file access performance by dynamically adjusting the "ownership" of data files.

Figure 40A:
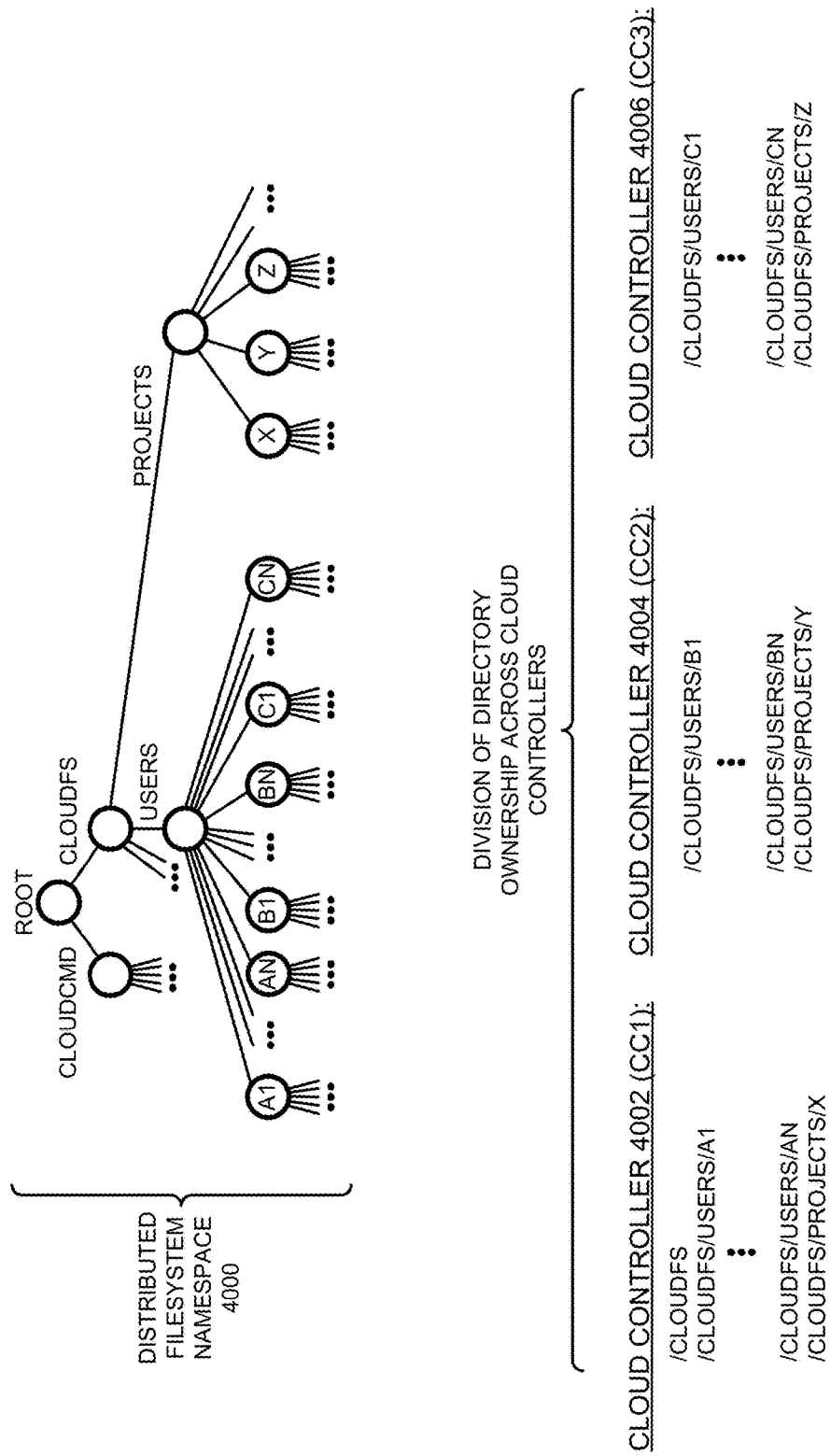
FIG. 40A illustrates an exemplary distributed filesystem namespace that includes a number of user and project directories in accordance with an embodiment.
Figure 40B:
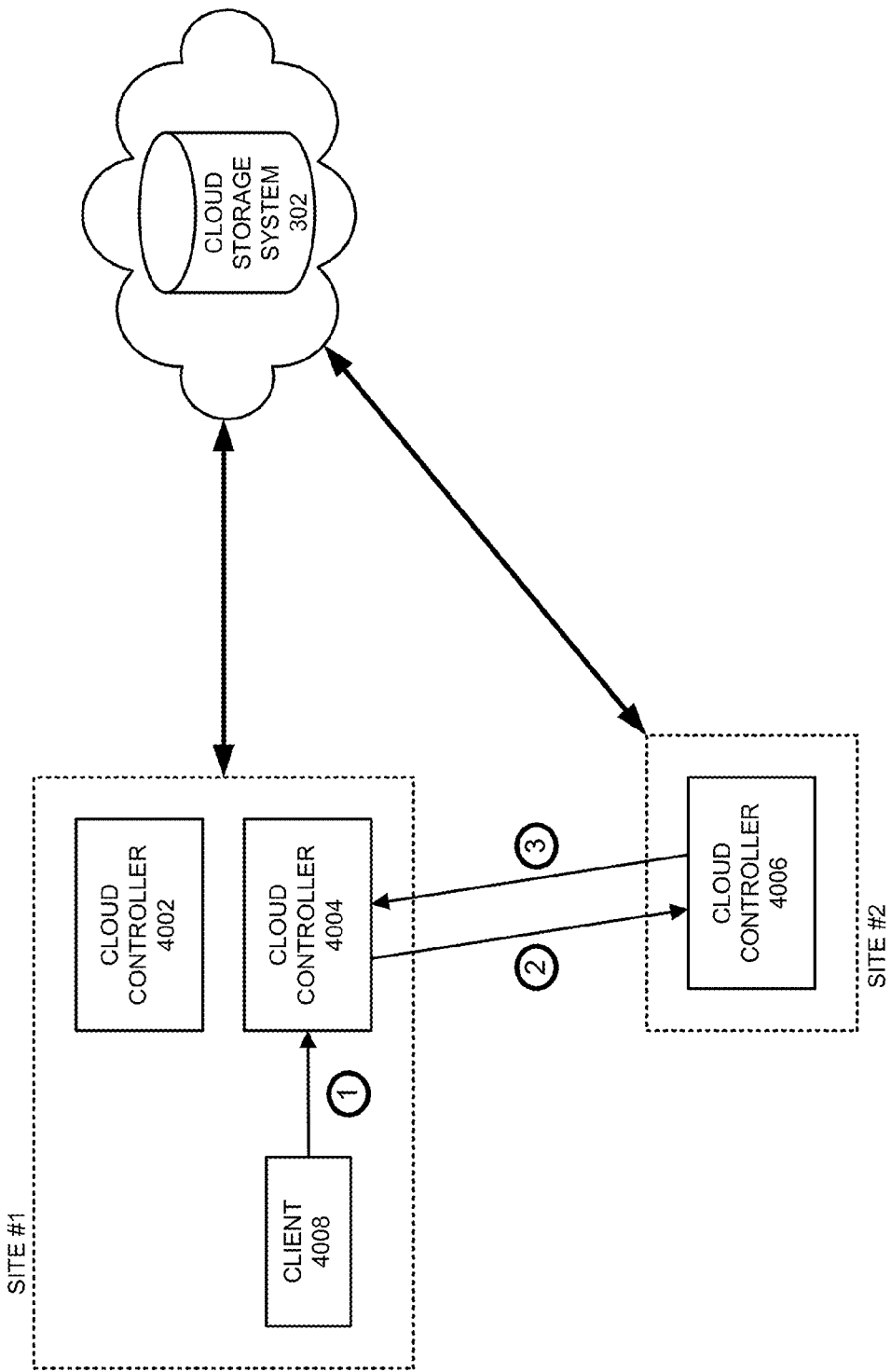
FIG. 40B illustrates an exemplary system organization in which a cloud controller allows clients to read and write data being managed by a different cloud controller using global read-write techniques in accordance with an embodiment.
Figure 40C:
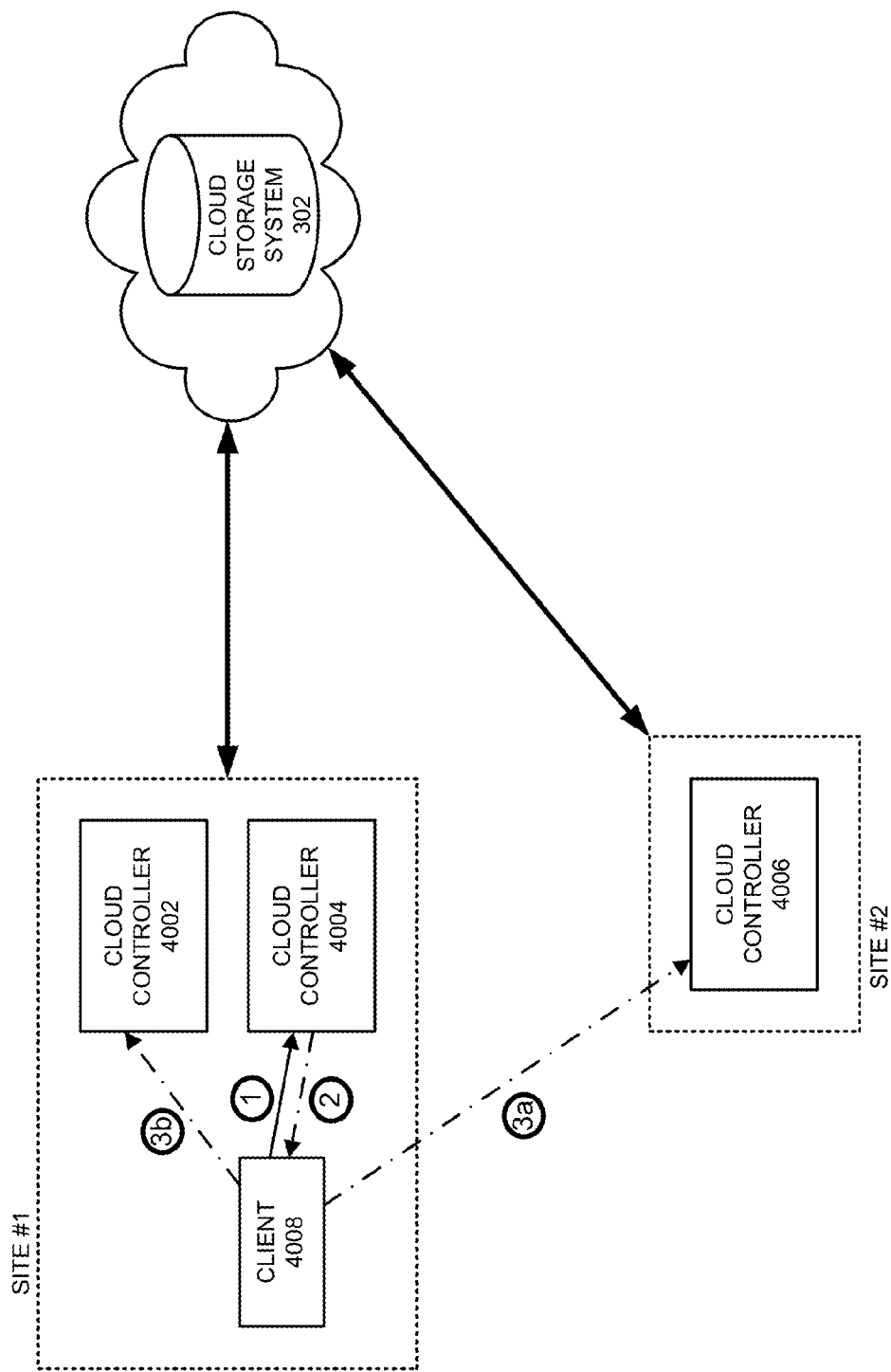
FIG. 40C illustrates an exemplary scenario in which a cloud controller 4004 uses a set of filesystem mappings to direct a client request in accordance with an embodiment.

FIGS. 40A-40C illustrate an exemplary set of load-balancing and performance scenarios for a distributed filesystem. FIG. 40A illustrates an exemplary distributed filesystem namespace 4000 that includes a number of user and project directories, each of which includes its own directory and/or file sub-hierarchy. Distributed filesystem namespace 4000 is segmented across three cloud controllers (4002-4006), each of which "owns" (e.g., is the primary manager of write access for) a specified subset of namespace 4000. More specifically, in this example: cloud controller 4002 manages the root cloudfs directory, a set of user directories (A1 through AN), and a project directory (X); cloud controller 4004 manages a second set of user directories (B1 through BN) and a second project directory (Y); and cloud controller 4006 manages a third set of user directories (C1 through CN) and a third project directory (Z). Note that while each cloud controller performs a certain set of management operations for its assigned portion of the namespace, each of the cloud controllers receives incremental metadata snapshots containing metadata updates for the other portions of the namespace, and can cache data for files in the other portions of the namespace (that they do not own).

FIG. 40B illustrates an exemplary system organization in which cloud controllers 4002 and 4004 are co-located at a given site (site #1) while cloud controller 4006 is located at a second site (site #2). In this example, a client 4008 is configured to connect to a local cloud controller 4004; for instance, client 4008 may initially perform a lookup operation to find a local file server, and in response be provided with the address of cloud controller 4004. Consider, in this context, an attempt by client 4008 to access a file (e.g., /cloudfs/projects/Z/file1) that is owned by cloud controller 4006 (operation 1). As described previously, cloud controller 4004 has been receiving incremental metadata updates for any changed files, and hence maintains locally up-to-date metadata for the requested file. If the client access is a read, cloud controller 4004 can retrieve the cloud files containing the data blocks for the requested file from cloud storage system 302 (or optionally from a peer cloud controller). If, however, the client is attempting to perform a write, cloud controller 4004 needs to contact cloud controller 4006 (which owns and manages the portion of namespace 4000 that includes the file) to request (operation 2) and receive (operation 3) a write lock for the file before modifying the file (or, alternatively, perhaps forward the write request to cloud controller 4006). This access scheme (called "global read-write," or GRW) allows clients to read and write data being managed by a different cloud controller (that the client is not currently connected to).

Note that a number of alternative arrangements are possible. Consider, for instance, an alternative scenario in which client 4008 is associated with a mobile user (C3) who is associated with project Z and was previously located at site #2, but is temporarily relocated to site #1. As illustrated in FIG. 40A, the mobile user's home and project directories are both being managed by cloud controller 4006, and client 4008 may have been previously connected directly to cloud controller 4006. In this scenario, even after the relocation, client 4008 may used cached address information to simply reconnect to cloud controller 4006 directly, thereby alleviating the need to involve multiple cloud controllers in the mobile user's file accesses. However, these file accesses may then become performance-limited by the network connection between site #1 and site #2, and attempts by client 4008 to access files managed by cloud controllers 4002-4004 via cloud controller 4006 may then involve additional GRW interactions between cloud controller 4006 and cloud controllers 4002-4004.

In another alternative scenario, client 4008 may be configured to directly connect to both cloud controllers 4004 and 4006. For instance, client 4008 may use two distinct CIFS connections for the same distributed filesystem to directly access the two sets of files that are owned by each cloud controller, respectively, thereby avoiding GRW operations for those files. However, initiating multiple connections may violate the transparency of the distributed filesystem (e.g., clients would need to determine which cloud controller manages which subset of the filesystem to connect optimally) and can increase the number of (memory-intensive) CIFS connections for each cloud controller, thereby limiting the number of users that each cloud controller can support.

In general, relying primarily upon GRW for a substantial set of file accesses can substantially limit the scalability of a distributed filesystem. As described above, while GRW allows remotely-owned files to be modified, these operations involve multiple cloud controllers and additional network connections. A limited set of such accesses may be feasible given sufficient network bandwidth, but such multi-cloud-controller operations can substantially increase cloud controller load even if the second cloud controller is co-located with the originating cloud controller. For instance, some operations (e.g., renaming files or creating new files in the namespace of a remote cloud controller) will typically involve multiple round-trip interactions with the second cloud controller, and thus may involve substantial network traffic and latency if the second cloud controller is very remote and/or the network connection is limited or busy. The alternative (and/or complementary) option of simultaneously connecting with multiple cloud controllers can be memory intensive (for both the client and the cloud controller), thereby also limiting the overall scalability of the distributed filesystem (e.g., the number of users that can be supported by each cloud controller).

In some embodiments, cloud controllers maintain (and collectively update) a set of namespace mappings for the distributed filesystem that track file ownership for the namespace of the distributed filesystem. Each cloud controller is configured to, upon receiving a client connection request, use these mappings to determine an appropriate cloud controller to handle the client, and re-direct the client to that cloud controller. Furthermore, cloud controllers can collectively track client accesses over time to determine more efficient data grouping across the cloud controllers, and then adjust the namespace mappings (e.g., migrating the ownership of a portion of the distributed filesystem from one cloud controller to another) to reduce the number of client connections that are needed, thereby improving file access performance while also improving the scalability of the distributed filesystem.

Consider, for instance, the CIFS protocol, which includes an additional layer (the "DFS layer") that can be used to help organizations manage mappings for a shared namespace. The file servers in the organization are configured to store a set of namespace mappings for the organization. A client attempting to access a specific file (e.g., in a specified user's home directory) sends a query to a participating file server via this DFS layer. The file server receiving this request in response gives the client contact information for the specific file server that is hosting the requested file and/or directory. Upon receiving this information, the client can connect directly with the indicated file server, and, once connected, can then communicate with the file server without any intermediary agents needing to translate paths for every request. The organizational mappings used for the DFS layer are typically statically defined, but do provide enterprises with a level of indirection that allows file servers to be modified without having to change client configurations. For example, when a file server hosting a number of user directories reaches capacity, system administrators can use this functionality to add a second file server, split the existing set of users across the file servers, and then update the static mappings to ensure that client requests are routed to the file server that is actually hosting the requested data. These capabilities give clients an abstraction of a shared global namespace while ensuring that requests are routed to the correct file server via the DFS layer. In some embodiments, such mapping functionality is leveraged (and extended) to dynamically route connection requests to the cloud controllers for a distributed filesystem based on a range of criteria.

In some embodiments, a cloud controller receiving a client request is configured to determine an appropriate target cloud controller for the request and send referral information for that target cloud controller back to the requesting client, which then connects directly to that target cloud controller. Note that multiple cloud controllers may be co-located at a given site to increase the file access performance for the site and the distributed filesystem. The set of (one or more) cloud controllers at each given site is referred to as a "local cluster." All of the cloud controllers for the distributed filesystem can participate in the referral process; each cloud controller tracks both the set of files that it owns as well as the files owned by the other cloud controllers, and stitches the associated set of namespace mappings together to present a single global name space to clients. Furthermore, all of the cloud controllers use a "heartbeat protocol" to periodically (e.g., every 5 seconds or less) ensure that each cloud controller is still operational (and potentially also check the load of each cloud controller). Clients can be configured to access a local cloud controller first, and then may be re-directed to the same or another cloud controller based on a set of criteria. For instance, the criteria for redirection may specify that:

- if the preferred cloud controller for a request (e.g., the cloud controller owning the requested file or directory) is in the local cluster, and that cloud controller is operational, the client can be referred to that cloud controller;
- if the preferred cloud controller for the request is in the local cluster, but is determined to not be operational (or is overloaded), the client can be referred to any available (e.g., operational and preferably not overloaded) cloud controller in the local cluster (including the cloud controller receiving the request); that cloud controller can then provide the requested share in read-only mode or use GRW for read/write access;
- if the preferred cloud controller is in a remote cluster, is available, the connection to the remote cluster is determined to have insufficient bandwidth to service the client's requests efficiently, and there is another operational, lightly-loaded local cloud controller available in the local cluster, the client can be referred to the local cloud controller, which can then provide read/write access to the requested file using GRW; and
- if the preferred cloud controller is in a remote cluster, is available, there is no operational and/or lightly-loaded local cloud controller available in the local cluster, and there is sufficient network bandwidth to the remote cluster to service the client's requests efficiently, the client can be referred to connect directly to remote preferred cloud controller.

In some embodiments, the determination of a target cloud controller for a client connection may consider one or more of the following:

- the location of the target cloud controller owning the requested file or directory;
- the availability of the target cloud controller;
- the configuration of the local cluster;
- the configuration of a remote cluster;
- the bandwidth between the local cluster and remote cluster;
- load information available for one or more cloud controllers (e.g., disk I/O load, storage space availability, memory space and load, and CPU load, all of which may be conveyed using either a heartbeat protocol and/or as part of the incremental metadata snapshots that are periodically sent to other cloud controllers);
- other files that are owned by the target cloud controller (e.g., other common group shares that may also be accessed by the requesting client, as described in more detail below);
- global cache knowledge—each cloud controller has an on-disk cache containing distributed filesystem data. Users who are likely to share common data blocks or files may be directed to a common cloud controller to increase the overall effectiveness of each individual cloud controller's caches. For instance, the cloud controller that owns a given portion of the distributed filesystem is also likely to receive many of the requests for the files it owns, and hence is more likely to be caching data blocks for that portion of the distributed filesystem. Taking advantage of global cache knowledge may also involve referring a client to the same cloud controller that it was previously connected to (either directly or via a GRW access), as that cloud controller may already be caching data that was previously being accessed by the client.

Hence, cloud controllers can leverage tracked information to direct a client to a cloud controller that is likely to provide good performance and response times for the client's file access requests. Note that the cloud controller receiving a request from a client always has the option of hosting the client connection if no other options are available. Note also that because all of the cloud controllers share the same knowledge of namespace mappings, clients can connect to any cloud controller for the distributed filesystem, and then subsequently be referred to any cloud controller for the distributed filesystem. Each of these cloud controllers can in turn negotiate any other cloud controller (via GRW) to perform writes for other files that they do not own. Hence, these capabilities provide an increased level of flexibility and reliability by facilitating load-balancing at both the front end (e.g., clients can query any cloud controller, allowing the query load to be distributed across cloud controllers) as well as at the back end (e.g., if needed, clients can be instructed to connect to a lightly-loaded intermediary instead of a more heavily-loaded cloud controller; requesting write locks from a heavily-loaded cloud controller often creates less load than an active client connection to the same cloud controller). These capabilities are distinct from and provide more resiliency than other approaches that require a (single) root namespace controller or file server that can fail and disrupt the operation of an entire distributed filesystem.

Consider the above-described namespace mapping capabilities for the distributed filesystem namespace 4000 illustrated in FIG. 40A. In this context, each cloud controller can provide a set of "shares" that represent locally owned sub-hierarchies, and track a set of mappings that link all of the shares for the distributed filesystem. For instance, these mappings may be tracked as a set of links to sub-hierarchies of files that are owned by other cloud controllers. For example, for namespace 4000, a set of mappings might include:

| /cloudfs/users/a1 | -> | /cc1/users/a1 |
| --- | --- | --- |
| ... | | |
| /cloudfs/users/an | -> | /cc1/users/an |
| /cloudfs/users/b1 | -> | /cc2/users/b1 |
| ... | | |
| /cloudfs/users/c1 | -> | /cc3/users/c1 |
| ... | | |

All of the cloud controllers synchronize both changes to their locally owned file systems as well as changes to the namespace mappings with the other cloud controllers of the distributed filesystem, and thus all cloud controllers can continuously track all of the directories that are available across the set of cloud controllers and the directory mappings themselves. Note that, as previously described, all of the data stored in these directories can be cached by any of the cloud controllers, allowing each cloud controller to support global deduplication, read-only access to files owned by other cloud controller, and GRW access to files owned by other cloud controllers. However, in addition to the previous capabilities, cloud controllers now also can make additional decisions on how to route an incoming client request beneficially.

FIG. 40C illustrates an exemplary scenario in which a cloud controller 4004 uses a set of filesystem mappings to direct a client request. As described for FIG. 40B, client 4008 performs a lookup operation to find a local file server, and is provided with the address of cloud controller 4004. Client 4008 then sends cloud controller 4004 a request that includes the path for a desired file, /cloudfs/users/c1/file1 (operation 1). Cloud controller 4004, upon receiving this request, determines an appropriate path of action using a set of cached filesystem mappings and state information for the distributed filesystem. For instance, cloud controller 4004 may determine from the mappings that cloud controller 4006 is the owner of the requested file, and that the network connection between site #1 and site #2 is sufficiently high that client 4008 should connect directly to cloud controller 4006. In this scenario, cloud controller 4004 returns to client 4008 a reference to cloud controller 4006 (operation 2), and client 4008 sends a request directly to cloud controller 4006 to perform the desired file access (operation 3*a*). If, however, cloud controller determines that the network connection between the two sites is limited and/or that the request is likely to be read-only (or best handled using a GRW access), cloud controller 4004 may decide otherwise. For instance, in some scenarios, cloud controller 4004 might directly service the request, in which case client 4008 might connect to cloud controller 4004, which would then retrieve the requested data from its cache and/or cloud storage system 302 and perform GRW accesses that involve cloud controller 4006 as needed. In yet another scenario, cloud controller 4004 may determine that a direct connection between cloud controller 4006 and client 4008 is not favorable, and that the load for cloud controller 4004 is too high to handle the request in a reasonable timeframe. In this scenario, cloud controller 4004 might return to client 4008 a reference to another local cloud controller 4002 that is more lightly loaded and can service the request (operation 2); client 4008 receives this respond, and connects to cloud controller 4002 (operation 3*b*). Note that these three connection possibilities are exemplary, and only illustrate a limited subset of possible permutations of the disclosed techniques for managing and providing load-balancing for a global namespace.

In some embodiments, a cloud controller may consider a range of factors when determining which cloud controller should own the home directory of a new user who is connecting to the distributed filesystem for the first time (or, alternatively, a user who is creating a new project directory). A cloud controller that has been contacted by a client system detects this situation upon receiving the request and determining from cached distributed filesystem metadata that the requested directory does not exist yet. This cloud controller can then choose an appropriate target cloud controller to own the new directory based on (but not limited to) one or more of the following:

which local cloud controller is least used (e.g., the cloud controller in the local cluster with the highest disk cache availability, most available memory, most lightly-loaded CPU, lowest network load, and/or lowest disk I/O);

which local cloud controller owns the fewest home and/or project directories (e.g., the cloud controller that has the lowest "namespace load" and/or expected number of clients);

which cloud controller the client system first connects to (e.g., the first cloud controller contacted by the client system);

the location of the client system (e.g., ensuring that the cloud controller is in network proximity with the client system);

information associated with the user (e.g., a group identifier that indicates the project or type of files that the user is likely to access); and/or a locality policy or some other means of specifying a preferred cloud controller or selection criteria.

Note that while some initial choice needs to be made, in some implementations this initial choice may subsequently be changed if needed. For example, in some embodiments the ownership of files and directories can be migrated between cloud controllers for a number of reasons (e.g., based on the additional knowledge of the new user's behavior over time).

In some embodiments, one or more cloud controllers may migrate the ownership of one or more files or directories in the distributed filesystem from one cloud controller to a new cloud controller. For instance, cloud controllers may track the set of accesses made by clients to determine and exploit natural patterns in data access and grouping, thereby improving file access performance while also reducing client and cloud controller overhead. Migrating the ownership for a set of files may: reduce the number of connections needed for one or more clients and make each client-maintained connection more efficient; balance the file access load between cloud controllers; and/or improve on-disk file cache hit rates by ensuring that certain users and their frequently-accessed data are co-located where possible. Consider the following exemplary migration scenarios:

Client share co-location: a cloud controller may determine that a set of co-located users all frequently access the same set of project files, and predict from these accesses that these users are members of a single design team associated with this project. Alternatively, a locality policy (or some other mechanism) may explicitly convey this information to the cloud controller. Based on such determinations, the cloud controllers may determine that grouping the ownership of this project's files and the ownership of all of these users' directories on a single cloud controller would improve file cache hit rates for those files while reducing the number of connections needed for each of the users' clients, and pursue a course of action that migrates those files' ownership to the selected cloud controller.

Client re-location: cloud controllers may detect when a user moves from one site to another site, and determine whether to migrate ownership of the user's home directory based on a number of factors. In such scenarios, the user's home directory may still be owned by a cloud controller at the remote location where the user was previously located, and the cloud controller at the new location may decide whether to migrate ownership based on the user's connection frequency, the user's typical access patterns, the size of the data in the user's home directory, a history and/or predicted frequency of re-location for the user, and/or the amount of data in the user's home directory that is currently cached in the local and remote cloud controller. For instance, if the current network load is low, the cloud controller can cache all of the user's files and migrate ownership in a relatively short time (e.g., five minutes), and the user has a high priority, the cloud controller may initiate those operations so that the user's client system can connect locally with the highest possible performance. Alternatively, if the migration and cache-loading were to take one day, the cloud controller might delay migration and first confirm that the user's client connects from the same (new) location across multiple days (thereby indicating a likely longer-term relocation of personnel).

Heavy user re-location: cloud controllers may detect that some users naturally consume more distributed filesystem resources than others. In order to balance the total set of distributed filesystem resources and provide the best overall experience for all of the users of a cluster, the cloud controllers for the distributed filesystem may distribute heavy users (e.g., spread the ownership of the home directories of heavy users) across cloud controllers in a way that evenly distributes file access load.

Global cache: as described previously, each cloud controller has an on-disk cache of data for the distributed filesystem. Migrating and grouping users who share common data blocks or files increases the overall effectiveness of each of the individual cloud controllers' on-disk data caches.

Cloud controller overload: as mentioned previously, cloud controllers continually update one other with load information. In situations where a cloud controller is overloaded, one or more cloud controllers may migrate the ownership of some of the files from the overloaded cloud controller to another less-loaded cloud controller to alleviate the load issues.

Note that in practice the migration of the ownership of files and directories is ideally performed as quickly as possible to minimize any delays for clients attempting to access the migrating files. Every cloud controller receives all of the incremental metadata updates and namespace mappings for the files and directories owned by the other cloud controllers, so this operation may involve briefly locking the files being migrated so that they are quiescent while the two cloud controllers update their internal tracking structures to reflect the change and distribute updated namespace mappings to all of the cloud controllers for the distributed filesystem. In some scenarios, the new owning cloud controller may also already pre-fetch data blocks for the files it will own shortly in anticipation of subsequent client file accesses.

In some embodiments, clients are configured to optimize their own resources, and hence attempt to limit the number of shares that are mounted for the distributed filesystem. For instance, consider an environment in which the process of mounting a cloud controller's share is fairly expensive (e.g., each mounted share consumes substantial memory resources), but once the connection has been established, per-file accesses have low overhead. In this scenario, a resource-constrained client might map only one CIFS connection to a drive letter, and then perform all of the file accesses for the distributed filesystem via this one connection, even if they are accessing (and writing) files owned by another cloud controller. As described previously, selectively migrating the ownership of portions of the distributed filesystem between cloud controllers in order to group the ownership of data that is likely to be accessed together in one place can reduce the number of shares that are mounted by each client, thereby improving the performance and resource consumption of clients accessing such grouped data. In some embodiments, cloud controllers and/or clients may track client accesses and resources to determine when the overhead of mounting additional shares may result in substantial performance benefits for the client (that outweigh the resource costs of establishing and maintaining those additional connections). For instance, a cloud controller may track the file accesses for a client, and may send the client a referral to another cloud controller when it detects that a direct connection to that other cloud controller may substantially benefit the client's performance. Depending on the level of client complexity, the client system may be able to decide whether to pursue this additional connection (e.g., if the client system expects to create a large number of new files in the namespace owned by the other cloud controller) or continue to access the distributed filesystem via only the original cloud controller (e.g., if the client system primarily will need read-only access to that portion of the namespace).

In implementations where mounting a cloud controller share is expensive, the choice of an appropriate target cloud controller can have significant performance ramifications (and avoid the need for substantial reconfiguration overhead). However, in some scenarios determining an appropriate target cloud controller may be challenging. For instance, in some situations a client system may not initially attempt to access a specific set of target files, but may instead be browsing through and exploring the namespace fairly extensively before settling on a set of files to access. Every cloud controller maintains a complete set of the metadata for the distributed filesystem, so any cloud controller can support such browsing behavior. However, an initially-contacted cloud controller may still use any available information to make an educated guess of a possible target cloud controller, and send the client system a corresponding referral. For example, a cloud controller may determine a user identifier and/or group identifier associated with the client system (and user) sending a request, and, based on a prediction that users usually most frequently access their own home and project directories, respond with a referral to the cloud controller that owns these files (assuming that other factors, such as the load of this potential target cloud controller, are favorable). If this educated guess is correct, the client system reaps performance benefits from being connected to a suitable cloud controller from the start. Even if the prediction is not completely accurate, the selected cloud controller can still support requests that involve other cloud controllers using GRW. Furthermore, the host cloud controller (e.g., the target cloud controller that was mounted by the client system) can track the accesses initiated by the client system and determine subsequent actions and/or adjustments that may improve performance. For instance, if the client system is performing a large number of accesses for which GRW is inefficient, the host cloud controller may (based on tracked, predicted, and/or user pre-specified access patterns) initiate a migration of ownership for the target files or (if the client system supports multiple simultaneous cloud-controller connections and/or the potential benefits of dismounting the current share and mounting a new share via another cloud controller outweigh the associated overhead) send the client a referral to a different cloud controller.

Note that in some embodiments, client systems may support a range of client-server protocols, and some client systems may not support dynamic referrals from cloud controllers. Cloud controllers can detect clients that do not support such capabilities, and respond appropriately. More specifically, if a cloud controller receives a request for a user's home directory from a client system that supports redirection, the cloud controller can respond with a referral to another (local) cloud controller that owns that home directory. In contrast, a the client system that does not support such capabilities may instead connect to the first cloud controller that it communicates with, with that cloud controller then using GRW as needed to access the other cloud controller that owns the user's home directory.

In some alternative embodiments, clients may support a higher level of sophistication, and be able to choose which cloud controllers to connect to. For instance, the software on a client system may be sufficiently sophisticated to see a set of namespace mappings for cloud controllers, and patch these mappings into a single global namespace that is presented to a user. Furthermore, in some embodiments, cloud controllers may be configured to send back a referral that lists a number of cloud controllers (perhaps in conjunction with characteristics for each cloud controller) that a client system can then choose from based on its own set of selection criteria (e.g., network link bandwidth, eventual anticipated client location, etc.). For example, in a (read-only) backup-recovery situation, an initial cloud controller may respond with a list of cloud controllers that are currently caching some of the data needed by the client system. The client can analyze the set of choices (e.g., testing the network connections, etc.) before connecting to a specific cloud controller. Alternatively, if recovery time is of paramount importance, the client system is provisioned with sufficient resources, and the cache contents of the listed cloud controllers are complementary, the client may connect to multiple (or all) of the referred cloud controllers to retrieve their cached data (or leverage their combined bandwidth to a supporting cloud storage system) and retrieve the needed data set as quickly as possible.

Figure 40D:
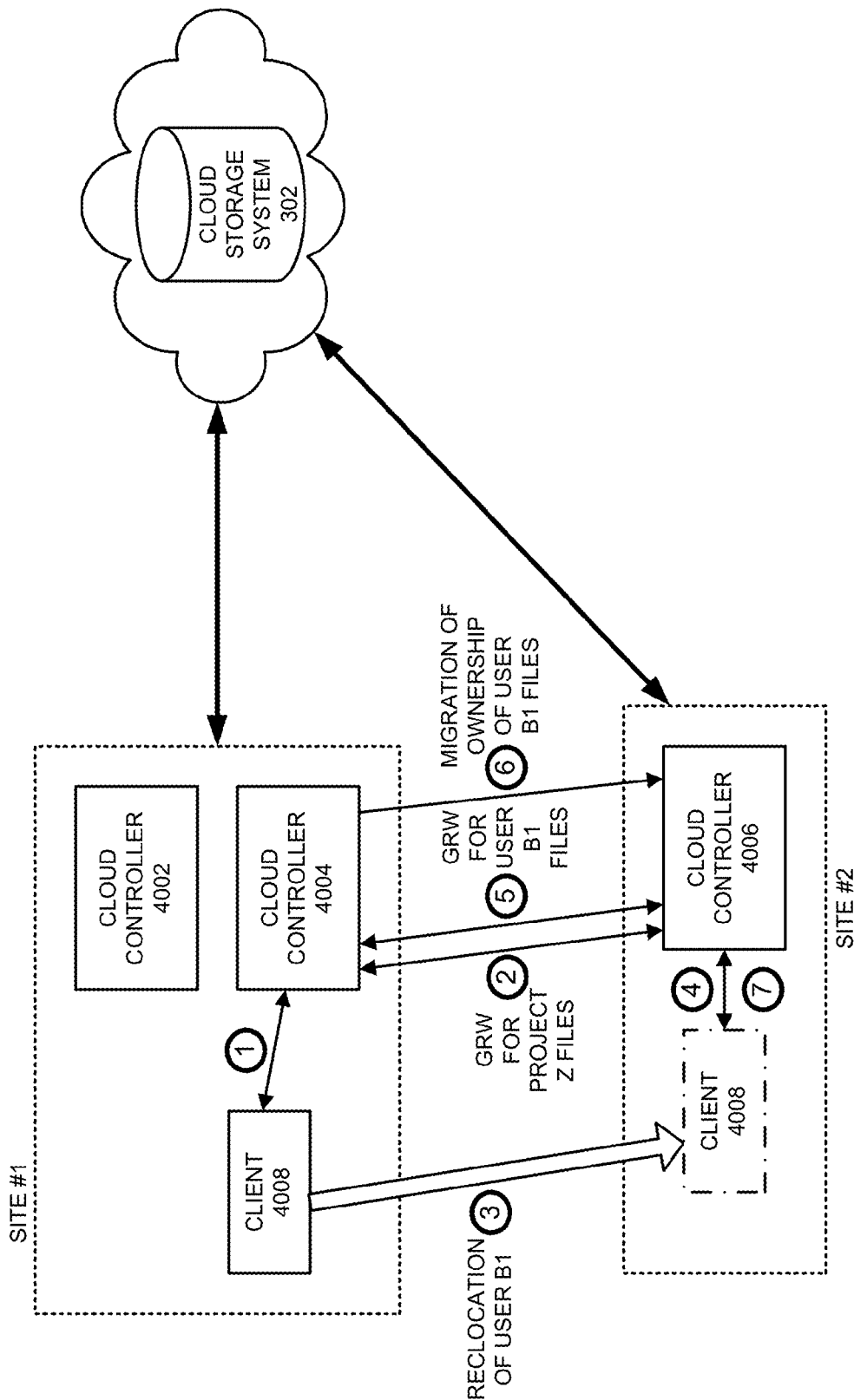
FIG. 40D illustrates an exemplary reassignment and relocation scenario in the context of the namespace illustrated in FIG. 40A in accordance with an embodiment.

FIG. 40D illustrates an exemplary reassignment and relocation scenario in the context of the namespace illustrated in FIG. 40A. In this scenario, clients are configured to connect to a single cloud controller, projects X, Y, and Z are different engineering projects that are each associated with different engineering teams (e.g., users A1 to AN, B1 to BN, and C1 to CN, respectively, with users A1-BN located at site #1 and users C1-CN located at site #2), and client 4008 is associated with user B1 (note that the clients associated with other users are not illustrated for simplicity). Via manual configuration and/or previous migration operations, the namespace is distributed across the three cloud controllers in a manner that allocates a separate cloud controller for each project and its associated users, thereby improving cache sharing for each individual project and balancing the project load across the cloud controllers. Client 4008 connects to cloud controller 4004 to access user B1's personal files and project Y's files (operation 1); cloud controller 4004 owns both sets of files, and hence does not need to involve other cloud controllers in accesses for these files.

After some time, however, user B1 is reassigned from project Y to project Z. Client 4008 remains connected to cloud controller 4004, which continues to own user B1's home directory. Given that a substantial number of users (C1-CN) associated with project Z are accessing project Z's files from site #2, these files are likely to remain owned by cloud controller 4006, but cloud controller 4004 now facilitates client 4008 access (as needed, for instance for write accesses) to project Z files via GRW accesses (operation 2). This arrangement could continue this in this manner indefinitely, but in this scenario at some subsequent point user B1 is relocated from site #1 to site #2 (operation 3). After this relocation, when user B1's client 4008 restarts, local directory services guide client 4008 to connect to (now local) cloud controller 4006. Client 4008 can now access project Z files directly via cloud controller 4006 (operation 4), but (write) accesses of user B1's files may now involve a GRW access to cloud controller 4004 (operation 5). This arrangement may persist for some time, with cloud controllers 4004-4006 tracking subsequent accesses. At some subsequent point, cloud controllers 4004-4006 may determine that this relocation seems to be persistent, and migrate the ownership of user B1's home directory from cloud controller 4004 to cloud controller 4006 (operation 6). At this point, client 4008 benefits from all of user B1 and project Z's files being owned by cloud controller 4006; migrating the ownership of the files reduces the number of GRW accesses (hops) that are needed for user B1's accesses.

Note that in a slightly modified scenario where client 4008 can connect to multiple different cloud controllers, client 4008 could potentially connect directly to both cloud controllers 4004 and 4006, thereby also reducing the number of GRW operations; in such scenarios, the client and/or cloud controllers might consider one or more individual and/or system performance and scalability trade-offs when deciding whether to have the client mount the second share or have a cloud controller provide access via GRW. Furthermore, the option of migrating the ownership of user B1's files would still be beneficial in that it would co-locate ownership for the files that are primarily accessed by client 4008 on one cloud controller, thereby reducing the number of connections for client 4008 as well as cloud controller 4004. Hence, detecting situations where migrating ownership can reduce the number of client connections and GRW (e.g., multi-cloud-controller) operations that are needed to access stored data can substantially improve the scalability of the distributed filesystem.

While the example of FIG. 40D highlights a set of options and trade-offs in a relatively simple exemplary scenario, in practice managing and optimizing access for large volumes of data and many users can quickly become quite complex, and frequently quickly exceeds the ability of system administrators to manage. A good initial understanding of user and project groupings can lead to a beneficial initial configuration, but eventually normal evolution in a large distributed filesystem will lead to changes that will degrade performance if appropriate adjustments are not made. The set of cloud controllers managing the distributed filesystem can track ongoing changes (e.g., changing access patterns, client locations, etc.) and use this tracked information to dynamically react on an as-needed basis (e.g., by migrating ownership of files, encouraging client systems to mount to multiple local cloud controllers or a mix of multiple local cloud controllers and remote cloud controllers, and/or performing GRW accesses). Frequently, a need for adjustment arises due to collaboration (and/or changes in the collaboration model) for a set of files. For instance, home directories and profiles are typically associated with a single user and thus have very little or no collaboration; hence, such directories typically involve less management complexity, and can be migrated as needed based on user movement to reduce multi-hop (GRW) communication. In contrast, files and directories that are collaboratively operated upon on by multiple users (who are potentially distributed across different locations) can provide substantial management challenges. A set of cloud controllers may optimize access performance for a specific set of files by migrating the ownership of these files and directories to a cloud controller that is closest to the largest (or most active) set of collaborators, and then allowing other more remote (or less active) collaborators to access them via GRW. The cloud controllers may consider a number of client, cloud controller, and distributed filesystem characteristics and parameters when making such decisions (e.g., how to balance minimizing GRW remote writes and minimizing the number of client connections for each cloud controller). The cloud controllers for a large distributed filesystem may be simultaneously tracking, and making decisions for, a very large number of collaborative files and/or directories.

In some embodiments dynamic referrals from cloud controllers can be used to support a seamless client transition from one cloud controller to another cloud controller (e.g., to upgrade or replace software/hardware, or to otherwise take a cloud controller offline without adversely impacting client systems that are currently connected to that cloud controller). For instance, consider such a scenario for a local site in which one of a group of multiple cloud controllers is being upgraded. This cloud controller is configured to initiate a migration of the namespace that it owns to one or more other cloud controllers at the site, send out an update to the namespace mappings to all of the cloud controllers, and send a disconnect message to all of its connected client systems (thereby closing the client systems' connections). When the client systems attempt to reconnect to the distributed filesystem, they are referred to one of the remaining cloud controllers for the site; the cloud controllers receiving the subsequent requests can then refer the client systems to a suitable cloud controller based on the requested target files, the updated namespace mappings, and other tracked system information. These operations are transparent to end users, who remain unaware that they have been switched to another cloud controller. Note, however, that, to ensure file consistency, any incremental metadata snapshots that are pending on the cloud controller that is being taken offline need to be received and processed by the cloud controller(s) taking over the portion of the namespace before any of the disconnected clients re-connect and submit requests. In some implementations this constraint can be met by temporarily delaying the acceptance of the client systems' connection requests at the replacement cloud controller(s) until the pending changes have been synchronized. In some instances, the set of incremental metadata and data snapshots may be pushed directly from the cloud controller that is going offline to the cloud controller that is taking over the re-assigned portion of the namespace.

The preceding example describes an operation where a cloud controller is taken offline gracefully. In another variation, a cloud controller may go offline unexpectedly; in this scenario, other cloud controllers detect and confirm the failure of the offline cloud controller (e.g., via the heartbeat protocol), and then either follow a pre-specified re-assignment plan or negotiate to take ownership of the portion of the namespace that was associated with the failed cloud controller.

Figure 41:
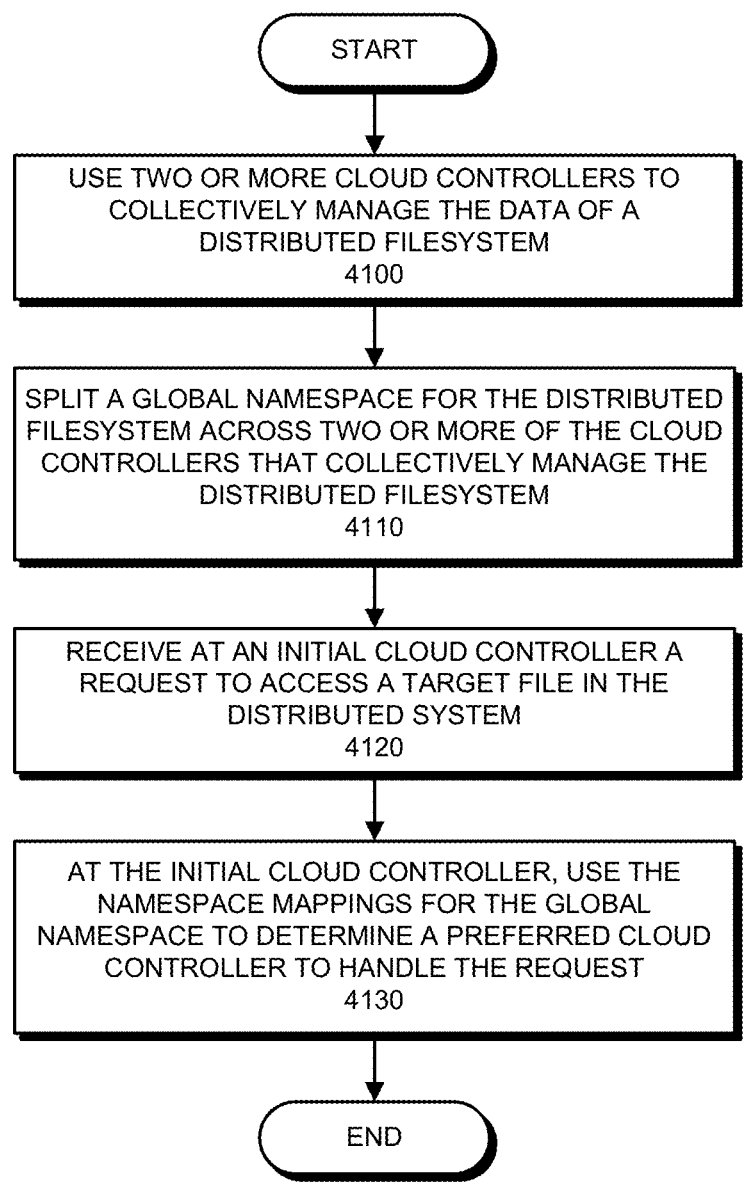
FIG. 41 presents a flow chart that illustrates the process of managing a global namespace for a distributed filesystem in accordance with an embodiment.

FIG. 41 presents a flow chart that illustrates the process of managing a global namespace for a distributed filesystem. Two or more cloud controllers collectively manage distributed filesystem data that is stored in one or more cloud storage systems (operation 4100); the cloud controllers ensure data consistency for the stored data, and each cloud controller caches portions of the distributed filesystem. Furthermore, a global namespace for the distributed filesystem is also split across two or more of the cloud controllers that collectively manage the distributed filesystem (operation 4110). Each of these cloud controllers is assigned a distinct portion of the global namespace; each of these cloud controllers manages write accesses for its assigned portion of the global namespace and helps to maintain a set of namespace mappings that indicate which portion of the namespace is assigned to each cloud controller. Note that not every cloud controller for the distributed filesystem needs to be assigned a portion of the global namespace. During operation, an initial cloud controller receives a request from a client system to access a target file in the distributed system (operation 4120). This initial cloud controller uses the namespace mappings for the global namespace to determine a preferred cloud controller that will handle the request (operation 4130).

In summary, cloud controllers present end users with an abstraction of a global namespace for a distributed filesystem while partitioning the distributed filesystem into a set of namespace mappings that are synchronized across the cloud controllers. These namespace mappings facilitate managing the ownership of portions of this namespace in a manner that optimizes file access performance and load-balancing across cloud controllers.

Performing Anti-Virus Checks for a Distributed Filesystem

One potential concern is that a file that has been infected with a virus may be written to the distributed filesystem, where it might be accessed by and infect a large number of client systems. While ideally all of the client systems for the distributed filesystem would include anti-virus capabilities that would help prevent this, this is not always the case in practice, and even protected client systems may not always be up-to-date. Furthermore, protected systems may also still be vulnerable to new attacks and/or not detect infected files that have not yet been discovered and addressed in the virus definition files that are available at the time that the infected file is written. Hence, in some embodiments a distributed filesystem may include anti-virus capabilities that attempt to prevent infected files from being stored to the system and/or facilitate scanning files that have already been stored to the distributed filesystem.

In some embodiments, every file that is written to the distributed filesystem (and/or every file that is modified) undergoes an anti-virus scan. The metadata for files includes an additional "clean" field that indicates whether a file has been checked; this field is cleared whenever the file is written, and each cloud controller receiving a file read request from a client ensures that the clean field for the requested file is marked before serving the file to the client. Anti-virus scans can be initiated by a cloud controller performing a write operation. For instance, the cloud controller may initiate a local anti-virus process or transfer the modified file to an anti-virus server (e.g., via a scanning protocol such as ICAP, the Internet Content Adaptation Protocol) to ensure that the file is safe before writing the file's data blocks to a cloud storage system, marking the clean field for the file, and then sending an incremental metadata snapshot to the other cloud controllers to notify them of the existence of the new file. Note that while this implementation ensures that new files entering the distributed filesystem are checked, it also increases the load of each cloud controller and slightly delays the appearance of new files in the distributed filesystem. Hence, in some alternative embodiments, a cloud controller that is co-located with the cloud storage system scans all newly-written or modified files for the distributed filesystem.

Figure 42:
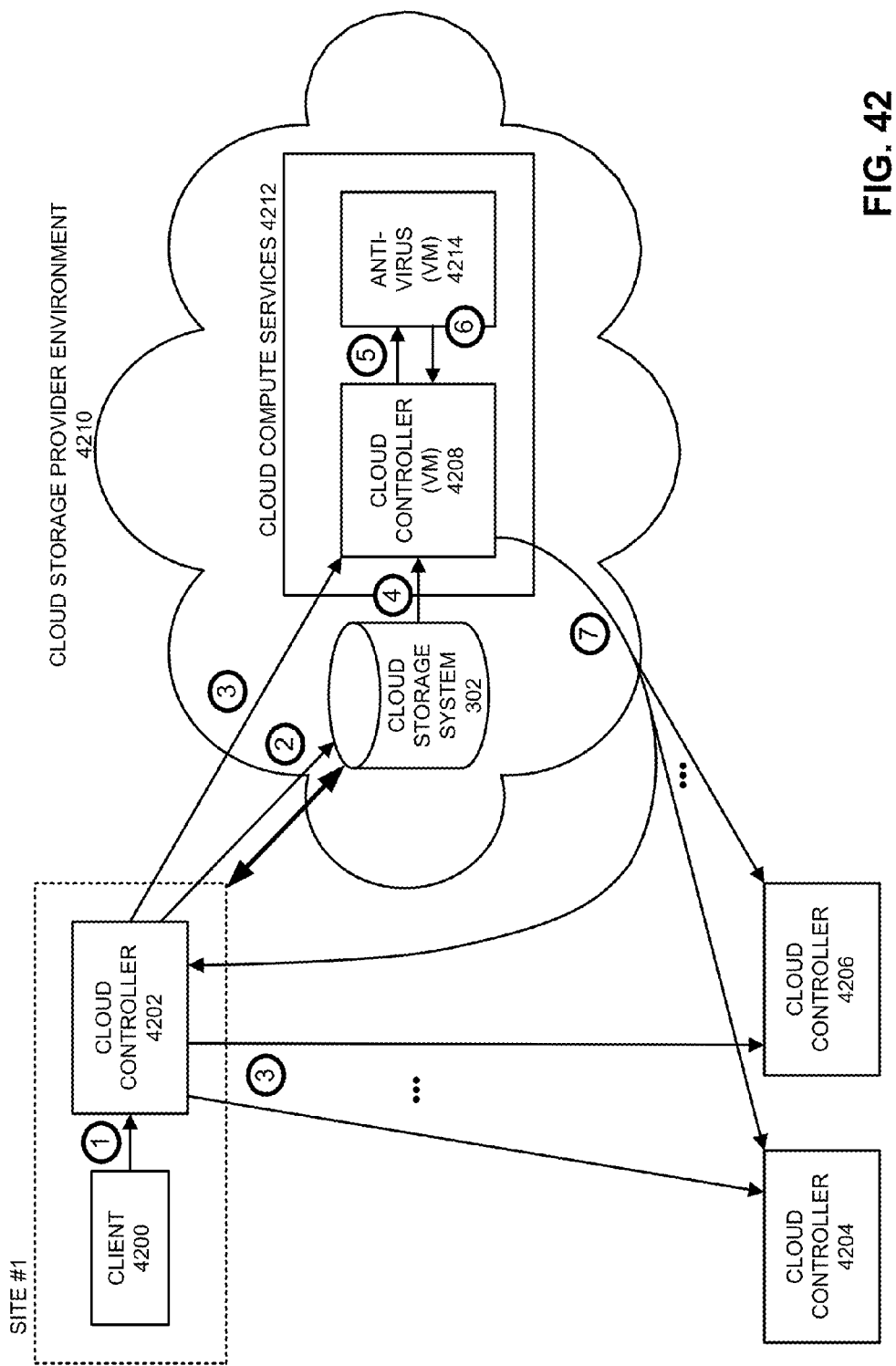
FIG. 42 illustrates an exemplary scenario in which a cloud controller that is co-located with a cloud storage system performs anti-virus scans for all of the data that is written to the distributed filesystem in accordance with an embodiment.

FIG. 42 illustrates an exemplary scenario in which a cloud controller 4208 that is co-located with a cloud storage system 302 performs anti-virus scans for all of the data that is written to the distributed filesystem. More specifically, the cloud storage provider environment 4210 that hosts the cloud storage system 302 also hosts cloud compute services 4212 that include cloud controller 4208 (which executes as a virtual machine in cloud compute services 4212) and an anti-virus service 4214 that is executed in a virtual machine. During operation, a client 4200 writes a new file to cloud controller 4202 (operation 1). Cloud controller 4202 writes cloud files containing the new data blocks for the file to cloud storage system 302 (operation 2), and then sends an incremental metadata snapshot containing metadata for the new file to the other cloud controllers 4204-4208 (operation 3). However, in this incremental metadata snapshot the clean field for the new file is not marked as clean, and hence while the other cloud controllers can indicate the presence of the file to clients, they do not yet allow clients to actually access the new (or modified) file.

An anti-virus scan for the new file may be initiated using a range of mechanisms after cloud controller 4208 has received the incremental metadata snapshot. For instance, cloud controller 4208 may be configured via a locality policy to immediately access cloud storage system 302 to download and cache all of the data blocks for files that are not marked as clean, and then send those files to anti-virus service 4214. Alternatively, anti-virus service 4214 may act as a client of cloud controller 4208, and constantly poll cloud controller 4208 (e.g., determining changes based on the timestamps for files) to detect files that need to be scanned. Regardless of how the scan is initiated, cloud controller 4208 accesses the data blocks for the new file from cloud storage system 302 (operation 4) and the files are transferred to anti-virus service 4214 (operation 5), which then conveys the results of the scan back to cloud controller 4208 (operation 6). Cloud controller 4208 conveys the results of the scan to the rest of the cloud controllers 4202-4206 via another incremental metadata snapshot (operation 7). If the scan indicated that the file was clean, the clean field in the metadata for the new file will have been updated to indicate this clean status. Alternatively, if the file was found to be infected, the cloud controller may be configured to remove the file, quarantine the file, and/or mark the file as infected, and mark the file metadata appropriately. This anti-virus scanning configuration offers a number of substantial performance benefits: (1) offloading anti-virus checks from cloud controllers that provide client file services reduces the load on these cloud controllers, thereby improving file performance for clients; (2) the virtual machine executing the cloud controller 4208 does not require additional dedicated hardware and executes in the same data center as cloud storage system 302, and hence can communicate with cloud storage system 302 via a very low-latency, high-bandwidth connection to download the data blocks for new files very quickly; (3) the virtual machines executing cloud controller 4208 and anti-virus service 4214 may execute on the same server (and/or within the same data center), thereby also facilitating the rapid transfer of files and scan results between the two services; (4) the anti-virus scan executes completely "in the cloud" (e.g., within the cloud storage provider environment), and thus does not consume additional network resources for the other cloud controllers or client sites beyond the receipt of an additional incremental metadata snapshot indicating the results of the scan; and (5) network and compute bandwidth within the cloud are often cheaper than network bandwidth from a client site to the cloud storage system and compute cycles in physical cloud controllers—thus, an arrangement that reduces the load on an organization's wide-area network links and physical cloud controllers can reduce cost while increasing performance. Note, however, that executing a cloud controller in a cloud storage provider environment implies trust in this environment; the cloud controller needs to decrypt the files before transferring them to the anti-virus service, and hence if the environment is compromised the files may be readable by other parties. If this risk is unacceptable, another substantially similar configuration could use a dedicated physical cloud controller and an anti-virus service that are located at a secure site in close network proximity with the cloud storage system (and have a high-bandwidth link to the cloud storage system) to perform anti-virus scans for the distributed filesystem.

Figure 43:
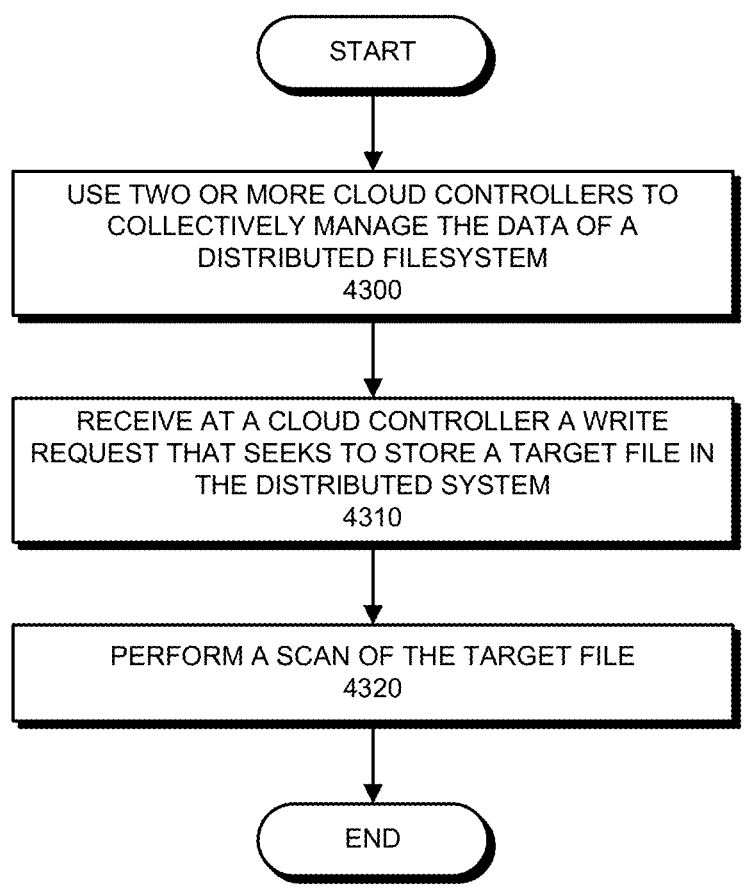
FIG. 43 presents a flow chart that illustrates the process of performing anti-virus checks for a distributed filesystem in accordance with an embodiment.

FIG. 43 presents a flow chart that illustrates the process of performing anti-virus checks for a distributed filesystem. Two or more cloud controllers collectively manage distributed filesystem data that is stored in one or more cloud storage systems (operation 4300); the cloud controllers ensure data consistency for the stored data, and each cloud controller caches portions of the distributed filesystem. During operation, a cloud controller receives a write request from a client system that seeks to store a target file in the distributed system (operation 4310). An scan is then performed for this target file (operation 4320). For instance, the scan may be an anti-virus scan that ensures that viruses are not spread across the distributed filesystem or the clients of the distributed filesystem.

Scanning new or modified files for viruses at write time can help detect some infected files, but if a new file is infected with a type of virus that is not yet covered by the virus definition time at the time of the scan, the infected file may be marked as clean by an anti-virus service. Thus, in some embodiments the distributed filesystem may pursue anti-virus efforts in a different and/or extended manner. For instance, the distributed filesystem may be configured to:

Perform anti-virus scans when files are accessed instead of when they are written: In this configuration, the clean field of a file may be left blank until a request to access the file is received, at which point an anti-virus scan is initiated for the file. For instance, for the exemplary architecture of FIG. 42, upon receiving from a client a request for an unscanned file, cloud controller 4204 may be configured to begin accessing the cloud file(s) containing the file's data blocks from cloud storage system 302 while sending in parallel a request to cloud controller 4208 to perform a scan of the file. Cloud controller 4208's close proximity to cloud storage system 302 may in many instances facilitate completing a scan of the file and sending an updated incremental metadata snapshot (with an updated clean field for the file or, if the file is infected, a virus alert) that reaches cloud controller 4204 in the same timeframe that cloud controller 4204 has finished decrypting the cloud file(s) and caching the data blocks for the requested file. Note that this order of operations puts an anti-virus service in the critical path for file accesses; multiple anti-virus services may need to be instantiated to ensure that anti-virus checks do not substantially delay file accesses.

Perform an anti-virus scan for each new file when it is written (or modified), and then selectively rescan files when they are subsequently accessed: In some configurations, cloud controllers may be able to determine version information for the set of virus definitions that were used during the initial scan of a file, and store this version information in the metadata for the file. During a subsequent access request, the cloud controller checks to see if the set of virus definitions has changed, and if so, rescans the file before allowing it to be accessed (e.g., upon detecting updated virus definitions, clearing the clean field for the file and initiating another scan as described for the previous scenario).

Scan when a file is first written, and then periodically re-scan: The previous scenario involved checking for changed virus definitions at the time a file is accessed. Another alternative involves rescanning all of the files that are stored in the distributed filesystem whenever virus definitions are updated. Depending on the size of the distributed filesystem this may involve substantial time and overhead, especially for files that are not frequently accessed. Thus, locality policies may be used to specify the anti-virus scanning policies for files (e.g., based on the file type, owner, location, etc.).

Note that anti-virus scans typically need to be performed at the file level, not at the file block level, because a virus signature may be split across two blocks of a file that otherwise might be considered clean if they were scanned in isolation. Hence, any time any part of a file changes, the entire file needs to be re-scanned to ensure that the file has not been infected by a virus. Furthermore, data blocks that are used by multiple files still need to be re-checked in the context of each individual file that includes the data block.

The delay associated with performing an anti-virus scan may be based on the size of the file being scanned, and may become substantial for very large files. In some embodiments, the metadata clean field for a file (e.g., for files beyond a certain size) may be organized in a manner that allows portions of the file that have already been scanned to be marked as clean, so that a cloud controller can already begin to send the checked portions of the file (if clean) to a client while the rest of the scan is completing. Thus, a client may experience some initial delay while the first part of a large file is being checked, but can begin receiving (and can start working on) the beginning of the file while the later parts are still being checked.

Another delay may arise for a client that writes a file and then immediately attempts to inspect the contents of the file; in some implementations, the subsequent read would be blocked until the anti-virus scan has completed. In some embodiments, cloud controllers may be configured to allow clients that have written new data to access this data immediately, even if it has not been scanned, to reduce user frustration with potential delays. However, these situations may be limited by locality policies (e.g., only allowed for certain file types, file sizes, or users), to prevent common access patterns that lead to infections (e.g., a user storing an attachment from email and being able to open the resulting file before it has been scanned).

Note that while the preceding examples describe performing anti-virus scans, the disclosed techniques can also be used to perform a wide range of other types of scans. For instance, the architecture and process illustrated in FIG. 42 could also be used to scan for files that violate workplace rules (e.g., compressed audio files, video files, pornographic images, etc.) based on a range of other filtering criteria (e.g., filename extensions, checksums, targeted definition files, etc.). These other types of scans can be initiated at the time that files are written and/or accessed, or on-demand for parts or all of the distributed filesystem, as also described above for anti-virus scans. Furthermore, the architecture illustrated in FIG. 42 could also be leveraged to perform targeted searches (e.g., for legal discovery); for example, in this context, anti-virus service 4214 might instead be configured as a general-purpose search service that leverages cloud controller 4208's close proximity to cloud storage system 302 to efficiently search through the distributed filesystem to find all of the files that meet the specified search criteria (e.g., all of the files that contain a specified text string). Note that performing such searches in a cloud storage provider environment is typically much faster and cheaper than having to transfer all of contents of the distributed filesystem out over the network to a non-co-located cloud controller to perform the search.

In summary, embodiments of the present invention facilitate storing and accessing data in a distributed filesystem. A set of distributed cloud controllers manage data stored in a cloud-based storage system to provide a high-capacity, high-reliability storage system that ensures data consistency. These cloud controllers cache the set of data that is being used by their respective clients, store updates in cloud files on the cloud storage system, and forward updates to each other via incremental snapshots. The data capacity of the system can be easily extended as needed by leasing additional space for the cloud storage system. Hence, the disclosed embodiments present an abstraction of one global, extensible filesystem while preserving the abstraction of high-speed local data access.

Computing Environment

Figure 9:
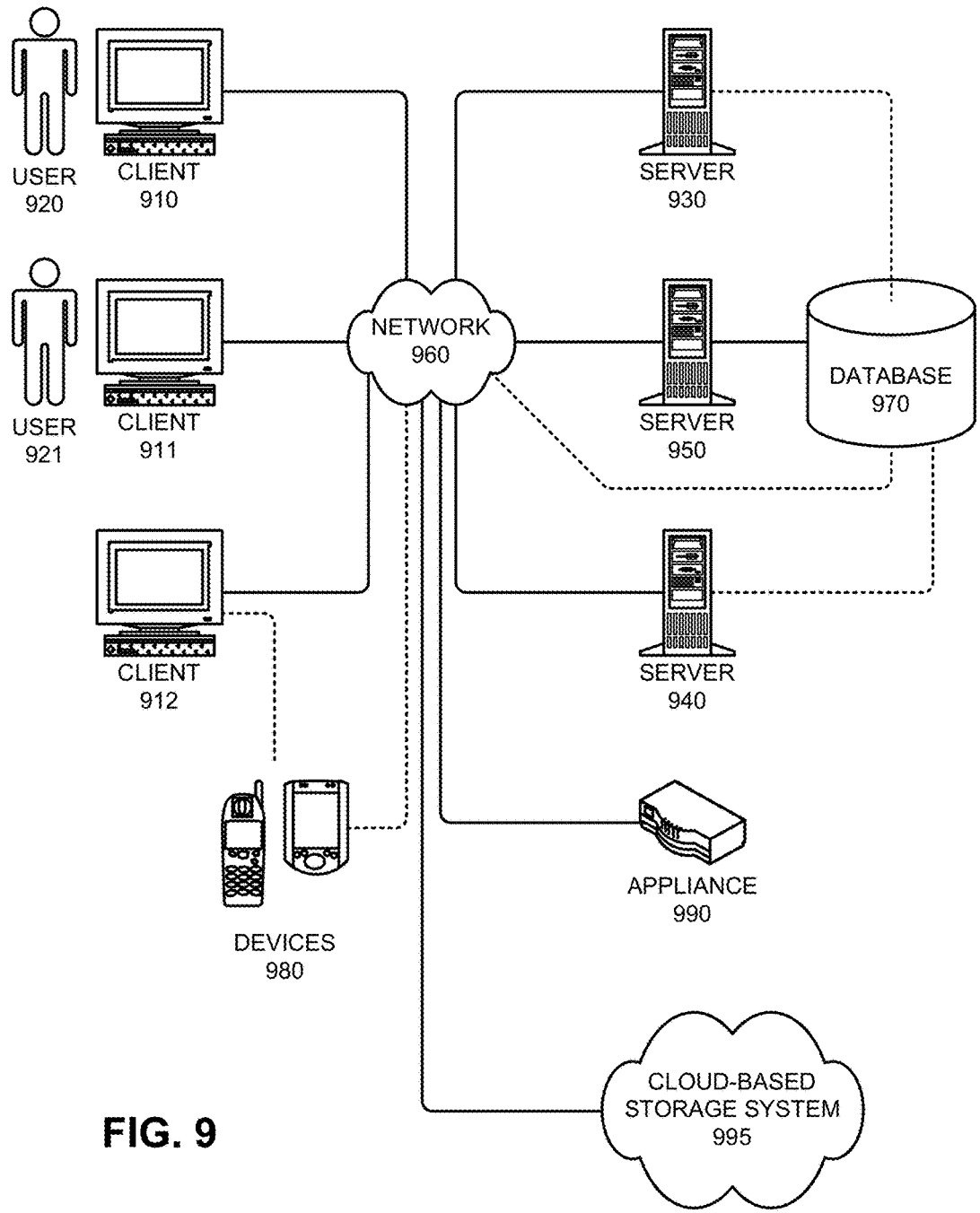
FIG. 9 illustrates a computing environment in accordance with an embodiment.

In some embodiments of the present invention, techniques for managing and/or accessing a distributed filesystem can be incorporated into a wide range of computing devices in a computing environment. For example, FIG. 9 illustrates a computing environment 900 in accordance with an embodiment of the present invention. Computing environment 900 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 9, computing environment 900 includes clients 910-912, users 920 and 921, servers 930-950, network 960, database 970, devices 980, appliance 990, and cloud-based storage system 995.

Clients 910-912 can include any node on a network that includes computational capability and includes a mechanism for communicating across the network. Additionally, clients 910-912 may comprise a tier in an n-tier application architecture, wherein clients 910-912 perform as servers (servicing requests from lower tiers or users), and wherein clients 910-912 perform as clients (forwarding the requests to a higher tier).

Similarly, servers 930-950 can generally include any node on a network including a mechanism for servicing requests from a client for computational and/or data storage resources. Servers 930-950 can participate in an advanced computing cluster, or can act as stand-alone servers. For instance, computing environment 900 can include a large number of compute nodes that are organized into a computing cluster and/or server farm. In one embodiment of the present invention, server 940 is an online "hot spare" of server 950.

Users 920 and 921 can include: an individual; a group of individuals; an organization; a group of organizations; a computing system; a group of computing systems; or any other entity that can interact with computing environment 900.

Network 960 can include any type of wired or wireless communication channel capable of coupling together computing nodes. This includes, but is not limited to, a local area network, a wide area network, or a combination of networks. In one embodiment of the present invention, network 960 includes the Internet. In some embodiments of the present invention, network 960 includes phone and cellular phone networks.

Database 970 can include any type of system for storing data in non-volatile storage. This includes, but is not limited to, systems based upon magnetic, optical, or magneto-optical storage devices, as well as storage devices based on flash memory and/or battery-backed up memory. Note that database 970 can be coupled: to a server (such as server 950), to a client, or directly to a network. In some embodiments of the present invention, database 970 is used to store information that may later be stored in unused bits of a memory pointer. Alternatively, other entities in computing environment 900 (e.g., servers 930-950) may also store such data.

Devices 980 can include any type of electronic device that can be coupled to a client, such as client 912. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 980 can be coupled directly to network 960 and can function in the same manner as clients 910-912.

Appliance 990 can include any type of appliance that can be coupled to network 960. This includes, but is not limited to, routers, switches, load balancers, network accelerators, and specialty processors. Appliance 990 may act as a gateway, a proxy, or a translator between server 940 and network 960.

Cloud-based storage system 995 can include any type of networked storage devices (e.g., a federation of homogeneous or heterogeneous storage devices) that together provide data storage capabilities to one or more clients.

Note that different embodiments of the present invention may use different system configurations, and are not limited to the system configuration illustrated in computing environment 900. In general, any device that includes computational and storage capabilities may incorporate elements of the present invention.

Figure 10:
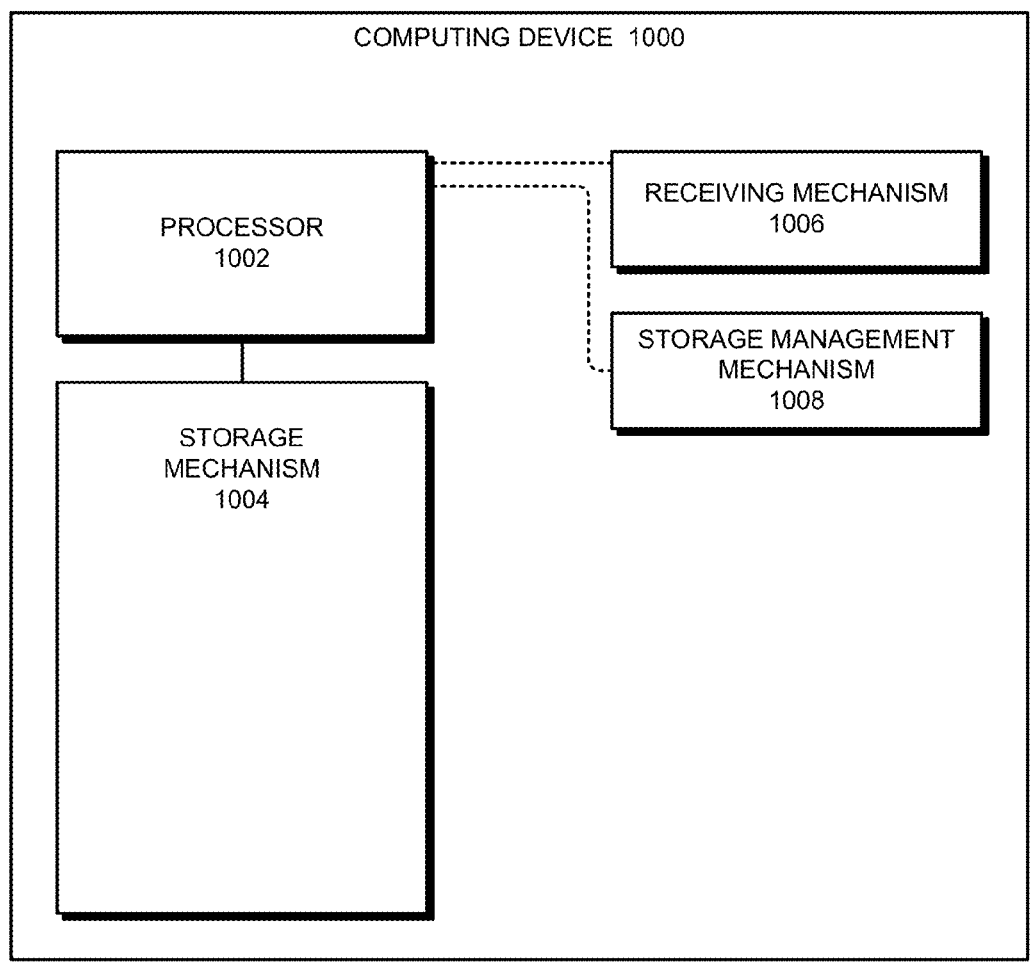
FIG. 10 illustrates a computing device in accordance with an embodiment.

FIG. 10 illustrates a computing device 1000 that includes a processor 1002 and a storage mechanism 1004. Computing device 1000 also includes a receiving mechanism 1006 and a storage management mechanism 1008.

In some embodiments, computing device 1000 uses receiving mechanism 1006, storage management mechanism 1008, and storage mechanism 1004 to manage data in a distributed filesystem. For instance, storage mechanism 1004 can store metadata for a distributed filesystem, and computing device 1000 can use receiving mechanism 1006 to receive a request to access a data block for a file. Program instructions executing on processor 1002 can traverse the stored metadata to identify a metadata entry that is associated with the data block. Storage management mechanism 1008 can use this metadata entry to download a cloud file containing the data block from a cloud storage system.

In some embodiments of the present invention, some or all aspects of receiving mechanism 1006, storage management mechanism 1008, and/or a filesystem device driver can be implemented as dedicated hardware modules in computing device 1000. These hardware modules can include, but are not limited to, processor chips, application-specific integrated circuit (ASIC) chips, field-programmable gate arrays (FPGAs), memory chips, and other programmable-logic devices now known or later developed.

Processor 1002 can include one or more specialized circuits for performing the operations of the mechanisms. Alternatively, some or all of the operations of receiving mechanism 1006, storage management mechanism 1008, and/or a filesystem device driver may be performed using general-purpose circuits in processor 1002 that are configured using processor instructions. Thus, while FIG. 10 illustrates receiving mechanism 1006 and/or storage management mechanism 1008 as being external to processor 1002, in alternative embodiments some or all of these mechanisms can be internal to processor 1002.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for performing file checks for a distributed filesystem, the method comprising:
   collectively managing the data of the distributed filesystem using two or more cloud controllers, wherein collectively managing the data comprises:
      storing the data for the distributed filesystem in a cloud storage system, wherein the cloud controllers cache and ensure data consistency for data stored in the cloud storage system;
      maintaining in each cloud controller a metadata hierarchy that reflects the current state of the distributed filesystem, wherein changes to the metadata for the distributed filesystem are synchronized across the cloud controllers,
      wherein the metadata hierarchy in the cloud controller tracks the location of distributed filesystem data blocks in the cloud storage system and cached distributed filesystem data blocks in the cloud controller, wherein the cloud controller uses the metadata hierarchy to locate and download requested, uncached data blocks in the distributed filesystem from the cloud storage system, wherein the file data for the distributed filesystem is stored in the cloud storage systems, wherein cloud controllers cache in their local storage devices a subset of the file data from the cloud storage system that is being actively accessed by each respective cloud controller's clients;

upon receiving at a cloud controller a write request from a client system that seeks to store a target file in the distributed filesystem, sending an incremental metadata snapshot containing metadata for the target file from the cloud controller to the other cloud controllers for the distributed filesystem;

wherein a third cloud controller that is associated with scanning operations uses the incremental metadata snapshot to retrieve the target file from the cloud storage system and initiates a scan for the target file, wherein the third cloud controller is co-located with the cloud storage system and geographically distinct and separate from the cloud controller receiving the target file and the client system;

wherein the third cloud controller determines that the target file has been successfully scanned and sends a subsequent incremental metadata snapshot indicating that the target file has been scanned to the other cloud controllers of the distributed filesystem;

wherein a second cloud controller receiving a client request to access the target file uses the contents of the subsequent incremental metadata snapshot to confirm that the target file has been scanned before allowing access to the target file.

2. The computer-implemented method of claim 1, wherein the scan is an anti-virus scan that ensures that the target file is clean of viruses before allowing any clients of the distributed filesystem to access the target file.

3. The computer-implemented method of claim 2, wherein the metadata for each file in the distributed filesystem includes a clean field that is marked when the file has been scanned and determined to be clean of viruses;

wherein performing the anti-virus scan of the target file involves marking the clean field for the target file if no virus is found for the target file and sending the subsequent incremental metadata snapshot that includes the updated clean field for the target file to the other cloud controllers of the distributed filesystem; and wherein the second cloud controller confirms that the clean field for the target file is marked before allowing access to the target file.

4. The computer-implemented method of claim 3, wherein performing the anti-virus scan of the target file further comprises:

storing one or more cloud files that contain data blocks for the target file in the cloud storage system;

receiving the incremental metadata snapshot at the third cloud controller, wherein the third cloud controller retrieves the one of more cloud files that contain the target file from the cloud storage system and performs the anti-virus scan for the target file; and if no virus is found for the target file, sending the subsequent incremental metadata snapshot from the third cloud controller in which the clean field for the target file is marked.

5. The computer-implemented method of claim 4, wherein the third cloud controller is co-located with the cloud storage system and an anti-virus service in a cloud computing environment;

wherein the third cloud controller downloads the target file by downloading the one or more cloud files containing the data blocks for the target file from the cloud storage system;

wherein the third cloud controller transfers the target file to the anti-virus service; and wherein after performing the anti-virus scan for the target file the anti-virus service sends the results for the anti-virus scan to the third cloud controller.

6. The computer-implemented method of claim 5, wherein the anti-virus scan of the target file is initiated at the time that the target file is written to the distributed filesystem.

7. The computer-implemented method of claim 5, wherein the anti-virus scan of the target file is initiated on the third cloud controller at the time that the target file is requested from the cloud storage system via the second cloud controller; and wherein the anti-virus scan executes in parallel with the download to the second cloud controller of the one or more cloud files that contain the data blocks for the target file from the cloud storage system, wherein co-locating the third cloud controller with the cloud storage system facilitates performing the anti-virus scan quickly and delivering the subsequent incremental metadata snapshot that includes the anti-virus scan results for the target file to the second cloud controller in the same timeframe that the requested cloud files have been decrypted and cached on the second cloud controller.

8. The computer-implemented method of claim 5, wherein a first anti-virus scan of the target file is initiated at the time that the target file is written to the distributed filesystem;

wherein the metadata for the target file includes a version field that tracks the version of the virus definitions that was used to perform the first anti-virus scan; and wherein upon receiving a subsequent access request for the target file, the cloud controller detects that an updated set of virus definitions are newer than the tracked version in the version field, initiates a subsequent anti-virus scan of the target file using the updated set of virus definitions, and restricts client access to the target file until at least one of a local anti-virus check or another subsequent incremental metadata update from the third cloud controller indicates that the target file is clean.

9. The computer-implemented method of claim 5, wherein a first anti-virus scan of the target file is initiated at the time that the target file is written to the distributed filesystem; and wherein a subsequent anti-virus scan of the target file is initiated when the anti-virus service receives an updated set of virus definitions.

10. The computer-implemented method of claim 9, wherein subsequent anti-virus scans for the distributed filesystem are configured to selectively re-scan a subset of the distributed filesystem.

11. The computer-implemented method of claim 10, wherein the subset of the distributed filesystem that is re-scanned is selected based on the file type for a file, the owner of the file, and the location of the file in the distributed filesystem hierarchy.

12. The computer-implemented method of claim 5,
wherein the clean field is organized in a manner that allows sub-portions of the target file that have already been scanned to be marked as clean; and
wherein the second cloud controller already serves portions of the target file that have been marked as clean to a requesting client while the anti-virus service is still scanning other portions of the target file.

13. A non-transitory computer-readable storage medium storing instructions that when executed by a computer cause the computer to perform a method for performing anti-virus checks for a distributed filesystem, the method comprising:
collectively managing the data of the distributed filesystem using two or more cloud controllers, wherein collectively managing the data comprises:
storing the data for the distributed filesystem in a cloud storage system, wherein the cloud controllers cache and ensure data consistency for data stored in the cloud storage system;
maintaining in each cloud controller a metadata hierarchy that reflects the current state of the distributed filesystem, wherein changes to the metadata for the distributed filesystem are synchronized across the cloud controllers,
wherein the metadata hierarchy in the cloud controller tracks the location of distributed filesystem data blocks in the cloud storage system and cached distributed filesystem data blocks in the cloud controller, wherein the cloud controller uses the metadata hierarchy to locate and download requested, uncached data blocks in the distributed filesystem from the cloud storage system, wherein the file data for the distributed filesystem is stored in the cloud storage systems, wherein cloud controllers cache in their local storage devices a subset of the file data from the cloud storage system that is being actively accessed by each respective cloud controller's clients;
upon receiving at a cloud controller a write request from a client system that seeks to store a target file in the distributed filesystem, sending an incremental metadata snapshot containing metadata for the target file from the cloud controller to the other cloud controllers for the distributed filesystem;
wherein a third cloud controller that is associated with scanning operations uses the incremental metadata snapshot to retrieve the target file from the cloud storage system and initiates a scan for the target file, wherein the third cloud controller is co-located with the cloud storage system and geographically distinct and separate from the cloud controller receiving the target file and the client system;
wherein the third cloud controller determines that the target file has been successfully scanned and sends a subsequent incremental metadata snapshot indicating that the target file has been scanned to the other cloud controllers of the distributed filesystem;
wherein a second cloud controller receiving a client request to access the target file uses the contents of the subsequent incremental metadata snapshot to confirm that the target file has been scanned before allowing access to the target file.

14. The non-transitory computer-readable storage medium of claim 13,
wherein the metadata for each file in the distributed filesystem includes a clean field that is marked when the file has been scanned and determined to be clean of viruses;
wherein performing the anti-virus scan of the target file involves marking the clean field for the target file if no virus is found for the target file and sending the subsequent incremental metadata snapshot that includes the updated clean field for the target file to the other cloud controllers of the distributed filesystem; and
wherein the second cloud controller confirms that the clean field for the target file is marked before allowing access to the target file.

15. The non-transitory computer-readable storage medium of claim 14, wherein performing the anti-virus scan of the target file further comprises:
storing one or more cloud files that contain data blocks for the target file in the cloud storage system;
receiving the incremental metadata snapshot at the third cloud controller that is associated with anti-virus scanning operations; and
if no virus is found for the target file, sending a subsequent incremental metadata snapshot from the third cloud controller in which the clean field for the target file is marked.

16. The non-transitory computer-readable storage medium of claim 15,
wherein the third cloud controller is co-located with the cloud storage system and an anti-virus service in a cloud computing environment;
wherein the third cloud controller downloads the target file by downloading the one or more cloud files containing the data blocks for the target file from the cloud storage system;
wherein the third cloud controller transfers the target file to the anti-virus service; and
wherein after performing the anti-virus scan for the target file the anti-virus service sends the results for the anti-virus scan to the third cloud controller.

17. The non-transitory computer-readable storage medium of claim 16, wherein the anti-virus scan of the target file is initiated at the time that the target file is written to the distributed filesystem.

18. The non-transitory computer-readable storage medium of claim 16,
wherein the anti-virus scan of the target file is initiated at the time that the target file is accessed by the client request via the second cloud controller; and
wherein the anti-virus scan executes in parallel with the download of the one or more cloud files that contain the data blocks for the target file from the cloud storage system.

19. The non-transitory computer-readable storage medium of claim 16,
wherein a first anti-virus scan of the target file is initiated at the time that the target file is written to the distributed filesystem;
wherein the metadata for the target file includes a version field that tracks the version of the virus definitions that was used to perform the first anti-virus scan; and
wherein a subsequent anti-virus scan of the target file is initiated if an updated set of virus definitions that are newer than the tracked version are available when the target file is accessed.

20. A cloud controller that initiates anti-virus checks for a distributed filesystem, comprising: a processor; a storage mechanism that stores metadata for the distributed filesystem; and a storage management mechanism; wherein two or more cloud controllers collectively manage the data of the distributed filesystem, wherein collectively managing the data comprises: storing the data for the distributed filesystem in a cloud storage system, wherein the cloud controllers cache and ensure data consistency for data stored in the cloud storage system; maintaining in each cloud controller a metadata hierarchy that reflects the current state of the distributed filesystem, wherein changes to the metadata for the distributed filesystem are synchronized across the cloud controllers, wherein the metadata hierarchy in the cloud controller tracks the location of distributed filesystem data blocks in the cloud storage system and cached distributed filesystem data blocks in the cloud controller, wherein the cloud controller uses the metadata hierarchy to locate and download requested, uncached data blocks in the distributed filesystem from the cloud storage system, wherein the file data for the distributed filesystem is stored in the cloud storage systems, wherein cloud controllers cache in their local storage devices a subset of the data from the cloud storage system that is being actively accessed by each respective cloud controller's clients; and wherein the cloud controller is configured to: receive an incremental metadata snapshot containing metadata for a new the that has been written to the distributed filesystem by a distinct cloud controller for the distributed filesystem; use the incremental metadata snapshot to download the new the from the cloud storage system, wherein the cloud controller is co-located with the cloud storage system and geographically distinct and separate from the distinct cloud controller receiving the target file; transfer the target the to an anti-virus service to initiate an anti-virus scan for the target file; and upon determining from the anti-virus service that no virus was found for the target file, send a subsequent incremental metadata snapshot that indicates that the target the is dean to the other cloud controllers for the distributed filesystem; wherein a second cloud controller receiving a client request to access the target file uses the contents of the subsequent incremental metadata snapshot to confirm that the target has been successfully scanned before allowing access to the target file.

* * * * *